(12) United States Patent
Millius et al.

(10) Patent No.: US 11,990,823 B2
(45) Date of Patent: May 21, 2024

(54) SELF-POWERED IRRIGATION SYSTEMS, GENERATOR SYSTEMS AND METHODS OF CONTROLLING IRRIGATION

(71) Applicant: Rain Bird Corporation, Azusa, CA (US)

(72) Inventors: Michael J. Millius, Tucson, AZ (US); Riccardo J. Tresso, Oro Valley, AZ (US); Randy R. Montgomery, Tucson, AZ (US); Patrick J. Hibbs, Gilbert, AZ (US); Parthiv A. Rajgor, Marana, AZ (US); Michael A. McAfee, Tucson, AZ (US); Jiangjiang Dai, Tucson, AZ (US); John E. Price, Tucson, AZ (US); Bradley H. Dolbin, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 188 days.

(21) Appl. No.: 17/744,349

(22) Filed: May 13, 2022

(65) Prior Publication Data
US 2022/0368195 A1    Nov. 17, 2022

Related U.S. Application Data

(60) Provisional application No. 63/218,771, filed on Jul. 6, 2021, provisional application No. 63/189,003, filed on May 14, 2021.

(51) Int. Cl.
*H02K 7/18* (2006.01)
*A01G 25/16* (2006.01)
(Continued)

(52) U.S. Cl.
CPC .......... *H02K 7/1823* (2013.01); *A01G 25/16* (2013.01); *G05D 16/0636* (2013.01); *H02K 11/0094* (2013.01); *H02K 11/04* (2013.01)

(58) Field of Classification Search
CPC .. H02K 7/1823; H02K 11/0094; H02K 11/04; H02K 7/1869; A01G 25/16;
(Continued)

(56) References Cited

U.S. PATENT DOCUMENTS

| 4,838,310 A | 6/1989 | Scott |
| 5,333,785 A | 8/1994 | Dodds |

(Continued)

FOREIGN PATENT DOCUMENTS

| NL | 2021361 B1 | 1/2020 |
| WO | 2008066670 | 6/2008 |

(Continued)

OTHER PUBLICATIONS

RAIN; "The one and only intelligent irrigation"; <https://www.rain.it/en/rain-products/rain-vision-en/>; Mar. 5, 2021; 2 pages; retrieved from Internet Archive Wayback Machine <https://web.archive.org/web/20210305075203/https://www.rain.it/en/rain-products/rain-vision-en/> on Mar. 2, 2023.

(Continued)

*Primary Examiner* — Joseph Ortega
(74) *Attorney, Agent, or Firm* — Fitch, Even, Tabin & Flannery LLP

(57) ABSTRACT

Some embodiments provide irrigation generator systems that include a main conduit comprising an inlet conduit and an outlet conduit; a flow control system positioned within the main conduit; a generator conduit comprising a generator inlet conduit and a generator outlet conduit, wherein the generator inlet conduit is fluidly coupled with the main conduit upstream of the flow control system, the generator outlet conduit is fluidly coupled with the main conduit downstream of the flow control system; and a generator comprising a rotor assembly cooperated with generator conduit to be physically activated by a flow of fluid through (Continued)

the generator conduit causing rotation of the rotor assembly and generates electrical power. The flow control system transitions between a closed state to the open state in response to a water pressure exceeding a pressure threshold.

26 Claims, 60 Drawing Sheets

(51) Int. Cl.
    *G05D 16/06* (2006.01)
    *H02K 11/00* (2016.01)
    *H02K 11/04* (2016.01)
(58) Field of Classification Search
    CPC .. A01G 25/165; G05D 16/0636; G05D 7/005; F05B 2220/20; F05B 2220/602; F03B 13/00; F16K 31/402
    See application file for complete search history.

(56) References Cited

U.S. PATENT DOCUMENTS

| | | |
|---|---|---|
| 5,427,350 A | 6/1995 | Rinkewich |
| 5,661,349 A | 8/1997 | Luck |
| 6,283,139 B1 | 9/2001 | Symonds |
| 6,312,191 B1 | 11/2001 | Rosenfeld |
| 6,661,112 B2 | 12/2003 | Zeier |
| 6,864,591 B2 | 3/2005 | DeFrank |
| 6,885,114 B2 | 4/2005 | Baarman |
| 6,927,501 B2 | 8/2005 | Baarman |
| 7,010,394 B1 | 3/2006 | Runge |
| 7,097,113 B2 | 8/2006 | Ivans |
| 7,140,563 B2 | 11/2006 | Sinden |
| 7,182,272 B1 | 2/2007 | Marian |
| 7,191,955 B2 | 3/2007 | Ivans |
| 7,228,726 B2 | 6/2007 | Kates |
| 7,264,177 B2 | 9/2007 | Buck |
| 7,266,428 B2 | 9/2007 | Alexanian |
| 7,348,685 B2 | 3/2008 | Yi |
| 7,349,763 B2 | 3/2008 | Ivans |
| 7,359,769 B2 | 4/2008 | Bailey |
| 7,362,000 B1 | 4/2008 | DeFrank |
| 7,363,113 B2 | 4/2008 | Runge |
| 7,383,721 B2 | 6/2008 | Parsons |
| 7,456,514 B2 | 11/2008 | Ahmad |
| 7,457,687 B1 | 11/2008 | Porter |
| 7,458,521 B2 | 12/2008 | Ivans |
| 7,605,485 B2 | 10/2009 | Pitchford |
| 7,617,992 B2 | 11/2009 | Ivans |
| 7,663,259 B2 | 2/2010 | Baarman |
| 7,685,973 B2 | 3/2010 | Nelson |
| 7,701,076 B2 | 4/2010 | Baarman |
| 7,708,206 B2 | 5/2010 | Ivans |
| 7,723,860 B2 | 5/2010 | Nagler |
| 7,768,147 B2 | 8/2010 | Baarman |
| 7,779,852 B2 | 8/2010 | Burlage |
| 7,812,470 B2 | 10/2010 | Baarman |
| 7,822,511 B2 | 10/2010 | Ivans |
| 7,844,368 B2 | 11/2010 | Alexanian |
| 7,898,102 B2 | 3/2011 | Alstot |
| 7,932,618 B2 | 4/2011 | Baarman |
| 7,945,973 B2 | 5/2011 | Khorshid |
| 7,956,481 B2 | 6/2011 | Baarman |
| 7,962,244 B2 | 6/2011 | Alexanian |
| 7,962,245 B2 | 6/2011 | Runge |
| 8,024,075 B2 | 9/2011 | Fekete |
| 8,055,389 B2 | 11/2011 | Holindrake |
| 8,067,850 B2 | 11/2011 | Alvarez |
| 8,080,913 B2 | 12/2011 | Fielder |
| 8,092,675 B2 | 1/2012 | Kennedy |
| 8,186,609 B2 | 5/2012 | Rapp |
| 8,225,810 B2 | 7/2012 | Blanchard |
| 8,278,775 B2 | 10/2012 | Liao |
| 8,294,292 B2 | 10/2012 | Irwin |
| 8,426,992 B2 | 4/2013 | Baarman |
| 8,443,822 B2 | 5/2013 | Ivans |
| 8,457,798 B2 | 6/2013 | Hackett |
| 8,457,799 B2 | 6/2013 | Cox |
| 8,538,592 B2 | 9/2013 | Alexanian |
| 8,546,965 B2 | 10/2013 | Alvarez |
| 8,616,830 B2 | 12/2013 | Unno |
| 8,678,706 B2 | 3/2014 | Luciano, Jr. |
| 8,698,333 B2 | 4/2014 | Glasser |
| 8,733,155 B2 | 5/2014 | Hill |
| 8,786,122 B2 | 7/2014 | Rajadhyaksha |
| 8,874,275 B2 | 10/2014 | Alexanian |
| 8,919,036 B2 | 12/2014 | Luciano, Jr. |
| 8,928,168 B2 | 1/2015 | Letang |
| 8,946,921 B2 | 2/2015 | Kaiser |
| 9,043,036 B2 | 5/2015 | Fekete |
| 9,049,821 B1 | 6/2015 | Hanna |
| 9,057,353 B2 | 6/2015 | Aubuchon, Sr. |
| 9,089,861 B2 | 7/2015 | Orubor |
| 9,097,234 B2 | 8/2015 | Breau |
| 9,144,203 B2 | 9/2015 | Nelson |
| 9,332,696 B2 | 5/2016 | Salsberg |
| 9,356,226 B2 | 5/2016 | Pargas |
| 9,439,369 B2 | 9/2016 | Christiansen |
| 9,453,492 B2 | 9/2016 | Letang |
| 9,506,448 B2 | 11/2016 | Doronin |
| 9,527,102 B2 | 12/2016 | Hill |
| 9,574,923 B2 | 2/2017 | Williamson |
| 9,651,400 B2 | 5/2017 | Pitchford |
| 9,684,312 B1 | 6/2017 | Eyring |
| 9,759,394 B2 | 9/2017 | Aubuchon |
| 9,901,041 B2 | 2/2018 | Manghi |
| 9,901,046 B2 | 2/2018 | Sun |
| 9,952,568 B2 | 4/2018 | Livadaras |
| 10,088,849 B2 | 10/2018 | Hurst |
| 10,094,355 B2 | 10/2018 | Kanemoto |
| 10,123,493 B2 | 11/2018 | Runge |
| 10,124,358 B1 | 11/2018 | Graham |
| 10,139,259 B2 | 11/2018 | Chen |
| 10,143,147 B2 | 12/2018 | Messner |
| 10,254,728 B2 | 4/2019 | Hill |
| 10,261,523 B2 | 4/2019 | Khabbaz |
| 10,368,504 B2 | 8/2019 | Sabadin |
| 10,512,227 B2 | 12/2019 | Rainone |
| 10,534,378 B1 | 1/2020 | Eyring |
| 10,576,481 B2 | 3/2020 | Patrick |
| 10,721,857 B2 | 7/2020 | Tippery |
| 10,753,337 B2 | 8/2020 | DeFrank |
| 10,782,163 B2 | 9/2020 | Vromans |
| 10,815,958 B2 | 10/2020 | Kah, III |
| 10,837,575 B2 | 11/2020 | Heaney |
| 10,925,222 B2 | 2/2021 | Sarver |
| 10,965,109 B2 | 3/2021 | Paul |
| 10,973,182 B1 | 4/2021 | Bangerter |
| 11,047,502 B2 | 6/2021 | Heaney |
| 11,118,556 B2 | 9/2021 | Kah, III |
| 11,152,795 B2 | 10/2021 | Hallstrom |
| 11,152,839 B2 | 10/2021 | Sturman |
| 2002/0021008 A1 | 2/2002 | Hurley |
| 2007/0035134 A1 | 2/2007 | Bristow, Jr. |
| 2007/0074767 A1 | 4/2007 | Roffey |
| 2007/0221750 A1 | 9/2007 | Roberts |
| 2008/0246282 A1 | 10/2008 | Hathaway |
| 2008/0251602 A1 | 10/2008 | Leggett |
| 2009/0001193 A1 | 1/2009 | Parsons |
| 2009/0102193 A1 | 4/2009 | Murphy |
| 2010/0324744 A1 | 12/2010 | Cox |
| 2011/0087379 A1 | 4/2011 | Savelle, Jr. |
| 2011/0111700 A1 | 5/2011 | Hackett |
| 2011/0133467 A1 | 6/2011 | Stiles |
| 2011/0233935 A1 | 9/2011 | Baarman |
| 2011/0309274 A1 | 12/2011 | Parsons |
| 2012/0160350 A1 | 6/2012 | Crugnale |
| 2012/0326443 A1 | 12/2012 | Vince |
| 2013/0048746 A1 | 2/2013 | Littrell |
| 2013/0113220 A1 | 5/2013 | Staples |
| 2014/0284932 A1 | 9/2014 | Sharkh |
| 2015/0053786 A1 | 2/2015 | Rosa |
| 2015/0192030 A1 | 7/2015 | Rubinshtein |

(56) References Cited

U.S. PATENT DOCUMENTS

| | | |
|---|---|---|
| 2015/0252793 A1 | 9/2015 | Croker |
| 2016/0083937 A1 | 3/2016 | Cavarec |
| 2017/0172078 A1 | 6/2017 | Gonzalez Hernandez |
| 2017/0318761 A1 | 11/2017 | Rainone |
| 2017/0347543 A1 | 12/2017 | Khabbaz |
| 2017/0367277 A1 | 12/2017 | Mohindra |
| 2018/0042188 A1 | 2/2018 | Khabbaz |
| 2018/0274212 A1 | 9/2018 | Kuchly |
| 2019/0235456 A1 | 8/2019 | Hill |
| 2019/0297798 A1 | 10/2019 | Levine |
| 2020/0015438 A1 | 1/2020 | Klicpera |
| 2020/0080875 A1* | 3/2020 | Hallstrom ............... F03B 13/10 |
| 2020/0091737 A1 | 3/2020 | Hallstrom |
| 2020/0245574 A1 | 8/2020 | Woytowitz |
| 2020/0281137 A1 | 9/2020 | Heaney |
| 2020/0288654 A1 | 9/2020 | Mohr |
| 2020/0344962 A1 | 11/2020 | Wright |
| 2020/0350778 A1 | 11/2020 | Nemecek |
| 2020/0359580 A1 | 11/2020 | Montgomery |
| 2020/0378353 A1 | 12/2020 | Kah, III |
| 2021/0013776 A1 | 1/2021 | Sturman |
| 2022/0018326 A1* | 1/2022 | Cheron ................. F03B 17/061 |
| 2022/0023894 A1 | 1/2022 | Wright, III |
| 2022/0395845 A1 | 12/2022 | Bell |

FOREIGN PATENT DOCUMENTS

| | | |
|---|---|---|
| WO | 2016190732 A1 | 12/2016 |
| WO | 2017111591 | 6/2017 |
| WO | 2021141491 A1 | 7/2021 |
| WO | 2022241231 | 11/2022 |
| WO | 2022241237 | 11/2022 |

OTHER PUBLICATIONS

RAIN; "Turbina Vision"; <https://www.rain.it/en/rain-product/onda-vision/>; available at least as early as Feb. 3, 2023; 6 pages.

RAIN; "Turbina Vision"; <https://www.rain.it/wp-content/uploads/wpallimport/files/pdf/superato/2021_TURBINA_instructions.pdf>; 2021; Edition v. 1.0; Rain; Italy; pp. 1-20.

AMRE Supply; "TOTO EcoPower Flushometer (Pre-2013) | Generator | Repair and Replace"; https://www.youtube.com/watch?v=WTRbXzwu0VE; Sep. 21, 2017; pp. 1-13.

KINETRON; "Turbine Generator Systems"; https://www.kinetron.eu/turbines; May 12, 2022; 8 pages.

KINETRON; "Turbine System Technology"; https://www.kinetron.eu/technology/turbines; Jun. 21, 2021; 6 pages.

Landscape Business; "John Deere Green Tech Wins IA New Product Award"; Landscape Business; https://landscape-business.com/john-deere-green-tech-wins-ia-new-product-award/; Jan. 9, 2009; 2 pages.

TOTO; "EcoPower® Toilet Flush Valve"; https://www.transparencycatalog.com/assets/uploads/pdf/TOTO-Toilet-FlushValve-TET1LA_EPD.pdf; Sep. 2, 2016; 4 pages.

TOTO; "Standard EcoPower® Faucet with Mixing Valve"; https://www.transparencycatalog.com/assets/uploads/pdf/TOTO-Standard-Faucet-with-MixingValve-TEL105_EPD.pdf; Sep. 2, 2016; 4 pages.

TOTO; "TOTO EcoPower"; https://www.youtube.com/watch?v=0P7P0tOyX9c; Nov. 23, 2010; pp. 1-7.

* cited by examiner

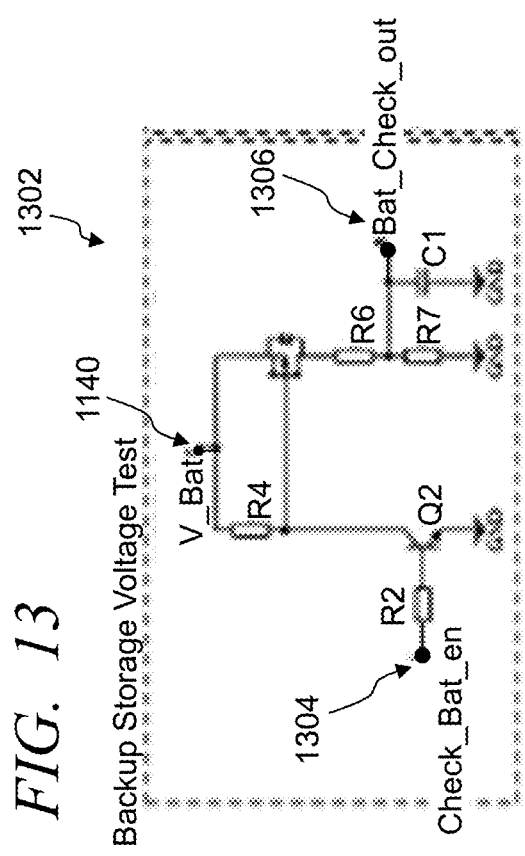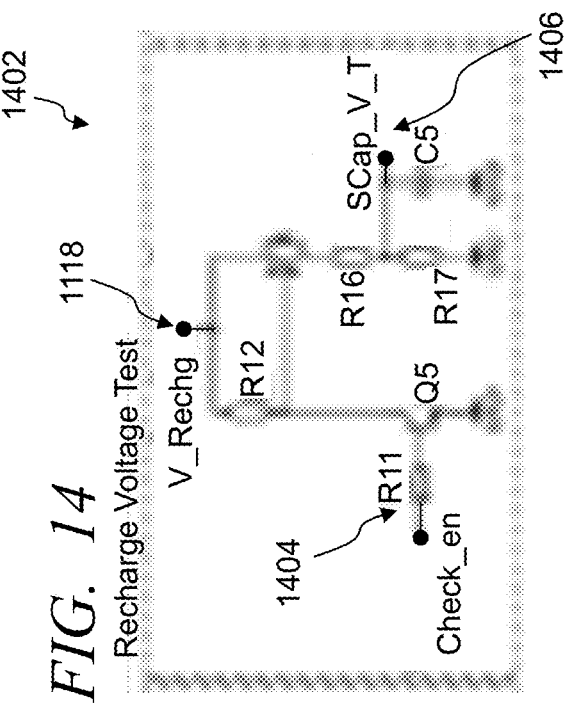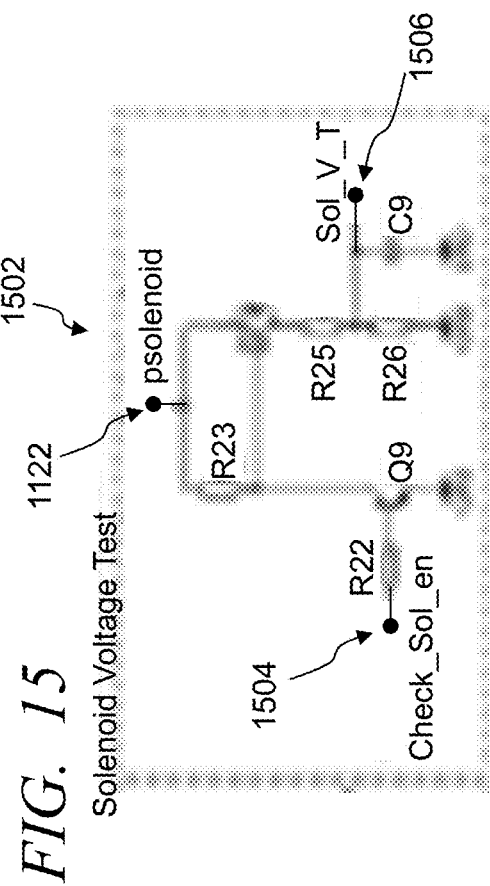
FIG. 13
FIG. 14
FIG. 15

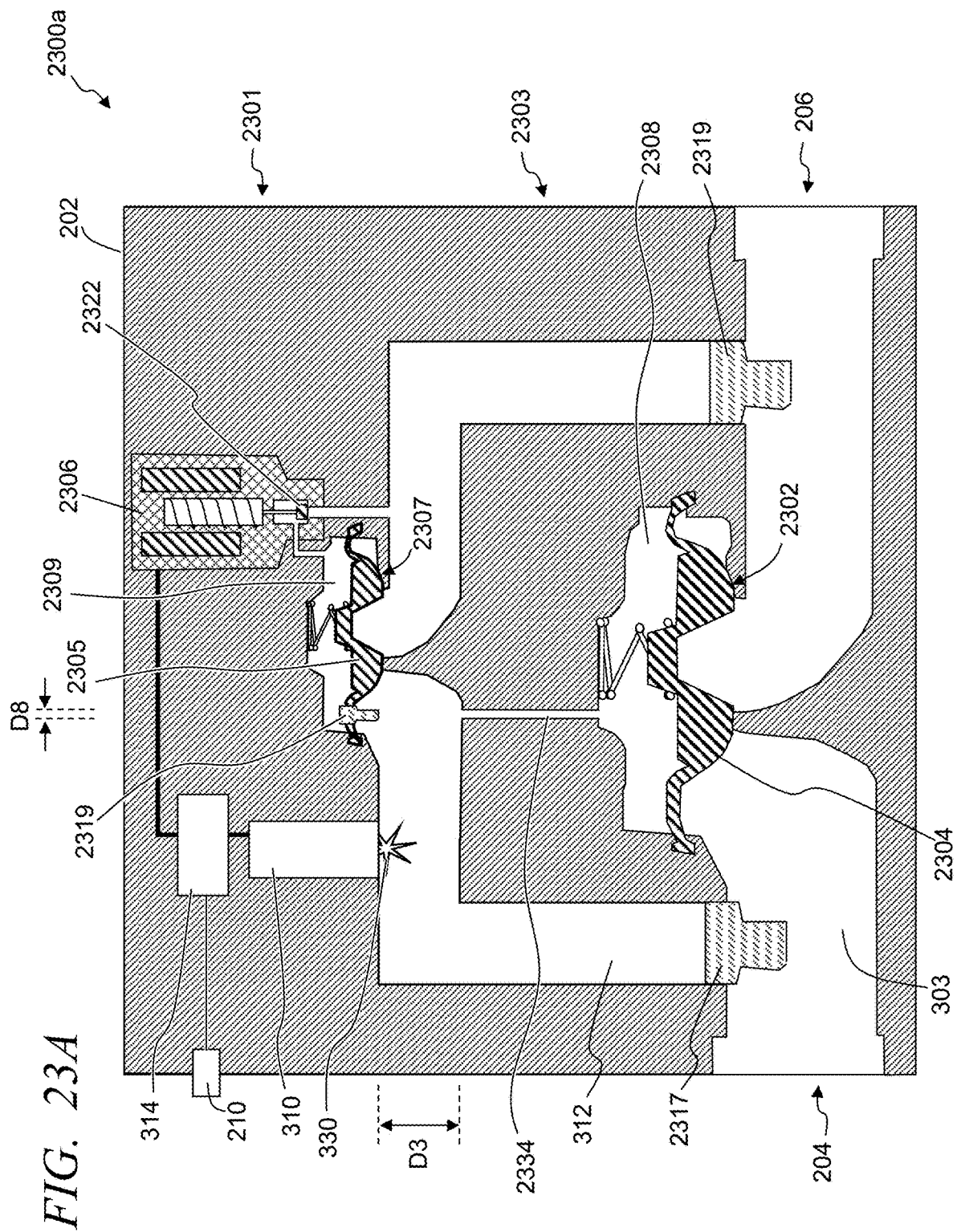

SELF-POWERED IRRIGATION SYSTEMS, GENERATOR SYSTEMS AND METHODS OF CONTROLLING IRRIGATION

CROSS-REFERENCE TO RELATED APPLICATIONS

This application claims the benefit of U.S. Provisional Application No. 63/189,003 filed May 14, 2021, and U.S. Provisional Application No. 63/218,771 filed Jul. 6, 2021, each of which is incorporated herein by reference in its entirety.

TECHNICAL FIELD

The present invention relates generally to irrigation systems.

BACKGROUND

Many types of irrigation systems enable automated irrigation of plant life. With some plant life and/or in some geographic regions irrigating can be costly. Similarly, with some locations, the installation and maintenance of an irrigation system can be costly.

BRIEF DESCRIPTION OF THE DRAWINGS

Disclosed herein are embodiments of systems, apparatuses and methods pertaining to providing self-powered irrigation valves. This description includes drawings, wherein:

FIG. 13 illustrates a simplified backup power storage test circuit, in accordance with some embodiments.

FIG. 14 illustrates a simplified circuit diagram of an exemplary rechargeable power storage test circuit, in accordance with some embodiments.

FIG. 15 illustrates a simplified circuit diagram of an exemplary solenoid capacitance test circuit, in accordance with some embodiments.

FIG. 23A illustrates a simplified block diagram, cross-sectional view of an exemplary dual diaphragm valve system, in accordance with some embodiments.

Figure 1:
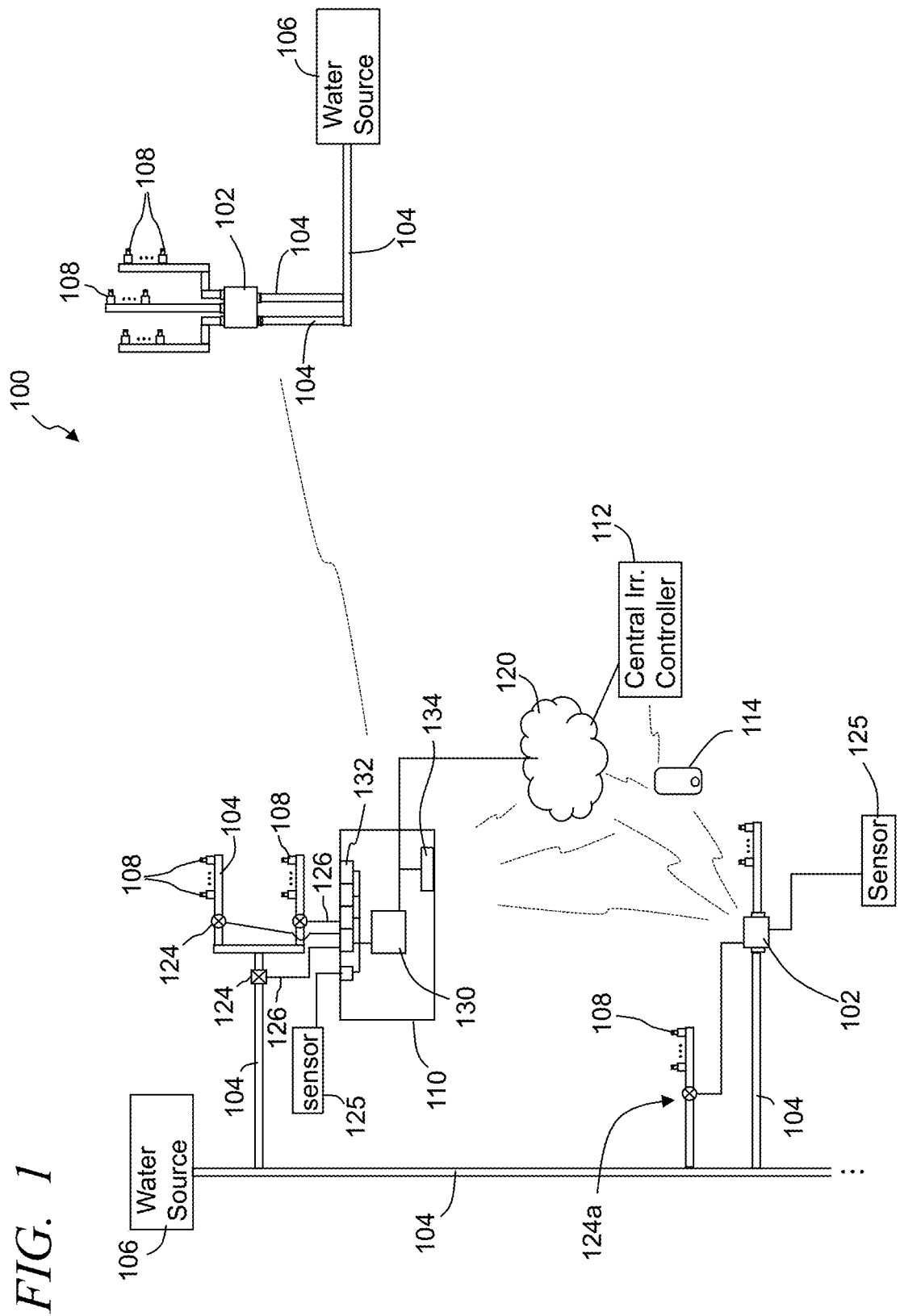
FIG. 1 illustrates a simplified block diagram of an exemplary irrigation system at one or more irrigation sites where irrigation is controlled, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. The scope of the invention should be determined with reference to the claims. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Irrigation systems utilize valves to control the flow of water from one or more water sources to water distribution devices and/or systems (e.g., sprinklers, rotors, drip lines, gated pipes, etc.). The valves can be controlled based on a schedule to open and release water for a period of time, and closed to prevent further water flow. These valves are typically electrically coupled over one or more electrically conductive wires to the irrigation controller to be controlled and typically receive electrical power to provide power to the valves to enable activation and/or deactivation. In most systems, the irrigation controller or a power source is a distance from the valve, and often hundreds or thousands of feet from the one or more valves. As such, the installation of valves in an irrigation system typically includes the trenching of the control lines and/or electrical power lines between the irrigation controller or other power source to the valves in order to protect the power lines. The coupling of valves to power sources and/or irrigation controllers typically results in significant costs and time, as well as additional design considerations that add complexity to an irrigation system.

Some embodiments such as described herein, however, provide self-powered valves systems that do not require power lines to be routed to the valve. Additionally, some embodiments include one or more wireless receivers and/or wireless transceivers that enable the valves to be activated, deactivated and/or provided with a schedule without requiring communication lines to be laid and connected to the valve. Accordingly, the self-powered valve system can greatly reduce the cost to implement an irrigation system, simplify the design of irrigation systems, simplify the implementation of irrigation systems, enable the positioning of valves in locations where it is typically difficult to incorporate, and other benefits.

FIG. 1 illustrates a simplified block diagram of an exemplary irrigation system 100 at one or more irrigation sites where irrigation is controlled, in accordance with some embodiments. The irrigation system 100 includes one or more irrigation control devices that include one or more wireless transceiver to receive and transmit communications. Further, one or more of the irrigation control devices is typically configured to implement one or more irrigation schedules stored local at the irrigation control device and output valve signals to cause activation of one or more valves. In some embodiments, the irrigation system 100 includes one or more self-powered valve systems 102, which in some implementations are further configured to wirelessly communicate with the irrigation control device. The valve systems 102 are configured to fluidly cooperate with one or more irrigation conduits 104. In some implementations the inlet conduit includes an inlet conduit coupler configured to cooperate with a separate input irrigation conduit that is coupled upstream with a water source 106 and configured to direct water into the inlet conduit. Similarly, in some implementations, the outlet conduit includes an outlet conduit coupler configured to cooperate with a separate outlet irrigation conduit that extends from the irrigation valve system to carry water downstream to one or more irrigation distribution devices 108. The irrigation conduits 104 transport water from one or more water sources 106 to one or more water distribution devices 108 (e.g., sprinklers, drip lines, etc.). The valve systems 102 typically do not have power lines coupling the valve systems with a separate power source, and instead generate power based on at least some of the fluid passing through the valve system 102 such that the valve systems are self-powered valve systems.

The one or more valve systems 102 are further in communication with one or more irrigation control devices that are configured to provide control signals and/or irrigation schedules to one or more of the self-powered valves 102. The irrigation control devices can include one or more local irrigation controllers 110, one or more central irrigation controllers 112, one or more user computing devices 114 (e.g., computer, smartphone, laptop, tablet, etc.), other such components, or a combination of two or more of such components. In some embodiments, one or more of the valve systems 102 are configured to wirelessly communicate with one or more of the irrigation control devices. In some embodiments, one or more of the valve systems 102 include one or more wireless receivers and/or transceivers configured to wirelessly communicate, via direct wireless communication and/or indirect communication over one or more communication and/or computer networks 120, with the irrigation controller 110, a central irrigation controller 112 and/or server, one or more other valve systems 102, one or more user mobile devices 114, one or more sensor systems 125, one or more local network routers, and/or other such devices. The one or more sensor systems 125 can include substantially any sensor system relevant to an irrigation system such as but not limited to a rain sensor, soil moisture sensor, temperature sensor, pressure sensor, flow sensor, light sensor, other such sensors, or a combination of two or more of such sensor systems. In some embodiments, as described further below, one or more sensor systems can include self-powered sensor systems. Further, the irrigation system 100 can include one or more actuatable system, which in some implementations are self-powered as described below.

The central irrigation controller 112 in some embodiments is remote from the valve systems 102 and implemented through one or more computers and/or servers. In some instances, the central irrigation controller 112 is located remote from a location where the valve systems 102 is located and the location where irrigation is implemented (e.g., an irrigation site). The central irrigation controller 112 can, in some implementations, communicate the valve signals to the valve system 102 over a distributed communication network 120. Additionally or alternatively, the irrigation control device can include a user device 114 (e.g., user computer, user mobile device, etc.) that is configured to wirelessly communicate the valve signals over the wireless communication network 120.

In some embodiments, the central irrigation controller 112 is implemented at a computer at a location of an entity managing or controlling the irrigation. For example, a computer has central irrigation control software installed thereon such that when executed, causes the computer to function as the central irrigation controller. The computer can be used to program schedules and/or control operation of various irrigation controllers 110, valves 124, and/or valve systems 102. Such devices may be located at one or more sites controlled by the entity operating the computer. In a typical application, the central control software provides a user interface at the device (e.g., via display and keyboard or other input), and in some cases, the user interface may be provided to remote devices communicating with the computer.

In some embodiments, the central irrigation controller 112 may be implemented as a remote server. For example, a server accessible via the network 120 is programmed with central irrigation control functionality and provides a user interface to any remote device (such as user devices 114). In some embodiments, the server may be referred to as a cloud server. In some embodiments, the server is dedicated to the entity or the irrigation site/s controlled by the entity, whereas in some embodiments, the server hosts irrigation central control functionality for multiple entities (customers) each having access to central control functionality for their irrigation site/s. In some embodiments, a remote server can be a hardware server or a virtual server implemented via computing devices. Irrigation parameters, scheduling, and other data particular to a given entities may be stored at the server and/or any database/s.

Further, the one or more irrigation control devices can include one or more wireless transceivers and an irrigation control device control circuit communicatively coupled with the one or more control device wireless transceivers. The irrigation control device control circuit is configured to receive and transmit communications via the one or more control device wireless transceivers. Further, some irrigation control devices are further configured to implement an irrigation schedule stored local at the irrigation control device, and output valve signals to cause activation of one or more valves. Additionally or alternatively, some irrigation control devices have at least some autonomous control, such as based on a set of pre-determined conditions, sensor inputs, thresholds, and/or other such factors, as further described below.

The lack of power lines coupled with an external power source and the lack of communication lines needed to communicate with the irrigation control device enables the valve systems 102 to be positioned remote from the irrigation control device, and in some instances be positioned in locations that have traditionally been difficult and/or impractical to incorporate an irrigation valve and/or irrigation system. Still further, the valve systems 10 enable one or more valves to be readily added to an existing irrigation system, expand an existing irrigation system and/or upgrade existing irrigation systems.

In some embodiments, the irrigation control device of the irrigation system 100 includes one or more irrigation controllers 110 that comprise one or more irrigation controller control circuits 130 configured to execute one or more irrigation schedules in controlling the distribution of irrigation one or more irrigation sites. The irrigation controller 110 typically includes one or more valve driver outputs 132 each configured to be physically and electrically coupled with one or more hardwired valves 124 via one or more wires 126. The irrigation controller 110, in some embodiments, includes one or more wired transceivers and/or wireless transceivers 134. The wireless transceivers 134 enable the irrigation controller to wirelessly communicate with one or more components, such as but not limited to one or more valve systems 102, central irrigation controllers 112, user devices 114, servers, memory, and/or other components. The irrigation controller 110 typically implements an irrigation schedule. In some implementations the irrigation controller 110 is configured to wirelessly receive a modification instruction from a user device 114, another irrigation controller 110, and/or a central irrigation controller 112. Based on the modification instructions, the irrigation controller modifies one or more irrigation schedules locally stored on the irrigation controller consistent with the modification instruction. Additionally or alternatively, in some embodiments, the irrigation controller 110 utilizes information to autonomously determine whether one or more actions are to be taken. The information can include sensor information, thresholds, timing information, and/or other such information that can be used to determine whether to activate one or more valves, close one or more valves, halt irrigation, and/or other such actions.

Figure 2:
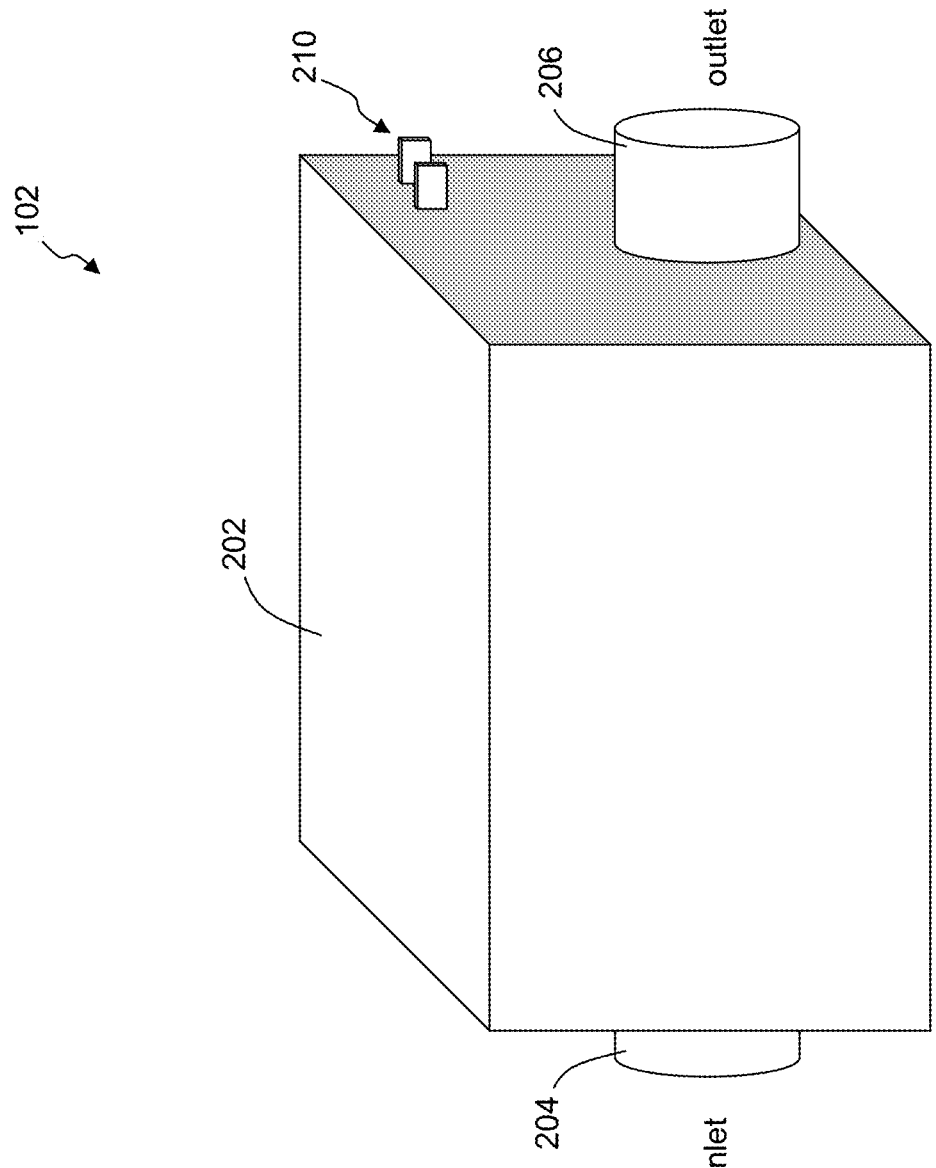
FIG. 2 illustrates a simplified block diagram of an exemplary valve system, in accordance with some embodiments.

FIG. 2 illustrates a simplified block diagram of an exemplary valve system 102, in accordance with some embodiments. Referring to FIGS. 1 and 2, the valve systems 102 includes a housing 202, one or more inlet conduits 204 or couplers, and one or more outlet conduits 206 or couplers. The inlet conduit 204 enables the valve systems 102 to be fluidly coupled with at least one source irrigation conduit 104, and the outlet conduit 206 enables the valve systems 102 to be fluidly coupled with one or more downstream irrigation conduits 104 that supply water to one or more water distribution devices 108. The valve system 102 prevents and enables the flow of water between the upstream source irrigation conduit and the downstream irrigation conduit based on irrigation control signals and/or an irrigation schedule. It will be appreciated that although the housing 202 is shown with a cubic or rectangular configuration, the housing can have substantially any relevant shape based on an intended implementation, protection from elements, size and/or shape of internal components, intended structural integrity, other such factors and typically a combination of two or more of such factors. In some embodiments, the valve system 102 includes one or more external electrical connectors 210.

Figure 3A:
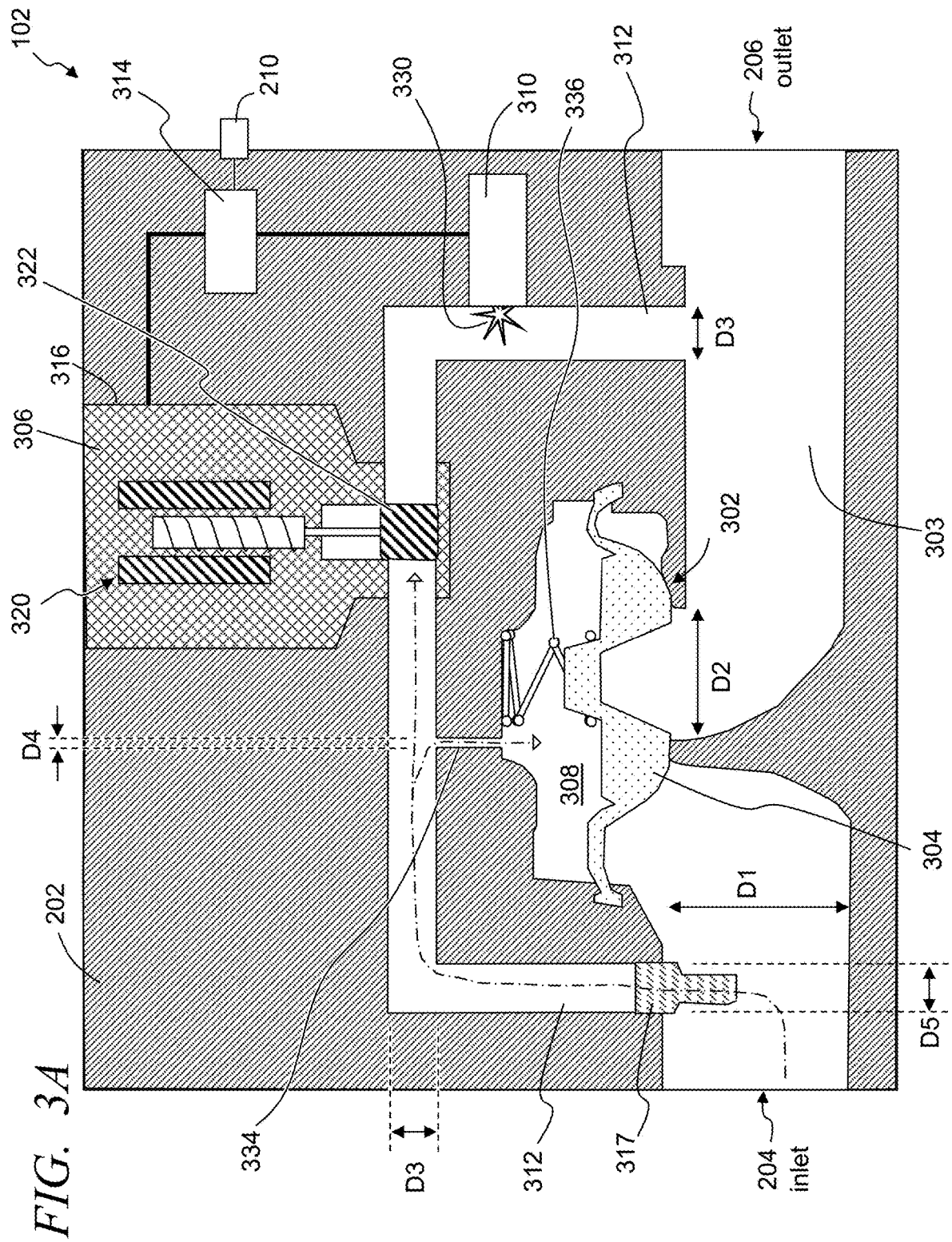
FIGS. 3A-3B illustrate a simplified block diagram, cross-sectional view of an exemplary valve system in an inactive or closed state, and an active or open state, respectively, in accordance with some embodiments.
Figure 3B:
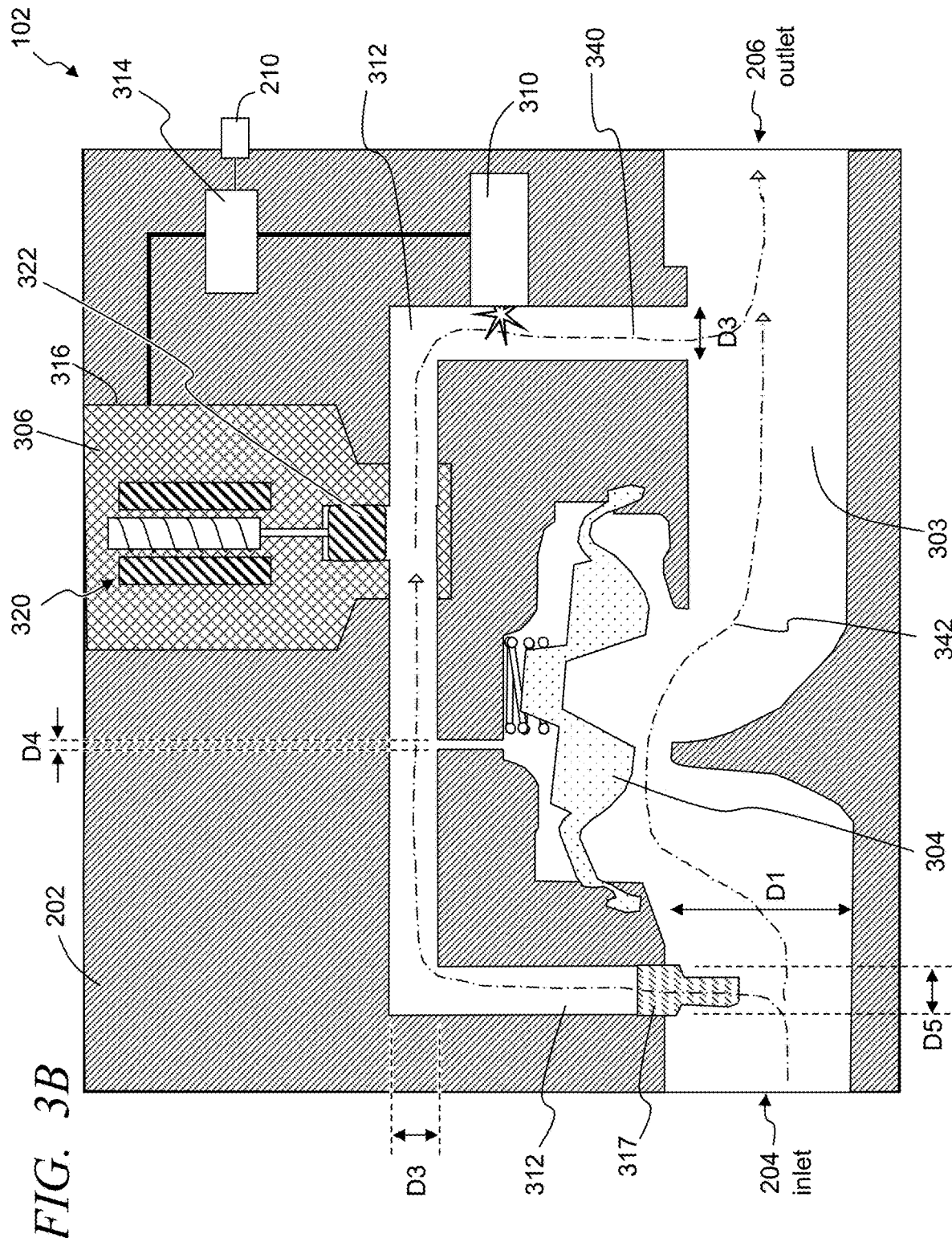

FIG. 3A illustrates a simplified block diagram, cross-sectional view of an exemplary valve system 102 in an inactive or closed state, in accordance with some embodiments. FIG. 3B illustrates a simplified block diagram, cross-sectional view of the exemplary valve systems 102 of FIG. 3A in an active or open state, in accordance with some embodiments. Referring to FIGS. 1-3B, the irrigation valve system 102, in some embodiments, includes a housing 202, at least one inlet conduit 204 and at least one outlet conduit 206 with a main conduit 303 extending therebetween, at least one valve seat 302, at least one diaphragm 304, at least one solenoid system 306, at least one bonnet cavity 308 or chamber, at least one generator 310, at least one generator conduit 312, and at least one valve control system 314. In some embodiments, the generator conduit 312 is fluidly coupled at a generator conduit inlet with the main conduit 303 and extends from the main conduit, and is further fluidly coupled downstream at a generator conduit outlet with the main conduit 303.

The inlet conduit 204 is fluidly coupled with the outlet conduit 206 through the valve seat 302, with the diaphragm 304 positioned between the inlet conduit 204 and the outlet conduit 206. The diaphragm 304 is configured to cooperate with the valve seat 302 and is positioned and secured between the valve seat 302 and the bonnet cavity 308. The bonnet cavity 308 is fluidly coupled with the inlet conduit 204, and the diaphragm is positioned between the inlet conduit 204 and the bonnet cavity 308. Further, the diaphragm is configured to move between a closed position (FIG. 3A) pressed against and engaging the valve seat 302, and an open position (FIG. 3B) with the diaphragm 304 at least partially separated from the valve seat 302. When in the closed state (FIG. 3A), the diaphragm is positioned against the valve seat 302 creating a watertight seal and preventing water flow through a primary flow path from the inlet conduit, past the diaphragm and through the valve seat 302 and to the outlet conduit. Alternatively, when the valve system 102 is in the active or open state, the diaphragm 304 is configured to move to the open position (FIG. 3B) enabling water to flow from the inlet conduit 204 to the outlet conduit 206 and into one or more downstream irrigation conduits 104 to water distribution devices 108.

The valve system 102 includes or is coupled with a solenoid system 306. The solenoid system 306 is configured to transition between an inactive state where fluid is prevented from flowing through the valve system 102, and an active state configured to enable water to flow through the valve system. In some embodiments, the solenoid system 306 is positioned within the housing 202 secured with a solenoid cavity 316 of the housing. Further, in some implementations, the solenoid system 306 is fully enclosed within the housing 202, while in other implementations some of the solenoid system is exposed outside of the housing. Still further, the valve system 102 is configured in some embodiment so that the solenoid system is removable from the housing allowing, for example, to replace the solenoid system and/or perform maintenance of one or more portions of the valve system.

The solenoid system 306 includes at least one solenoid 320 that is coupled with a respective plunger 322. The solenoid 320 is configured to transition between an active state and an inactive state to control the movement of the plunger 322 to move between a closed position (FIG. 3A) and an open position (FIG. 3B). In some embodiments, the transition of the solenoid plunger 322 from the closed position to the open position is configured to enable water to flow from the inlet conduit 204 through the generator conduit 312 establishing a generator fluid flow path 340, with the generator conduit inlet upstream of the diaphragm 304 and the generator conduit outlet downstream of the diaphragm 304. Further, the transition of the solenoid plunger 322 from the closed position to the open position is configured to cause the diaphragm 304 to transition from the closed position or inactivate state pressed against and engaging the valve seat 302, and the open position or active state (FIG. 3B) where the diaphragm 304 separated from the valve seat 302 enabling water flow between the inlet conduit 204 and the outlet conduit 206 along a main fluid flow path 342.

In some embodiments, when the plunger 322 in the closed position the plunger 322 seals the generator conduit 312, separating an upstream portion of the generator conduit from a downstream portion of the generator conduit, and prevents water from flowing through the generator conduit 312. Alternatively, when the plunger 322 in the open position the generator conduit 312 is open enabling fluid to flow through and along the generator conduit 312. In some embodiments the generator conduit 312 fluidly couples with the outlet conduit 206 and fluid exits the generator conduit 312 into the outlet conduit. Additionally, in some embodiments, the valve system 102 is configured to enable water to flow through the generator conduit 312 for at least a generator threshold duration prior to the diaphragm transitioning from the closed position to the open position.

The generator 310, in some embodiments, includes at least one rotor assembly 330. Further, the generator 310 is positioned proximate the generator conduit 312 with the at least a portion of the rotor assembly 330 extending into at least a portion of the generator conduit 312 such that the rotor assembly is configured to be contacted by the flow of fluid when fluid travels through the generator conduit 312. The flowing fluid causes movement of the rotor assembly 330 (e.g., rotation, vibration, lateral movement, and/or other such movement). In some embodiments, the generator 310 comprises one or more turbine generators, motors, magnetic sensors and/or coupling systems, and/or other such systems that are configured to generate electrical power in response to the movement of the rotor assembly 330 caused by the flow of fluid in the generator conduit 312. Accordingly, the generator 310 and rotor assembly 330 are periodically activated in response to activation of the valve system 102 to generate electrical power.

Figure 9:
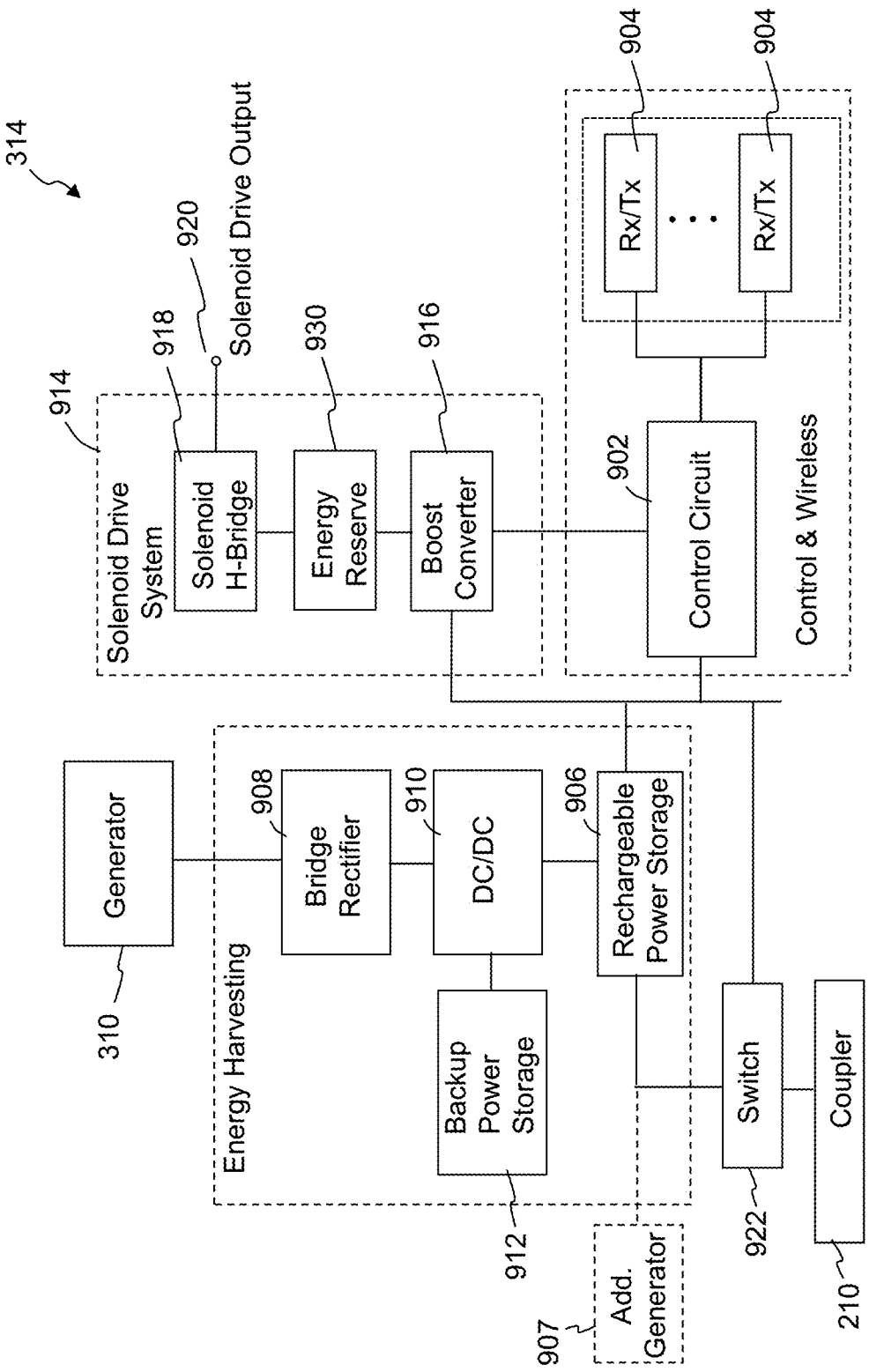
FIG. 9 illustrates a simplified block diagram of an exemplary valve control system, in accordance with some embodiments.
Figure 10:
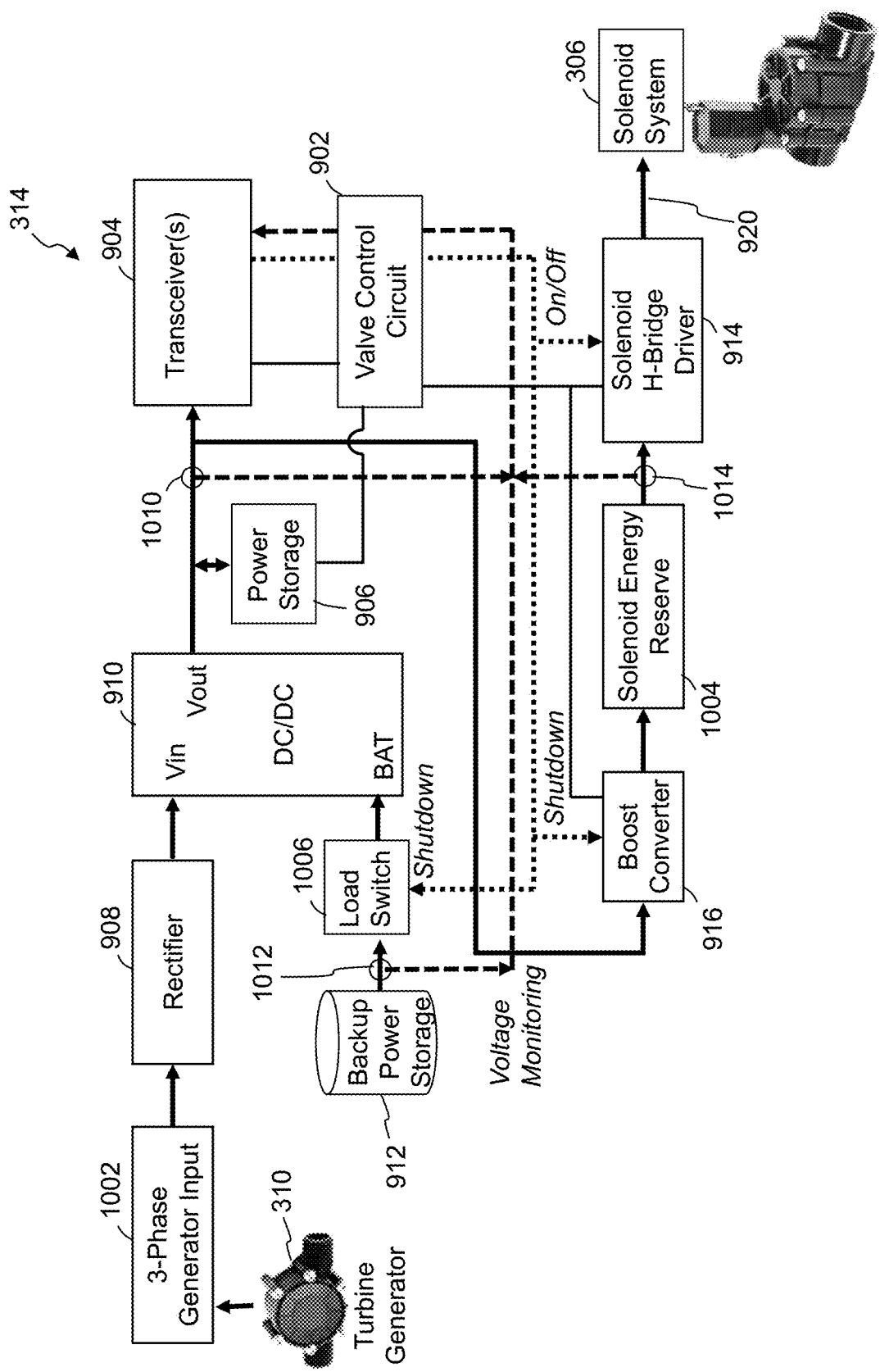
FIG. 10 illustrates a simplified block diagram of an exemplary valve control system in accordance with some embodiments.

The rotor assembly 330 can comprise one or more turbines, propellers, impellers, paddlewheels, blades, vanes, other such structures or a combination of two or more of such structures that are configured to interact with the fluid moving relative to the rotor assembly 330 while traveling through the generator conduit 312. For example, in some implementations, the rotor assembly 330 includes an impeller comprising one or more blades that at least partially extend into the fluid path through the generator conduit. The moving water sequentially contacts the blades causing a rotation of the impeller. That rotation is transferred to a turbine generator that generates electrical power proportional to the rate of rotation and the duration the impeller is rotated by the flow of fluid. In some embodiments, the generator 310 is electrically coupled with the valve control system 314 that includes one or more rechargeable power storage systems or is at least directly coupled with one or more rechargeable power storage system (as described further below, and for example, exemplary valve control systems 314 are shown in FIGS. 9 and 10).

The inlet conduit 204 has an inlet cross-sectional area D1 and/or diameter. Similarly, outlet conduit 206 has an outlet cross-sectional area D2 and/or diameter. In some embodiments, the valve system is configured with the outlet cross-sectional area D2 being less than the inlet cross-sectional area D1. Further, in some embodiments, the inlet cross-sectional area D1 is at a choke point or smallest cross-sectional area of the inlet conduit, and similarly the outlet cross-sectional area D2 is at a choke point or smallest cross-sectional area of the outlet conduit. As one non-limiting example, in some implementations, the inlet cross-sectional area D1 is defined as adjacent to the diaphragm 304, while the outlet cross-sectional area D2 is at or adjacent the valve seat 302. In some embodiments, the cross-sectional area of the upstream portion of the generator conduit 312 that is prior to (relative to the intended flow of water) the solenoid plunger 322, in some embodiments, is substantially equal to the cross-sectional area of the downstream portion of the generator conduit 312 following (relative to the intended flow of water) the solenoid plunger 322.

In some embodiments, the valve system 102 is configured so that an inlet/outlet area ratio defined by the ratio of the outlet cross-sectional area D2 to the inlet cross-sectional area D1 (i.e., D2/D1) induces, in response to the activation of the solenoid system 306, a back-pressure relative to the inlet conduit 204 to cause water to flow through the generator conduit 312 for at least the generator threshold duration prior to the diaphragm 304 transitioning from the closed position to the open position. The flow of water through the generator conduit 312 results in the generator 310 generating electrical power for approximately at least the generator threshold duration and ensures a generation of electrical power in response to an activation of the solenoid system 306 and thus the valve system 102. Still further, in some embodiments, a sum of the outlet cross-sectional area D2 of the outlet conduit 206 and a generator conduit cross-sectional area D3 of the generator conduit 312 is proportional to the inlet cross-sectional area D1 of the inlet conduit 204. In some instances, for example, the sum of the outlet cross-sectional area D2 and the generator conduit cross-sectional area D3 are equal to the inlet cross-sectional area D1. In other implementations, the sum of the outlet cross-sectional area D2 and the generator conduit cross-sectional area D3 are between 80-150% of the inlet cross-sectional area D1. Additionally or alternatively, some embodiments configure the valve system such that the outlet cross-sectional area D2 is set less than the inlet cross-sectional are D1 to establish a minimal amount of back pressure to force water through the generator conduit 312 for at least a threshold duration of time while not restricting a flow of water through the valve system 102.

Some embodiments include at least one bonnet cavity conduit 334 that is fluidly coupled with the generator conduit 312 and further fluidly coupled with the bonnet cavity 308. Further, in some embodiments, the bonnet cavity conduit 334 extends from the generator conduit that is separately fluidly coupled with the inlet conduit 204. Accordingly, in such embodiments, the bonnet cavity conduit 334 provides a fluid path between the inlet conduit 204 through the generator conduit 312 and to the bonnet cavity 308. The bonnet cavity 308 is configured to fill with water, and in some embodiments that fill water is received through the bonnet cavity conduit 334 based at least in part on an inlet pressure caused by water at the inlet conduit 204 while the solenoid plunger 322 and diaphragm 304 are in the respective closed states. Further, the pressure that is established in the bonnet cavity 308, when filled and while the solenoid plunger 322 and diaphragm 304 are in the closed states, is applied on a non-valve seat side of the diaphragm 304 (e.g., a top area of the diaphragm in the example illustrated in FIG. 3A). This pressure on the non-valve seat side of the diaphragm maintains the diaphragm in the closed position and against the valve seat 302. Some embodiments include one or more biasing members 336 (e.g., spring, lever, compressible substance, etc.) the applies a force on the diaphragm 304 biasing the diaphragm against the valve seat 302 and aids in at least returning the diaphragm to the closed position in response to a deactivation of the valve system.

Again, the solenoid plunger 322, while in the non-active or closed position, prevents water from flowing through the generator conduit 312 and maintains the pressure within the bonnet cavity 308. The pressure aids in maintaining the diaphragm 304 in the closed position. In response to the transition of the plunger 322 from the closed position to the open position (FIG. 3B), water is allowed to flow from the inlet conduit 204, through the generator conduit 312 interacting with the rotor assembly causing the movement (e.g., rotation, vibration, longitudinal movement, etc.) of the rotor assembly and into the outlet conduit 206. The movement of the rotor assembly is converted to electrical power by the generator 310. The flow of water further causing a reduction of the pressure within the bonnet cavity 308 over a duration of time. In some embodiments, when the pressure in the bonnet cavity 308 drops below a bonnet pressure threshold level (e.g., less than a sum of an inlet pressure on the valve seat side of the diaphragm 304 caused by the water in the inlet conduit 204 plus the bias force induced by the biasing member 336) then the diaphragm transitions to the open position. Accordingly, some embodiments configure the valve system to have a threshold area relationship between a cross-sectional sum of the outlet cross-sectional area D2 of the outlet conduit 206 and a generator conduit cross-sectional area D3 of the generator conduit 312 relative to the inlet cross-sectional area D1 of the inlet conduit 204 in order to achieve a pressure drop threshold duration of time between an activation of the solenoid system 306 transitioning the plunger 322 to the open position and when the pressure in the bonnet cavity drops below the bonnet pressure threshold to ensure that water flows through the generator conduit 312 for at least the generator threshold duration that is approximately equal to the pressure drop threshold duration. Accordingly, the valve system provides a flow of water through the generator conduit for at least the generator threshold duration in response to each activation of the valve system ensuring the generator 310 is actively generating electricity for at least the generation threshold duration of time each time the valve system is activated.

In some embodiments, the transition of the diaphragm 304 from the closed to the open position causes a reduced pressure at an inlet side of the generator conduit 312 resulting in a reduced fluid flow or a stoppage of flow through the generator conduit. This reduction or stoppage of water flow through the generator conduit 312 thus reduces or stops the generation of electrical energy by the generator 310.

Further, in some embodiments, a bonnet conduit cross-sectional area D4 and/or diameter of the bonnet cavity conduit 334 is configured to aid in establishing the generator threshold duration prior to the diaphragm 304 transitioning from the closed position to the open position. As described above, in some embodiments the conduit cross-sectional areas and/or flow areas of the valve system are configured to establish the generator threshold duration prior to the diaphragm 304 transitioning from the closed position to the open position in response to the solenoid plunger 322 being moved to the respective open plunger open position (e.g., see FIG. 3B). In some embodiments, the bonnet conduit cross-sectional area D4 is designed to be less than the generator conduit cross-sectional area D3 by a threshold area or factor to aid in establishing a rate of flow of water from the bonnet cavity 308 through bonnet cavity conduit 334 to ensure that the duration for the pressure in the bonnet cavity 308 to drop below the pressure threshold is at least the generator threshold duration. In some embodiments, for example, the generator conduit cross-sectional area D3 is at least twice the bonnet conduit cross-sectional area D4, while in other implementations the generator conduit cross-sectional area D3 is approximately four times, five times or more greater than the bonnet conduit cross-sectional area D4.

Some embodiments include an optional generator conduit flow filter 317 that filters the water entering the generator conduit and interacts with the solenoid system 306 and/or the generator 310. The flow filter 317 can be substantially any filter system configured to filter out particles, sediment and/or other such materials that are greater than or equal to a threshold size. The filtering of the water provides protection to the solenoid system 306, the rotor assembly 330, the generator 310 and/or other components of the valve system 102. Further, the generator conduit flow filter 317, in some embodiments, is configured with an effective generator flow filter cross-sectional area D5 and/or provides a fluid flow rate through the flow filter that is at least equal to an intended flow rate through the generator conduit 312, which is typically dependent on an expected fluid pressure in the inlet conduit. Typically, the flow filter 317 is self-cleaning by the water flowing through the main conduit 303. In some implementations, the flow filter includes a scrubber as is used in PEB valves from Rain Bird Corporation. Further, in some embodiments, the flow filter includes one or more magnets and/or separate magnets are incorporated into the valve body, bonnet, filter, or a combination of the above to catch ferrous material from the water before reaching the generator. The one or more magnets may also be self-cleaning such that ferrous material flows through the main conduit to the outlet, and does not go through the generator conduit 312.

Figure 4A:
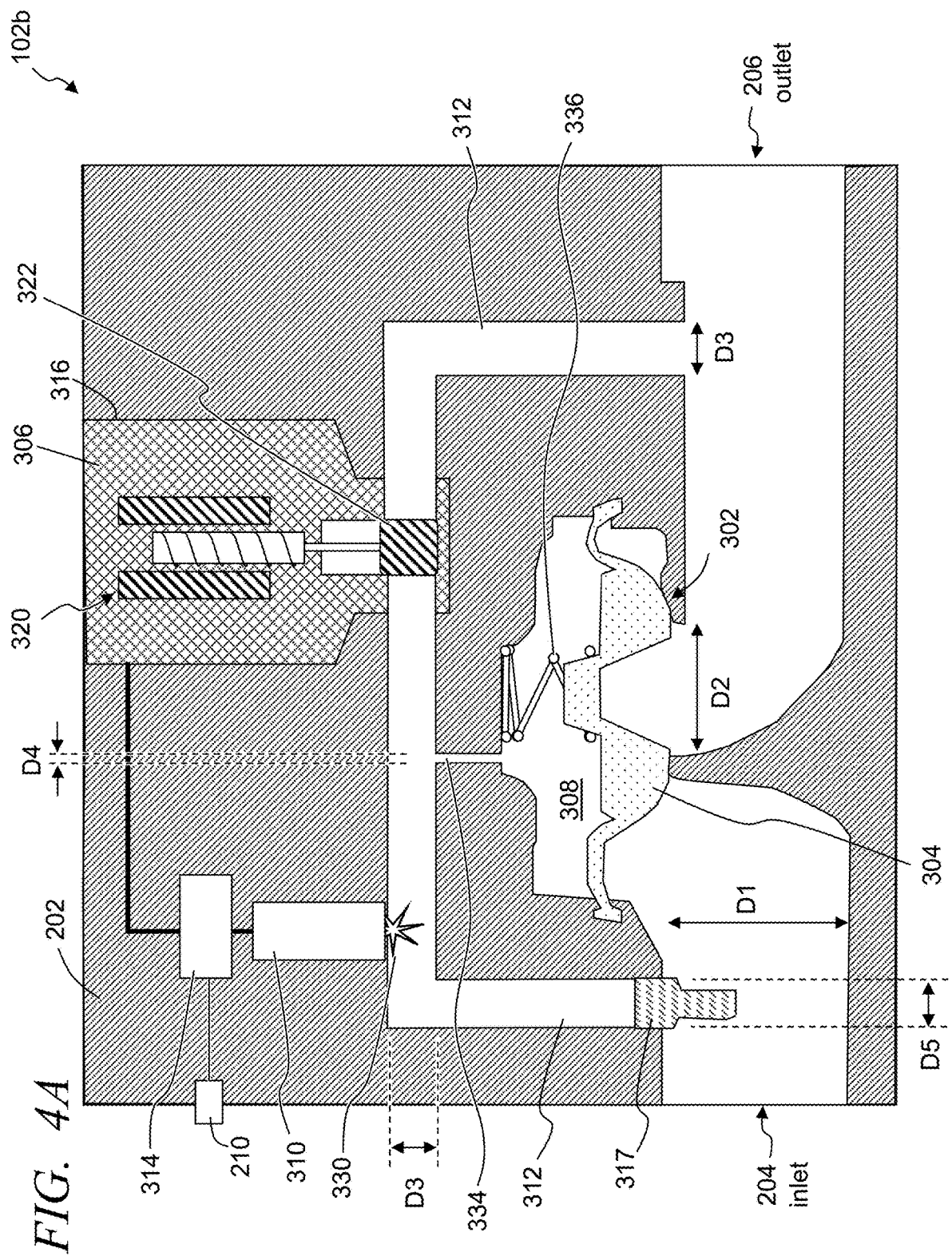
FIGS. 4A-4B illustrate a simplified block diagram, cross-sectional view of an exemplary valve system in an inactive or closed state, and an active or open state, respectively, in accordance with some embodiments.
Figure 4B:
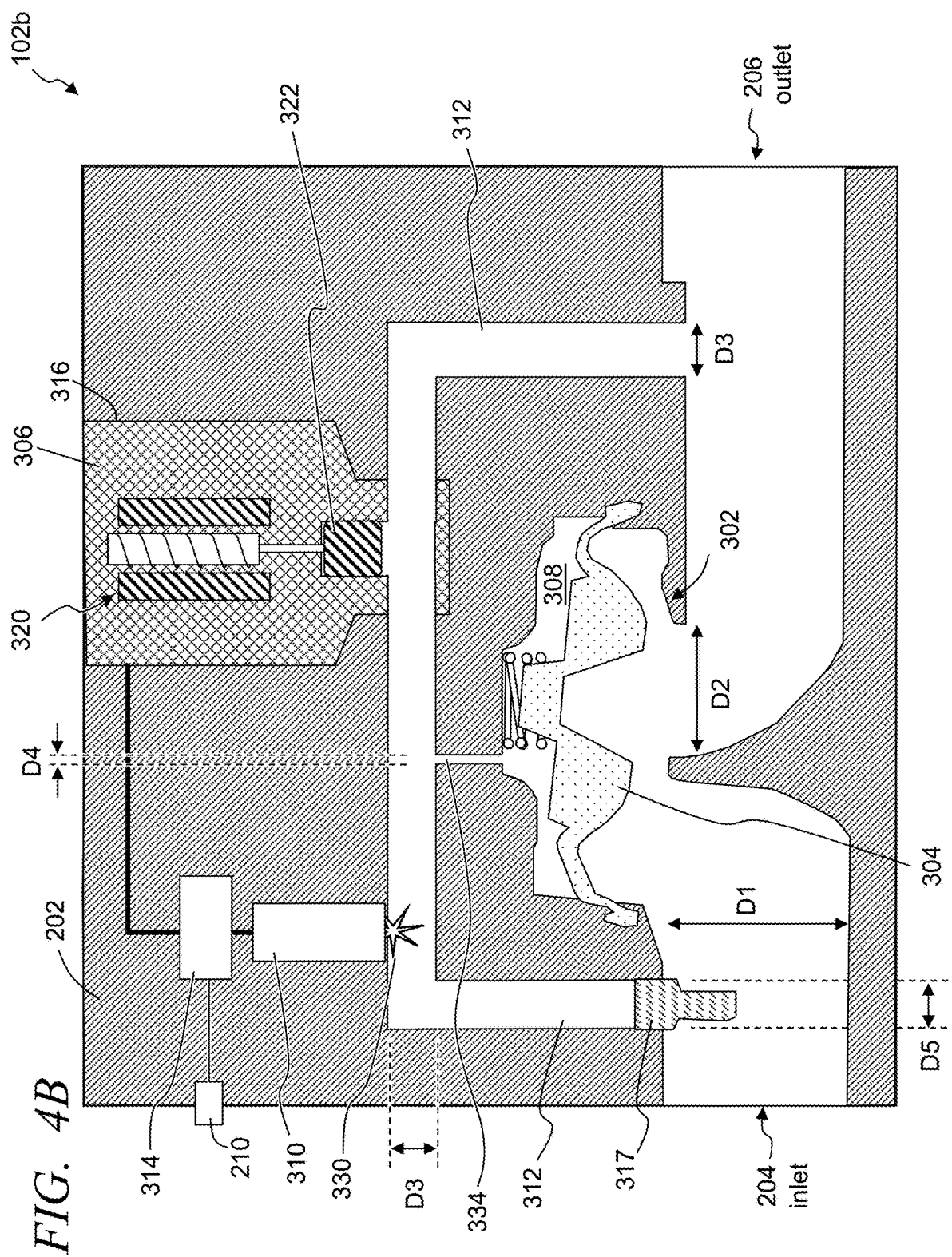

FIG. 4A illustrates a simplified block diagram, cross-sectional view of an exemplary valve system 102*b* in an inactive or closed state, in accordance with some embodiments. FIG. 4B illustrates a simplified block diagram, cross-sectional view of the exemplary valve systems 102*b* of FIG. 4A in an active or open state, in accordance with some embodiments. Referring to FIGS. 1 and 4A-4B, the irrigation valve system 102b, is similar to the irrigation system of FIGS. 3A-3B with the generator 310 positioned upstream from the solenoid system 306 while still cooperated with the generator conduit 312. The valve system 102b operates substantially the same as the valve system 102 of FIGS. 3A-3B where water flows through the generator conduit 312 in response to the activation of the solenoid system 306 to cause the plunger 322 to transition from the closed position (FIG. 4A) to the open position (FIG. 4B). The flowing fluid through the generator conduit 312 interacts with the rotor assembly 330 of the generator 310 to cause movement of the rotor assembly that is converted by the generator 310 into electrical energy. At least some of the generated electrical energy is supplied to the valve control system 314.

Figure 5:
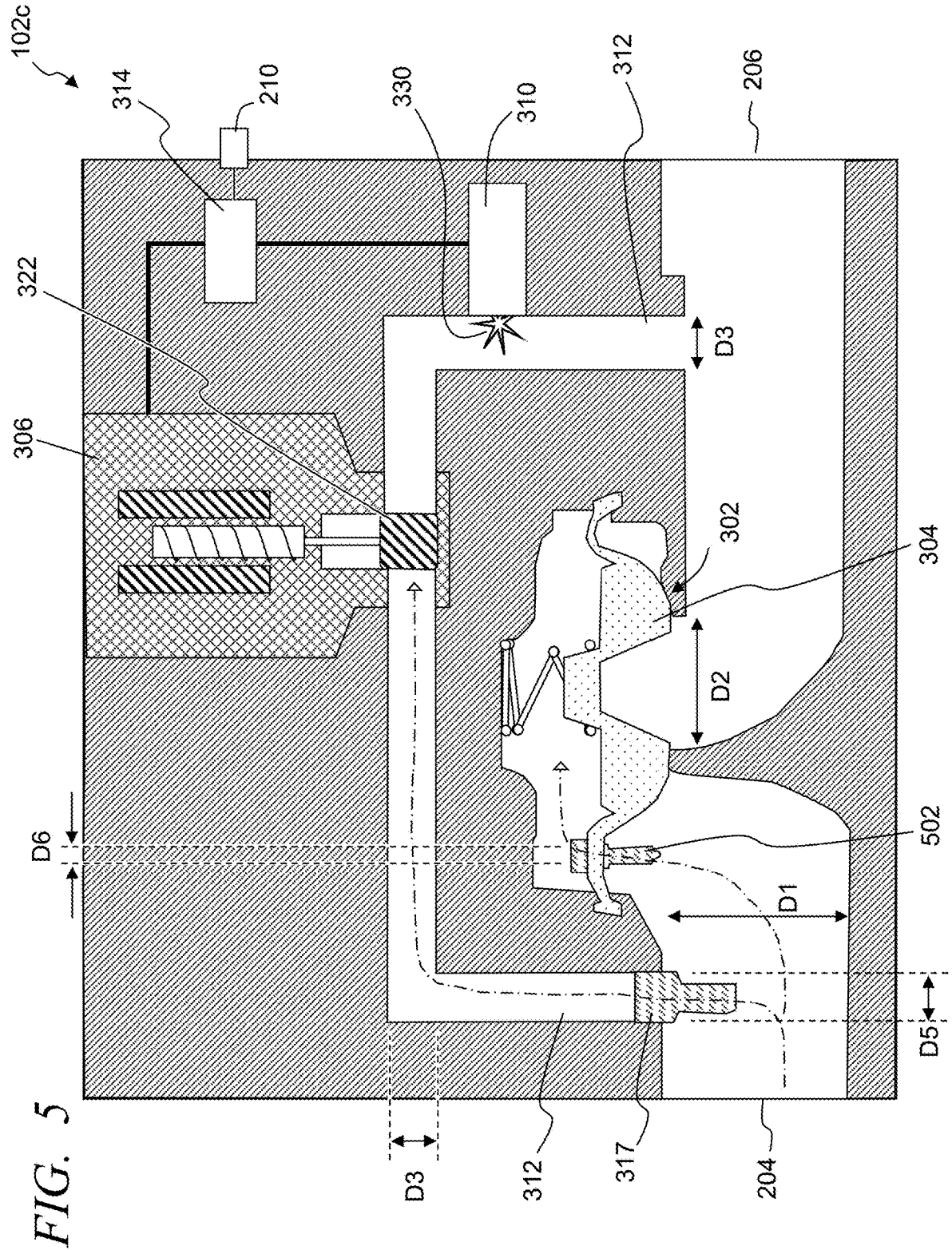
FIG. 5 illustrates a simplified block diagram, cross-sectional view of an exemplary irrigation valve system in an inactive or closed state, in accordance with some embodiments.

FIG. 5 illustrates a simplified block diagram, cross-sectional view of an exemplary irrigation valve system 102c in an inactive or closed state, in accordance with some embodiments. The valve system 102c in FIG. 5 is similar to the valve system 102 in FIGS. 3A-3B, but includes a bonnet cavity flow filter 502 establishing a fluid flow path between the inlet conduit 204 and the bonnet cavity 308. Further, in some embodiments, the valve system 102c does not include a bonnet cavity conduit (e.g., see FIGS. 3A-3B) fluidly coupling the generator conduit 312 with the bonnet cavity 308, and instead relies on the bonnet cavity flow filter 502 to supply filtered water to the bonnet cavity 308 and establish the pressure within the bonnet cavity to maintain the diaphragm 304 in the closed position and/or aid in returning the diaphragm to the closed state after the solenoid plunger 322 returns to the closed position.

The bonnet cavity flow filter 502 can be substantially any filter system configured to filter out particles, sediment and/or other such materials that are greater than or equal to a threshold size. The filtering of the water by the bonnet cavity flow filter 502 provides protection to the diaphragm 304 and the one or more biasing members 336 of the valve system 102. The threshold size of the bonnet cavity flow filter 502, in some instances, is a larger size than the generator conduit flow filter 317 because the diaphragm may be more tolerant of and less affected by debris in the water than the solenoid system 306 and/or the generator system 310.

The bonnet cavity flow filter 502 is configured to establish a fluid flow and/or has an effective filter cross-sectional flow area D6 that is proportional to the flow rate through the generator conduit 312 in order to establish a predefined generator threshold duration prior to the diaphragm 304 transitioning from the closed position to the open position. As described above, this predefined generator threshold duration ensures a flow of fluid through the generator conduit 312 for at least the predefined generator threshold duration so that the generator 310 is actively generating electrical energy for at least the predefined generator threshold duration. In some embodiments, for example, a flow rate through the generator conduit 312 is at least twice the flow rate through the bonnet cavity flow filter 502. As a non-limiting example, in some implementations a flow rate through the generator conduit 312 is approximately five times the flow rate through the bonnet cavity flow filter 502. Additionally or alternatively, in some embodiments, a cross-sectional area D3 of the generator conduit 312 is approximately five times a cross-sectional flow area D6 of the bonnet cavity flow filter 502.

Figure 6A:
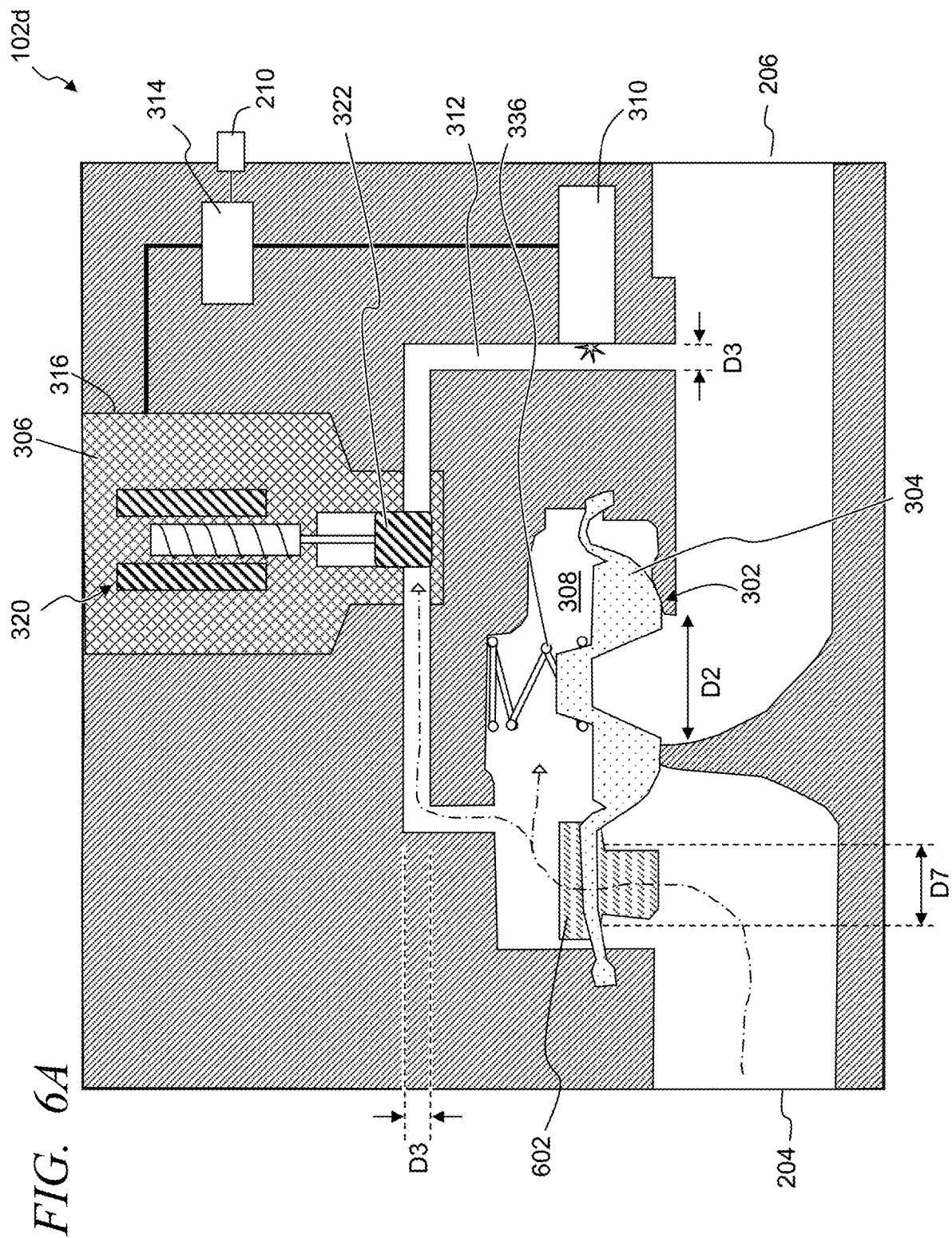
FIGS. 6A-6B illustrate a simplified block diagram, cross-sectional view of an exemplary valve system in an inactive or closed state, and an active or open state, respectively, in accordance with some embodiments.
Figure 6B:
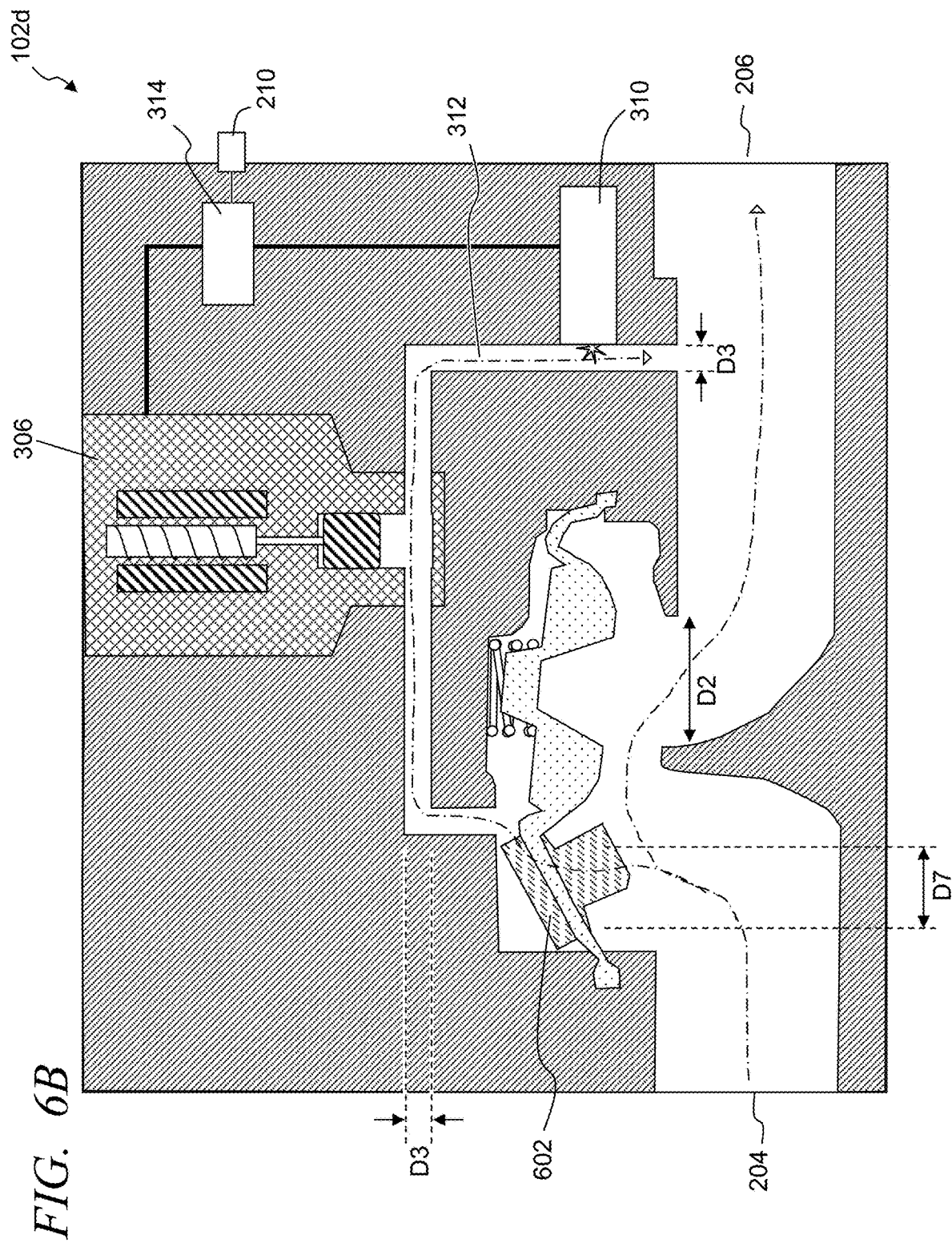

FIG. 6A illustrates a simplified block diagram, cross-sectional view of an exemplary valve system 102d in an inactive or closed state, in accordance with some embodiments. FIG. 6B illustrates a simplified block diagram, cross-sectional view of the exemplary valve systems 102d of FIG. 6A in an active or open state, in accordance with some embodiments. Referring to FIGS. 1 and 6A-6B, the irrigation valve system 102d, in some embodiments, includes a housing 202, at least one inlet conduit 204, at least one outlet conduit 206, at least one valve seat 302, at least one diaphragm 304, at least one solenoid system 306, at least one bonnet cavity 308 or chamber, at least one generator 310, at least one generator conduit 312, and at least one valve control system 314. The irrigation valve system 102d is configured with the generator conduit 312 extending from the bonnet cavity 308, instead of originating from the inlet conduit. Further, a large inlet flow filter 602 fluidly couples the inlet conduit with the bonnet cavity 308. Further, the inlet flow filter 602 provides a fluid flow rate that is significantly greater than the fluid flow rate provided by bonnet cavity flow filter 502 of FIG. 5.

The inlet flow filter 602 can be substantially any filter system configured to filter out particles, sediment and/or other such materials that are greater than or equal to a predefined threshold size. The filtering of the water provides protection to the solenoid system 306, the rotor assembly 330, the generator 310, the diaphragm 304 and/or other components of the valve system 102.

The inlet flow filter 602 is further configured to provide a fluid flow rate and/or has an effective filter cross-sectional flow area D7 that is proportional to the generator conduit cross-sectional area D3 and/or flow rate through the generator conduit 312 to supply a threshold amount of water to the generator conduit 312 in response to the solenoid plunger 322 transitioning to the open state to cause the intended movement of the rotor assembly 330 for the threshold duration. As one non-limiting example, the effective filter cross-sectional flow area D7 is at least five times the generator conduit cross-sectional area D3. Further, in some embodiments, the generator conduit cross-sectional area D3 is configured to establish a predefined generator threshold duration prior to the diaphragm 304 transitioning from the closed position to the open position following the transition of the solenoid plunger 322 from the closed position to the open position.

Figure 7:
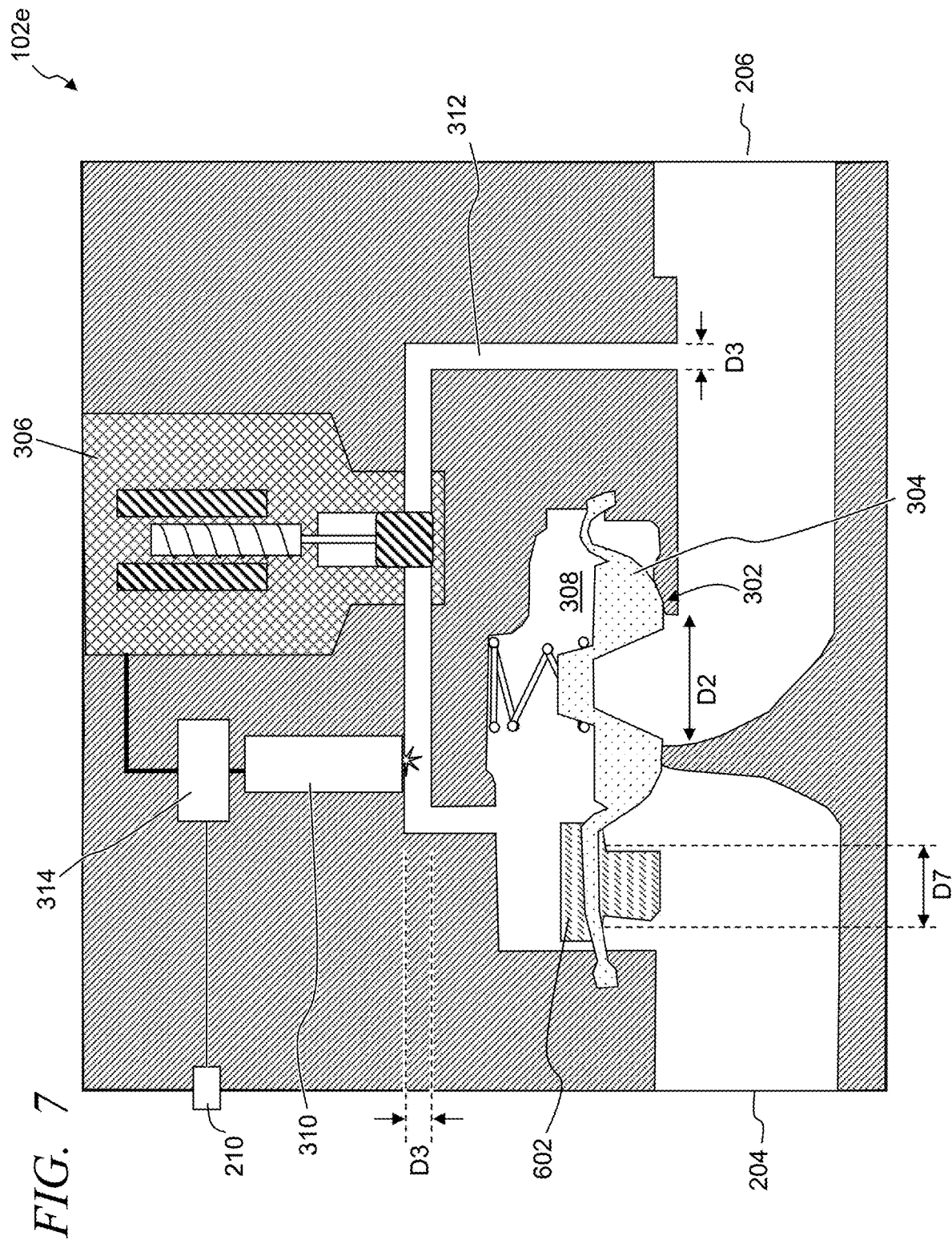
FIG. 7 illustrates a simplified block diagram, cross-sectional view of an exemplary irrigation valve system in an inactive or closed state, in accordance with some embodiments.

FIG. 7 illustrates a simplified block diagram, cross-sectional view of an exemplary irrigation valve system 102e in an inactive or closed state, in accordance with some embodiments. The valve system 102e in FIG. 7 is similar to the valve system 102d in FIGS. 6A-6B but with the generator 310 positioned upstream from the solenoid system 306 while still cooperated with the generator conduit 312. The valve system 102e operates substantially the same as the valve system 102d of FIGS. 6A-6B where water flows through the generator conduit 312 in response to the activation of the solenoid system 306 to cause the plunger 322 to transition from the closed position to the open position. The flowing fluid through the generator conduit 312 interacts with the rotor assembly 330 of the generator 310 to cause movement of the rotor assembly that is converted by the generator 310 into electrical energy. At least some of the generated electrical energy is supplied to the valve control system 314.

Figure 8:
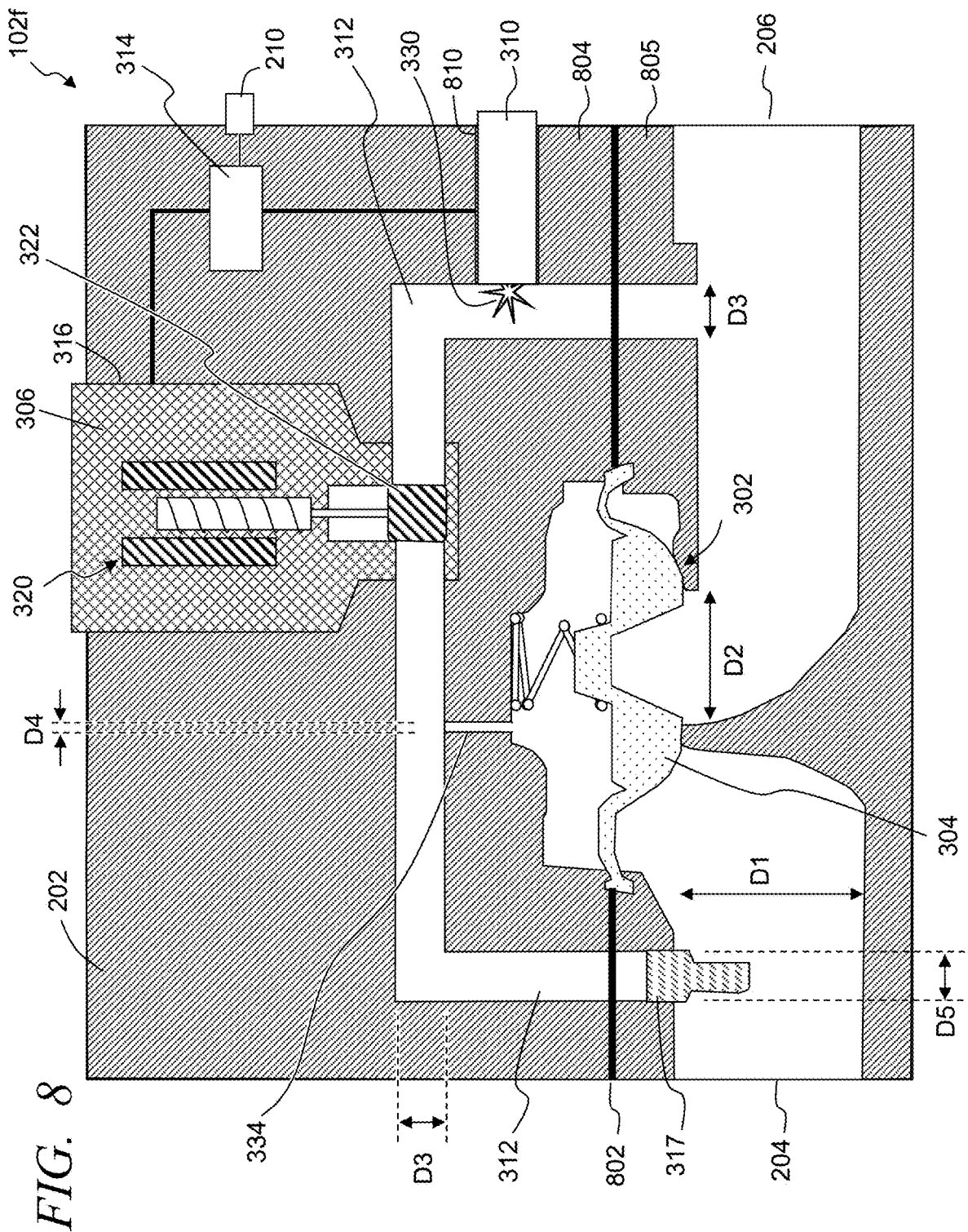
FIG. 8 illustrates a simplified block diagram, cross-sectional view of an exemplary valve system in an inactive or closed state, in accordance with some embodiments.

FIG. 8 illustrates a simplified block diagram, cross-sectional view of an exemplary valve system 102f in an inactive or closed state, in accordance with some embodiments. The irrigation valve system 102f, in some embodiments, is similar to the irrigation system 100 of FIGS. 3A-3B, with the housing 202 comprising multiple housing portions 804-805 that cooperatively couple along a respective one of one or more service interfaces 802. The one or more service interfaces 802 are formed in the housing 202 and enable a first housing portion 804 of the housing (e.g., an upper portion as illustrated in FIG. 8) to be separated along the service interface 802 from a second housing portion 805 of the housing (e.g., a lower portion as illustrated in FIG. 8) and/or from one or more other housing portions of the valve system. The separation of two of the housing portions 804-805 of the housing enables a person to service the valve system 102ƒ, such as one or more of but not limited to cleaning components, removing debris, replacing one or more components, and/or other such services. The housing portions 804-805 of the housing can be secured together through one or more securing mechanisms, such as but not limited to screws, bolts, nuts, camps, latches, straps, rotational locking mechanisms, snap fits, tongue and grooves, other such mechanisms, or a combination of two or more of such mechanisms.

In some embodiments the solenoid system 306 is accessible from an exterior of the housing 202 and/or is removable. For example, in some implementations, the solenoid system 306 is inserted into the solenoid cavity 316 from an exterior of the housing 202 and secured with the housing (e.g., solenoid system includes threading that cooperates with threading of the housing, bolts, latches, snap-fit, tongue and groove, etc.) in proper position with the plunger 322 positioned relative to the generator conduit 312. Similarly, in some embodiments, the generator 310 is accessible from an exterior of the housing 202 and removable and/or replaceable. The generator 310 can be configured to be inserted into a generator cavity 810 from an exterior of the housing 202 and secured with the housing (e.g., generator includes threading that cooperates with threading of the generator cavity 810, bolts, latches, snap-fit, tongue and groove, etc.) in proper position with the generator 310 with the rotor assembly 330 positioned to at least partially extend into the generator conduit 312.

FIG. 9 illustrates a simplified block diagram of an exemplary valve control system 314, in accordance with some embodiments. The valve control system 314 electrically couples with the generator 310 to receive electrical power generated in response to water flow through the generator conduit 312. The valve control system 314 includes one or more valve control circuits 902 and/or microcontrollers that provides at least some control over the activation of one or more solenoid systems 306. In some embodiments, the valve control circuit 902 communicatively couples with one or more wireless transceivers 904, receivers, transmitters, and/or wired transceivers configured to enable the valve system 102 to communicate with one or more external devices (e.g., irrigation controller 110, user device 114, central irrigation controller 112, other valve system 102 and/or other devices). The communication can be through one or more wireless and/or wired protocols over one or more wireless and/or wired communication networks. In some implementations, the valve system 102 includes multiple transceivers enabling communication utilizing different communication protocols. For example, a first wireless transceiver can enable communication over one or more shorter range wireless communication protocols (e.g., BLUETOOTH, Wi-Fi, etc.), while one or more other wireless transceivers enable wireless communication over longer range protocols (e.g., LoRa, LoRaWAN, cellular, radio frequency, etc.).

The valve control system 314 is coupled with the generator 310. In some embodiments, some or all of the power generated by the generator 310 is supplied to a rechargeable power storage system 906 and/or device that is configured to receive and store at least some of electrical power and release power as controlled by the valve control circuit 902. Some embodiments additionally or alternatively include one or more other generators 907 (e.g., wind turbine(s), solar panel(s), etc.) that generate power that can be stored in the rechargeable power storage 906 and/or other storage system. Typically, the rechargeable power storage system 906 operates as a main power supply to the valve system 102 supplying the operational power to the valve control circuit 902, and used to drive and control the operation of one or more solenoid systems 306. Some embodiments include one or more voltage rectifiers 908 to provide a conversion of electrical power from the generator to a DC voltage. In some embodiments, the generator 310 produces a three-phase voltage output. Accordingly, the one or more rectifiers 908 provide a conversion to DC voltage. For example, the rectifier can include one or more bridge rectifiers coupled between an output of the generator 310 and the rechargeable power storage system 906 with electrical power supplied from the generator, through the rectifier to the rechargeable power storage system.

The valve control system 314, in some implementations, includes one or more DC to DC regulators 910 and/or converters (e.g., one or more buck (or buck-boost) regulators) that limit and/or step down voltage received from the generator 310 to a threshold level that is supplied to the rechargeable power storage system 906 that stores the electrical power. One or more backup power storage systems 912, backup battery and/or devices can be included with and/or cooperated with the valve control system 314. In some embodiments, the backup power storage system 912 can include one or more non-replaceable batteries and/or replaceable, disposable batteries (e.g., AA battery, AAA battery, 9V battery, etc.) that are readily replaced as needed. The valve control circuit 902 can control the use of the backup power storage system 912 to supply power to recharge the rechargeable power storage system 906 when a storage voltage and/or power level of the rechargeable power storage system 906 is below a recharge threshold.

The valve control system 314 further includes one or more solenoid drive systems 914 that are controlled by the valve control circuit 902 to generate a respective solenoid drive output to control one or more solenoid systems 306 in response to a valve activation signal (e.g., wirelessly received from an irrigation controller, a valve activation signal based on an irrigation schedule, etc.). In some embodiments, the solenoid drive system includes one or more boost converters 916 that boost a voltage output from the rechargeable power storage system 906 to a solenoid threshold to effectively control the solenoid system 306. For example, in some applications the rechargeable power storage system 906 provides an output that is between about 2V-4V (e.g., 2.2-3.8V), and the boost converter 916 boosts that to about 7-9 V that is supplied to an optional latching solenoid energy reserve 930 (e.g., one or more capacitors, rechargeable battery, other such reserve devices, or a combination of two or more of such devices), and/or one or more solenoid H-bridge circuits 918 configured to produce a solenoid drive output 920 (e.g., a 7-9 V pulse) to activate and/or deactivate a respective solenoid system.

In some embodiments, the valve control circuit 902 enables the valve system to operate as an irrigation flow sensor system. The valve control circuit 902, in such embodiments, further detects an amount of power generated by the generator 310. Based on the amount of power generated, the valve control circuit can determine a flow rate or volume flow of fluid flowing through the outlet conduit as a function of the amount of voltage generated by the power turbine. In some embodiments, the valve control circuit 902 stores a table that is used to look up a flow rate relative to an amount of voltage. In other implementations, the valve control circuit 902 is trained based on different predefined flow rates. Additionally or alternatively, one or more algorithms may be applied based on parameters (e.g., cross-sectional area of the outlet conduit, water pressure, maximum flow rate, and/or other such parameters). In other embodiments, one or more sensors are incorporated into the self-powered valve system 102. Typically, such sensors are coupled with the valve control circuit 902 enabling the valve control circuit to monitor information and take one or more actions based on the sensor data. The one or more sensors can include pressure sensors, flow sensors, temperature sensors, and/or other relevant sensors. Similarly, one or more external sensor systems can communicatively couple with the valve control circuit. Further, in some embodiments, the valve control circuit 902 is configured to communicate sensor information to one or more external systems (e.g., irrigation controller, central irrigation controller, other self-powered valve system, other sensor system, other systems, or combination of two or more of such systems) through the one or more transceivers. The one or more internal sensors, in some implementations, are powered from the rechargeable power storage system.

As described above, the valve system 102 in some implementations includes one or more external electrical connectors 210. One or more switches 922 can be controlled by the valve control circuit 902 to provide electrical power from the rechargeable power storage system 906 to the one or more external electrical connectors 210.

In some embodiments, the valve control circuit 902 is further configured to communicatively couple with one or more other self-powered valve systems, other valves, sensor systems 125, other actuator systems, generator systems, portable user devices 114, central irrigation controllers 112, and/or other systems or combinations of two or more of such systems. The valve control circuit 902, in some embodiments, comprises and/or executes autonomous logic to take autonomous action and/or control of other systems. As one non-limiting example, the valve control circuit 902 can receive sensor data from one or more sensor systems (e.g., rain sensor system, soil moisture sensor system, etc.), evaluate the sensor data received from the sensor system, and autonomously take one or more actions (e.g., evaluate soil moisture data relative to one or more soil moisture thresholds, and autonomously determine whether one or more actions are to be implemented, such as activate the valve system 102 to distribute water through one or more irrigation distribution devices 108). In some embodiments, the valve control circuit 902 takes into consideration other relevant factors in making a determination, such as whether to activate a release of water through the self-powered valve system 102. The additional factors may be based on sensor data, control information provided by another system (e.g., threshold from a central irrigation controller 112 and/or mobile device 114). For example, the valve control circuit 902, in some embodiments, considered factors such as but not limited to temperature (e.g., how current temperature related to a cold temperature threshold), weather forecast information, municipal restrictions (e.g., municipality specifies "do-not-irrigate on certain days"), pressure sensor information relative to one or more pressure thresholds, other such factors, and typically a combination of two or more of such factors. The valve control circuit 902, in some implementations, communicates to other autonomous valves, sensors, actuators, central irrigation controller 112, mobile device 114, in response to initiating one or more action, not initiating one or more actions, making a determination (e.g., relative to one or more thresholds), etc. Other systems of the irrigation system 100 (e.g., other autonomous valves, sensors, actuators, etc.) in some implementations utilizes the information and/or notification of actions as an input in evaluating information for determination of whether those systems and/or other system should or should not take action.

FIG. 10 illustrates a simplified block diagram of an exemplary valve control system 314 in accordance with some embodiments. The generator 310 is coupled with one or more rectifiers 908 configured to receive AC power 1002 that is supplied by the generator. The rectifier 908 provides a conversion to DC voltage to one or more buck or buck-boost regulators 910 that limit and/or step down voltage received from the generator 310 to a threshold level that is supplied to the rechargeable power storage system 906 that stores the electrical power. In some embodiments, the rectifier 908 is implemented through a set of one or more diodes. The generator may also contain an AC to DC rectification circuit. In that case, DC power would be supplied directly to one or more buck or buck-boost regulators 910.

As described above, in some embodiments, the rechargeable power storage system 906 operates as a main power source to the valve system 102 and supplies power to the valve control circuit 902, the one or more buck or buck-boost converters 916, and one or more transceivers 904. In some embodiments, the valve control circuit 902 controls the operation of the buck or buck-boost converter 916 and/or one or more solenoid drive systems 914 to generate a respective solenoid drive output 920 to control one or more solenoid systems 306. The valve control system 314, in some implementations, includes one or more solenoid energy reserves 1004 that at least temporarily store and/or accumulate power from the boost converter 916 to generate the solenoid output signal or pulse at the boosted voltage. The solenoid energy reserves 1004 in some embodiments comprises one or more solenoid boost capacitor systems. Further, in some implementations, the solenoid energy reserve 1004 is a latching solenoid energy reserve configured to power one or more latching solenoids.

One or more backup power storage systems 912 and/or devices can be included with and/or cooperated with the valve system 102. In some embodiments, the backup power storage system 912. The valve control circuit 902 can control the use of the backup power storage system 912 to supply power to recharge the rechargeable power storage system 906 when a storage voltage and/or power level of the rechargeable power storage system 906 is below a recharge threshold. In some embodiments, the valve control system 314 includes a power switch 1006 that enables power to be supplied to the rechargeable power storage system 906 and/or cuts of the backup power storage system 912 to limit or prevent unintended power drain of the backup power storage system 912. For example, the valve control circuit 902 can detect when a power level stored on the rechargeable power storage system drops below a threshold level and activate the power switch 1006 to enable power to be received from the backup power storage system 912. The backup power, in some implementations, is used to recharge the rechargeable power storage system 906. Additionally or alternatively, power from the backup power storage system 912 may be used to power one or more of the valve control circuit 902, the transceiver(s) 904, the solenoid system 306, and/or other components of the valve system 102. Typically, the rechargeable power storage system 906 and the backup power storage system 912 provide the only power of the irrigation valve system. Accordingly, the valve system 102 can be positioned without needing to be coupled to an external power source. This can greatly reduce complexity of installation, allow the valve system 102 to be positioned in places that are often difficult to incorporate a valve, and other such benefits.

Further, in some embodiments, the valve control circuit 902 is configured to monitor one or more voltages, signals, and/or other conditions of the valve system in controlling the operation of the valve system 102. For example, the valve control circuit can monitor a power and/or voltage level 1010 of the rechargeable power storage system 906 and/or an output of the rechargeable power storage system 906, a voltage and/or power level of the backup power storage system 1012, a voltage level of drive voltage 1014 supplied to the solenoid drive systems 914 and/or other aspects of the valve system 102. Further, the valve control circuit 902 provides control over and/or enables the components of the valve control system 314. As described above, the valve control circuit 902 can enable the power switch 1006 to supply power from the backup power storage system 912 to the rechargeable power storage system 906 (e.g., in response to voltage level 1010 of the rechargeable power storage system 906 dropping below a threshold level, such as after a prolonged period without use), enable the operation of the boost converter 916 to generate the solenoid drive signal, control the operation of the H-bridge driver 914 to activate the solenoid system 306, and other such control. In some implementations, the valve control circuit 902 wirelessly receives one or more valve activation signals through a wireless transceiver (e.g., from a separate irrigation controller 110, a user device, etc.) and activates one or both of the boost converter 916 and/or H-bridge to activate one or more solenoid systems 306. In some embodiments, a boost converter circuit 916 electrically couples with the rechargeable power storage system generates a boosted solenoid output signal at least to a threshold voltage that is greater than a voltage from the rechargeable power storage system.

Figure 11:
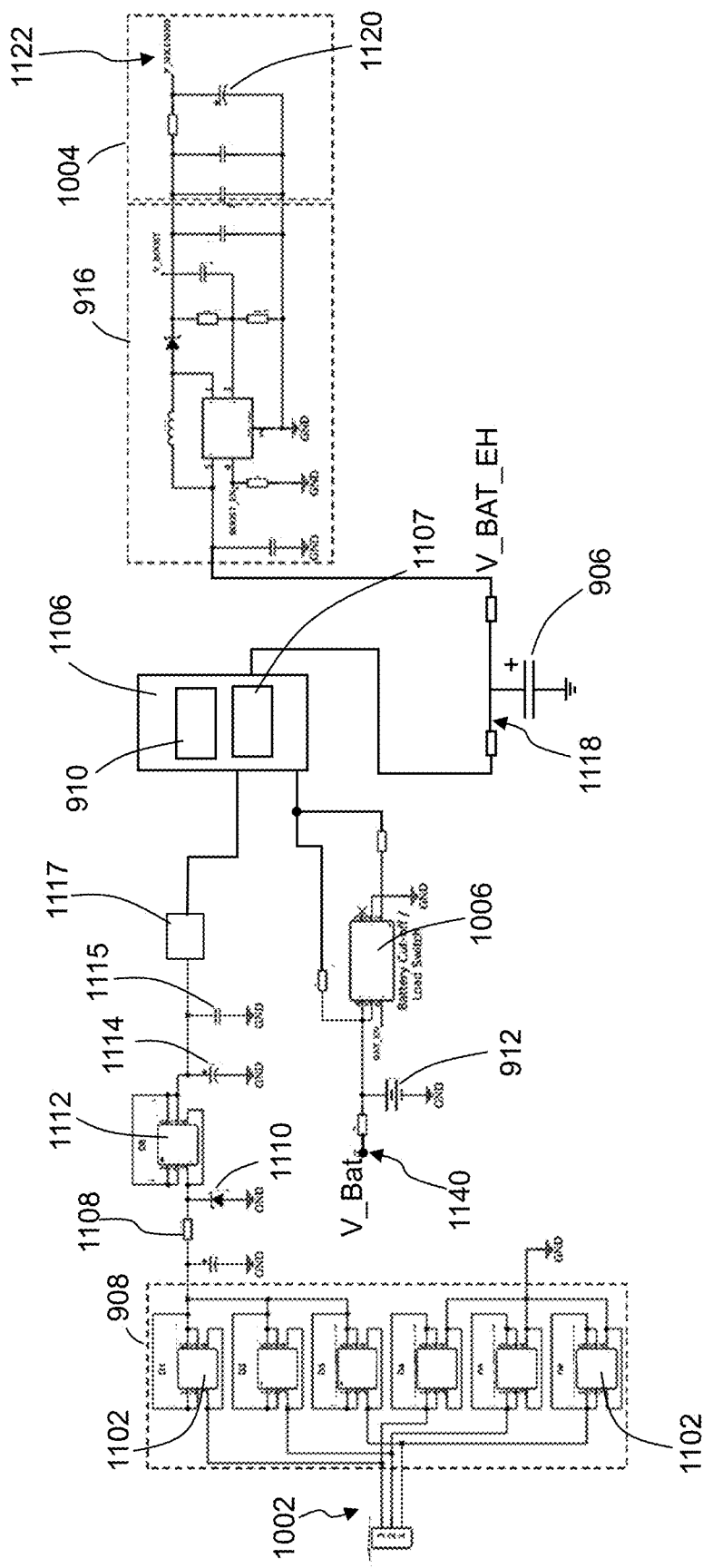
FIG. 11 illustrates a simplified circuit diagram of an exemplary portion of the valve control system, in accordance with some embodiments.

FIG. 11 illustrates a simplified circuit diagram of an exemplary portion of the valve control system 314, in accordance with some embodiments. In some embodiments, the valve control system includes a voltage rectifier 908, an energy harvesting system 1106, a primary rechargeable power storage system 906, a backup power storage systems 912, a boost converter 916, and a solenoid drive systems 914. As described above, in some embodiments, the generator 310 produces an AC voltage output 1002 that is supplied to the voltage rectifier 908. In some implementation, the regulator comprises a three-phase bridge rectifier circuit configured to provide a conversion to DC voltage. For example, the rectifier can include one or more diodes 1104a-1104f coupled in parallel to provide a conversion to DC. The rectifier 908 is coupled with the energy harvesting system 1106. Some embodiments include protection components to limit current and/or voltage. For example, one or more resistors 1108 can couple between the rectifier 1102 and the energy harvesting system 1106 to limit in-rush current. One or more over voltage protection components, such as one or more clamping diodes 1110, can be included that clamps the input voltage below a threshold (e.g., 18V).

The input voltage from the rectifier 1102, in some embodiments, is filtered through one or more capacitors 1114-1115, which in part provide frequency filtering and/or de-rippling. For example, two or more capacitors 1114-1115 can be included with different capacitance to provide filtering at different frequency ranges of ripple of the input DC voltage. Some embodiments further include an in-line rectifying diode 1112 that provides protection from back current. For example, the rectifying diode 1112 can inhibit back flow of current from one or both of the de-ripple capacitors 1114-1115 that might feed back to the generator. Some embodiments include an optional generator cutoff switch 1117 between the generator 310 and the energy harvesting system 1106 (e.g., at a VIN pin of an energy harvesting chip or system) to prevent inadvertent power drain of the rechargeable power storage system 906 by the de-ripple capacitors 1114-1115 and/or other components.

The energy harvesting system 1106, in some embodiments, includes at least one buck or buck-boost regulator 910 or other step down regulator or DC to DC converter limits the voltage from the generator (e.g., 0-18 V) to supply an output voltage 1118 that is at or below an output threshold (e.g., 2-7 V, such as 3.6 V). The output 1118 is supplied to recharge the rechargeable power storage system 906. The rechargeable power storage system 906 can include one or more capacitors, supercapacitors, hybrid-supercapacitors, rechargeable batteries, lithium batteries, alkaline batteries, other such rechargeable devices, or a combination of two or more of such rechargeable systems that are configured to be repeatedly charged by the power generated by the generator 310. In some embodiments, the rechargeable power storage system 906 is the main power source of the valve system 102 and/or valve control system 314. In some embodiments, one or more other power generating sources can be cooperated to additionally or alternatively generate power that is supplied to the rechargeable power storage system 906, such as but not limited to wind power generator, solar panels, other such generating systems, or a combination of two or more of such power generating systems.

In some embodiments, the energy harvesting system 1106 further couples with one or more replaceable, backup power storage system 912 (e.g., a battery, such as one or more AA batteries, AAA batteries, 9V batteries, etc.) that can be utilized when a voltage level of the one or more rechargeable power storage systems 906 is below a supply voltage threshold. Some embodiments include a power switch 1006 between the backup power storage system 912 and the energy harvesting system 1106. At least in part, the power switch 1006 which can operate as a battery cutoff switch, enables power to be supplied to the rechargeable power storage system 906 and/or cuts of the backup power storage system 912 to limit or prevent unintended power drain of the backup power storage system 912. Accordingly, the power switch 1006 in part effectively disconnects the backup power storage system 912 from the energy harvesting system 1106 when a voltage on the rechargeable power storage system 906 is above a power source threshold and prevents inadvertent power drain of the backup power storage system 912.

In some embodiments, the valve control system 314 includes one or more boost converter circuits 916 (e.g., off the shelf boost converter from Linear Technologies) that is set to a boost threshold output voltage (e.g., about 9V in some implementations). In some embodiments, the boost converter circuit 916 charges one or more solenoid energy reserves 1004 that at least temporarily store power from the boost converter 916 to generate the solenoid drive pulse 1122 at the boosted voltage. For example, the solenoid energy reserve can include one or more capacitors 1120, supercapacitors or the like that are charged up, by the rechargeable power storage system 906 through the boost converter 916, to a solenoid drive threshold (e.g., about 9V).

Some embodiments incorporate a latching solenoid energy reserve, such as the latching solenoid energy reserve described in U.S. Pat. No. 8,295,985, filed Dec. 22, 2008, and entitled "Latching Solenoid Energy Reserve", which is incorporated herein by reference in its entirety. In some embodiments, the valve control circuit 902 limits when the boost converter 916 is enabled or active to those times when the solenoid is to be activated in order to prevent leakage current draw on the rechargeable power storage system 906. Some embodiments include an optional power shutoff switch between the rechargeable power storage system 906 and the boost converter 916 to limit or prevent leakage current draw from the rechargeable power source system 906.

Figure 12:
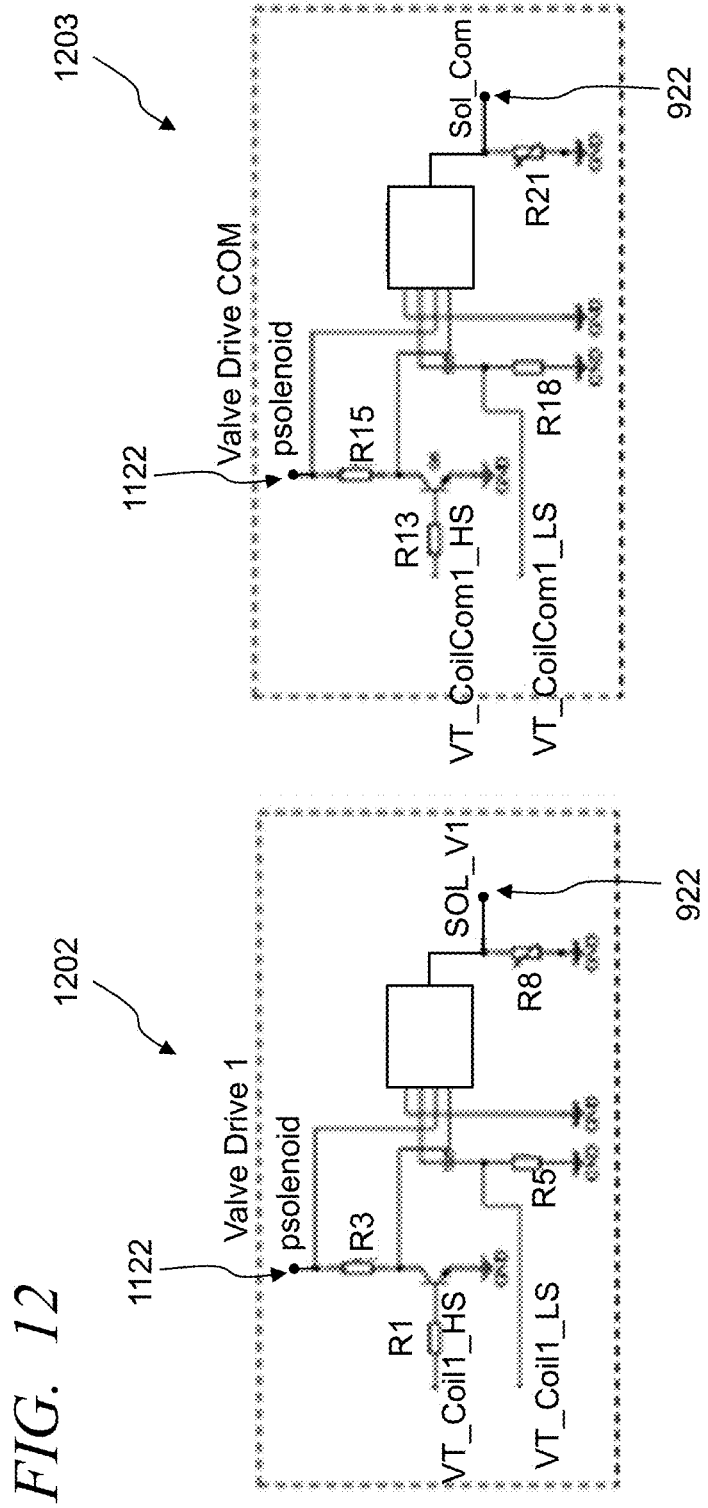
FIG. 12 illustrates an example pair of solenoid drive circuits that cooperatively operate to generate a solenoid drive output, in accordance with some embodiments.

The solenoid system 306, in some implementations, includes a latching solenoid that is driven by a threshold voltage (e.g. 7-9 V) solenoid drive output 920 from the solenoid drive system 914. FIG. 12 illustrates an example pair of solenoid drive circuits 1202-1203 that cooperatively operate to generate a solenoid drive output 920, in accordance with some embodiments. The solenoid drive systems 1202-1203 can be implemented through substantially any relevant drive system, including known commercially available solenoid drive systems and/or solenoid drive systems used in various solenoid systems, such as solenoid systems utilized in some products by Rain Bird Corporation. For example, the solenoid drive systems 1202-1203 can include an H-bridge drive circuit that is coupled with the solenoid drive pulse 1122 (e.g., driven by a 7-9 V, 50 ms pulse). Cooperatively, the solenoid drive systems establish a voltage differential to generate the solenoid drive output 920 to open the solenoid in one voltage orientation, and close the solenoid in a second voltage orientation. For example, in a first polarity a first solenoid drive system 1202 operates as a positive 9V providing a pulse (e.g., 50 ms) while the second solenoid drive system 1203 operates as a reference or ground voltage to active the solenoid. Similarly, the polarities can be reversed to close the solenoid with the second solenoid drive system 1203 operating as a positive 9V pulse with the first solenoid drive system 1202 operating as a reference or ground voltage.

As described above, some embodiments enable the valve control circuit 902 to track one or more voltages and/or conditions of the valve system 102. Some embodiments include one or more voltage tracking and/or measurement systems to help manage and regulate the valve control system 314. FIG. 13 illustrates a simplified backup power storage test circuit 1302, in accordance with some embodiments. The backup power storage test circuit 1302 couples with the backup power storage system 912 (e.g., at a battery voltage tap point 1140). The valve control circuit 902 applies a backup enable signal 1304 to the backup power storage test and receives a backup power storage output 1306 indicating a power level of the backup power storage system 912.

FIG. 14 illustrates a simplified circuit diagram of an exemplary rechargeable power storage test circuit 1402, in accordance with some embodiments. The rechargeable power storage test circuit 1402 couples with the output 1118 of the rechargeable power storage system 906. The valve control circuit 902 applies a check enable signal 1404 to activate the rechargeable power storage test circuit 1402 to obtain a voltage output 1406 corresponding to a voltage level stored in the rechargeable power storage system 906. Accordingly, some embodiments utilize the rechargeable power storage test circuit 1402 to determine whether a voltage level on the rechargeable power storage system 906 is greater than a threshold power source voltage. The voltage test output 1406, in some instances, may be supplied to the valve control circuit through one or more analog to digital converter. In instances where the voltage of the rechargeable power storage system 906 drops below a threshold (e.g., about 2.2V), the valve control circuit can activate and/or enable the power switch 1006 to obtain power from the backup power storage system 912 and charge the rechargeable power storage system 906. In some implementations, the energy harvesting system 1106 includes a buck-boost converter 1107 that uses power from the backup power source 912 to recharge the rechargeable power storage system 906. This recharging may be limited to below a threshold level to limit the power drain of the backup power source 912. When the voltage level of the rechargeable power storage system 906 is above the threshold, then the battery cutoff power switch 1006 is deactivated to cut off the backup power storage system 912 and prevent leakage current and inadvertent draining of the backup power storage system 912.

FIG. 15 illustrates a simplified circuit diagram of an exemplary solenoid capacitor voltage-level test circuit 1502, in accordance with some embodiments. The solenoid capacitor voltage-level test circuit 1502 couples with the solenoid drive pulse 1122 of the solenoid energy reserves 1004. The valve control circuit 902 applies a check capacitance voltage enable signal 1504 to activate the solenoid capacitance test circuit 1502 to obtain a voltage output 1506 corresponding to a voltage level stored in the one or more solenoid energy reserves 1004 used to drive the solenoid drive circuits.

Figure 16:
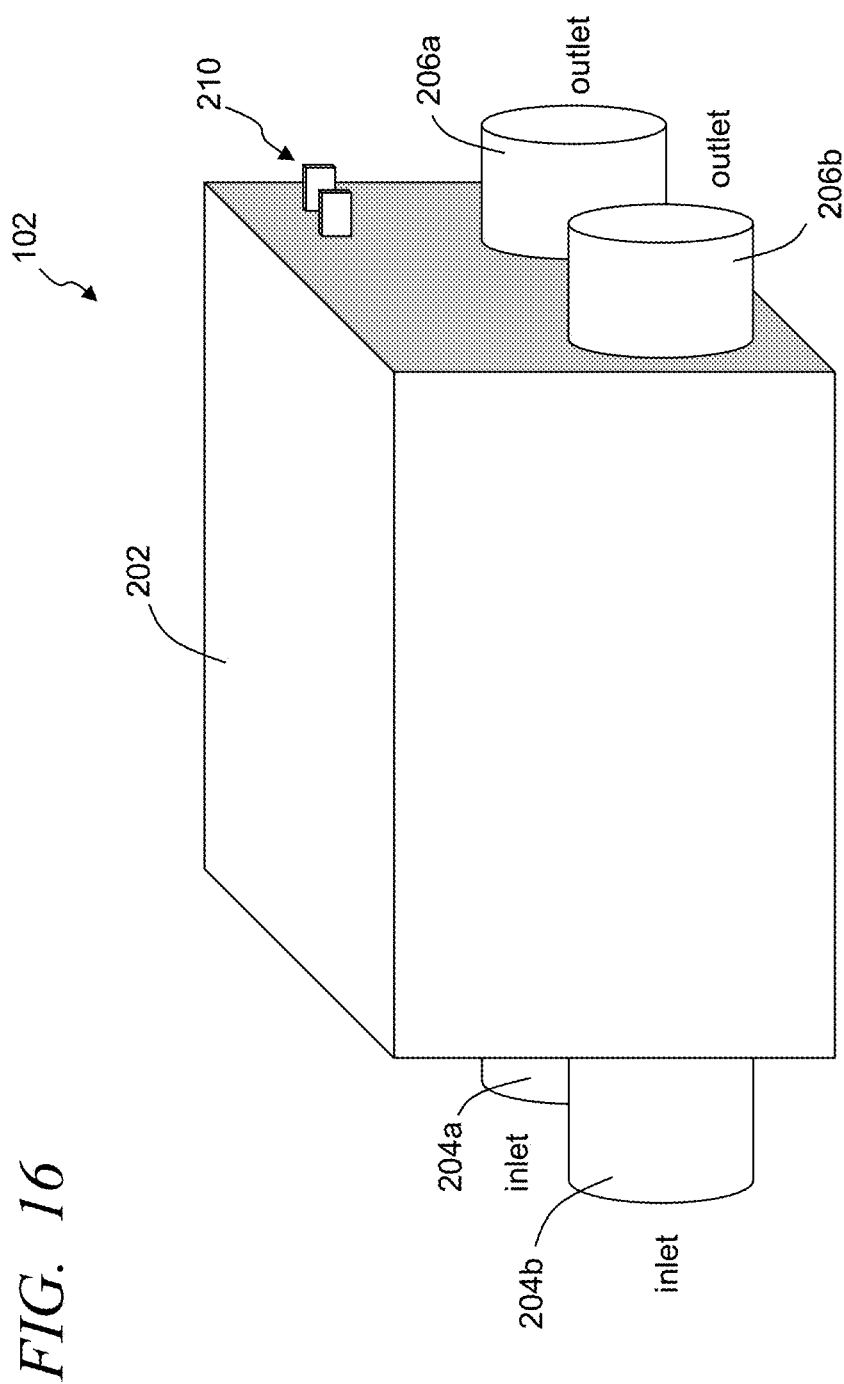
FIG. 16 illustrates a simplified block diagram of an exemplary valve system that includes two inlet conduits and two outlet conduits, in accordance with some embodiments.

As introduced above, in some embodiments, a valve system 102 includes more than one inlet conduits 204 or couplers, and more than one outlet conduits 206 or couplers. FIG. 16 illustrates a simplified block diagram of an exemplary valve system 102 that includes two inlet conduits 204a-204b and two outlet conduits 206a-206b, in accordance with some embodiments. Each inlet conduit 204 extends into the housing 202 and fluidly cooperates with a respective valve system. In some embodiments, the valve system includes one or more external electrical connectors 210.

Figure 17A:
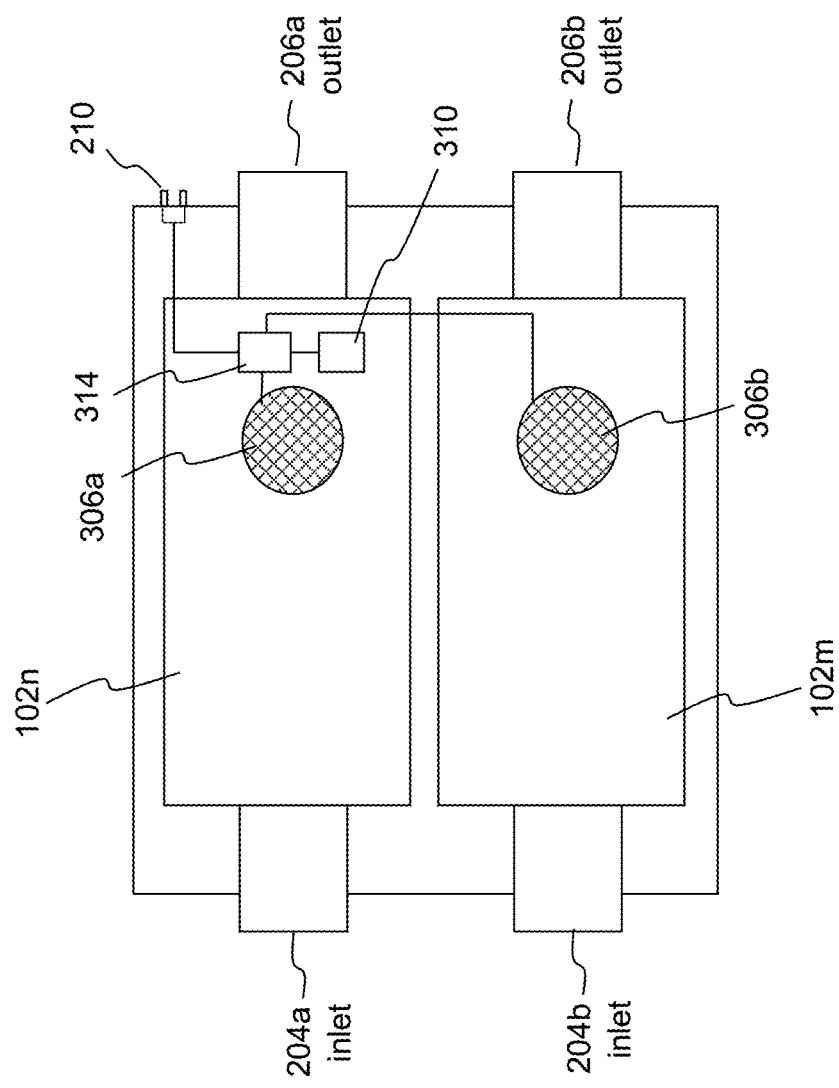
FIG. 17A illustrates a simplified block diagram, overhead cross-sectional view of the valve system of FIG. 16 having two internal valve systems, in accordance with some embodiments.

FIG. 17A illustrates a simplified block diagram, overhead cross-sectional view of the valve system 102 of FIG. 16 having two internal valve systems 102n-102m, in accordance with some embodiments. The two internal valve systems 102n-102m each include a respective solenoid systems 306a, 306b, and internal diaphragm (not illustrated in FIG. 17A) that cooperates with a respective one of the inlet conduit 204a, 204b and outlet conduit 206a, 206b pair. In the embodiment illustrated in FIG. 17A, the valve system 102 include a single generator 310 that cooperates with one of the internal valve systems (e.g., first internal valve system 102n) to generate power in response to activation of the first solenoid system 306a in the first internal valve system 102n and the flow of water through the respective generator conduit (not shown in FIG. 17A). Further, the valve system 102 includes a single valve control system 314 electrically coupled with the generator to receive and store electrical power, and further coupled with each of the solenoid systems 306a, 306b of the two internal valve systems 102n, 102m. In some implementations the valve control system 314 includes separate valve drive systems that can be individually activated to allow independent control of the two internal valve systems 102n, 102m.

As such, in some embodiments a second diaphragm is positioned between the second inlet conduit 204b and the second outlet conduit 206b, and is configured to prevent a flow of water between the second inlet conduit, through a corresponding valve seat, and the second output conduit when the second diaphragm is in a closed position. The valve control system can provide a second solenoid drive output electrically coupled with the rechargeable power storage system and the second solenoid system. The valve control system can communicatively couple with the second solenoid drive output, receive power from the rechargeable power storage system, and activate, in response to a second valve activation signal, the second solenoid drive output to output a second solenoid drive signal to activate the second solenoid system.

Figure 17B:
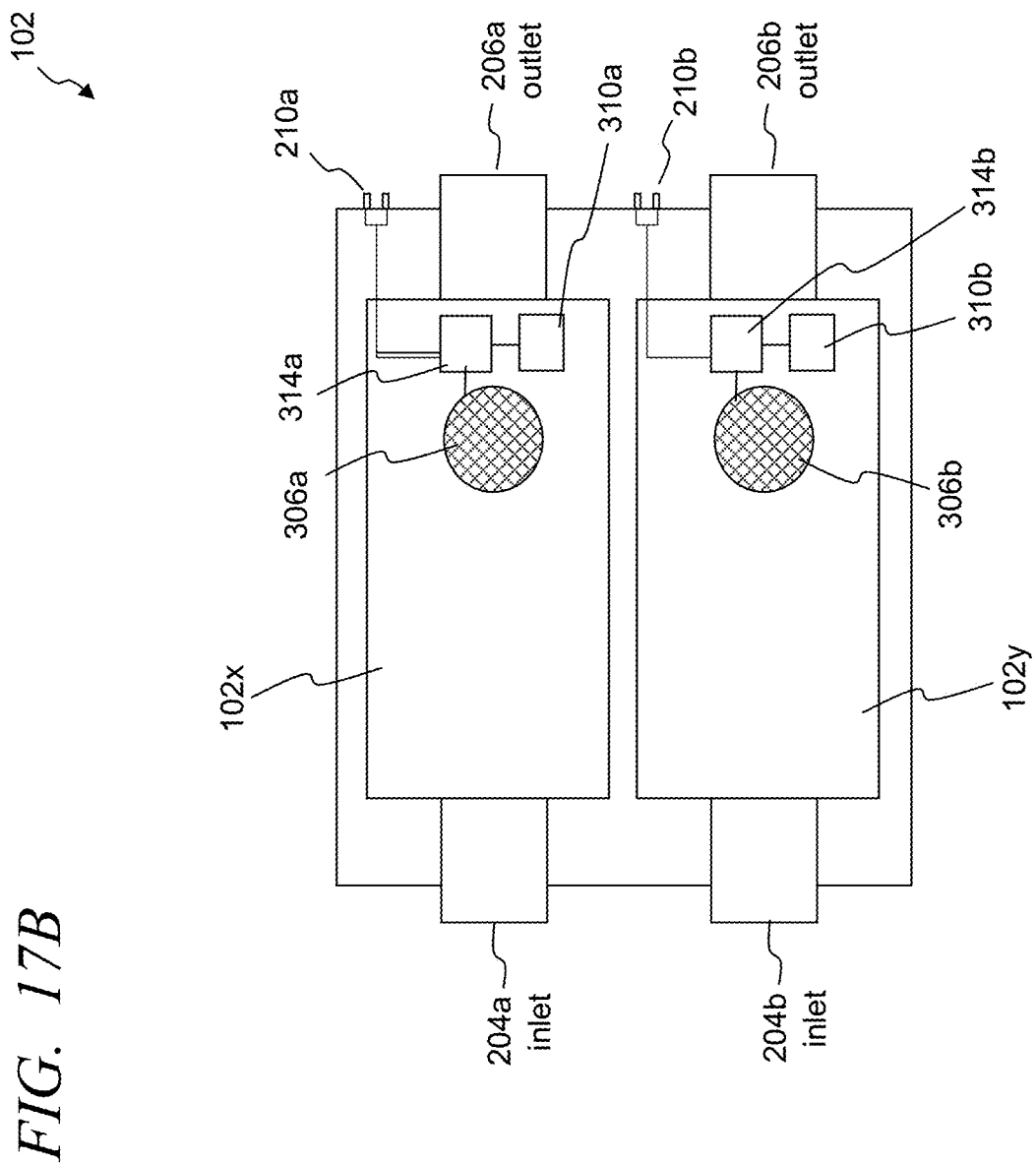
FIG. 17B illustrates a simplified block diagram, overhead cross-sectional view of an alternate embodiment of the valve system of FIG. 16 having two internal valve systems, in accordance with alternate embodiments.

FIG. 17B illustrates a simplified block diagram, overhead cross-sectional view of an alternate embodiment of the valve system 102 of FIG. 16 having two internal valve systems 102x-102y, in accordance with alternate embodiments. The two internal valve systems 102x-102y each including a respective solenoid systems 306a, 306b, and internal diaphragm (not illustrated in FIG. 17B) that cooperates with a respective one of the inlet conduit 204a, 204b and outlet conduit 206a, 206b pair. In the embodiment illustrated in FIG. 17B, the first valve system 102x include a first generator 310a and a first control system 314a. The first generator 310a generates power in response to activation of the first solenoid system 306a in the first internal valve system 102x and the flow of water through the respective first generator conduit (not shown in FIG. 17B). The first valve control system 314a electrically couples with the first generator 310a to receive and store electrical power, and further couples with the first solenoid system 306a to control the activation of the first solenoid system in response to receiving an activation or control signal (e.g., wirelessly received from a separate, remote irrigation controller).

Further, the second valve system 102y include a second generator 310b and a second control system 314b. The second generator 310b generates power in response to activation of the second solenoid system 306b in the second internal valve system 102y and the flow of water through the respective second generator conduit (not shown in FIG. 17B). The second valve control system 314b electrically couples with the second generator 310b to receive and store electrical power, and further couples with the second solenoid system 306b to control the activation of the second solenoid system 306b in response to receiving an activation or control signal (e.g., wirelessly received from a separate, remote irrigation controller). In some embodiments, the valve system 102 of FIG. 17B included multiple external electrical connectors 210a, 210b. In some embodiments, at least one external electrical connector 210a, 210b is associated with a respective one of the internal valve systems 102x, 102y, and electrically coupled with a respective one of the valve control systems 314a, 314b.

Accordingly, in some embodiments the valve control system includes a plurality of 314 solenoid drive outputs each electrically coupled with one of a plurality of valve systems. The valve control system 314 is coupled with and/or controls each of the plurality of solenoid drive outputs and activates, in response to a respective one of a plurality of valve activation signals, the respective one of the plurality of solenoid drive outputs to output a corresponding solenoid drive signal powered from the rechargeable power storage system. The solenoid drive outputs power and activate the respective one of the plurality of valves to cause the respective one of the plurality of valves to transition between a closed state and an open state.

Figure 18:
FIG. 18 illustrates a simplified block diagram, overhead view of an exemplary valve system that includes four inlet conduits and corresponding four outlet conduits, in accordance with some embodiments.

FIG. 18 illustrates a simplified block diagram, overhead view of an exemplary valve system 102 that includes four inlet conduits 204a-204d and corresponding four outlet conduits 206a-206d, in accordance with some embodiments. Each inlet conduit 204a-204d extends into the housing 202 and fluidly cooperates with a respective internal valve system that fluidly cooperates with a respective one of the outlet conduits 206a-206d. In some embodiments, the valve system 102 includes one or more external electrical connectors 210. The above examples shows valve systems 102 with one inlet/outlet pair, two inlet/outlet pairs and four inlet/outlet pairs. It will be appreciated, however, that valve systems can include substantially any number of inlet/outlet valve pairs with corresponding number of internal valve systems.

Figure 19:
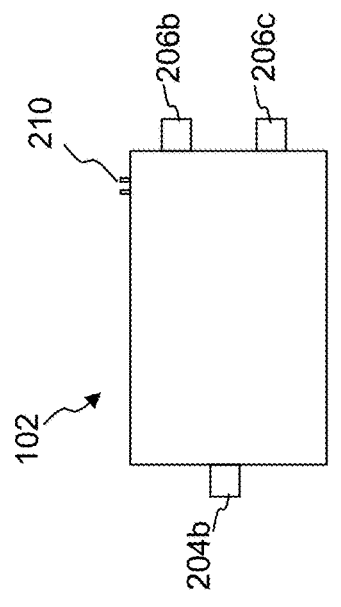
FIG. 19 illustrates a simplified overhead view of an exemplary valve system having a single inlet conduit and two outlet conduits, in accordance with some embodiments.

In other embodiments, some valve systems include an inlet conduit that supplies water to multiple outlet conduits. FIG. 19 illustrates a simplified overhead view of an exemplary valve system 102 having a single inlet conduit 204 and two outlet conduits 206a, 206b, in accordance with some embodiments. In some embodiments, the valve system includes a single valve seat and single diaphragm, but the output from the valve seat splits into the two outlet conduits 206a, 206b. In other implementations, the valve system 102 includes two valve seats and corresponding diaphragms (not illustrated) that each fluidly cooperate with one of the two outlet conduits 206a, 206b.

Referring back to FIG. 1, as described above one or more valve systems 102 can be utilized, for example, in an irrigation system 100. The valve system 102 is configured to communicate with one or more irrigation control devices (e.g., irrigation controllers 110, central irrigation controllers 112, user computing devices 114, or other such devices). In some embodiments, the valve system 102 receives valve activation signals, deactivation signals, activation time information, activation duration information, one or more irrigation schedules, and/or other such triggers or controls from one or more irrigation devices.

In some embodiments, one or more of the valve systems include the external electrical connectors 210 that are electrically coupled with the valve control system 314 and/or the rechargeable power storage system 906. Typically, the external electrical connector 210 is exposed external to the irrigation valve system 102 and/or housing, and is configured to electrically couple with and supply electrical power to an external system that is separate from the irrigation valve system 102. Further, in some embodiments, the external electrical connector 210 is coupled with the rechargeable power storage system 906 through one or more switches 922 or other control devices that are controlled by the valve control circuit 902. Accordingly, in some implementations, the valve control circuit 902 can control the supply of electrical power to the external electrical connector 210 (e.g., through the valve control circuit 902, through the control of a switch 922, etc.), and thus control the supply of electrical power to an external device electrically coupled with the external electrical connector 210. Additionally or alternatively, the electrical connectors 210 can be configured to enable an external diagnostic system to couple with the valve system 102 and/or the valve control system 314 to monitor the operation of the valve system and/or valve control system, and/or test one or more components of the valve system 102 and/or valve control system 314 (e.g., control circuit, rechargeable power storage system, transceivers, etc.).

By locally generating electrical power, the valve system 102 in some embodiments can supply power to one or more external devices, and/or control the operation of one or more external devices. As illustrated in FIG. 1, in some implementations, one or more separate external valves 124a can electrically be coupled with the external electrical connectors 210. The valve control system 314, in some embodiments, can be configured to control when power is supplied to the external electrical connector 210, and thus control the operation of the one or more external valves 124a. Similarly, one or more irrigation sensors 125 or sensor systems can be electrically coupled with one or more external electrical connectors 210 of a valve system 102. The sensors 125 can be substantially any relevant irrigation sensor system and/or non-irrigation sensor systems. For example, the sensor systems can include a flow sensor, rain sensor, soil moisture sensor, temperature sensor, humidity sensor, wind sensor, light sensor, other such sensors or two or more of such sensors. As with the external valve 124a, in some embodiments, the valve system 102 can control when power is supplied to the one or more external electrical connectors 210 and thus control when the one or more sensors 125 can be activated. The valve control circuit can control the supplying of electrical power from the rechargeable power storage system, through the external electrical connector 210, and to the irrigation sensor system to supply operation power to the irrigation sensor system. The powering of the one or more sensor system enables the sensors to operate to acquire sensor information, and communicate the sensor information via wired and/or wireless communication. The valve control circuit, in some embodiments, receives the sensor system. Further, in some applications, the valve control circuit can adjust the operation of the valve system 102 based on the sensor information (e.g., shut off the valve system in response to a threshold rain sensor information, shut off the valve system in response to a temperature threshold sensor information, etc.), and in some instances communicates the sensor information to one or more remote systems. In some embodiments, the valve control system 314 is configured to wirelessly receive control commands from a remote device (e.g., irrigation controller 110, central irrigation controller 112, user device 114, etc.) to control the supply of power to the external electrical connector 210 and thus control one or more external devices.

In some embodiments, the external electrical connector 210 is electrically coupled with the rechargeable power storage system 906 and communicatively coupled with the valve control circuit 902. The valve control circuit 902 can be configured to control electrical power supplied from the rechargeable power storage system to the external irrigation valve according to an irrigation schedule.

The irrigation activation signals and/or irrigation schedule, in some implementations, is provided through one or more the irrigation control devices. Typically, the activation signal and/or irrigation schedule is communicated wirelessly. In some embodiments, the irrigation control device is an irrigation controller located at a location where the valve system 102, with a valve control system 314, is located and where irrigation is controlled and implemented. Additionally or alternatively, the valve system 102 in some embodiments is configured to operate in some instances autonomously to identify actions to implement based on one or more sensor data, conditions, one or more thresholds and/or other relevant information. Similarly, in some implementations, the valve system 102 receives an irrigation schedule relative to at least the valve system itself and once received autonomously implements that irrigation schedule, while further making adjustments and/or interruptions to the irrigation schedule based one or more factors and/or conditions (e.g., weather, moisture, flow rates, pressure, etc.).

Figure 20:
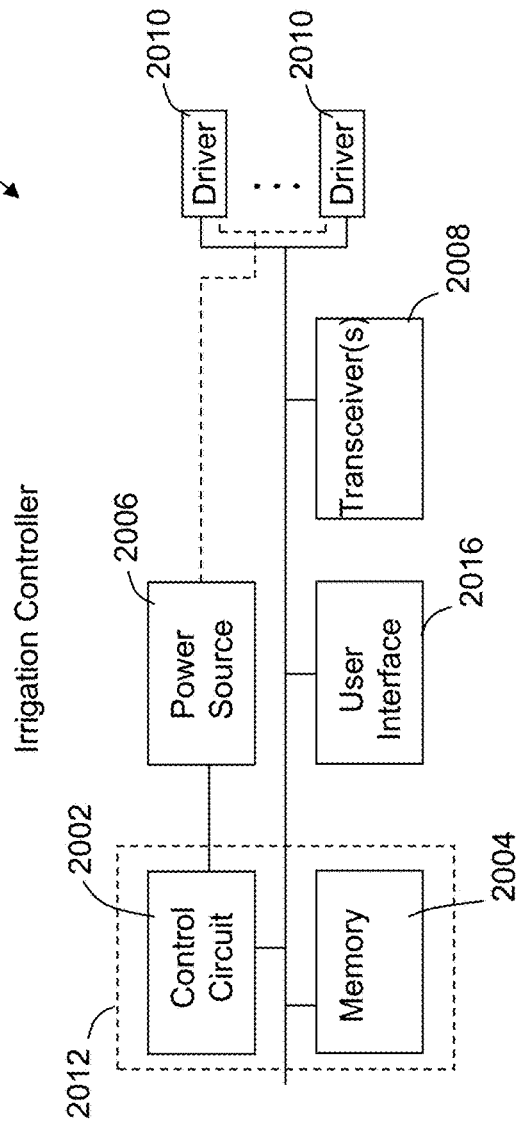
FIG. 20 illustrates a simplified block diagram of an irrigation controller, in accordance with some embodiments.

FIG. 20 illustrates a simplified block diagram of an irrigation controller 110, in accordance with some embodiments. The irrigation controller 110 includes one or more irrigation control circuits 2002, memory 2004, one or more power sources 2006, one or more communication transceivers 2008, and a plurality of valve driver outputs 2010. Further, in some embodiments, the control circuit 2002 can be part of control circuitry and/or a control system 2012, which may be implemented through one or more processors with access to one or more memory 2004 that can store instructions, code and the like that is implemented by the control circuit and/or processors to implement intended functionality. Some embodiments may include one or more user interfaces 2016 that can include a display and/or one or more user inputs (e.g., buttons, touch screen, track ball, keyboard, mouse, etc.). Each of the valve driver outputs 2010 is configured to be physically and electrically coupled with one or more remote valves 124 via one or more wires 126.

The irrigation control circuit 2002 is configured to generate valve signals that are powered from the power source 2006 and transmitted as one or more of the output valve signals on one or more of the plurality of driver outputs 2010 to cause activation of a respective one of the one or more irrigation valves 124 physically coupled via at least one of the one or more wires 126 with a respective one of the plurality of driver outputs 2010.

Figure 21:
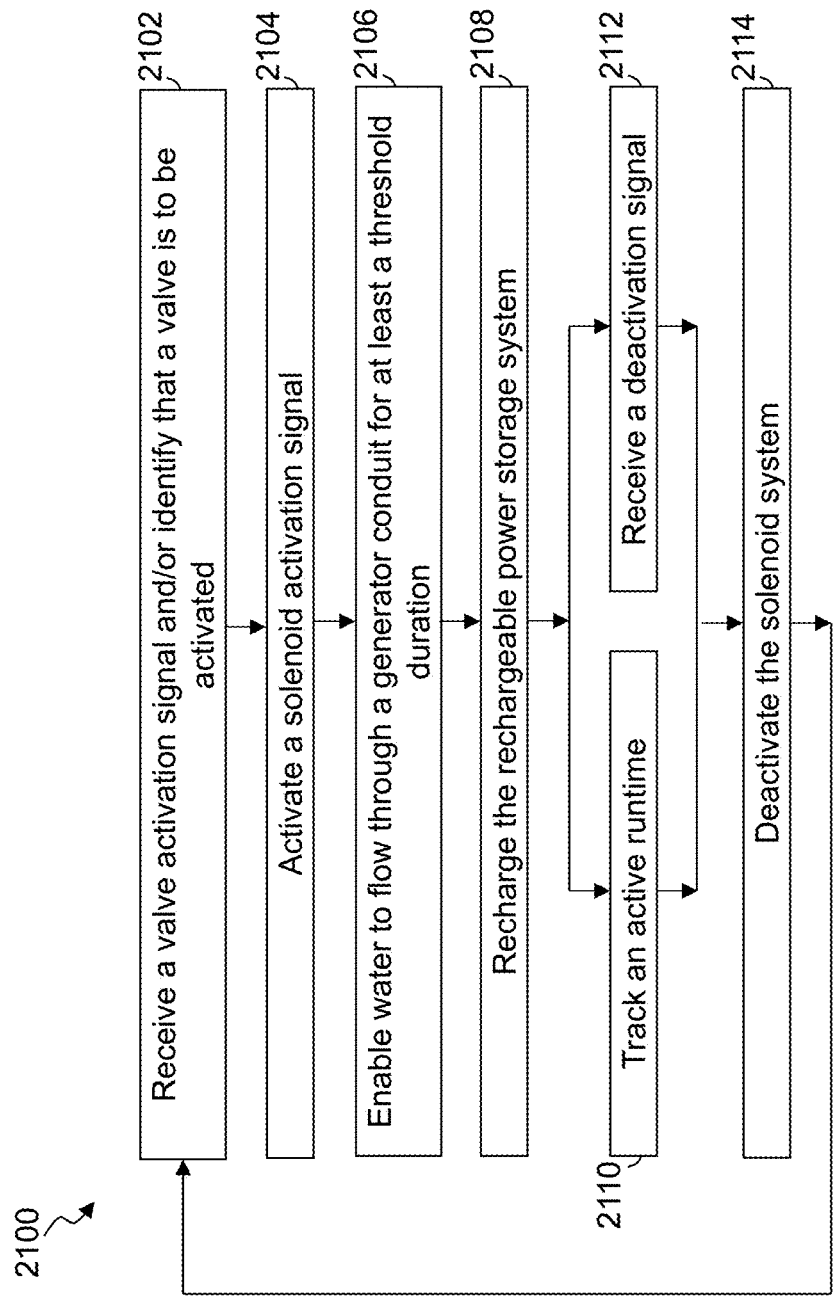
FIG. 21 illustrates a simplified flow diagram of an exemplary process of controlling irrigation, in accordance with some embodiments.

FIG. 21 illustrates a simplified flow diagram of an exemplary process 2100 of controlling irrigation, in accordance with some embodiments. In step 2102, a valve control circuit 902 receives a valve activation signal and/or identifies that a valve is to be activated consistent with an irrigation schedule implemented by the valve control circuit. In step 2104, a solenoid activation signal is activated. In some embodiments, the boost converters 916 is activated to boost the voltage from the rechargeable power storage system 906 to charge the one or more solenoid energy reserves 1004 that are used to drive one or more solenoid drive circuits 1202-1203 to activate one or more solenoid systems 306. In step 2106, water flows through a generator conduit for at least a threshold duration prior to an opening of the diaphragm, and power is generated by the generator 310 for at least the threshold duration. In step 2108, the power is used to recharge the rechargeable power storage system 906.

Some embodiments include optional step 2110 where an active runtime is tracked while water is flowing through the valve system 102. Additionally or alternatively a deactivation signal may be received in step 2112. In step 2114, the valve control circuit activates the boost converter 916 to deactivate the solenoid system in response to a specified runtime duration is reached and/or a deactivation signal is wirelessly received. The process 2100 can be repeated any number of times, resulting in repeated charging and discharging of the rechargeable power storage system 906.

Figure 22:
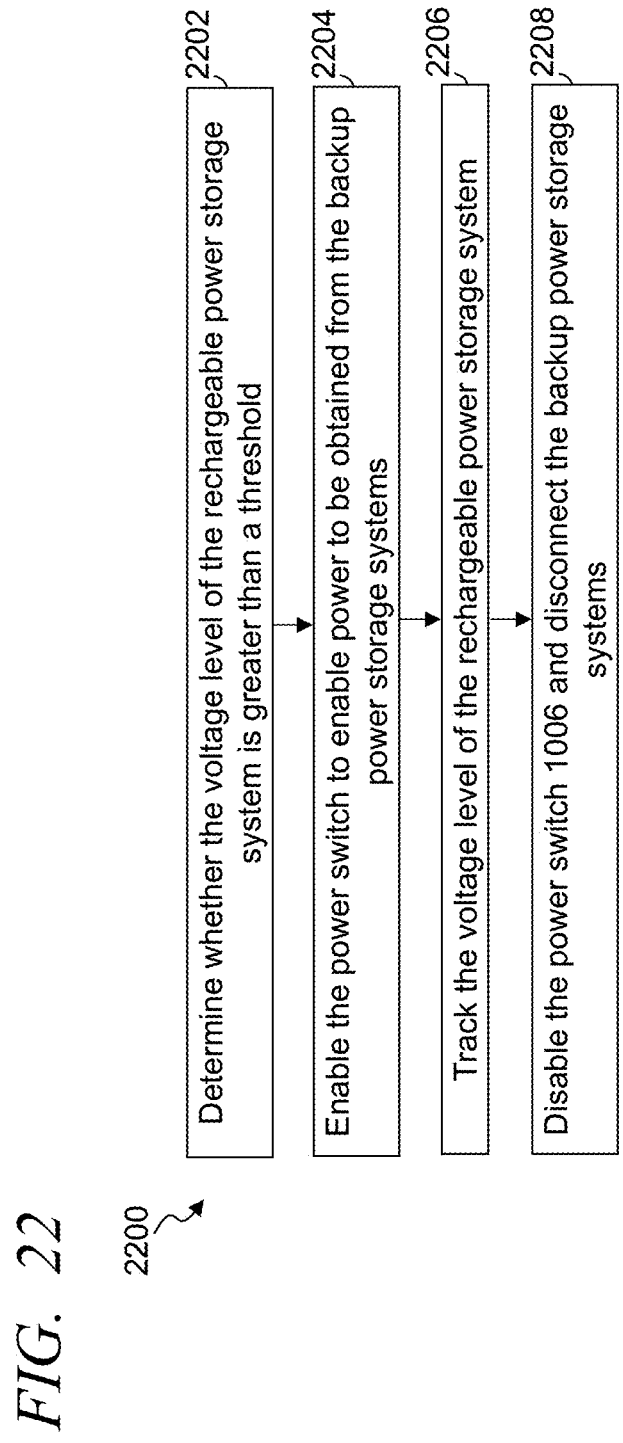
FIG. 22 illustrates a simplified flow diagram of an exemplary process of monitoring a power level of the rechargeable power storage system, in accordance with some embodiments.

FIG. 22 illustrates a simplified flow diagram of an exemplary process 2200 of monitoring a power level of the rechargeable power storage system 906, in accordance with some embodiments. The process 2200 can be implemented as part of the process 2100 (e.g., following step 2102) or as a separate process. In step 2202, a voltage level of the rechargeable power storage system 906 is evaluated to determine whether the voltage level is greater than a threshold. When the voltage is not, the process advances to step 2204 where the power switch 1006 is enabled to enable power to be obtained from the backup power storage systems 912 and recharge the rechargeable power storage system with the power received from the backup power storage system. In step 2206, the voltage level of the rechargeable power storage system 906 is tracked while recharging the rechargeable power storage system. In step 2208, the power switch 1006 is disabled disconnecting the backup power storage systems 912.

Figure 23B:
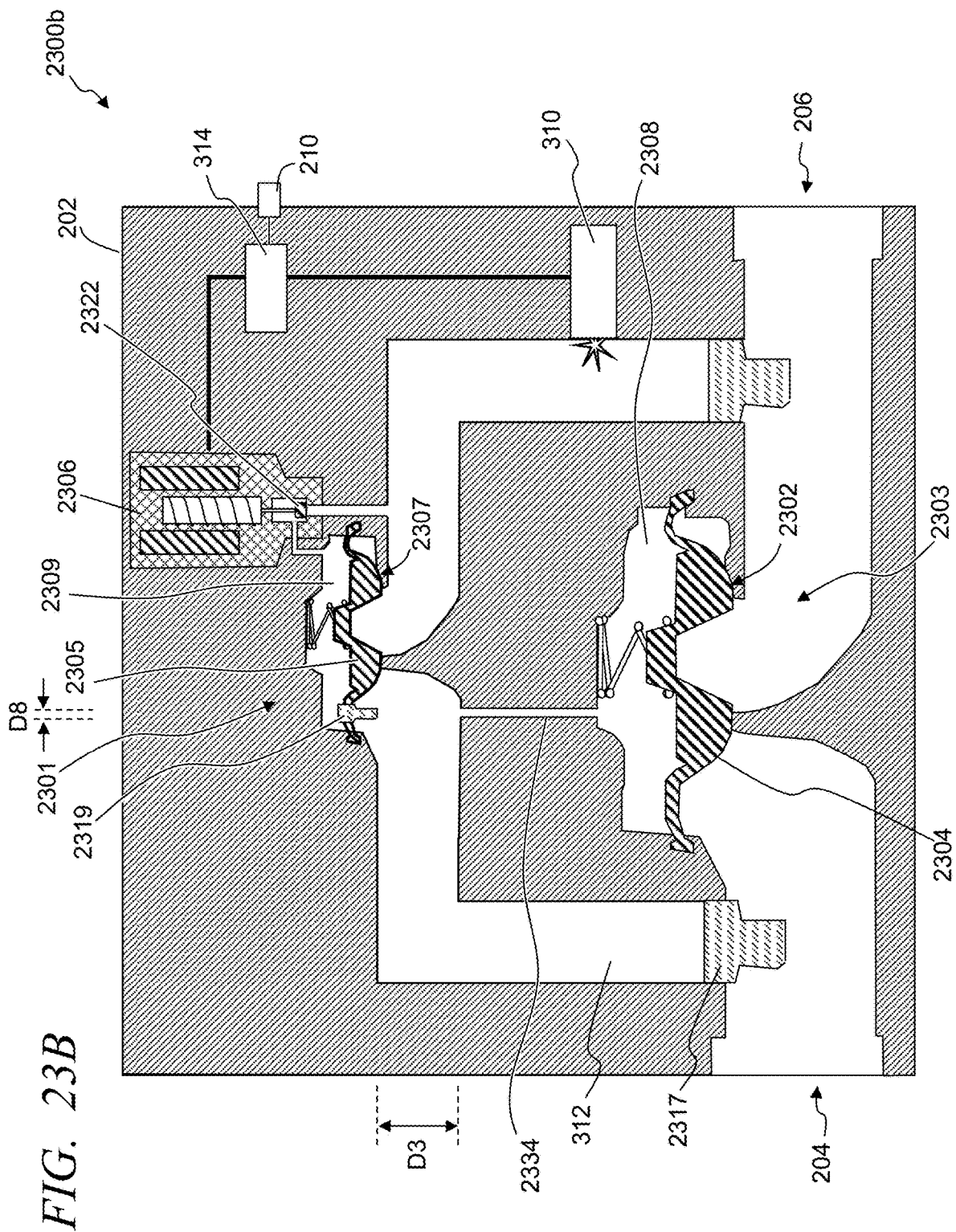
FIG. 23B illustrates a simplified block diagram, cross-sectional view of an exemplary dual diaphragm valve system, in accordance with some embodiments.

FIG. 23A illustrates a simplified block diagram, cross-sectional view of an exemplary dual diaphragm valve system 2300a, in accordance with some embodiments, with a generator 310 upstream of an actuation diaphragm 2305. FIG. 23B illustrates a simplified block diagram, cross-sectional view of an exemplary dual diaphragm valve system 2300b, in accordance with some embodiments, with a generator 310 downstream of an actuation diaphragm 2305. Referring to FIGS. 23A-23B, the dual diaphragm valve systems in some embodiments include an actuation sub-valve system 2301 positioned as part of or cooperated with the generator conduit 312, and a primary sub-valve system 2303 cooperated with a main conduit 303 and comprising a primary diaphragm 2304 or other such primary controllable valve mechanism. The primary diaphragm 2304 is positioned to be in contact against a primary valve seat 2302 when in a closed position to prevent the flow of fluid through the primary flow path between the inlet conduit 204, through the valve seat 2302, and the outlet conduit 206. In some embodiments, the generator conduit 312 is fluidly coupled at a generator conduit inlet with the main conduit 303 and extends from the main conduit upstream of the primary diaphragm 2304, and is further fluidly coupled with the main conduit 303 downstream of the primary diaphragm 2304 at a generator conduit outlet.

The actuation sub-valve system 2301 includes an actuation diaphragm 2305 positioned to be in contact against an actuation valve seat 2307 when in a closed position to prevent the flow of fluid through the generator conduit 312 when the actuation sub-valve system 2301 is in an inactive state. The actuation diaphragm 2305 is further configured to transition to an open position separated from the actuation valve seat 2307 when the actuation sub-valve system is in an activate state opening a flow path and allowing fluid to travel through the generator conduit 312 from the inlet conduit 204 to the outlet conduit 206. The actuation sub-valve system 2301 further includes or is coupled with a solenoid system 2306. The solenoid system 2306 is configured to transition in response to an activation signal between an inactive state with a solenoid plunger 2322 in a closed position preventing fluid flow from an actuation bonnet cavity 2309 or chamber, and an activate state with the solenoid plunger moved to an activate position. When the solenoid plunger 2322 is in the open position, a solenoid flow path from the actuation bonnet cavity 2309, through the solenoid and back into the generator conduit 312 is opened resulting in reduction in the pressure within the bonnet cavity 2309. The reduced pressure enables the actuation diaphragm 2305 to transition to the open position allowing fluid to flow through the generator conduit 312.

One or more generators 310 are positioned proximate the generator conduit 312 with the at least a portion of a corresponding rotor assembly 330 extending into at least a portion of the generator conduit 312 such that the rotor assembly is configured to be contacted by the flow of fluid when fluid travels through the generator conduit 312. The flowing fluid causes movement of the rotor assembly 330 (e.g., rotation, vibration, lateral movement, and/or other such movement). In some embodiments, the generator 310 comprises one or more turbine generators, motors, magnetic sensors and/or coupling systems, and/or other such systems that are configured to generate electrical power in response to the movement of the rotor assembly 330 caused by the flow of fluid in the generator conduit 312. Accordingly, the generator 310 and rotor assembly 330 are periodically activated in response to activation of the actuation sub-valve system 2301 to generate electrical power.

Further, the flow of fluid through the generator conduit 312 enables fluid to flow from a primary bonnet cavity 2308, which is separated from the inlet conduit 204 by the primary diaphragm 2304. The flow or pull of fluid from the primary bonnet cavity 2308 through a primary bonnet cavity conduit 2334 causes a reduction in pressure within the primary bonnet cavity 2308 enabling the transition of the primary diaphragm 2304 to transition to the open position separating the primary diaphragm 2304 from the primary valve seat 2302 and allowing fluid to flow through the main fluid path from the inlet conduit 204 to the outlet conduit 206. The cross-sectional area and/or diameter of the primary bonnet cavity conduit 2334 is configured to ensure that the rate of pressure drop within the primary bonnet cavity 2308 is less than a threshold rate such that the primary diaphragm 2304 remains in the closed position for at least a threshold period of time after the solenoid system 2306 is activated. This threshold period of time ensures that fluid flows through the generator conduit 312 for at least a generator threshold duration of time before the primary diaphragm 2304 transitions to the open position and the generator 310 generates electrical power for at least a generator threshold period of time. In some embodiments, the dual diaphragm valve system 2300 is configured with an activation ratio defined by the ratio of the generator conduit cross-sectional area D3 relative to a cross-sectional area D8 of the primary bonnet cavity conduit 2334 to establish the rate of flow from the primary bonnet cavity 2308 resulting in the primary diaphragm 2304 remaining in the closed position for at least the threshold period of time after the solenoid system 2306 is activated, and ensures the flow of fluid through the generator conduit 312 for at least the generator threshold duration of time.

Some embodiments include an optional inlet generator conduit flow filter 2317 and/or optional outlet generator conduit flow filter 2319 that filter the water entering the generator conduit. Typically, the flow filters 2317, 2319 are self-cleaning by the water flowing through the main conduit 303. In some implementations, the flow filters include a scrubber.

The dual diaphragm valve system 2300 further includes at least one valve control system 314. The valve control system 314, in some embodiments, is similar to the valve control system described above and includes and/or is coupled with one or more rechargeable power storage systems 906, and one or more wireless transceivers 904. At least some of the electrical energy generated by the generator 310 is supplied to the valve control system 314. Typically, some or all of the received electrical energy is stored in the rechargeable power storage system 906. The valve control circuit 902, in some embodiments, provides at least some control over the activation of one or more solenoid systems 2306, and typically in response to one or more wireless control signals received by the valve control system 314. The valve control system 314 can activate the solenoid system 2306 in response to an activation system, and deactivate the solenoid system 2306 based on a deactivation signal, tracking an instructed activate duration of time, and/or other such controls. In some embodiments, the dual diaphragm valve system 2300 includes one or more external electrical connectors 210.

In some embodiments, the solenoid system 2306 is positioned within the housing 202 secured within a solenoid cavity of the housing. Further, in some implementations, the solenoid system is fully enclosed within the housing 202, while in other implementations some of the solenoid system is exposed outside of the housing. Still further, the dual diaphragm valve system 2300 is configured in some embodiment so that the solenoid system 2306 is removable from the housing allowing, for example, to replace the solenoid system and/or perform maintenance of one or more portions of the valve system. Similarly, in some embodiments, one or both of the diaphragms can be accessed through one or more openings or separations of the housing to enable service of the diaphragms, filters and/or other components of the valve system.

The dual diaphragm valve system 2300, in some implementations, enables the use of larger generator conduits and/or greater fluid flow through the generator conduit with minimal pressure loss. It is determined that the use of solenoid system to block or allow flow through some generator conduits, in some implementations, may utilize an amount of power from the rechargeable power storage system that is greater than desired and/or sustainable based power generated. Accordingly, the use of a solenoid system to activate the actuation diaphragm 2305 to enable flow through the generator conduit. In some embodiments, the actuation diaphragm 2305 is smaller than the primary diaphragm 2304, such as in systems when the generator conduit 312 has a cross-sectional area that is less than the cross-sectional area. Additionally, the actuation diaphragm 2305 typically results in a relatively low pressure loss within the generator conduit, which in part enables more power generation and/or precise control over a duration the power generator is active. In some embodiments, one or both of the actuation diaphragm 2305 and/or the primary diaphragm 2304 comprises a latching solenoid system 2306, which can reduce power usage in activation and/or deactivation. In some embodiments, the valve control system 314 is configured to wirelessly receive an activation signal from an external source and cause power to be supplied from the rechargeable power storage system to activate the solenoid system 2306 to cause the solenoid system to transition to an activate position triggering a transition of the actuation diaphragm 2305 to the open position enabling fluid flow through the generator conduit 312 for at least a threshold duration. The generator is configured to generate the electrical power at least during the threshold duration. In some embodiments, the transition of the actuation diaphragm 2305 to the open position induces, after the threshold duration, the primary diaphragm 2304 to transition to the open position enabling the flow of fluid through the main conduit 303.

Figure 24A:
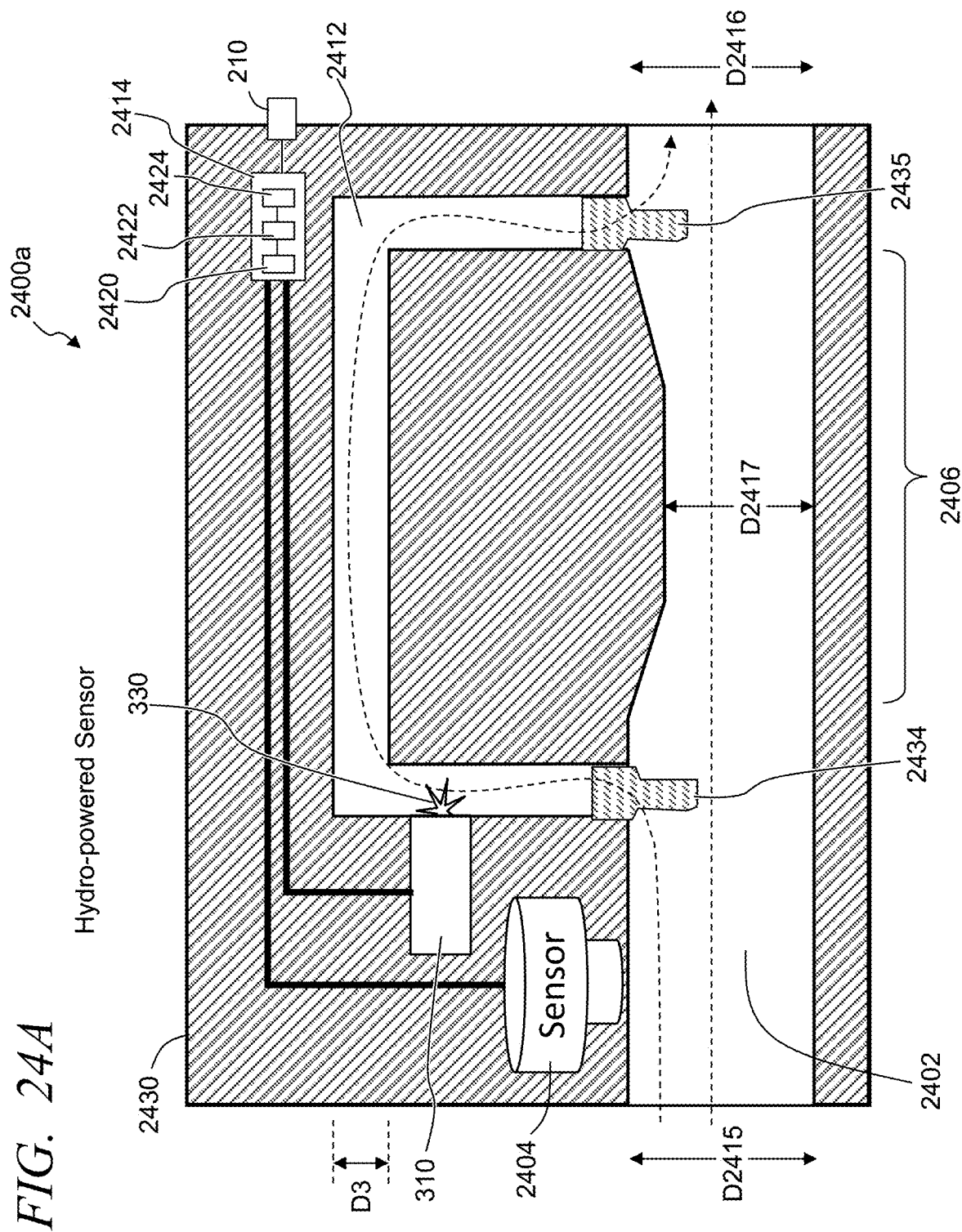
FIG. 24A illustrates a simplified block diagram, cross-sectional view of an exemplary hydro-powered irrigation sensor system, in accordance with some embodiments.
Figure 24B:
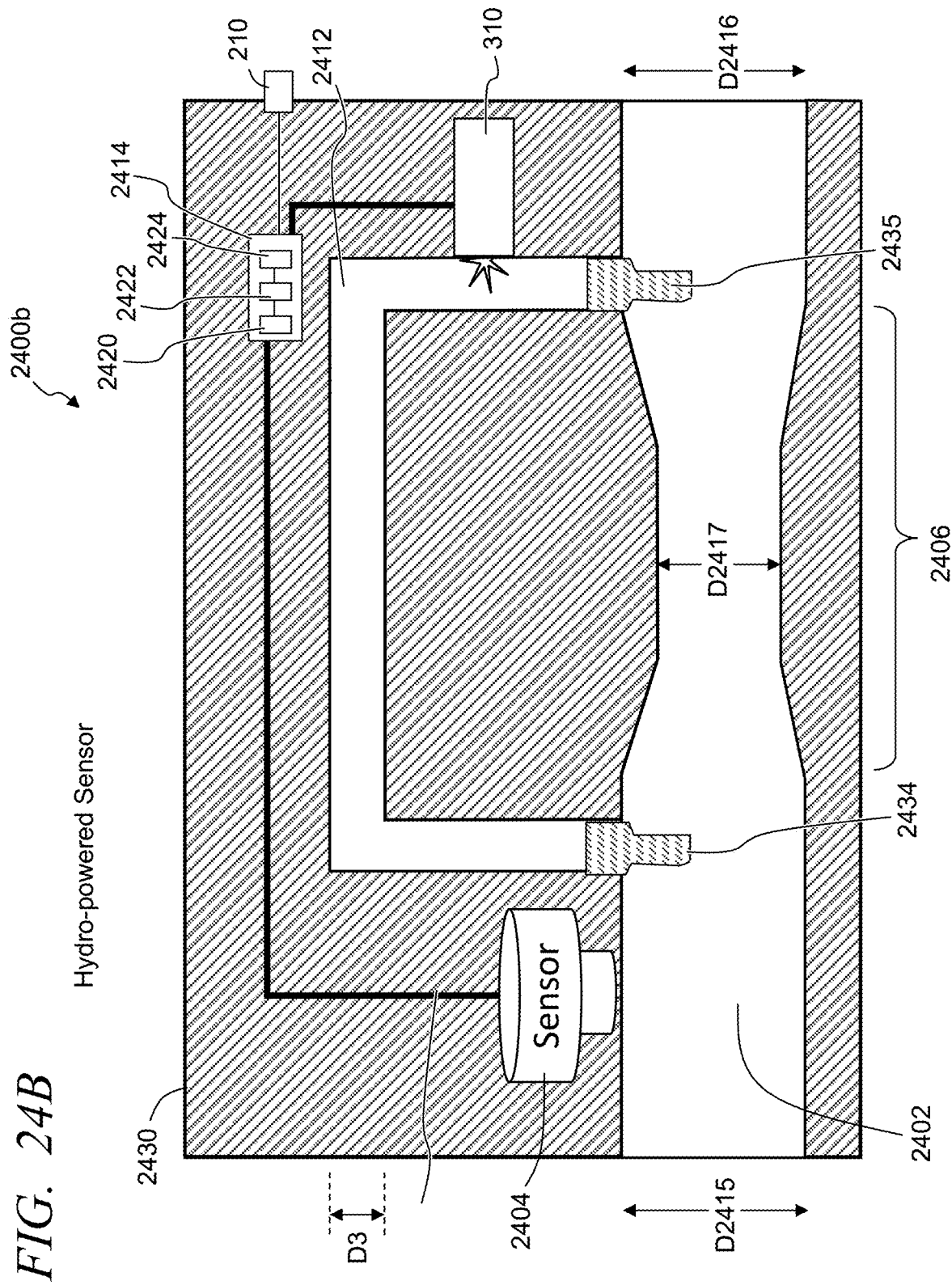
FIG. 24B illustrates a simplified block diagram, cross-sectional view of an exemplary hydro-powered irrigation sensor system, in accordance with some embodiments.

Some embodiments incorporate an electrical generator system 310 into a sensor system. FIG. 24A illustrates a simplified block diagram, cross-sectional view of an exemplary hydro-powered irrigation sensor system 2400a, in accordance with some embodiments, with a generator system 310 positioned proximate an inlet of a generator conduit 2412. FIG. 24B illustrates a simplified block diagram, cross-sectional view of an exemplary hydro-powered irrigation sensor system 2400b, in accordance with some embodiments, with a generator system 310 positioned proximate an outlet of a generator conduit 2412. Referring to FIGS. 24A-24B, the irrigation sensor system 2400 includes a main flow conduit 2402, one or more sensors 2404 and/or actuatable sub-systems, a bypass generator conduit 2412, one or more generator systems 310 each cooperated with one or more rotor assemblies 330, and a sensor control system 2414. The main flow conduit 2402 is configured to fluidly couple with one or more upstream conduits (not shown) that is fluidly coupled with a fluid source, and one or more downstream fluid conduits (not shown) such that fluid flows through the main flow conduit 2402 when fluid is supplied to the irrigation sensor system 2400. The sensor system 2400 can be cooperated in-line with substantially any irrigation conduit. Similarly, the sensor system 2400 can be integrated within an irrigation rotor, a water emission device (e.g., sprinkler, drip line, etc.). Further, the sensor system 2400 can be a stand-alone system, or a module that is integrated into a larger device (e.g., rotors, valves, pumps, etc.).

The main flow conduit 2402 includes an inlet with an inlet cross-sectional area D2415 or diameter, an outlet with an outlet cross-sectional area D2416 or diameter, and a flow restriction section 2406 comprising a reduced cross-sectional area D2417 or diameter. The reduced flow restriction section 2406 is positioned downstream of a generator conduit inlet of the generator conduit 2412. The reduced cross-sectional area D2414 is at least less than the inlet cross-sectional area D2415. The reduction in cross-sectional area of the main flow conduit induces an increased pressure and in response fluid is forced to pass through the generator conduit 2412 and engage with the rotor assembly 330 of the generator 310.

The cross-sectional area D3 and/or diameter of the generator conduit 2412 is configured such that a ratio of the cross-sectional area D3 of the generator conduit 2412 versus the cross-sectional area D2415 of the main flow conduit 2402 is configured to ensure at least a threshold fluid flow through the generator conduit 2412 when a threshold minimum inlet fluid flow or inlet fluid pressure is applied to an inlet of the main flow conduit 2402. This enables a threshold amount of power to be generated when fluid passes through the sensor system at the minimum inlet flow and for at least a minimum threshold duration. In some embodiments, the cross-sectional area D3 and/or diameter of the generator conduit 2412 is sized to be about equal to or greater than the reduction in the cross-sectional area of the main flow conduit 2402 caused by the flow restriction section 2406 such that a fluid pressure at an outlet of the main flow conduit 2402 is substantially equal to the fluid pressure at the inlet of the main flow conduit. Further, in some implementations, the inlet cross-sectional area D2415 is substantially equal to or less than the outlet cross-sectional area D2415 of the main flow conduit, and/or the outlet cross-sectional area D2415 is configured such that the fluid pressure at the outlet is substantially equal to the fluid pressure at the inlet. The amount of reduction caused by the flow restriction section 2406 is typically predefined to achieve an intended range of fluid flow through the generator conduit 2412 based on an expected range of fluid flows being fed into an inlet of the main flow conduit 2402. In some embodiments, different configurations having different ratios of the cross-sectional area D3 of the generator conduit 2412 verses the cross-sectional area D2415 of the main flow conduit 2402 to enable different expected fluid flows through the sensor system 2400.

The irrigation sensor system 2400, in some embodiments, further includes at least one sensor control system 2414. The sensor control system 2414 includes one or more sensor control circuit 2420, and typically includes and/or is electrically coupled with one or more rechargeable power storage systems 2422. In some embodiments, the sensor control system 2414 is similar to one or more of the valve control systems described above. Typically, the sensor control system 2414 includes one or more wired and/or wireless transceivers 2424. The generator 310 is configured to generate electrical power in response to the movement of the rotor assembly 330 caused by the flow of fluid in the generator conduit 312. Typically, while fluid is flowing into the main conduit 2402, a percentage of the fluid is forced through the generator conduit 2412 as a result of the flow restriction section 2406.

At least some of the electrical energy generated by the generator 310 is supplied to the sensor control system 2414. Typically, some or all of the received electrical energy is stored in the rechargeable power storage system 2422. The sensor control circuit 2420 provides at least some control over one or more sensors 2404 and/or actuatable systems of the irrigation sensor system 2400 and/or receives sensor data from the sensor systems 2404. The one or more sensor systems 2404 of the self-powered irrigation sensor system 2400 can be substantially any relevant sensor system, such as but not limited to one or more flow sensor systems, temperature sensor systems, landscape drip filter with wireless notification (e.g., to irrigation controllers 110, one or more central irrigation controllers 112, an APP executed on one or more user computing devices 114, etc.) when the filter becomes clogged, pressure sensor system, soil sensor systems, turf health sensor system (e.g., imaging system cooperated with image processing to filters out green colors to identify (and treat) landscape stress, disease, dry-spots, wet-spots, weeds, etc.), location sensor systems, acoustic sensor systems, ultrasound sensor systems, pulse-counter interface, other such sensor systems, or a combination of two or more of such relevant sensor systems.

In some embodiments, the hydro-powered irrigation sensor system 2400*a* additionally includes one or more actuatable systems or includes one or more actuatable systems instead of a sensor system providing a self-powered actuatable system. The actuatable systems can be substantially any relevant actuatable system such as but not limited to wireless micro-valves, wireless controller remote, pump start relay, irrigation filter with wireless life remaining or months until next service alert (e.g., communicated to one or more irrigation controllers 110, one or more central irrigation controllers 112, an application (APP) on a user computing device 114, a server and/or other such systems), and/or other such actuatable systems. Still further, in some embodiments, the irrigation sensor system 2400*a* includes external electrical connectors 210. The sensor control circuit 2420 is configured, in some embodiments, to control power supplied from the rechargeable power storage system 2422 to the external electrical connectors 210 to supply power to substantially any relevant external system, such as but not limited to valves, pumps, lighting, fountains, other actuatable accessories, sensor systems, micro-valves, pump start relays, pulse counter interface, irrigation filters, other such external systems, or a combination of two or more of such external systems. The control can be based on one or more commands and/or one or more schedules received from an irrigation controller 110, central irrigation controller 112, user computing device 114 and/or other such system, implemented by the sensor control circuit based on sensor information, other such conditions, or a combination of such factors.

The positioning of the sensor or sensors 2404 within a housing 2430 of the sensor system 2400 can be in substantially any relevant location, and can be dependent on the type of sensor. Similarly, some embodiments consider turbulence and/or other factors resulting from the generator conduit 2412 and/or the tapering, change in shape and/or size of the main flow conduit 2402 based on the flow restriction sections 2406.

The sensor control circuit 2420, in some embodiments, controls the supply of electrical energy from the rechargeable power storage system 2422 and/or controls the activation and/or the deactivation of the one or more sensors 2404. For example, the sensor control circuit 2420 can activate a sensor 2404 in response to wirelessly receiving a request from a remote system (e.g., an irrigation controller 110, central irrigation controller 112, user computing device 114, and/or other such system). Additionally or alternatively, the sensor control circuit 2420 can activate one or more sensor 2404 based on a locally stored schedule, a detection of an event (e.g., based on sensor input from another sensor of the irrigation sensor system 2400), and/or other such condition.

Similarly, in some embodiments, the sensor control circuit 2420 is configured to communicate sensor information from the one or more sensors 2404 to one or more self-powered valve systems 102, the irrigation controllers 110, central irrigation controller 112, user computing devices 114, other self-powered sensor systems, self-powered generator systems, other actuator systems, and/or other such systems. The sensor information may be communicated in response to a request from the irrigation controller 110, central irrigation controller 112, user computing device 114, and/or other such system, in response to a detected threshold condition, in response to a detected threshold change, and/or other such triggers.

In some embodiments, the irrigation sensor system 2400 includes one or more external electrical connector 210. Typically, the one or more external connectors 210 are exposed external to the irrigation sensor system 2400 and/or housing 2430 of the irrigation sensor system. In some implementations, the electrical connector 210 is configured to electrically couple with one or more an external systems (e.g., external sensor, external valve, etc.) that is separate from the irrigation sensor system 2400, supply electrical power to and/or communicate with the external system (e.g., activation signal, receive sensor data, etc.). Further, in some embodiments, the external electrical connector 210 is coupled with the rechargeable power storage system 906 through one or more switches or other control devices that are controlled by the sensor control circuit 2420. Accordingly, in some implementations, the sensor control circuit 2420 controls the supply of electrical power to the external electrical connector 210 (e.g., through the valve control circuit 902, through the control of a switch 922, etc.), and thus controls the supply of electrical power to an external device electrically coupled with the external electrical connector 210. Additionally or alternatively, the electrical connectors 210 can be configured to enable an external diagnostic system to couple with the irrigation sensor system 2400 and/or the sensor control system 2414 to monitor the operation of the irrigation sensor system, the valve control system, and/or test one or more components of the irrigation sensor system 2400 and/or sensor control system 2414 (e.g., control circuit, rechargeable power storage system, transceivers, etc.).

In some embodiments, the flow restriction section 2406 is formed through one or more tapered regions of some or all of an interior of the main conduit 2402. The tapering is configured to reduce turbulence and/or other adverse effects of the fluid flow through the irrigation sensor system 2400. Further, some embodiments optionally include a generator conduit inlet flow filter 2434 that filters debris to protect the generator 310. Additionally, some embodiments optionally include a generator conduit outlet flow filter 2435 positioned at the outlet of the generator conduit in case of a reverse fluid flow through the sensor system. The flow filters 2434, 2435, in some implementations, are self-cleaning filters with the flow of fluid through the main flow conduit 2402 flushing debris from the flow filters.

In some embodiments, the sensor system 2400 is configured to operate as a stand-alone system and be cooperated in-line with an irrigation conduit and/or other fluid path. In other embodiments, the sensor system 2400 is configured to be integrated within an irrigation rotor, a water emission device (e.g., sprinkler, drip line, etc.), valve systems, pump systems and/or other such systems. For example, in some implementations, the sensor system 2400 is a module that is integrated into a larger device (e.g., rotors, valves, pumps, etc.). Further, in some embodiments, the sensor system 2400 is intended to be implemented without a valve or other method of controlling water flow through the sensor system 2400, with separate external devices (e.g., valves) controlling the flow of water fed to a conduit or fluid path with which the sensor system 2400 is cooperated. In other embodiments, the sensor system 2400 is integrated with a valve system, such as a valve system described above or below. In some embodiments, one or more check-valves and/or pressure regulation valves are utilized in place of the flow restriction section 2406 and/or in cooperation with the flow restriction section 2406 to control the flow of fluid into the generator conduit 2412. Typically, the check valve or pressure regulation valve remains in a closed state until a threshold amount of pressure is applied to the check valve or pressure regulation valve. Accordingly, as fluid is supplied to the sensor system 2400 the check valve or pressure regulation valve remains closed enabling the flow of fluid through the generator conduit 2412 until the pressure within the sensor system 2400 exceeds the valve threshold pressure. This provides an additional or alternative control of fluid flow into the generator conduit and the amount of electrical power that is generated by the generator 310.

The hydro-powered irrigation sensor system 2400, in some embodiments includes the main flow conduit 2402 that includes and extends between an inlet having an inlet cross-sectional area D2415 and an outlet having an outlet cross-sectional area D2416. Further, the main flow conduit 2402 includes a flow restriction section 2406 positioned downstream of a generator conduit inlet of the generator conduit 2412. The flow restriction section comprising a reduced cross-sectional area D2417 that is less than at least the inlet cross-sectional area D2415, and typically less than the outlet cross-sectional area D22416. The generator conduit 2412 is fluidly coupled at the generator conduit inlet with the main flow conduit 2402 upstream of the flow restriction section 2406 and further fluidly coupled with the main flow conduit at the generator conduit outlet downstream of at least an initial upstream restriction of the main flow conduit 2402 caused by the flow restriction section 2406. The generator 310 is cooperated with the generator conduit 2412 and configured to generate electrical power in response to a fluid flow through the generator conduit 2412 induced by the back pressure caused by the flow restriction section 2406. The rechargeable power storage system 2422 electrically coupled with the generator and is configured to receive and store the electrical power generated by the generator 310. In some embodiments, the sensor 2404 is electrically coupled with the rechargeable power storage system and configured to receive power from the rechargeable power storage system 2422. Further, the sensor 2404 is configured to output sensor data. At least one transceiver 2424 configured to receive electrical power from the rechargeable power source 2422 and transmit the sensor information to an external system.

Figure 25:
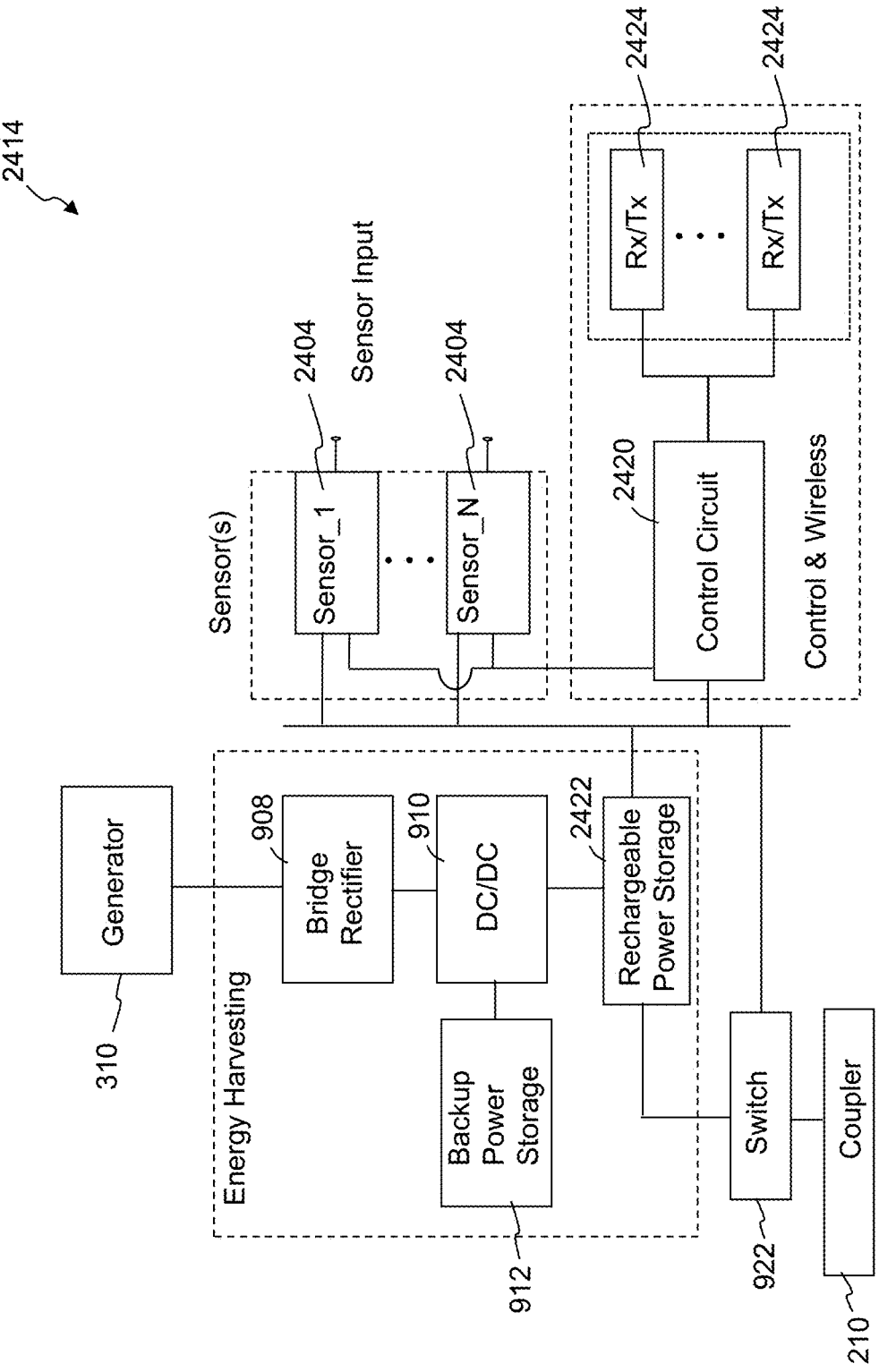
FIG. 25 illustrates a simplified block diagram of an exemplary sensor control system, in accordance with some embodiments.

FIG. 25 illustrates a simplified block diagram of an exemplary sensor control system 2414, in accordance with some embodiments. The sensor control system 2414 electrically couples with the generator 310 to receive electrical power generated in response to water flow through the generator conduit 2412. The sensor control system 2414 includes one or more sensor control circuits 2420 and/or microcontrollers that at least receive sensor data from one or more sensors 2404 and/or provide at least some control over the activation of and/or communication from one or more sensors 2404. In some embodiments, the sensor control circuit 2420 communicatively couples with one or more wireless transceivers 2424, receivers, transmitters, and/or wired transceivers configured to enable the irrigation sensor system 2400 to communicate with one or more external devices (e.g., irrigation controller 110, user device 114, central irrigation controller 112, valve system 102, and/or other devices). The communication can be through one or more wireless and/or wired protocols over one or more wireless and/or wired communication networks. In some implementations, the irrigation sensor system 2400 includes multiple transceivers enabling communication utilizing different communication protocols. For example, a first wireless transceiver can enable communication over one or more shorter range wireless communication protocols (e.g., BLUETOOTH, Wi-Fi, etc.), while one or more other wireless transceivers enable wireless communication over longer range protocols (e.g., LoRa, LoRaWAN, cellular, radio frequency, etc.).

In some embodiments, some or all of the power generated by the generator 310 is supplied to a rechargeable power storage system 2422 and/or device that is configured to receive and store at least some of electrical power and release power as controlled by the sensor control circuit 2420. Typically, the rechargeable power storage system 2422 operates as a main power supply to the irrigation sensor system 2400 supplying the operational power to the sensor control circuit 2420, and used to communicate with and/or power the sensor systems 2404. Some embodiments include one or more voltage rectifiers 908 to provide a conversion of electrical power from the generator to a DC voltage. In some embodiments, the generator 310 produces an AC voltage output. Accordingly, the one or more rectifiers 908 provide a conversion to DC voltage. For example, the rectifier can include one or more bridge rectifiers coupled between an output of the generator 310 and the rechargeable power storage system 906 with electrical power supplied from the generator, through the rectifier to the rechargeable power storage system.

The sensor control system 2414, in some implementations, includes one or more DC to DC regulators 910 and/or converters (e.g., one or more buck or buck-boost regulators) that limit and/or step-up or down the voltage received from the generator 310 to a threshold level that is supplied to the rechargeable power storage system 2422 that stores the electrical power. One or more backup power storage systems 912, backup battery and/or devices can be included with and/or cooperated with the sensor control system 2414. In some embodiments, the backup power storage system 912 can include one or more non-replaceable batteries, and/or one or more replaceable batteries (e.g., AA battery, AAA battery, 9V battery, etc.) that are replaced as needed. The sensor control circuit 2420 can control the use of the backup power storage system 912 to supply power to recharge the rechargeable power storage system 2422 when a storage voltage and/or power level of the rechargeable power storage system 2422 is below a recharge threshold.

Figure 26:
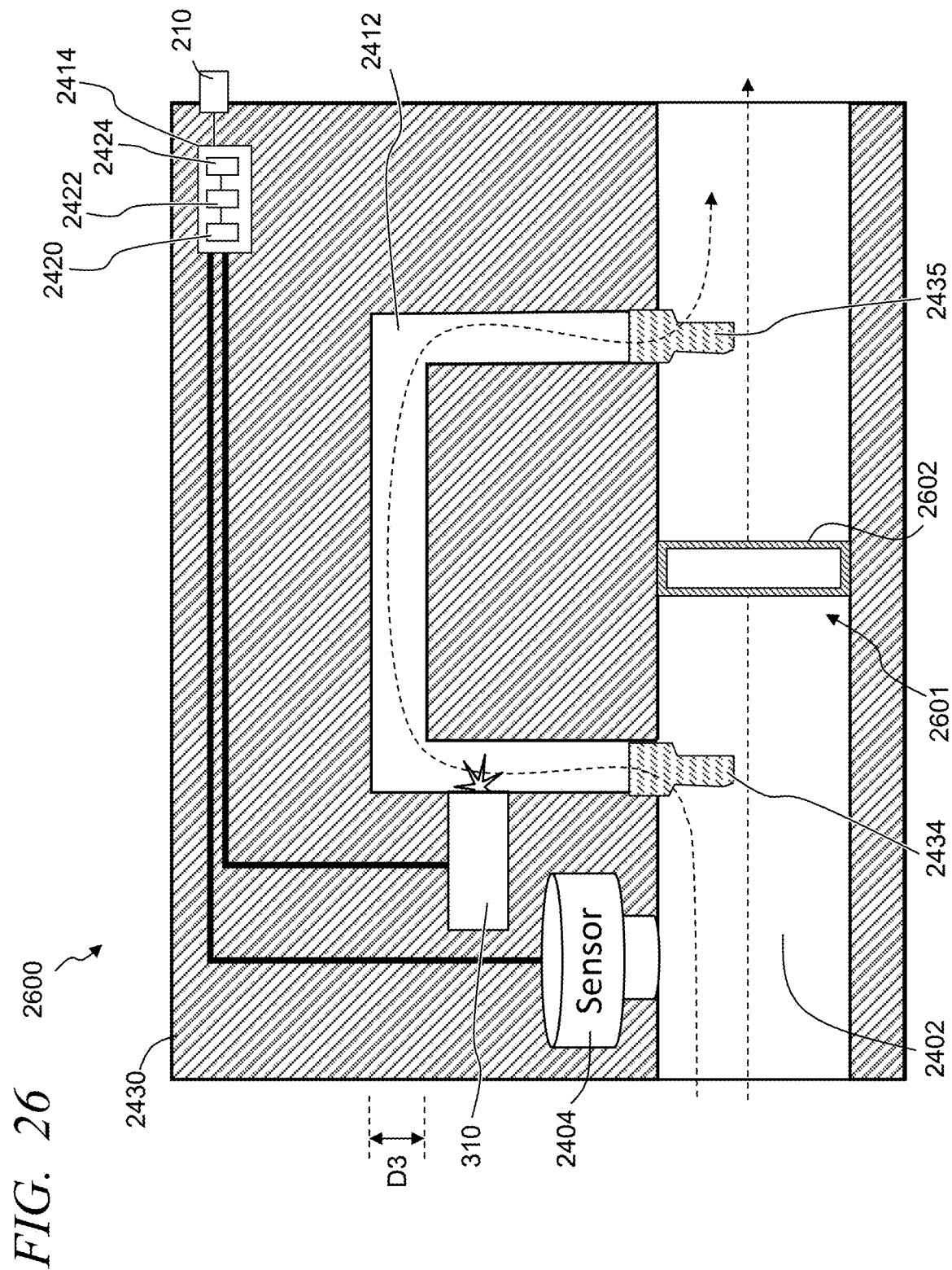
FIG. 26 illustrates a simplified block diagram, cross-sectional view of an exemplary hydro-powered irrigation sensor system, in accordance with some embodiments.

FIG. 26 illustrates a simplified block diagram, cross-sectional view of an exemplary hydro-powered irrigation sensor system 2600, in accordance with some embodiments. The irrigation sensor system 2600 includes a main flow conduit 2402, one or more sensors 2404, a bypass generator conduit 2412, one or more generator systems 310 each cooperated with one or more rotor assemblies 330, a sensor control system 2414 and one or more flow restriction sections 2601 comprising one or more check-valves 2602, pressure regulation valves and/or other such flow restricting devices configured to restrict or reduce flow for at least a threshold duration and/or until a threshold pressure is reached on an upstream side of the flow restriction section 2601. The main flow conduit 2402 is configured to fluidly couple with one or more upstream conduits (not shown) that is fluidly coupled with a fluid source, and one or more downstream fluid conduits (not shown). The check valve 2602 is set with a threshold activation pressure such that fluid flowing into the inlet of the main flow conduit flows into the generator conduit 2412 while the fluid pressure within the main flow conduit on the inlet side of the check valve 2602 is less than the threshold activation pressure. Once the inlet fluid pressure reaches the threshold activation pressure, the check valve 2602 opens allowing fluid to flow along the main flow conduit 2402 until the fluid pressure drops below the threshold activation pressure. Accordingly, the generator 310 generates electrical power at least when fluid is flowing into the irrigation sensor system 2600 and the inlet fluid pressure is below the threshold activation pressure. Some embodiments include one or more flow filters 2434, 2435 to provide protection of the rotor assembly 330 and/or generator 310.

At least some of the electrical power generated by the generator 310 is supplied to the sensor control system 2414, one or more rechargeable power storage systems 2422 and/or one or more separate rechargeable power sources. The sensor control system 2414 utilizes the power from the rechargeable power storage system to power the sensor control system 2414, one or more internal sensors 2404 and/or one or more external systems (e.g., through one or more external electrical connectors 210). In some embodiments, the main flow conduit 2402 of the hydro-powered irrigation sensor system 2600 comprises a flow restricting device 2602 cooperated with the main flow conduit 2402 downstream of a generator conduit inlet of the generator conduit 2412. The generator conduit, in some embodiments, is fluidly coupled at the generator conduit inlet with the main flow conduit 2402 upstream of the flow restricting device 2602 and further fluidly coupled with the main flow conduit 2402 at a generator conduit outlet downstream of the flow restricting device 2602. A generator 310 is cooperated with the generator conduit 2412 and configured to generate electrical power in response to a fluid flow through the generator conduit induced by a back pressure caused by the flow restricting device 2602. The duration of flow through the generator is base at least in part on the threshold pressure of the flow restricting device 2602. The rechargeable power storage system 2422 is electrically coupled with the generator 310 and configured to receive and store the electrical power generated by the generator. One or more sensors 2404 electrically coupled with the rechargeable power storage system 2422 and configured to receive power from the rechargeable power system and output sensor information. Typically, the irrigation sensor system 2600 further includes one or more wired and/or wireless transceivers 2424 that are configured to receive electrical power from the rechargeable power storage system 2422 and transmit the sensor information.

Figure 27A:
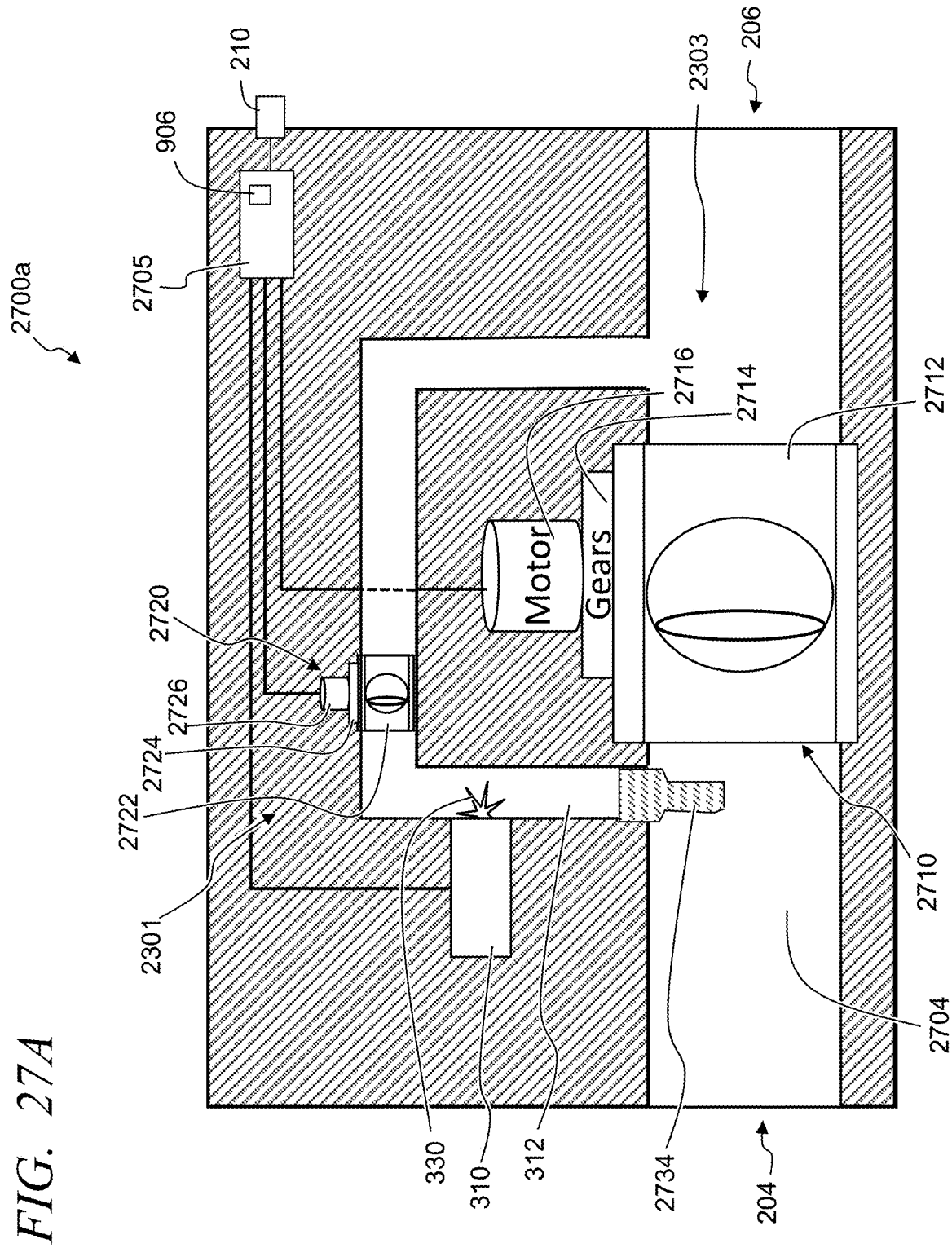
FIG. 27A illustrates a simplified block diagram, cross-sectional view of an exemplary dual ball valve system, in accordance with some embodiments.
Figure 27B:
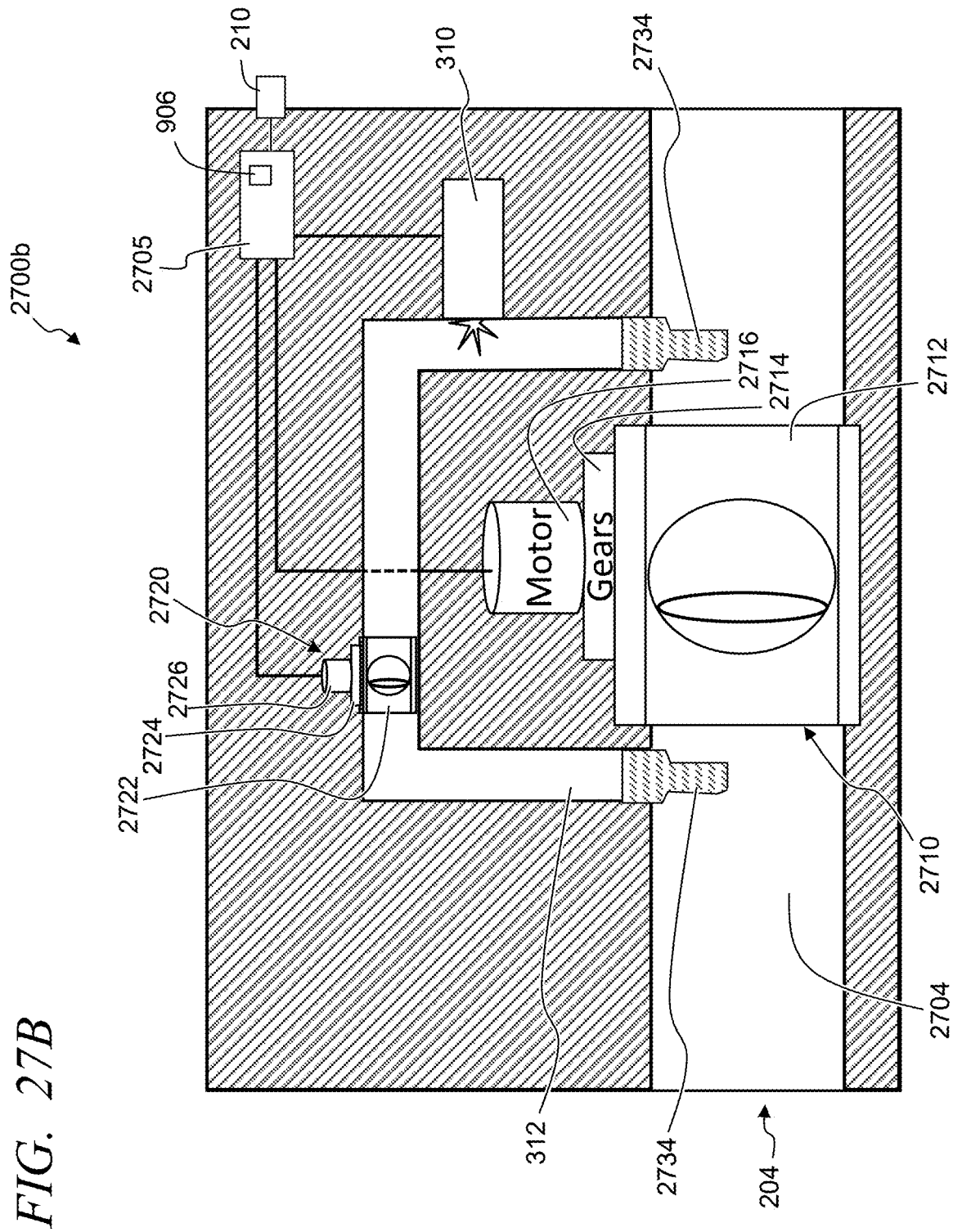
FIG. 27B illustrates a simplified block diagram, cross-sectional view of an exemplary dual ball valve system, in accordance with some embodiments.

FIG. 27A illustrates a simplified block diagram, cross-sectional view of an exemplary dual ball valve system 2700a, in accordance with some embodiments, with a generator 310 upstream of a generator conduit ball valve system 2720. FIG. 27B illustrates a simplified block diagram, cross-sectional view of an exemplary dual ball valve system 2700b, in accordance with some embodiments, with a generator 310 downstream of a generator conduit ball valve system 2720. Referring to FIGS. 27A-27B, in some embodiments, the dual ball valve system 2700 comprises at least one main fluid conduit 2704 formed between an inlet conduit 204 and an outlet conduit 206, at least one a primary sub-valve system 2303 comprising at least one main controllable valve mechanism such as at least one main ball valve system 2710 positioned relative to the respective main fluid conduit 2704, at least one bypass generator conduit 312, at least one generator 310 positioned proximate the respective generator conduit 312 with at least a portion of a corresponding rotor assembly 330 extending into at least a portion of the generator conduit 312, at least one actuation system or actuation sub-valve system 2301 comprising at least one generator conduit ball valve system 2720 positioned relative to the corresponding generator conduit 312, and at least one dual ball valve control system 2705. Some embodiments include one or more optional flow filters 2734 cooperated with the inlet and/or outlet of the generator conduit 312.

The main ball valve system 2710, in some embodiments, comprises a main ball valve 2712 positioned with the main fluid conduit 2704 and secured with one or more gears 2714 that cooperate with a main ball valve motor 2716 that is electrically coupled with the valve control system 2705. Similarly, the generator conduit ball valve system 2720, in some embodiments, comprises a generator conduit ball valve 2722 positioned with the generator conduit 312 and secured with one or more gears 2724 that cooperate with a generator conduit valve motor 2726 that is electrically coupled with the valve control system 2705. The main ball valve motor 2716 and/or the generator conduit valve motor 2726 can be implemented through substantially any relevant motor, such as but not limited to a brushless motor, stepper motor, brush motor, or other relevant motor. Other valve control or actuation systems may be used in some embodiments (e.g., pneumatic, hydraulic, etc.). The main ball valve system 2710 and/or the generator conduit ball valve system 2720 are implemented, in some embodiments, through commercially available ball valve system, while other embodiments utilize custom ball valve systems to provide desired precision and/or control.

The generator conduit ball valve system 2720 when in a closed state prevents the flow of fluid through the generator conduit 312. The generator conduit ball valve system 2720 is further configured to transition between the closed state and an open state to open a flow path and allowing fluid to travel through the generator conduit 312 and downstream of the main ball valve system 2710. The generator conduit ball valve motor 2726 is configured to be controlled by the valve control system 2705 to control the opening and closing of the generator conduit ball valve 2722, and in some instances an amount or degree of opening of the generator conduit ball valve 2722.

The main ball valve system 2710 when in a closed state prevents the flow of fluid through the main fluid conduit

2704. The main ball valve system 2710 is further configured to transition to an open state opening a flow path through the main fluid conduit 2704 and allowing fluid to travel through from the inlet conduit 204 to the outlet conduit 206 along the main fluid conduit 2704. The main ball valve motor 2716 is configured to be controlled by the valve control system 2705 to control the opening and closing of the main ball valve 2712, and in some instances an amount or degree of opening of the main ball valve 2712. Further, in some embodiments, the valve control system 2705 can control the operation of the main ball valve system 2710 to cause at least a percentage of the fluid entering the inlet conduit 204 to flow through the generator conduit 312 while the generator conduit ball valve system 2720 is in an open state. For example, in some implementations, the valve control system 2705 can open the generator conduit ball valve 2722 while keeping the main ball valve system 2710 in a closed state for at least a threshold period of time to ensure a threshold quantity of electrical energy is generated by the generator 310, prior to opening the main ball valve 2712 to allow fluid to flow through the main fluid conduit 2704. As another example, the valve control system 2705 additionally or alternatively partially opens the main ball valve 2712 such that a pressure within the main fluid conduit 2704 resulting from the partial opening causes some of the fluid entering the inlet conduit 204 to flow through the generator conduit 312 while the generator conduit ball valve 2722 is in an open state, and while the remainder of the fluid entering the inlet conduit 204 flows through the main ball valve system 2710. In some embodiments, the valve control system 2705 maintains the main ball valve 2712 in a partially opened position for the partially open threshold duration of time as a function of the expected resulting pressure and accordingly the expected fluid flow through the generator conduit 312. In some implementations, the valve control system 2705 receives flow sensor data and/or pressure sensor data, and utilizes this data in determining a threshold duration of time to maintain the main ball valve 2712 in a closed position and/or partially opened position.

One or more generators 310 are positioned proximate the generator conduit 312 with the at least a portion of a corresponding rotor assembly 330 extending into at least a portion of the generator conduit 312 such that the rotor assembly is configured to be contacted by the flow of fluid when fluid travels through the generator conduit 312. The flowing fluid induces movement of the rotor assembly 330 (e.g., rotation, vibration, lateral movement, and/or other such movement). In some embodiments, the generator 310 comprises one or more turbine generators, motors, magnetic sensors and/or coupling systems, and/or other such systems that are configured to generate electrical power in response to the movement of the rotor assembly 330 caused by the flow of fluid in the generator conduit 312. Accordingly, the generator 310 and rotor assembly 330 are activated to generate electrical power in response to a flow of fluid through the generator conduit controlled by the valve control system 2705 through the control of one or both of the main ball valve system 2710 and the generator conduit ball valve system 2720. Further, the generation of the electrical power can be halted and/or prevented by closing the to generator conduit ball valve system 2720 and preventing fluid flow through the generator conduit 312.

The valve control system 2705 in the dual ball valve system 2700, in some embodiments, is similar to the valve control systems described above and includes a valve control circuit 902 and one or more wireless transceivers 904. Typically, the dual ball valve system 2700 further includes and/or is coupled with one or more rechargeable power storage systems 906. At least some of the electrical energy generated by the generator 310 is supplied to the valve control system 2705. Typically, some or all of the received electrical energy is stored in the rechargeable power storage system 906. The valve control circuit 902 provides control over the opening and/or closing of the main ball valve system 2710 and the generator conduit ball valve system 2720. The control of the main ball valve system 2710 is typically controlled in response to one or more wireless control signals received by the valve control system 2705. The valve control system 2705 can control the main ball valve system 2710 in response to one or more instructions or signals from one or more remote systems (e.g., an irrigation controller 110, central irrigation controller 112, user computing device 114, and/or other such system), based on a timing schedule locally implemented by the valve control system, and/or other such controls. Similarly, the valve control system 2705 can control the generator conduit ball valve system 2720 in response to the one or more instructions or signals to control the main ball valve system 2710 (e.g., based on a predefined activation sequence), based on one or more instructions or signals from one or more remote systems to control the generator conduit ball valve system 2720, based on power levels of the rechargeable power storage of the valve control system 2705 and/or other such controls. In some embodiments, the valve control system 2705 includes a power level sensor system and uses power level information from the power level sensor to control one or both of the main ball valve system 2710 and the generator conduit ball valve system 2720.

The valve control system 2705 can be configured and/or instructed to control the generation of electrical power by opening the generator conduit ball valve to enable flow through the generator conduit 312 while the main ball valve system 2710 is maintained in a closed state, and/or can control of the main ball valve system 2710 to partial open while the generator conduit ball valve system 2720 is partially or fully opened to allow fluid flow through the main fluid conduit 2704 while the back pressure within the main fluid conduit 2704 causes flow through the generator conduit. Further, the flow of fluid through the generator conduit 312 and/or the forces by the fluid on the rotor assembly 330 can be more fully controlled by the use of the generator conduit ball valve system 2720. Similarly, the control of the generator conduit ball valve system 2720 can limit or prevent fluid back flow through the generator conduit 312.

It has been found that ball valve systems often have less pressure losses within the fluid system than some systems that include a turbine generator used in combination with some solenoid and diaphragm valve systems. Some embodiments incorporate the generator conduit ball valve system 2720 cooperated with the generator conduit 312 to enable operation with reduced or no pressure losses based on the valve systems. Additionally or alternatively, the generator conduit ball valve system 2720 can be controlled to limit flow and/or shut off flow through the generator conduit 312, such as during winterization of an irrigation system when high pressure and/or relatively high water and/or air flow is applied to remove fluid from at least the fluid conduits of the irrigation system. Similarly, the use of a main ball valve system 2710 within the main fluid conduit 2704 enables greater control over the back pressure and accordingly an amount of electrical energy potentially generated by the generator 310. Additionally or alternatively, the generator conduit ball valve system 2720 can be controlled to partially and/or fully open to control a fluid flow rate through the generator conduit 312. Further, in some instances, the generator conduit ball valve system 2720 can be controlled to prevent opening unless pressure within the main fluid conduit 2704 is at or above a pressure threshold. Typically, the main ball valve system 2710 and the generator conduit ball valve system 2720 are independently operated and controlled, and in some embodiments are fine tuned to control of closed positions as well as one or more different open positions through the control of the respective motors.

In some embodiments, one or both of the main ball valve system 2710 and the generator conduit ball valve system 2720 are positioned within the housing 202. Further, in some implementations, the solenoid system is fully enclosed within the housing 202, while in other implementations some of the solenoid system is exposed outside of the housing. Still further, the dual ball valve system 2700 is configured in some embodiment so that one or both of the main ball valve system 2710 and the generator conduit ball valve system 2720 can be accessed to enable maintenance of one or more components of the main ball valve system 2710, the generator conduit ball valve system 2720, filters, etc. of the dual ball valve system 2700.

The dual ball valve system 2700 in some embodiments, comprises a main conduit 2704, a generator conduit 312 fluidly coupled with the main conduit 2704, actuation sub-valve system 2301 cooperated with the generator conduit, a generator 310 cooperated with the generator conduit 312, a primary sub-valve system 2303 cooperated with main conduit 2704, a valve control system 2705 and a rechargeable power storage system 90. The actuation sub-valve system 2301 is cooperated with the generator conduit 312 and comprises a generator conduit ball valve system 2720 configured to transition between a closed state preventing a flow of fluid through the generator conduit and an open state or position allowing fluid to travel through the generator conduit. Further, in some implementations, the valve control system 2705 can partially open the conduit ball valve system 2720 at one or more partially open positions between the closed position and a fully open position. The generator 310 is cooperated with the generator conduit 312 and configured to generate electrical power in response to a fluid flow through the generator conduit. The primary sub-valve system 2303 is cooperated with main conduit 2704, and comprises a main ball valve system 2710 configured to transition between a closed state or position preventing a flow of fluid through the main conduit 2704 and an open state enabling a flow of fluid through the main conduit. Similar with the conduit ball valve system 2720, in some implementations, the valve control system 2705 can partially open the main ball valve system 2710 at one or more partially open positions between the closed position and the open position. Still further, some embodiments enable continuous control over the amount or partial opening.

The rechargeable power storage system 906 electrically coupled with the generator 310 and is configured to receive and store the electrical power generated by the generator. The valve control system 2705 communicatively couples with the generator conduit ball valve system 2720, and is configured to wirelessly receive an activation signal from an external source. In response to the activation signal, the valve control system, in some embodiments, causes power to be supplied from the rechargeable power storage system to the generator conduit ball valve system 2720 causing the generator conduit ball valve system 2720 to transition to an open state enabling a flow of fluid from the main conduit 2704 while the main ball valve system 2710 is at or below a partially open threshold state inducing a back pressure causing the fluid to flow through the generator conduit. The partially open threshold state is less than a fully open state and limits a flow of fluid through the main conduit. This limiting of the flow induces the back pressure. Typically, the system attempts to establish at least a threshold amount of back pressure to provide a threshold flow through the generator conduit 312. The threshold back pressure corresponding to a threshold open position as a function of a known or expected water pressure and/or flow rate at the inlet of the main conduit. Again, the generator 310 is configured to generate the electrical power while the fluid flows through the generator conduit 312. At least some of that generated power is supplied to the rechargeable power storage system 906 used to power the dual ball valve system 2700.

Figure 28:
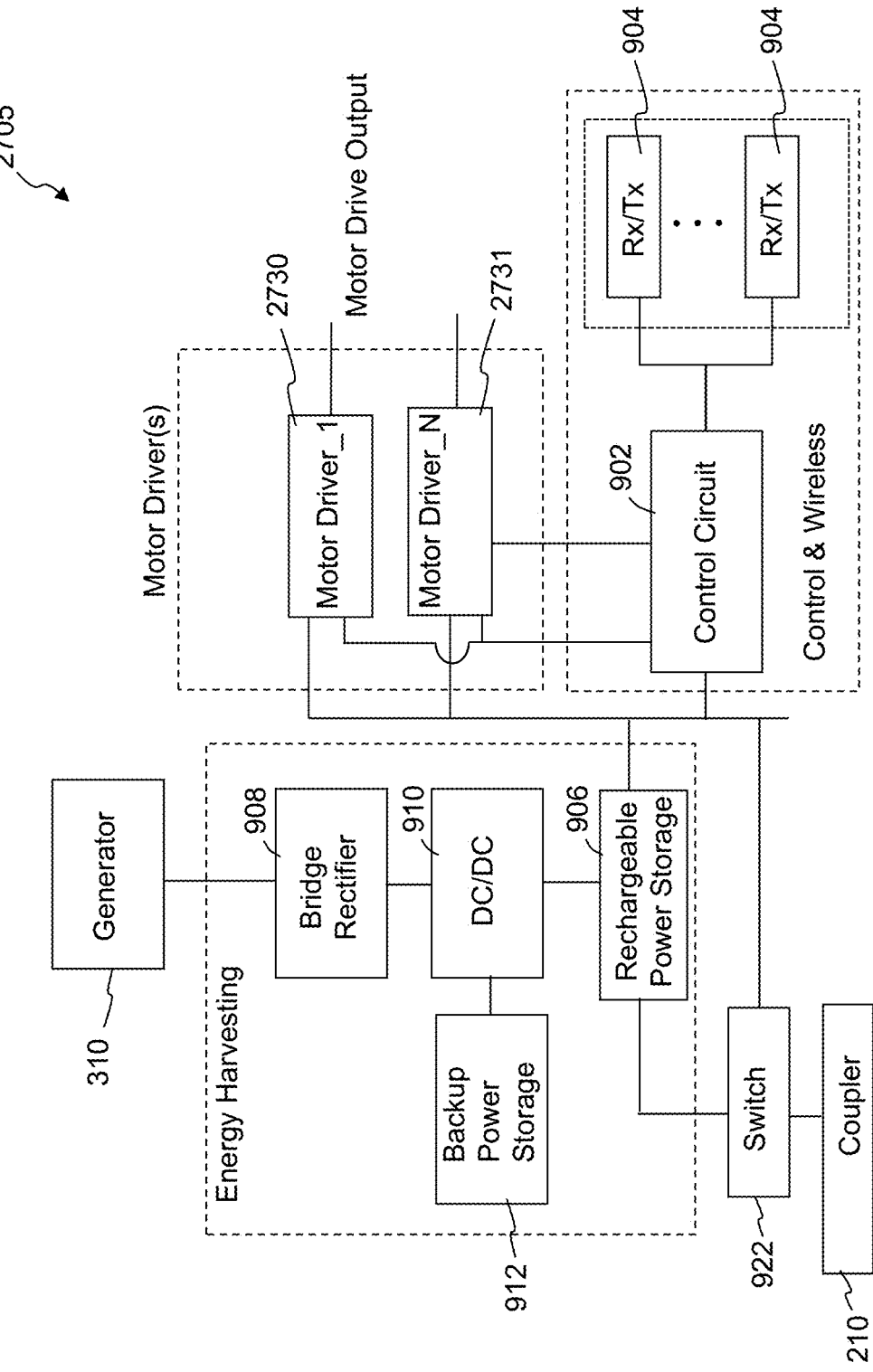
FIG. 28 illustrates a simplified block diagram of an exemplary dual ball valve control system, in accordance with some embodiments.

FIG. 28 illustrates a simplified block diagram of an exemplary dual ball valve control system 2705, in accordance with some embodiments. The valve control system 2705 electrically couples with the generator 310 to receive electrical power generated in response to water flow through the generator conduit 312. One or more valve control circuits 902 and/or microcontrollers are included in the valve control system 2705 that provide at least some control over the activation of the main ball valve motor 2716 and/or generator conduit valve motor 2726. In some embodiments, the valve control circuit 902 communicatively couples with one or more wireless transceivers 904, receivers, transmitters, and/or wired transceivers configured to enable the dual ball valve system 2700 to communicate with one or more external devices (e.g., irrigation controller 110, user device 114, central irrigation controller 112, other valve system 102 and/or other devices). The communication can be through one or more wireless and/or wired protocols over one or more wireless and/or wired communication networks. In some implementations, the dual ball valve system 2700 includes multiple transceivers enabling communication utilizing different communication protocols. For example, a first wireless transceiver can enable communication over one or more shorter range wireless communication protocols (e.g., BLUETOOTH, Wi-Fi, etc.), while one or more other wireless transceivers enable wireless communication over longer range protocols (e.g., LoRa, LoRaWAN, cellular, radio frequency, etc.).

The valve control system 2705 is coupled with the generator 310. In some embodiments, some or all of the power generated by the generator 310 is supplied to a rechargeable power storage system 906 and/or device that is configured to receive and store at least some of electrical power and release power as controlled by the valve control circuit 902. Typically, the rechargeable power storage system 906 operates as a main power supply to the dual ball valve system 2700 supplying the operational power to the valve control circuit 902, and used to drive and control the operation of one or more of the main ball valve system 2710 and the generator conduit ball valve system 2720. Some embodiments include one or more voltage rectifiers 908 to provide a conversion of electrical power from the generator to a DC voltage. In some embodiments, the generator 310 produces a three-phase voltage output. Accordingly, the one or more rectifiers 908 to provide a conversion to DC voltage. For example, the rectifier can include one or more bridge rectifiers coupled between an output of the generator 310 and the rechargeable power storage system 906 with electrical power supplied from the generator, through the rectifier to the rechargeable power storage system.

The valve control system 2705, in some implementations, includes one or more DC to DC regulators 910 and/or converters (e.g., one or more buck regulators) that limit and/or step down voltage received from the generator 310 to a threshold level that is supplied to the rechargeable power storage system 906 that stores the electrical power. One or more backup power storage systems 912, backup battery and/or devices can be included with and/or cooperated with the valve control system 2705. In some embodiments, the backup power storage system 912 can include one or more replaceable, disposable batteries (e.g., AA battery, AAA battery, 9V battery, etc.) that are readily replaced as needed. The valve control circuit 902 can control the use of the backup power storage system 912 to supply power to recharge the rechargeable power storage system 906 when a storage voltage and/or power level of the rechargeable power storage system 906 is below a recharge threshold.

The valve control system 314 further include one or more motor drive systems 2730, 2731 that are controlled by the valve control circuit 902 to generate a respective motor control output to control a respective one of the main ball valve motor 2716 and the generator conduit valve motor 2726 in response to an activation signal (e.g., a valve activation signal (e.g., wirelessly received from an irrigation controller, a valve activation signal based on an irrigation schedule, etc.), generator activation signal, etc.).

In some embodiments, the valve control circuit 902 enables the dual ball valve system 2700 to operate as an irrigation flow sensor system. The valve control circuit 902, in such embodiments, further detects an amount of power generated by the generator 310. Based on the amount of power generated, the valve control circuit can determine a flow rate or volume flow of fluid flowing through the outlet conduit as a function of the amount of power generated by the generator 310. In some embodiments, the valve control circuit 902 stores a table that is used to look up a flow rate relative to an amount of power. In other implementations, the valve control circuit 902 is trained based on different predefined flow rates. Additionally or alternatively, one or more algorithms may be applied based on parameters (e.g., cross-sectional area of the outlet conduit, water pressure, maximum flow rate, and/or other such parameters).

Figure 29:
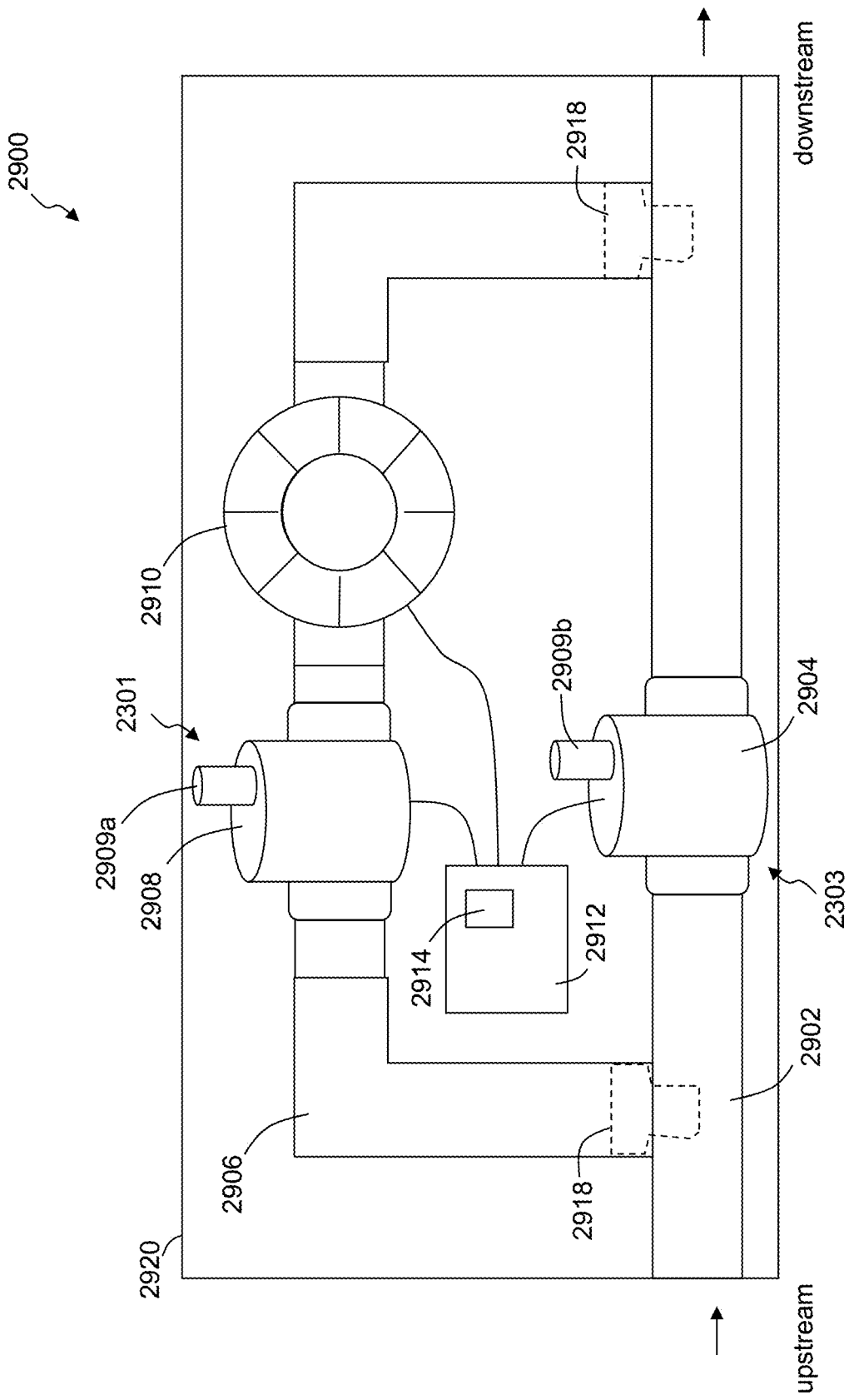
FIG. 29 illustrates a simplified block diagram of an exemplary irrigation valve system in accordance with some embodiments.

FIG. 29 illustrates a simplified block diagram of an exemplary irrigation valve system 2900 in accordance with some embodiments. The irrigation valve system 2900 is configured to control the flow of fluid from an upstream fluid source to a downstream fluid system. In some embodiments, irrigation valve system 2900 comprises a main fluid conduit 2902 with at least one a primary sub-valve system 2303 comprising at least one main valve system 2904 cooperated with and configured to control the flow of fluid through the main fluid conduit 2902, a generator conduit 2906 with at least one actuation system or actuation sub-valve system 2301 comprising at least one generator conduit valve system 2908 cooperated with and configured to control the flow of fluid through the generator conduit 2906, a generator system 2910, and a valve control system 2912 electrically and/or communicatively coupled with the main valve system 2904, the generator conduit valve system 2908 and the generator system 2910. Some embodiments include one or more optional flow filters 2918, which in some implementations are self-cleaning and/or cleaned by fluid flow through the main fluid conduit 2902.

The valve control system 2912 comprises and/or couples with one or more local rechargeable power storage systems 2914 that receive electrical power from the generator system 2910, and supplies power to the irrigation valve system 2900. Further, in some implementations, the main fluid conduit 2902, the main valve system 2904, the generator conduit 2906, the generator conduit valve system 2908, the generator system 2910, and the valve control system 2912 are cooperated into a single housing 2920. The embodiment illustrated in FIG. 29 shows the generator system 2910 downstream of the generator conduit valve system 2908. Some embodiments incorporate multiple generators cooperated with the generator conduit. In other embodiments, one or more generator systems 2910 are additionally or alternatively incorporated upstream of the generator conduit valve system 2908.

In some embodiments, the valve control system 2912 monitors a power and/or charge level of a local rechargeable power storage system 2914. When charge levels are above a charge threshold, the irrigation valve system 2900 utilizes the main valve system 2904 to control the flow of water to one or more downstream systems. In some implementations, the valve control system 2912 activates the generator conduit valve system 2908, in response to a valve activation signal, when a charge level is below a charge threshold such that water flows through the generator conduit 2906 and power is generated by the generator system 2910 in response to the flow of fluid through the generator conduit. Typically, the valve control system 2912 activates the generator conduit valve system 2908 while maintaining the main valve system 2904 in a closed state so that all fluid flows through the generator conduit 2906. Some or all of the electrical power generated by the generator while the generator conduit valve system 2908 is in the open state is supplied to the one or more rechargeable power storage systems 2914. Further, in some embodiments, the valve control system 2912 leaves the generator conduit valve system 2908 in an open state for at least a generating threshold duration of time to achieve a desired charge level in the one or more rechargeable power storage systems 2914. Additionally or alternatively, the valve control system 2912 monitors a charge level of the rechargeable power storage systems 2914 and leaves the generator conduit valve system 2908 in an open state at least until a charge level of the one or more rechargeable power storage systems 2914 exceeds a recharging threshold level.

In some embodiments, the valve control system 2912 activates the main valve system 2904 in response to the charge level of the one or more rechargeable power storage systems 2914 exceeding a recharging threshold level and/or the generator conduit valve system 2908 is in the open state for at least the generating threshold duration of time, and further causes the generator conduit valve system 2908 to transition to a closed state. The opening of the main valve system 2904 and the closing of the generator conduit valve system 2908 enables water flow to continue to downstream systems but through the main conduit 2902. Accordingly, in some implementations, the dual valve systems provide a recharging ping-pong architecture where the main valve system 2904 is controlled during typical operation with minimal pressure loss, and the generator conduit valve system 2908 is activated when energy storage is below the charge threshold. Typically, there is a greater pressure loss through the generator conduit due to the operation of the generator. As such, it can be advantageous to limit the duration the fluid flows through the generator conduit. The main valve system 2904 and/or the generator conduit valve system 2908 can be implemented through a solenoid activated valve having one or more solenoids 2909a, 2909b, diaphragm valve system, a ball valve system, or other relevant valve systems.

In some embodiments, one or both of the main valve system 2904 and the generator conduit valve system 2908 are implemented with a commercially available diaphragm valve system. In other embodiments, one or both of the main valve system 2904 and the generator conduit valve system 2908 are implemented with a ball valve system, other commercially available valve systems, or a combination of two or more valve systems. With the main valve system 2904 comprising a ball valve system, the valve control system 2912, in some embodiments, is configured to partially open the main valve system 2904 based on a desired back pressure to force fluid into the generator conduit 2906 while the generator conduit valve system 2908 is in an open state. By partially opening the main valve system 2904 power can be generated while fluid passes through both the main valve system 2904 and the generator conduit valve system 2908 to the down stream devices.

In some embodiments, the irrigation valve system 2900 comprises the main fluid conduit 2902 with a main valve system 2904 cooperated with and configured to control a flow of fluid through the main fluid conduit, a generator conduit 2906 fluidly coupled at a generator conduit inlet with the main fluid conduit 2902 upstream of the main valve system 2904, and fluidly coupled with the main fluid conduit at a generator conduit outlet downstream of the main valve system 2904. A generator conduit valve system 2908 is cooperated with and configured to control the flow of fluid through the generator conduit 2906. The valve control system 2912 electrically couples with the main valve system 2904, the generator conduit valve system 2908 and the generator system 2910. The rechargeable power storage systems 2914 electrically coupled with the generator system 2910 and is configured to receive electrical power from the generator system 2910. The valve control system 2912 is configured to monitor a charge level of the rechargeable power storage system, and activate, in response to receiving a valve activation signal and while maintaining the main valve system in a closed state or below a threshold open position, the generator conduit valve system 2908 when the charge level is below a charge threshold enabling water to flow through the generator conduit 2906.

Figure 30:
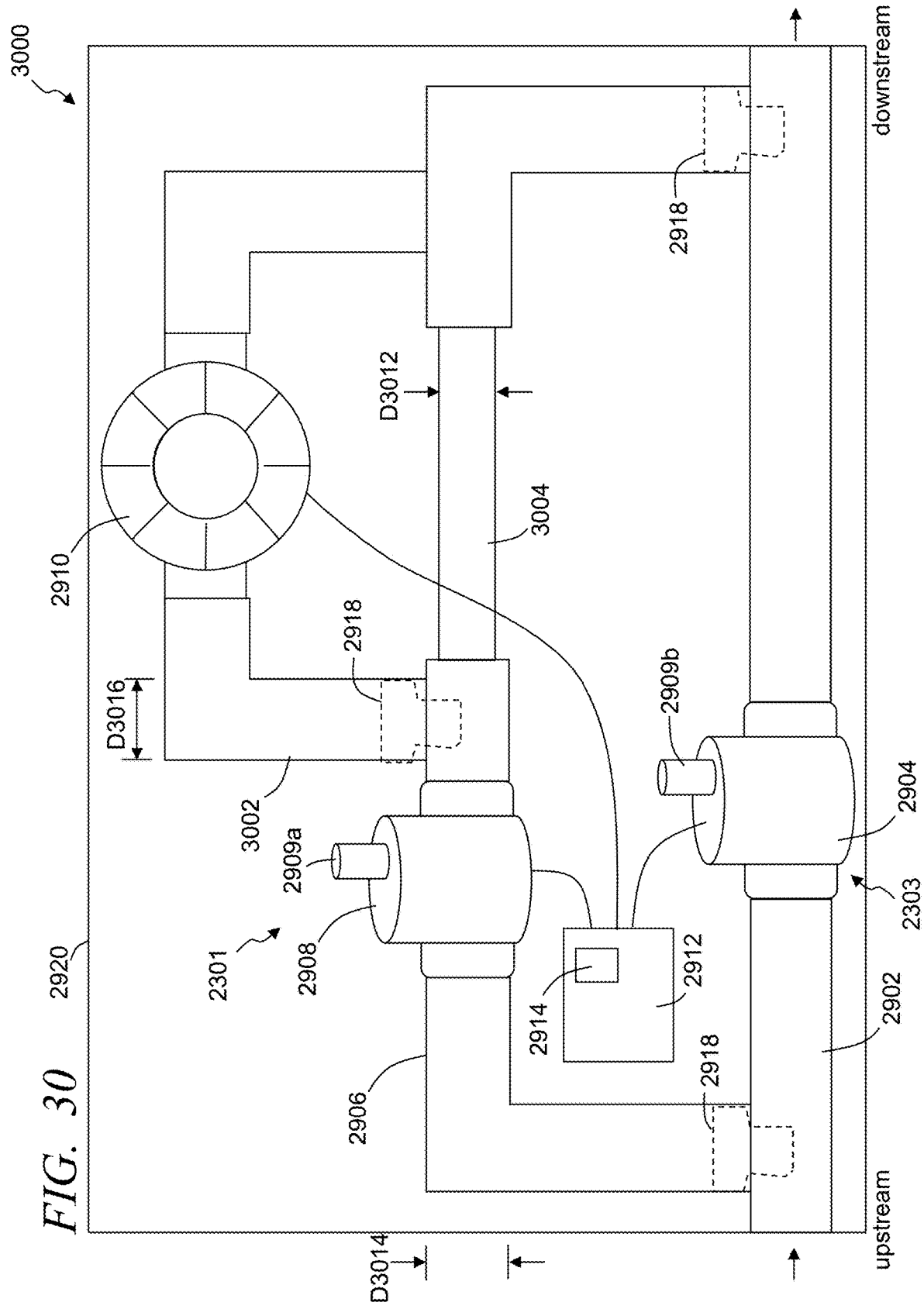
FIG. 30 illustrates a simplified block diagram of an exemplary irrigation valve system in accordance with some embodiments.

FIG. 30 illustrates a simplified block diagram of an exemplary irrigation valve system 3000 in accordance with some embodiments. The irrigation valve system 3000 is configured to control the flow of fluid from an upstream fluid source to a downstream fluid system. Further, the irrigation valve system 3000, in some embodiments, is similar to the irrigation valve system 2900 illustrated in FIG. 29, and comprises a main fluid conduit 2902 with at least one a primary sub-valve system 2303 comprising at least one main valve system 2904 cooperated with and configured to control the flow of fluid through the main fluid conduit 2902, a generator conduit 2906 with at least one actuation system or actuation sub-valve system 2301 comprising at least one generator conduit valve system 2908 cooperated with and configured to control the flow of fluid through the generator conduit 2906, a generator system 2910, and a valve control system 2912 electrically and/or communicatively coupled with the main valve system 2904, the generator conduit valve system 2908 and the generator system 2910. Some embodiments include one or more optional flow filters 2918, which in some implementations are self-cleaning and/or cleaned by fluid flow through the main fluid conduit 2902, and/or include scrubbers. The valve control system 2912 comprises and/or couples with one or more local rechargeable power storage systems 2914 that receive electrical power from the generator system 2910, and supplies power to the irrigation valve system 3000.

Additionally, the irrigation valve system 3000 includes a generator bypass conduit 3002 with which the generator system 2910 is cooperated and a restricted flow generator conduit 3004. Further, in some implementations, the main fluid conduit 2902, the main valve system 2904, the generator conduit 2906, the generator conduit valve system 2908, the generator bypass conduit 3002, and the restricted flow generator conduit 3004 are cooperated into a single housing 2920. The embodiment illustrated in FIG. 30 shows the generator system 2910 downstream of the generator conduit valve system 2908. Some embodiments incorporate multiple generators cooperated with the generator conduit. In other embodiments, one or more generator systems 2910 are additionally or alternatively incorporated upstream of the generator conduit valve system 2908.

The irrigation valve system 3000 is configured to operate similar to the irrigation valve system 2900 with at least the generator valve system 2908 being activated by the valve control system 2912 to enable fluid to pass to the generator bypass conduit 3002 and the restricted flow generator conduit 3004. The restricted flow generator conduit 3004 is configured with a cross-sectional area D3012 and/or diameter that is less than a cross-sectional area D3014 of the generator conduit 2906. Similar to the flow restriction section 2406 of FIGS. 24A-24B, the reduced cross-sectional area D3012 is configured to induce a back pressure to force fluid into the generator bypass conduit 3002 to engage the generator system 2910 to generate electrical power. The valve control system 2912, in some embodiments, independently control the main valve system 2904 and the generator conduit valve system 2908 to generate a desired amount of electrical power that is stored in the rechargeable power storage systems 2914. Other embodiments utilize a check valve in place of the restricted flow generator conduit 3004. The check valve can be configured with a pre-determined pressure loss, and activates to open in response to a flow of fluid having a pressure greater than an activation threshold (e.g., when the water pressure is above 5 psi, the check valve opens).

In some embodiments, the irrigation valve systems 2900 and 3000, illustrated in FIGS. 29 and 30 respectively, control both the main valve system 2904 and the generator conduit valve system 2908 through the activation of a single solenoid 2909 cooperated with one of the main valve system 2904 or the generator conduit valve system 2908. Such embodiments fluidly couple the bonnet cavity of the main valve system 2904 with the bonnet cavity of the generator conduit valve system 2908 enabling a flow of fluid from one bonnet cavity to the other bonnet cavity of the non-activated valve system. For example, in some implementations, a solenoid 2909a is cooperated with the generator conduit valve system 2908, while the main valve system 2904 does not include a solenoid. In those instances where the main valve system 2904 includes a solenoid port, that solenoid port can be sealed (e.g., a cap, potting, epoxy, etc.). As described above, activation of this solenoid 2909a causes fluid to flow from the bonnet cavity of the generator conduit valve system 2908. This activation of the solenoid 2909a further induces a fluid flow from the bonnet cavity of the main valve system 2904. As such, the flow of fluid from each of the bonnet cavities induces a reduced pressure in the bonnet cavity enabling the respective diaphragms in the respective main valve system 2904 and the generator conduit valve system 2908 to transition to the open position allowing fluid to flow through the respective main conduit and generator conduit.

Figure 31:
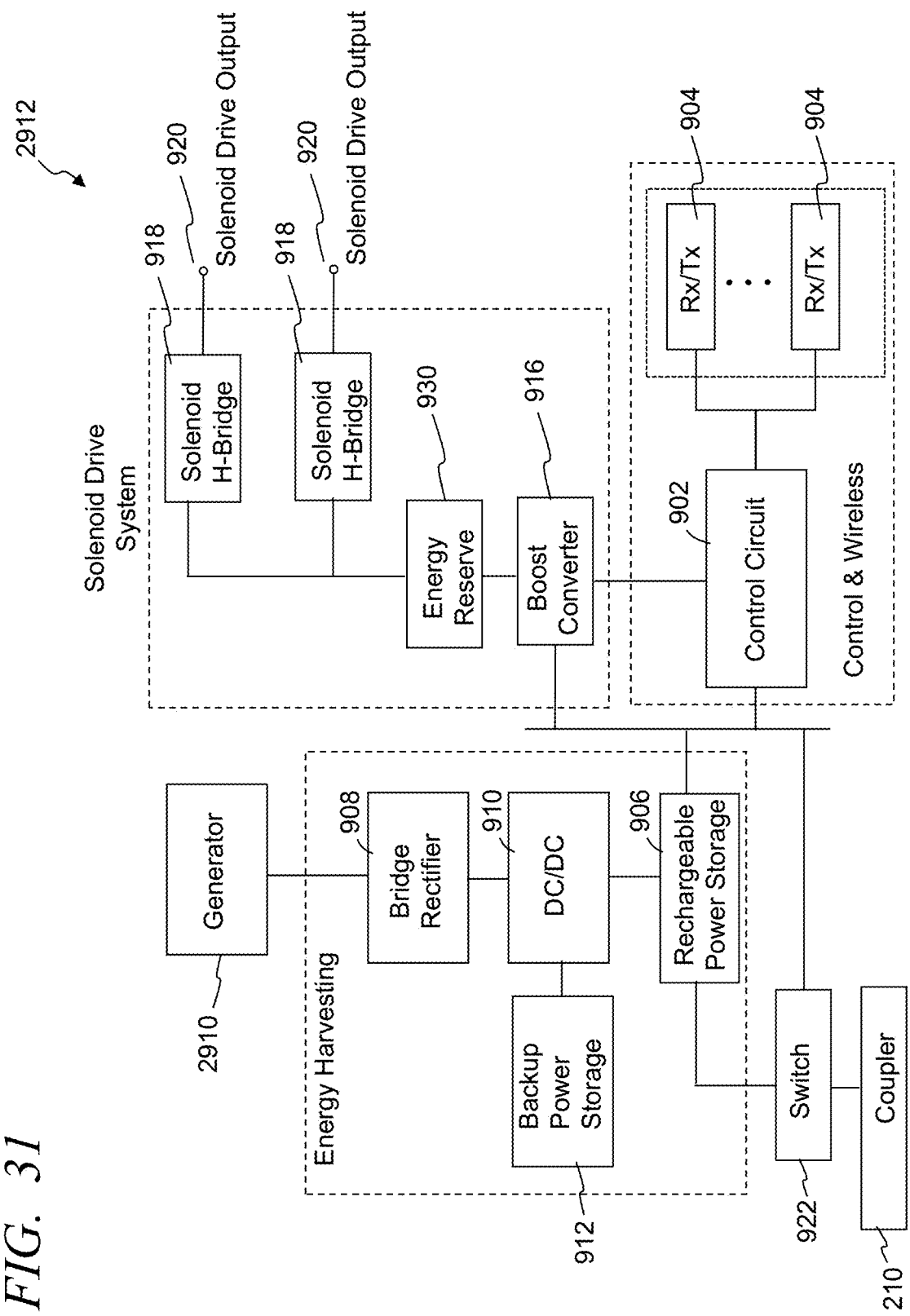
FIG. 31 illustrates a simplified block diagram of an exemplary valve control system, in accordance with some embodiments.

FIG. 31 illustrates a simplified block diagram of an exemplary valve control system 2912, in accordance with some embodiments. The valve control system 2912, in some implementations, is similar to one or more of the above described valve control systems, such as but not limited to the valve control system 314 of FIG. 9 and the valve control system 2705 of FIG. 28. The valve control system 2912 includes, in some embodiments, two or more solenoid H-bridge circuits 918 electrically coupled with one or more boost converters 916 configured to boost an output of the rechargeable power storage system 906 to an intended solenoid drive output voltage. In some embodiments, the output of the boost converter 916 is supplied to an optional latching solenoid energy reserve 930 (e.g., one or more capacitors, rechargeable battery, other such reserve devices, or a combination of two or more of such devices) that drives the one or more solenoid H-bridge circuits 918. The solenoid H-bridge circuits 918 are configured to output a respective solenoid drive output 920. In other embodiments, for example, the valve control system 2912 includes one or more motor drive systems (not shown) that are controlled by the valve control circuit 902 to generate a respective motor control output to control a respective ball valve when one or more of the main valve system 2904 and generator conduit valve system 2908 comprise a ball valve.

Figure 32:
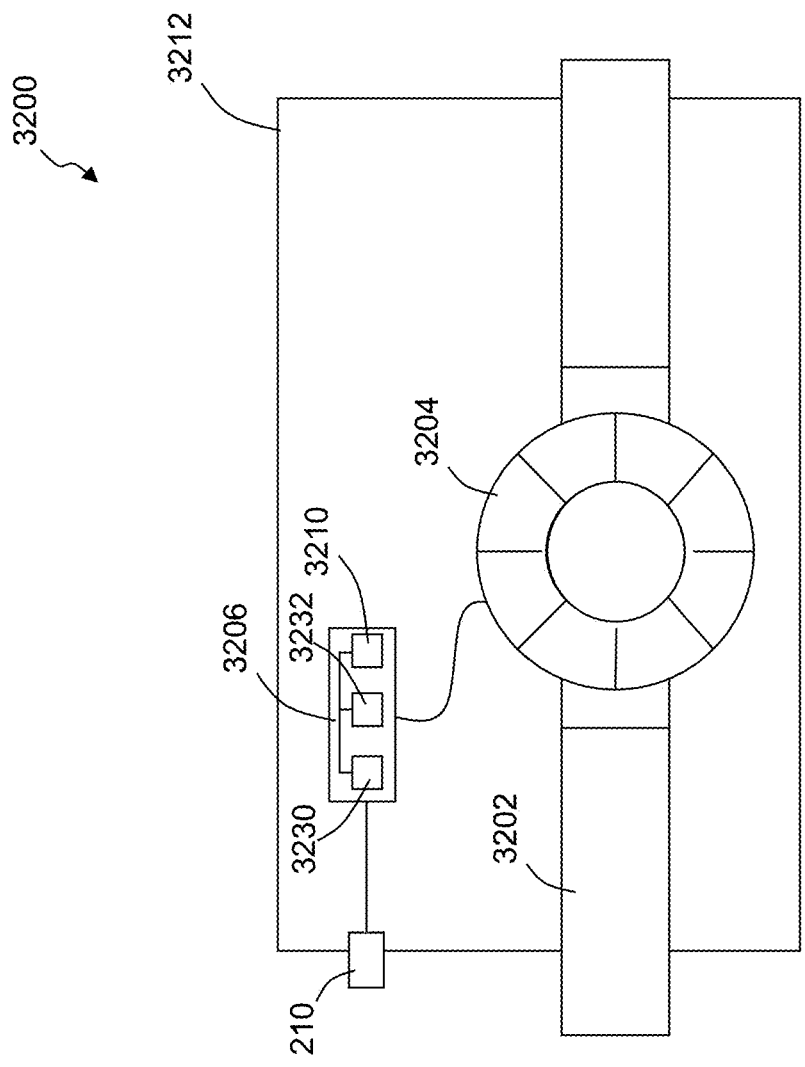
FIG. 32 illustrates a simplified block diagram of an irrigation electrical generator system, in accordance with some embodiments.

FIG. 32 illustrates a simplified block diagram of an irrigation electrical generator system 3200, in accordance with some embodiments. The irrigation electrical generator system 3200 comprises at least one fluid conduit 3202 with at least one electrical generator 3204 cooperated with a fluid conduit 3202 and configured to generate electrical energy in response to fluid flowing through the fluid conduit 3202 (e.g., a rotor assembly (not illustrated) is positioned within a fluid flow path through the irrigation electrical generator system 3200). At least some of the electrical power generated by the electrical generator 3204 is supplied, in some embodiments, to and stored in a rechargeable power storage system 3210. The irrigation electrical generator system 3200 is configured, in some embodiments, to be positioned in-line with at least one irrigation conduit 104 (see FIG. 1) and generate electrical power as fluid passes through the fluid conduit 3202. Further, in some implementations, the irrigation generator system 3200 is configured to be a standalone module, while in other embodiments, the irrigation generator system 3200 is a module to be incorporated into another system (e.g., valve system, sensor system, rotor system, etc.). In some embodiments, the irrigation electrical generator system 3200 comprises an optional generator control systems 3206 electrically coupled with the electrical generator 3204 and/or the rechargeable power storage system 3210. Typically, the electrical generator 3204 and the generator control systems 3206 are positioned within a generator housing 3212, with the fluid conduit 3202 extending through the housing and/or formed as part of the housing (e.g., injection molding, machining, 3D printing, other such methods or a combination of two or more of such methods).

Additionally, in some embodiments, the electrical generator system 3200 includes one or more external electrical connectors 210, taps or the like. The electrical connectors 210 are configured to electrically couple with one or more external systems, such as one or more external valve systems (e.g., such as one or more of the valve systems described herein, and/or other valve systems), sensor systems, lighting systems, pump systems, other such systems, or a combination of two or more of such systems. Power from the electrical generator 3204 can be supplied directly to the external electrical connectors 210, and/or electrical power stored in the rechargeable power storage system 3210 can be supplied to the external electrical connectors 210.

The generator control system 3206, in some embodiments, is similar to and/or includes one or more components of one or more of the control systems described herein. The generator control system 3206 typically includes one or more generator control circuits 3230, and one or more wireless and/or wired transceivers 3232. The generator control system 3206 is configured, in some implementations, to control the flow of electrical power to at least one of the one or more external electrical connectors 210. Accordingly, in some embodiments, the irrigation electrical generator system 3200 further controls one or more external systems based on the supply of electrical power from the irrigation electrical generator system 3200 to the one or more external systems. As one non-limiting example, the irrigation electrical generator system 3200 controls one or more external sensor systems to activate the one or more sensor systems by providing power through the external electrical connector 210. Further, in some embodiments, the generator control system 3206 is configured to receive sensor data from the one or more sensor systems. The sensor information can be relayed by the irrigation electrical generator system to one or more other devices and/or used by the generator control system 3206 to control the release of electrical power via the external electrical connector(s) 210 through the control of electrical power from the irrigation electrical generator system 3200 to the one or more external systems. Further, in some embodiments, the generator control system 3206 is configured to supply power from the rechargeable power storage system to the generator in some applications to cause the generator to control the movement of a rotor system or other system within the fluid flow. For example, during winterization of an irrigation system the generator control system 3206 can cause power to be supplied to the generator system to limit, slow and/or halt the rotation of the rotor assembly to prevent wear and tear.

Figure 33:
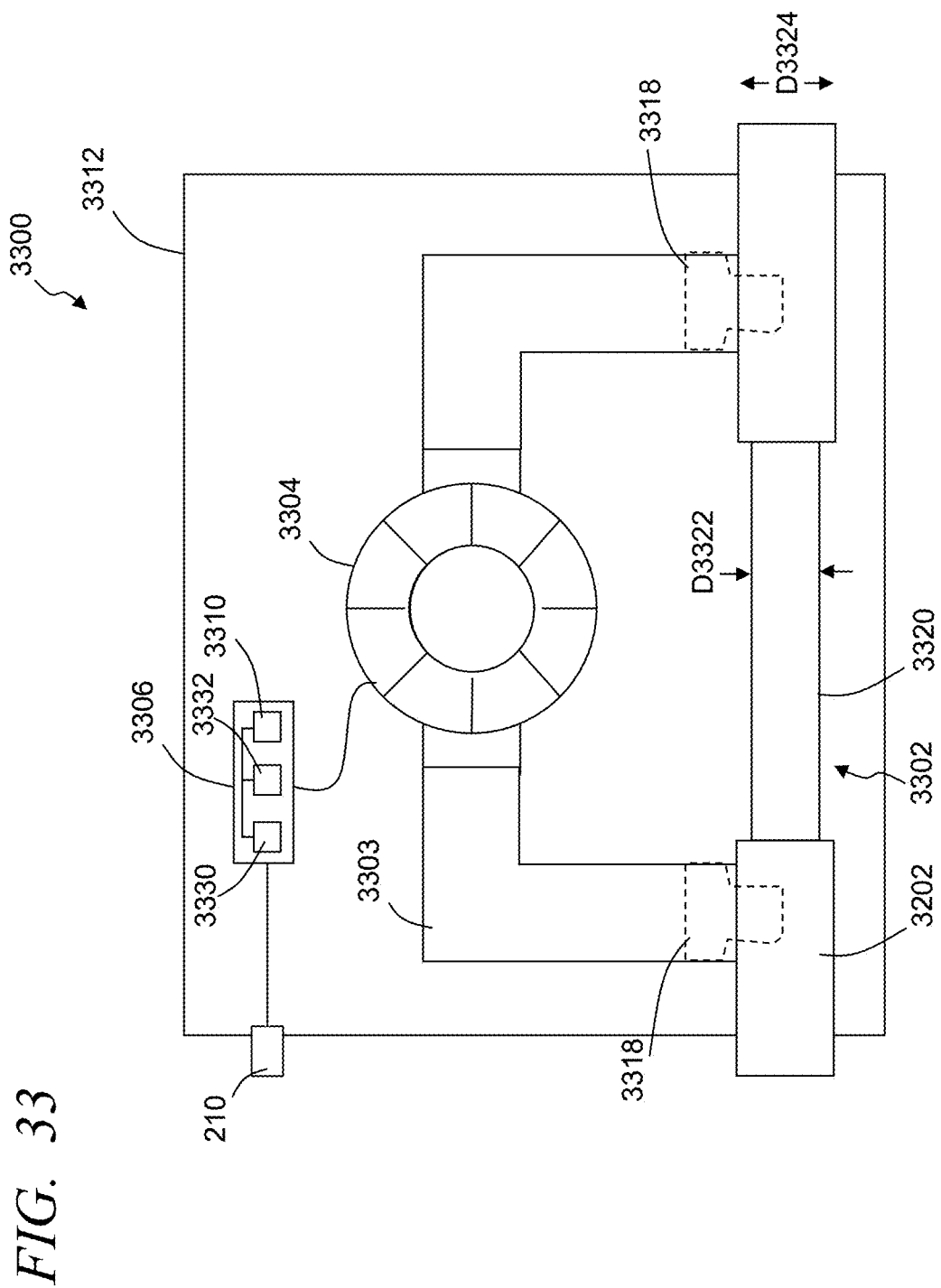
FIG. 33 illustrates a simplified block diagram of an irrigation electrical generator system, in accordance with some embodiments.

FIG. 33 illustrates a simplified block diagram of an irrigation electrical generator system 3300, in accordance with some embodiments. The irrigation electrical generator system 3300 comprises at least one main fluid conduit 3302 and at least one generator loop conduit 3303 fluidly coupled with the main fluid conduit 3302. At least one electrical generator 3304 is cooperated with the generator loop conduit 3303 and configured to generate electrical energy in response to fluid flowing through the generator loop conduit 3303 (e.g., a rotor assembly (not illustrated) is positioned within a fluid flow path through the irrigation electrical generator system 3200). At least some of the electrical power generated by the electrical generator 3304 is supplied, in some embodiments, to and stored in a rechargeable power storage system 3310. The irrigation electrical generator system 3300 is configured, in some embodiments, to be positioned in-line with at least one irrigation conduit 104 (see FIG. 1) and generate electrical power as fluid passes through the irrigation electrical generator system 3300. Some embodiments include one or more optional flow filters 3318 at the inlet and/or outlet of the generator loop conduit 3303.

Further, in some implementations, the irrigation generator system 3300 is configured to be a standalone module, while in other embodiments, the irrigation generator system 3300 is a module to be incorporated into another system (e.g., valve system, sensor system, rotor system, etc.). In some embodiments, the irrigation electrical generator system 3300 comprises an optional generator control systems 3306 electrically coupled with the electrical generator 3304 and/or the rechargeable power storage system 3310. Typically, the electrical generator 3304 and the generator control systems 3306 are positioned within a generator housing 3312, with the main fluid conduit 3302 extending through the housing and/or formed as part of the housing (e.g., injection molding, machining, 3D printing, other such methods or a combination of two or more of such methods). The main fluid conduit 3302 further includes a restriction section 3320 having a cross-sectional area D3322, diameter and/or flow area that is less than a cross-sectional area D3324, diameter and/or flow area of inlets and outlets of the main fluid conduit 3302. As described above at least with reference to FIGS. 24A-24B and 30, the restricted cross-sectional area D3322 induces a backpressure causing fluid to flow into the generator loop conduit 3303 enabling the generator to generate electrical power. Other embodiments utilize a check valve in place of the restriction section 3320. The check valve can be configured with a pre-determined pressure loss, and activates to open in response to a flow of fluid having a pressure greater than an activation threshold (e.g., when the water pressure is above 5 psi, the check valve opens).

Similar to the irrigation generator system 3200 of FIG. 32, the irrigation generator system 3300 optionally includes, in some embodiments, one or more external electrical connectors 210, taps or the like. The electrical connectors 210 are configured to electrically couple with one or more external systems. Power from the electrical generator 3304 can be supplied directly to the external electrical connectors 210, and/or electrical power stored in the rechargeable power storage system 3310 can be supplied to the external electrical connectors 210. The generator control system 3306, in some embodiments, is similar to and/or includes one or more components of one or more of the control systems (e.g., valve control systems, sensor control systems, generator control systems, etc.) described herein. The generator control system 3306 typically includes a generator control circuit 3330, and one or more wireless and/or wired transceivers 3332. The generator control system 3306 is configured, in some implementations, to control the flow of electrical power to at least one of the one or more external electrical connectors 210. Accordingly, in some embodiments, the irrigation electrical generator system 3300 further controls one or more external systems based on the supply of electrical power from the irrigation electrical generator system 3300 to the one or more external systems. As one non-limiting example, the irrigation electrical generator system 3300 controls one or more external sensor systems to activate the one or more sensor systems by providing power through the external electrical connector 210. Further, in some embodiments, the generator control system 3306 is configured to receive sensor data from the one or more sensor systems. The sensor information can be relayed to one or more other devices and/or used by the generator control system 3306 to control the release of electrical power via the external electrical connector(s) 210 through the control of electrical power from the irrigation electrical generator system 3300 to the one or more external systems. Further, in some embodiments, the generator control system 3306 is configured to supply power from the rechargeable power storage system to the generator in some applications to cause the generator to control the movement of a rotor system or other system within the fluid flow. For example, during winterization of an irrigation system the generator control system 3306 can cause power to be supplied to the generator system to limit, slow and/or halt the rotation of the rotor assembly to prevent wear and tear.

Figure 34:
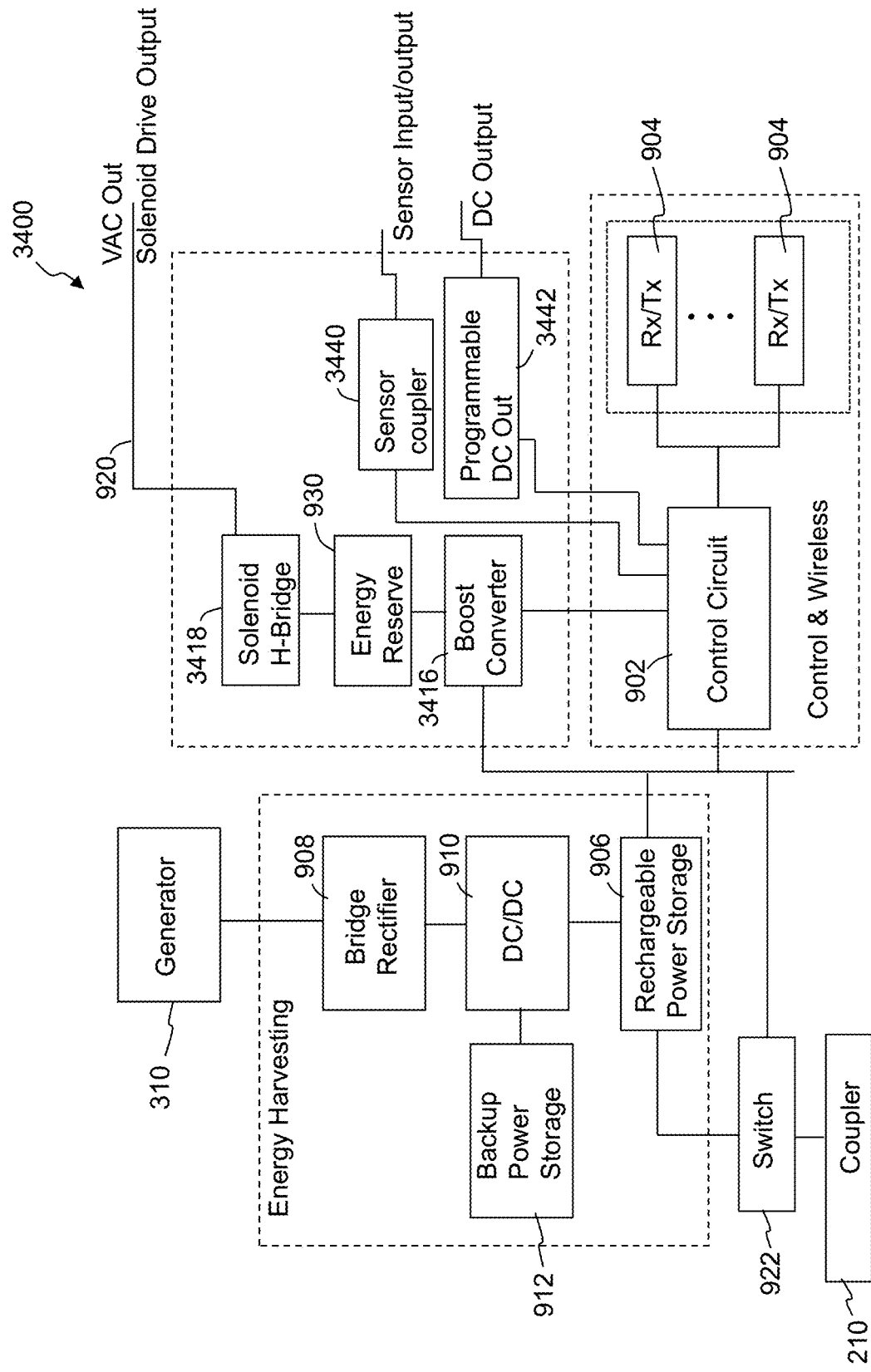
FIG. 34 illustrates a simplified block diagram of an exemplary valve control system, in accordance with some embodiments.

FIG. 34 illustrates a simplified block diagram of an exemplary valve control system 3400, in accordance with some embodiments. The valve control system 3400, in some implementations, is similar to one or more of the above described valve control systems, such as but not limited to the valve control system 314 of FIG. 9 and the valve control system 2705 of FIG. 28. The valve control system 3400 includes, in some embodiments, two or more solenoid H-bridge circuits 3418 electrically coupled with one or more boost converters 3416 configured to boost an output of the rechargeable power storage system 906 to an intended solenoid drive output voltage. In some embodiments, the output of the boost converter 916 is supplied to an optional latching solenoid energy reserve 930 (e.g., one or more capacitors, rechargeable battery, other such reserve devices, or a combination of two or more of such devices) that drives the one or more solenoid H-bridge circuits 918.

The solenoid H-bridge circuits 3418 are configured to output a respective solenoid drive output 920. In other embodiments, for example, the valve control system 2912 includes one or more motor drive systems (not shown) that are controlled by the valve control circuit 902 to generate a respective motor control output to control a respective ball valve. In some embodiments, the valve control system 3400 includes one or more sensor couplers 3440 configured to output sensor control signals (e.g., power and/or activation signals), and/or receive sensor information from one or more sensor systems. The valve control system 3400 optionally can include one or more programmable direct current (DC) outputs 3442 configured to output a DC power to one or more external systems (e.g., through the external electrical connector 210).

In some applications, the valve control system 3400 can be incorporated into another irrigation system. For example, the valve control system 3400 may be incorporated into a rotor system, sprinkler, valve system, pump system, or other system.

Figure 35B:
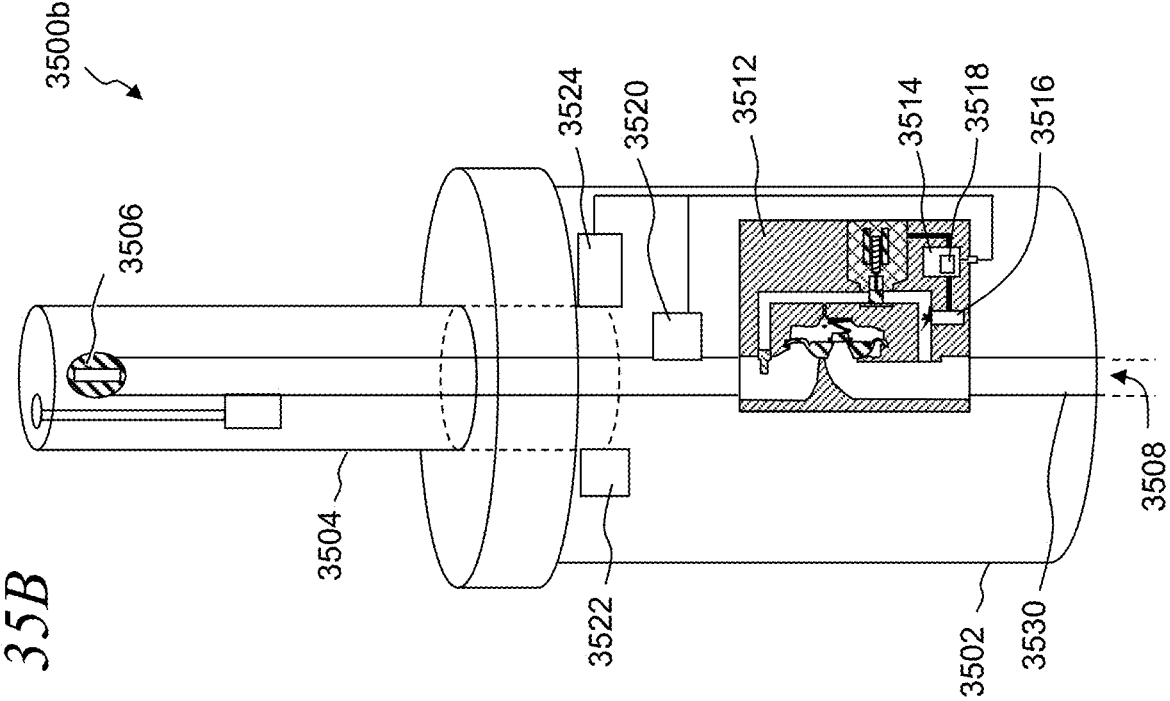
FIG. 35B illustrates a simplified block diagram, partially exposed view of an exemplary irrigation rotor system, in accordance with some embodiments.
Figure 35A:
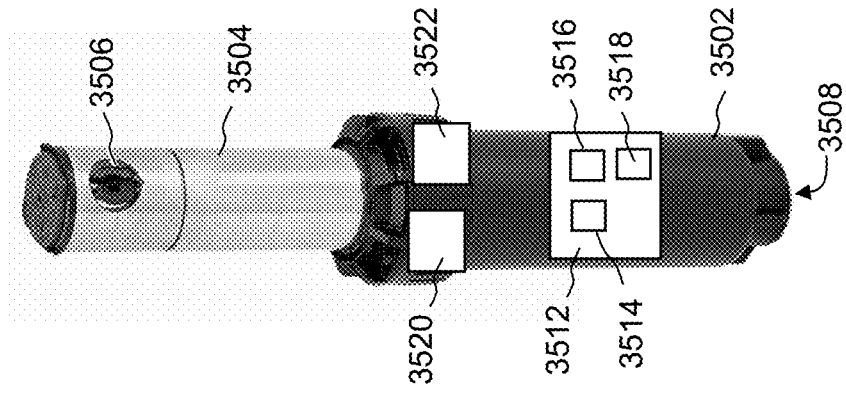
FIG. 35A illustrates a simplified block diagram of an exemplary irrigation rotor system, in accordance with some embodiments.

FIG. 35A illustrates a simplified block diagram of an exemplary irrigation rotor system 3500*a*, in accordance with some embodiments. The rotor system 3500*a* comprises a body 3502, a riser 3504 cooperated with the body and configured to rise from a non-active position within the body 3502 to an active position extending from the body when actively emitting water from one or more water emitters 3506, apertures or other such water dispersing devices (FIG. 35A shows the riser in the active position). Further, in some embodiments, the rotor system 3500*a* includes valve system 3512 that cooperates with a rotor fluid conduit 3530 and is configured to control the flow of water through the fluid conduit from an inlet 3508 to at least one emitter 3506. In some embodiment, the valve system 3512 comprises a valve control system 3514 that controls one or more solenoids to control one or more diaphragms, one or more ball valve motors to control one or more ball valves, etc. The rotor system 3500*a* and/or the valve system 3512 further includes a generator system 3516 configured to be activated in response to the valve control system enabling a flow of water to the emitter 3506. Typically, the valve system 3512 couples with and/or comprises one or more rechargeable power storage systems 3518 coupled with the generator system 3516 to receive and store power generated by the generator system 3516. The valve system 3512 receives operational power from the rechargeable power storage system 3518 to control the valve system and the release of fluid from the one or more emitters of the irrigation rotor system 3500*a*.

In some embodiments, the rotor system 3500a further includes one or more sensor systems 3520, such as but not limited to one or more of a pressure sensor system, temperature sensor system, flow sensor system, and/or other such relevant sensor systems. The rotor system 3500a, in some implementations, optionally includes one or more automated flush systems 3522 configured flush and/or wash debris from a generator filter and/or other parts of the rotor system in response to the riser 3504 and/or other parts of the rotor system retracting to a non-activate position. In some embodiments, the rotor system 3500a includes at least one rotation motor 3524 configured to control and/or set a rotation rate of the riser 3504 and/or emitter 3506 when actively emitting water to establish a rate of precipitation to the plant life being irrigated by the rotor system 3500a.

FIG. 35B illustrates a simplified block diagram, partially exposed view of an exemplary irrigation rotor system 3500b, in accordance with some embodiments, which is similar to the rotor system 3500a of FIG. 35A. In some embodiments, the valve system 3512 is similar to one of the valve systems described herein, such as valve system 102 described above. The valve system 3512 includes a valve control system 3514 coupled with the generator 3516, and the rechargeable power storage system 3518 receives and stores power from the generator. In some embodiments, the valve control system 3514 is similar to the valve control systems described here, such as valve control system 314 (e.g., as illustrated in FIG. 9). The valve system 3512 includes one or more diaphragms, ball valves and/or other such devices that are controlled to enable the flow of water to the emitter 3506 and prevent the flow of water to the emitter. For example, in some embodiments, the valve system 3512 includes a main motorized ball valve system that is controlled by the valve control system 3514 to set a flow rate (e.g., gallons per minute (GPM)) and/or one or more throw distances and/or ranges (i.e., distances or ranges of distance from the rotor system 3500b that the emitted water travels).

In some implementations, the valve control system 3514 wirelessly receives activation signals and/or deactivation signals and controls the valve system in accordance with the wireless signals. Further, in some applications, the valve control system 3514 receives sensor information from the one or more sensors 3520 and communicates the sensor information to one or more external systems, and/or adjusts operation of the rotor system based on the sensor data (e.g., activate in response to an activation signal when pressure sensor information indicates the water pressure is above a threshold pressure). In some embodiments, the rechargeable power storage system 3518 is used to power the sensor system 3520, the rotation motor 3524, other such sub-systems of the rotor system 3500b, and/or other devices external to the rotor system 3500b (e.g., other rotor systems, other sensors, other valves, etc.). Additionally or alternatively, the rotor system 3500 and/or valve system 3512, in some embodiments, is configured to operate in some instances autonomously to identify actions to implement based on one or more sensor data, conditions, one or more thresholds and/or other relevant information. Similarly, in some implementations, the rotor system receives an irrigation schedule and once received autonomously implements that irrigation schedule, while further making adjustments and/or interruptions to the irrigation schedule based on one or more factors and/or conditions (e.g., weather, moisture, flow rates, pressure, etc.).

In some embodiments of the valve systems, sensor systems, rotor systems and/or generator systems described herein are further configured to control the rotation of the generator and/or rotor assembly in an effort to reduce wear and tear and/or damage. For example, during a winterization of an irrigation system where relatively high air pressure is applied to the irrigation conduits in an effort to eject water from the irrigation conduits and components of the irrigation system, the control system can apply a power to the generator to control or limit a rotational speed or other movement speed of the rotor assembly, such as slowing a rotation of the turbine-generator to reduce wear and tear. Additionally or alternatively, some embodiments induce pressure regulation within the valve system and/or one or more irrigation conduits through using the principle of dynamic braking or "plugging" in part by controlling the rotational speed of the rotor assembly.

Figure 36:
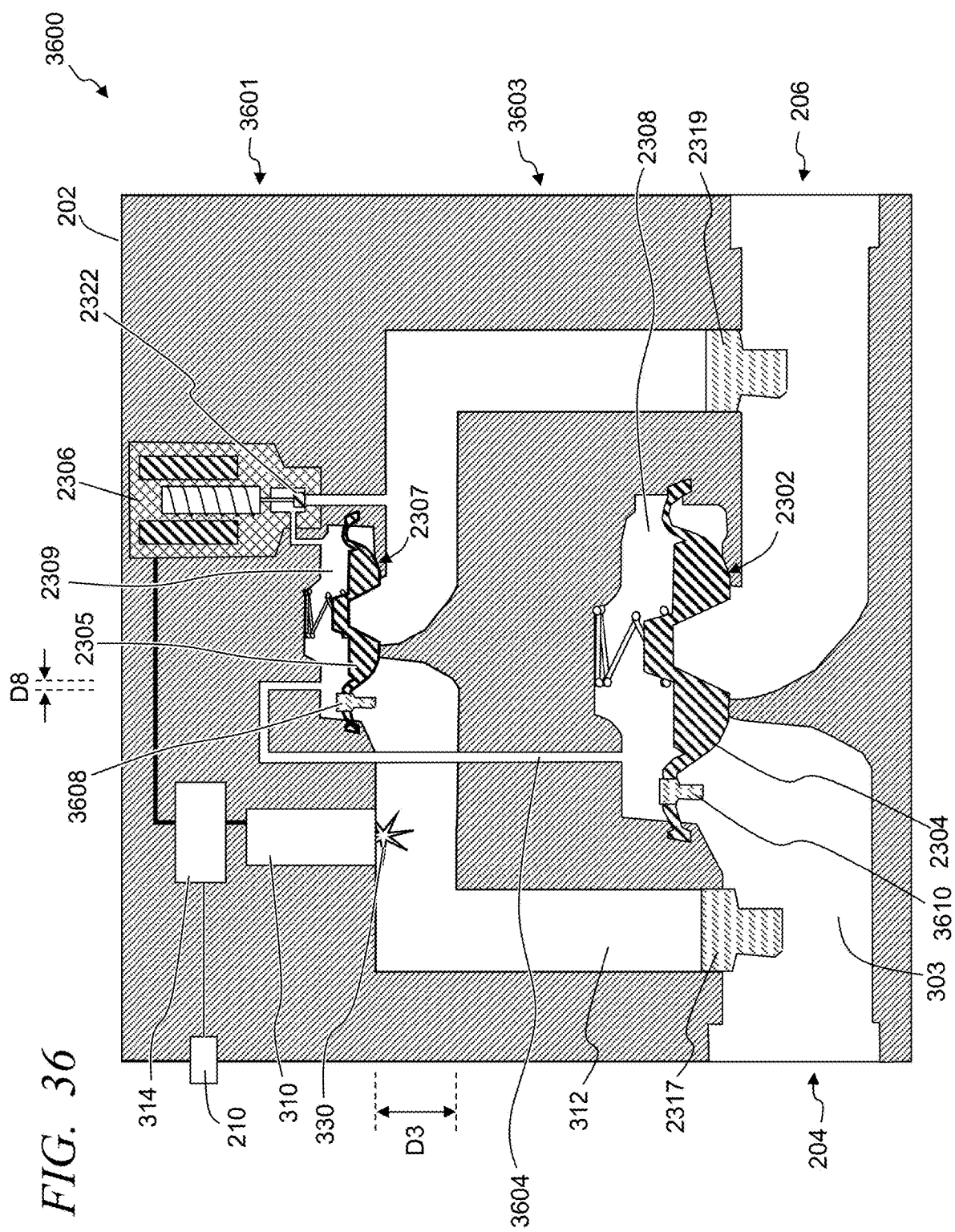
FIG. 36 illustrates a simplified block diagram, cross-sectional view of an exemplary self-powered, dual diaphragm valve system, in accordance with some embodiments.

FIG. 36 illustrates a simplified block diagram, cross-sectional view of an exemplary self-powered, dual diaphragm valve system 3600, in accordance with some embodiments. The dual diaphragm valve system 3600 includes an actuation sub-valve system 3601 positioned as part of or cooperated with the generator conduit 312, and a primary sub-valve system 3603 cooperated with a main conduit 303 and comprising a primary diaphragm 2304 or other such primary controllable valve mechanism. The primary diaphragm 2304 is positioned to be in contact against a primary valve seat 2302 when in a closed position, and configured to move between the closed position and an open position as described above. The generator conduit 312 is fluidly coupled at a generator conduit inlet with the main conduit 303 and extends from the main conduit upstream of the primary diaphragm 2304, and is further fluidly coupled with the main conduit 303 downstream of the primary diaphragm 2304 at a generator conduit outlet.

The actuation sub-valve system 2301 includes an actuation diaphragm 2305 positioned to be in contact against an actuation valve seat 2307 when in a closed position and configured to move between the closed position and an open position as described above. The actuation sub-valve system 2301 further includes or is coupled with a solenoid system 2306. The dual diaphragm valve system 3600 further includes a bonnet coupling conduit 3604 extending between the actuation bonnet cavity 2309 and a primary bonnet cavity 2308 of the primary sub-valve system 3603.

The primary diaphragm 2304, when in the closed position separates the primary bonnet cavity 2308 from the main conduit 303. The solenoid system 2306 is configured to transition in response to an activation signal between an inactive state with a solenoid plunger 2322 in a closed position preventing fluid flow from an actuation bonnet cavity 2309 or chamber, and an activate state with the solenoid plunger moved to an activate position. When the solenoid plunger 2322 is in the open position, a solenoid flow path from the actuation bonnet cavity 2309, through the solenoid and back into the generator conduit 312 is opened resulting in reduction in the pressure within the actuation bonnet cavity 2309. The reduced pressure enables the actuation diaphragm 2305 to transition to the open position allowing fluid to flow through the generator conduit 312. Fluid further flows from the primary bonnet cavity 2308, through the bonnet coupling conduit 3604 and into the actuation bonnet cavity 2309. The flow of fluid from the primary bonnet cavity 2308 similarly induces a reduction in the pressure within the primary bonnet cavity 2308 and cause the primary diaphragm 2304 to transition to the open position allowing fluid to flow through the main conduit 303. Accordingly, the single solenoid system 2306 enables the activation of both of the actuation sub-valve system 3601 and the primary sub-valve system 3603. In some embodiments, an optional actuation bonnet cavity flow filter 3608 may provide a fluid flow path from the generator conduit 312 to the actuation bonnet cavity 2309. Additionally or alternatively, some embodiments optionally include a primary bonnet cavity flow filter 3610 providing a flow path from the main conduit 303 to the primary bonnet cavity 2308. While FIG. 36 shows the solenoid system 2306 cooperated with the actuation sub-valve system 3601, some embodiments alternatively cooperate the solenoid system 2306 with the primary sub-valve system 3603.

In some embodiments, the bonnet coupling conduit 3604 is sized to ensure that fluid flows through the generator conduit 312 for at least a threshold duration of time prior to the primary diaphragm 2304 transitioning to the open position. For example, in some implementations, the flow of fluid through the actuation sub-vale system 3601 following the transition of the actuation diaphragm 2305 from the closed state to the open state induces a sufficient flow of fluid through the bonnet coupling conduit 3604 to induce, after at least a threshold period of time, at least a threshold reduction in pressure within the primary bonnet cavity 2308 to cause the transition of the primary diaphragm 2304 to transition to the open state. Some embodiments incorporate a check-valve, ball valve and/or other such device in the bonnet coupling conduit 3604 to provide additional control over the flow of fluid through the bonnet coupling conduit 3604.

The dual diaphragm valve system 3600 further includes one or more generators 310 cooperated with the generator conduit 312 and configured to generate electrical power when fluid flows through the generator conduit 312. The generator 310 electrically couples with a valve control system 314 that includes local rechargeable power storage systems 2914 that receive electrical power from the generator system 2910, and supplies power to the valve system 3600. In the embodiment illustrated in FIG. 36, the generator 310 is positioned upstream of the actuation diaphragm 2305. Some embodiments incorporate multiple generators cooperated with the generator conduit. Further, some embodiments additionally or alternatively incorporate one or more generators downstream of the actuation diaphragm 2305. Further, some embodiments include one or both of optional flow filters 2317, 2319 to provide protection for the generator 310, and/or the actuation sub-valve system 3601.

Accordingly, some embodiments provide the irrigation valve system 3600 that comprises the main conduit 303, the primary sub-valve system 3603 cooperated with and configured to control the flow of fluid through the main conduit 303, an actuation sub-valve system 3601 cooperated with and configured to control the flow of fluid through the generator conduit, a generator system 310 cooperated with the generator conduit, a valve control system electrically coupled with the primary sub-valve system 3603, the actuation sub-valve system 3601 and the generator system, and a rechargeable power storage system electrically coupled with the generator system and configured to receive electrical power from the generator system. The generator conduit 312 is fluidly coupled at a generator conduit inlet with the main conduit 303 upstream of the primary sub-valve system 3603, and fluidly coupled with the main conduit at a generator conduit outlet downstream of the primary sub-valve system 3603. The primary sub-valve system 3603, in some implementations, includes a primary bonnet cavity 2308 separated from the main conduit by a primary diaphragm 2304. In some embodiments the actuation sub-valve system 3601 comprises: an actuation bonnet cavity 2309 separated from the generator conduit 312 by an actuation diaphragm 2305, and a solenoid system 2306 fluidly coupled with the actuation bonnet cavity 2309. Some embodiments include a bonnet coupling conduit 3604 fluidly coupling the actuation bonnet cavity 2309 with the primary bonnet cavity 2308. The valve control system, in some implementations, is configured to: activate the solenoid system 2306 (e.g., in response to a valve activation signal) to cause both the primary diaphragm 2304 and the actuation diaphragm 2305 to transition between a closed position and an open position in controlling fluid flow through the main conduit 303 and generator conduit 312 enabling the generator system 310 to generate electrical power supplied to the rechargeable power storage system.

Figure 37:
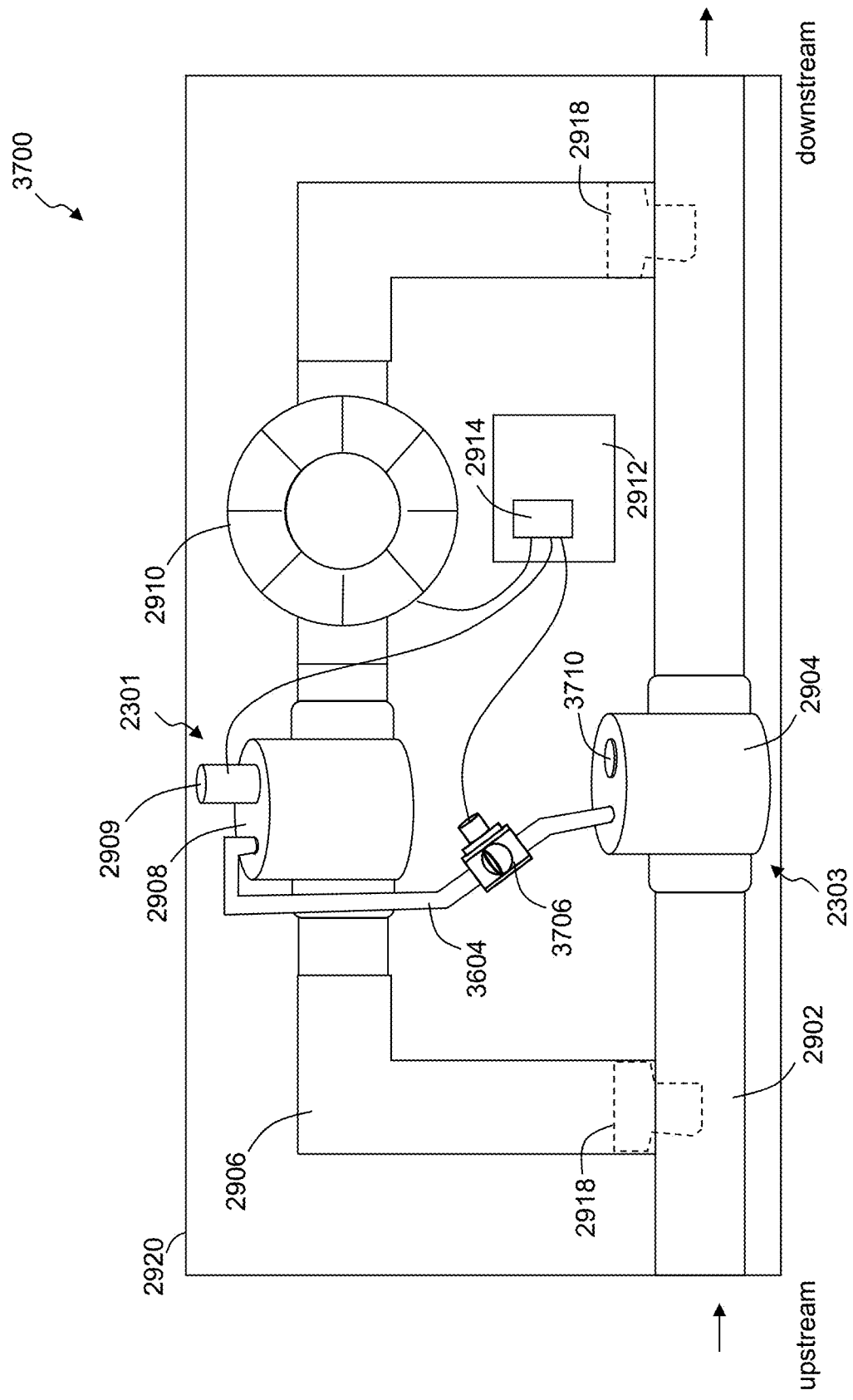
FIG. 37 illustrates a simplified block diagram of an exemplary self-powered valve system, in accordance with some embodiments.

FIG. 37 illustrates a simplified block diagram of an exemplary self-powered valve system 3700, in accordance with some embodiments. The valve system 3700 includes a main fluid conduit 2902 with at least one a primary sub-valve system 2303 comprising at least one main valve system 2904 cooperated with and configured to control the flow of fluid through the main fluid conduit 2902, a generator conduit 2906 with at least one actuation system or actuation sub-valve system 2301 comprising at least one generator conduit valve system 2908 cooperated with and configured to control the flow of fluid through the generator conduit 2906, a generator system 2910, and a valve control system 2912 electrically and/or communicatively coupled with the main valve system 2904, the generator conduit valve system 2908 and the generator system 2910. Further, the valve system 3700 includes a bonnet coupling conduit 3604 extending between an actuation bonnet cavity of the generator conduit valve system 2908 and a primary bonnet cavity of the main valve system 2904. The generator conduit valve system 2908 includes a solenoid system 2909, while the main valve system 2904 does not include a solenoid. In some embodiments, a solenoid port of a main valve system 2904, which is configured to receive and cooperate a solenoid system with the main valve system, is sealed with a cap 3710, a plug, epoxy, resin, potting material, plastic, and/or other relevant method of closing and sealing. The valve control system 2912 is configured to activate the solenoid system 2909 when fluid is intended to flow through the valve system 3700. While FIG. 37 shows the solenoid system 2909 cooperated with the generator conduit valve system 2908, some embodiments alternatively cooperate the solenoid system 2909 with the main valve system 2904.

The solenoid system 2306 is configured to transition in response to an activation signal between an inactive state preventing fluid flow from an actuation bonnet cavity, and an activate state opening a solenoid flow path from the actuation bonnet cavity of the generator conduit valve system 2908, through the solenoid and back into the generator conduit 2906 causing a reduction in the pressure within the actuation bonnet cavity. The reduced pressure enables the valve transition to the open position allowing fluid to flow through the generator conduit 2906. Fluid further flows from a primary bonnet cavity 2308 of the main valve system 2904, through the bonnet coupling conduit 3604 and into the actuation bonnet cavity. The flow of fluid from the primary bonnet cavity similarly induces a reduction in the pressure within the primary bonnet cavity and cause the main valve system 2904 to transition to the open position allowing fluid to flow through the main conduit 303. Accordingly, the single solenoid system 2909 enables the activation of both of the actuation sub-valve system 2301 and the primary sub-valve system 2303.

In some embodiments, the bonnet coupling conduit 3604 is sized to ensure that fluid flows through the generator conduit 2906 for at least a threshold duration of time prior to the primary sub-valve system 2303 transitioning to the open state. Some embodiments further include one or more optional ball valves 3706, check-valves and/or other such systems that enables further control of the flow of fluid through the bonnet coupling conduit 3604 and the control of the primary sub-valve system 2303. The ball valve 3706 can be coupled with and controlled by the valve control system 2912. In some embodiments, the valve control system 2912 opens the ball valve 3706 less than a threshold amount in order to control a pressure within the bonnet coupling conduit 3604 and/or the duration of time after activation of the solenoid system 2909 before the primary sub-valve system 2303 transitions to the active state.

The generator system 2910 couples with one or more local rechargeable power storage systems 2914 that receive electrical power from the generator system 2910, and supplies power to the irrigation valve system 3700. Further, in some implementations, the main fluid conduit 2902, the primary sub-valve system 2303, the generator conduit 2906, the actuation sub-valve system 2301, the generator system 2910, and the valve control system 2912 are cooperated into a single housing 2920. The embodiment illustrated in FIG. 37 shows the generator system 2910 downstream of the actuation sub-valve system 2301. Some embodiments incorporate multiple generators cooperated with the generator conduit. In other embodiments, one or more generator systems 2910 are additionally or alternatively incorporated upstream of the actuation sub-valve system 2301. Some embodiments include one or more optional flow filters 2918 cooperated with the generator conduit 2906, which in some implementations are self-cleaning and/or cleaned by fluid flow through the main fluid conduit 2902.

In some embodiments, the irrigation valve system 3700 includes the main fluid conduit 2902, the main valve system 2904 cooperated with and configured to control a flow of fluid through the main fluid conduit; the generator conduit 2906; the generator conduit valve system 2908 cooperated with and configured to control the flow of fluid through the generator conduit 2906; a bonnet coupling conduit 3604; a generator system 310 cooperated with the generator conduit; a valve control system 2912 electrically coupled with the main valve system 2904, the solenoid system 2909, and the generator system 2910; and a rechargeable power storage system 2914 electrically coupled with the generator system 2910 and configured to receive electrical power from the generator system. The main valve system 2904 comprises a primary bonnet cavity. The generator conduit valve system 2908 comprises an actuation bonnet cavity, and a solenoid system 2909 configured to control the opening and closing of the generator conduit valve system 2908. The generator conduit 2906 is fluidly coupled at a generator conduit inlet with the main fluid conduit 2902 upstream of the main valve system 2904, and fluidly coupled with the main fluid conduit at a generator conduit outlet downstream of the main valve system 2904.

The bonnet coupling conduit 3604 fluidly couples the actuation bonnet cavity of the generator conduit valve system 2908 with the primary bonnet cavity of the main valve system 2904. The valve control system 2912 is configured to activate the solenoid system 2909, in response to a valve activation signal, to cause both the main valve system 2904 and the generator conduit valve system 2908 to transition between a closed state and an open state in controlling fluid flow through the main fluid conduit 2902 and generator conduit 2906 enabling the generator system 2910 to generate electrical power supplied to the rechargeable power storage system.

Figure 38:
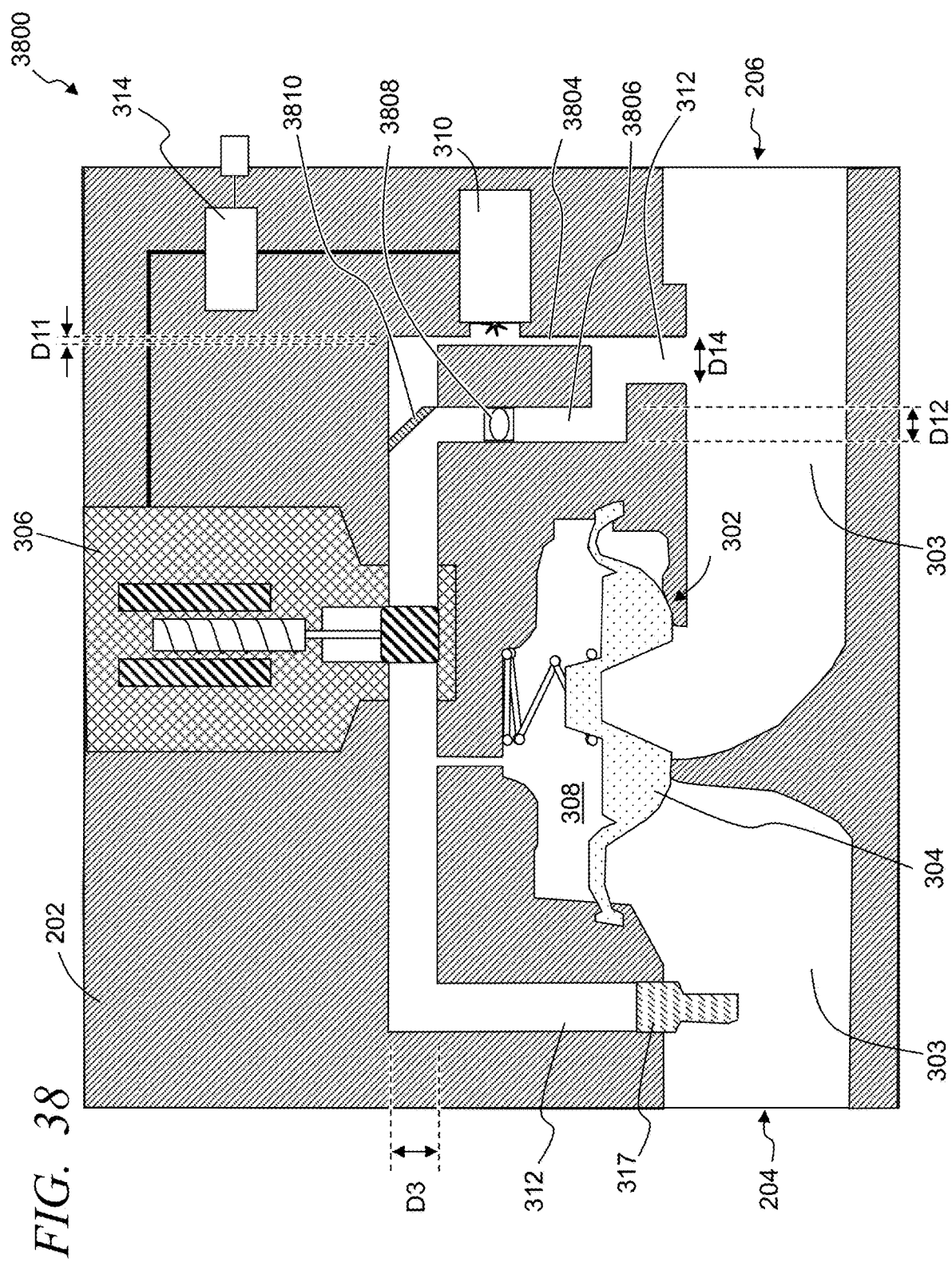
FIG. 38 illustrates a simplified block diagram, cross-sectional view of an exemplary self-powered valve system, in accordance with some embodiments.

FIG. 38 illustrates a simplified block diagram, cross-sectional view of an exemplary self-powered valve system 3800, in accordance with some embodiments. The valve system 3800 is similar to the valve system 102 of FIGS. 3A-3B with the generator 310 positioned downstream from the solenoid system 306 while still cooperated with the generator conduit 312. The valve system 3800 operates similar to the valve system 102 of FIGS. 3A-3B where water flows through the generator conduit 312 in response to the activation of the solenoid system 306 to cause the plunger 322 to transition from the closed position to the open position (not illustrated in FIG. 38). The generator conduit 312, however, is divided proximate the generator 310 into a rotor stream conduit 3804 and a generator bypass conduit 3806. The generator 310 is cooperated with the rotor stream conduit 3804 with the rotor assembly in contact with fluid passing through the rotor stream conduit when in use. The generator bypass conduit 3806 provides a separate or parallel path to the rotor stream conduit 3804. Some embodiments optionally include one or more check-valves 3808, ball-valves, gate valves, or other relevant flow restricting sub-system that is cooperated with the generator bypass conduit 3806. In some embodiments, the check-valve 3808 is configured to remain closed when a water pressure the generator bypass conduit 3806 and upstream of the check-valve is below a bypass water pressure threshold. Accordingly, when the solenoid system 306 is in an open state and while the check-valve 3808 is closed (i.e., the pressure within the generator bypass conduit 3806 is below the bypass water pressure threshold), the flow of fluid through the generator conduit 312 flows through the rotor stream conduit 3804 to interact with the rotor assembly to induce the generation of electric power by the generator 310.

In some embodiments, the check-valve 3808 is configured to open when the pressure on an upstream side of the check-valve 3808 is greater than the bypass water pressure threshold enabling some or all of the fluid flowing through the generator conduit 312 to flow through the generator bypass conduit 3806. In some embodiments, the check-valve is variable enabling the water pressure threshold to be set within a variable range. Further, in some instances while the check-valve 3808 is in an open state, some of the fluid flowing through the generator conduit 312 continues to flow through the rotor stream conduit 3804 to interact with the rotor assembly causing the generator 310 to continue to generate electrical energy. Additionally, in some embodiments, the rotor stream conduit 3804 is sized and/or is configured with a cross-sectional area D11, diameter or other measure that is less than the cross-sectional area D3, diameter or other measure of the generator conduit 312, which in some instances causes an increase in the flow rate of the fluid through the rotor stream conduit 3804 and accordingly induce an increased rate of rotation of the rotor assembly. The cross-sectional area D12, diameter or other measure of the generator bypass conduit 3806 can be substantially any relevant size to achieve an intended flow rate through the generator conduit 312 and/or the rotor stream conduit 3804. In some embodiments, as a non-limiting example, the sum of the cross-sectional area D11 of the rotor stream conduit 3804 and the cross-sectional area D12 of the generator bypass conduit 3806 is substantially equal to the cross-sectional area D3 of the generator conduit 312. In other embodiments, the sum of the cross-sectional area D11 of the rotor stream conduit 3804 and the cross-sectional area D12 of the generator bypass conduit 3806 is greater than the cross-sectional area D3 of the generator conduit 312, while the difference can be dependent on one or more factors such as an expected input pressure, an expected or threshold flow rate, other such factors, or a combination of two or more of such factors. Further, in some embodiments, the cross-sectional area D11 of the rotor stream conduit 3804 is less than the cross-sectional area D12 of the generator bypass conduit 3806 to achieve a desired flow rate through the rotor stream conduit 3804. Further, in some implementations cross-sectional area D12 and/or the check-valve 3808 are configured to induce a sufficient pressure so that a threshold amount of fluid flows through the rotor stream conduit 3804 when there is a threshold expected input pressure at the inlet conduit 204. In some embodiments, a cross-sectional area D14 of an outlet of the generator conduit 312, positioned downstream of the generator 310 and rotor stream conduit 3804, is at least equal to a cross-sectional area D3 at an inlet of the generator conduit 312.

The valve system 3800, in some embodiments, optionally includes one or more filters, strainers, flow filters and/or other such structures to provide protection to the solenoid system 306, generator 310 and/or check-valve 3808. For example, the valve system 3800 optionally includes an inlet flow filter 317 at an inlet of the generator conduit 312, and/or an optional outlet flow filter (not illustrated) at an outlet of the generator conduit 312. An optional mesh 3810, strainer or filter is included in some embodiments to limit debris greater than a threshold size from flowing into the rotor stream conduit 3804 and/or damaging the generator 310. Debris greater than the threshold size, in some implementations, is redirected by the mesh 3810 into the generator bypass conduit 3806. In the embodiment illustrated in FIG. 38, the generator 310 is positioned downstream of the solenoid system 306. Some embodiments incorporate multiple generators cooperated with the generator conduit. Further, some embodiments additionally or alternatively incorporate one or more generators upstream of the solenoid system 306. Still further, it is noted that rotor stream conduit 3804 and generator bypass conduit 3806 can be utilized in any of the above described embodiments.

In some embodiments, the rotor stream conduit 3804 and the generator bypass conduit 3806 are formed within a housing 202 of the valve system 3800, such as through molding, 3D printing, machining, other such methods or a combination of such methods. In other embodiments, one or both of the rotor stream conduit 3804 and/or the generator bypass conduit 3806 are implemented through separate pipes or other such conduits are fluidly coupled with the generator conduit 312. Further, in some embodiments, some or all of the components can be replaced and/or the self-powered valve system 3800 is formed from multiple sub-parts with one or more service interfaces 802 between the sub-parts enabling access to one or more components of the self-powered valve system. The valve control system 314 provides control over the operation of the valve system 3800 as described above with reference to the valve system 102 of FIGS. 3A-3B.

In some embodiments, the valve system 3800 comprises an irrigation valve system that comprises at least one main conduit 303, at least one generator conduit 312, at least one solenoid system 306, at least one generator 310, and at least one valve control system 314. The main conduit 303 includes the inlet conduit 204 and the outlet conduit 206 with the diaphragm 304 positioned within the main conduit. The diaphragm is configured to transition between a closed position and an open position. In the closed position the diaphragm 304 prevents water from flowing along a primary flow path from the inlet conduit, past the diaphragm and to the outlet conduit. The generator conduit 312 is fluidly coupled with the main conduit 303 upstream of the diaphragm 304 at a generator conduit inlet, and fluidly coupled with the main conduit 303 downstream of the diaphragm 304 at a generator conduit outlet. The generator conduit 312 further comprises at least one rotor stream conduit 3804 and at least one generator bypass conduit 3806 that is fluidly coupled in parallel with at least one rotor stream conduit 3804.

In some embodiments, the solenoid system 306 is cooperated with the generator conduit 312. Further, the solenoid system, when activated, is configured to enable water to flow through the generator conduit 312 for at least a threshold duration prior to the diaphragm 304 transitioning from the closed position to the open position. The generator 310 includes a rotor assembly, inline propeller, turbine and/or other such structure configured to be contacted by the flow of fluid through the rotor stream conduit 3804. The generator 310 is positioned with the rotor assembly cooperated with the rotor stream conduit 3804 and configured to be physically activated by the flow of fluid through the rotor stream conduit. The valve control system 314, in some embodiments, comprises: at least one rechargeable power storage system electrically coupled with the generator and configured to receive and store electrical power generated by the generator 310, and a control circuit configured to receive power from the rechargeable power storage system and to activate the solenoid drive output to output a solenoid drive signal to activate the solenoid system 306. In some embodiments, the valve control system 314 includes at least one wireless transceiver. The control circuit can be communicatively coupled with the wireless transceiver and configured to activate, in response to a valve activation signal received through the wireless transceiver, the solenoid drive output to output the solenoid drive signal to activate the solenoid system 306. Further, the valve system 3800 includes a check-valve 3808 positioned within the generator bypass conduit 3806. The check-valve 3808 is configured to open when the pressure on an upstream side of the check-valve is greater than the bypass water pressure threshold enabling at least some of the fluid flowing through the generator conduit 312 to flow through the generator bypass conduit 3806.

Figure 39:
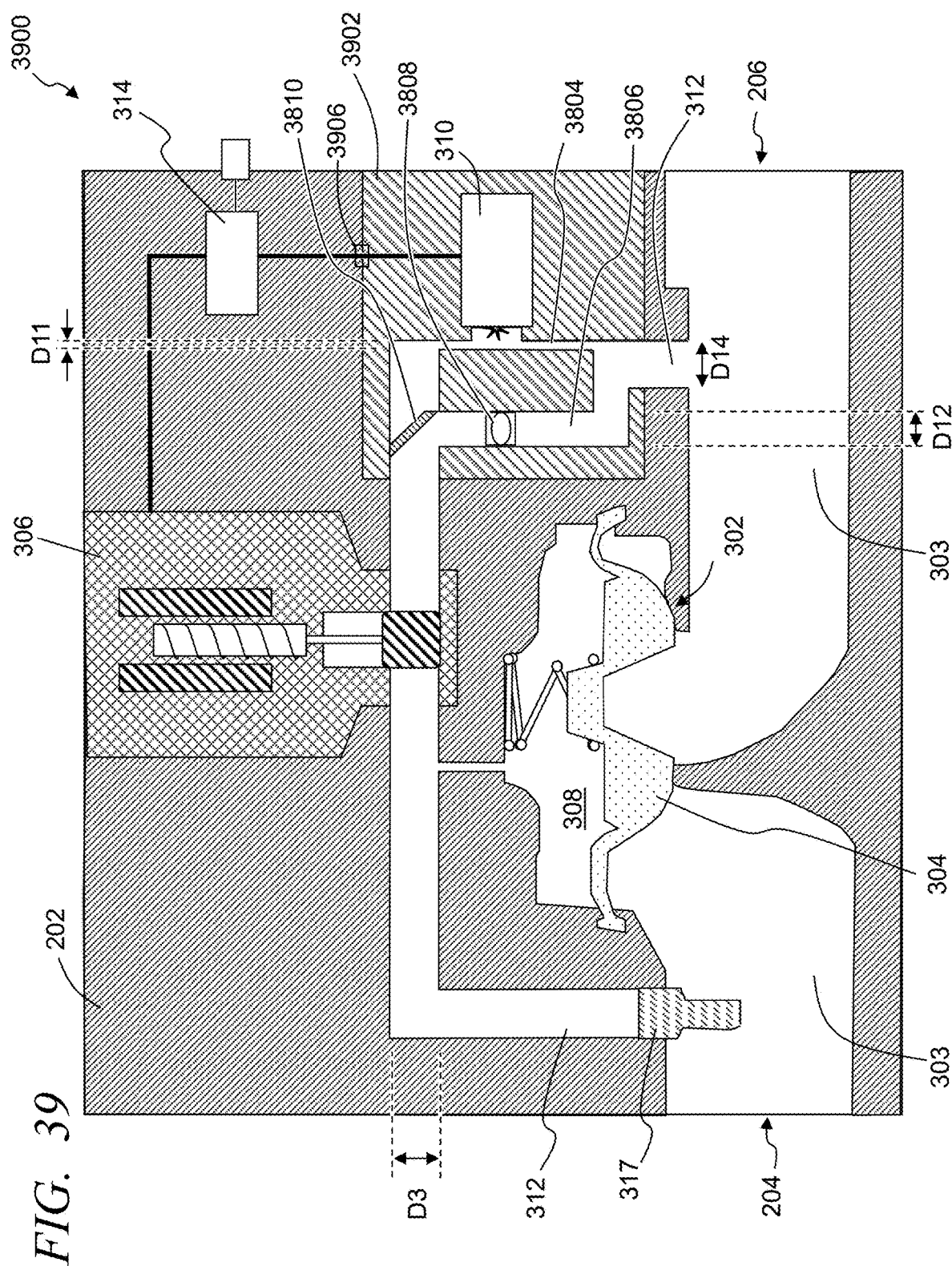
FIG. 39 illustrates a simplified block diagram, cross-sectional view of an exemplary self-powered valve system, in accordance with some embodiments.

FIG. 39 illustrates a simplified block diagram, cross-sectional view of an exemplary self-powered valve system 3900, in accordance with some embodiments. The valve system 3900 is similar to the valve system 3800 of FIG. 38, but comprises one or more separate generator sub-systems 3902 that is cooperated with the housing 202 through substantially any method, such as but not limited to threading, compression fit, tongue and groove, bolts, adhesive, epoxy, other such methods, or a combination of two or more of such methods. The generator sub-system 3902 comprises a rotor stream conduit 3804 and a generator bypass conduit 3806. In some embodiments, the generator sub-system 3902 further includes the generator 310 that is cooperated with the rotor stream conduit 3804 with the rotor assembly configured to be in contact with fluid passing through the rotor stream conduit when in use. The generator bypass conduit 3806 provides a separate or parallel path to the rotor stream conduit 3804. The generator sub-system 3902 optionally includes one or more check-valves 3808, ball-valves, gate valves, or other relevant flow restricting sub-system that is cooperated with the generator bypass conduit 3806. In some embodiments, the check-valve 3808 is configured to remain closed when a water pressure the generator bypass conduit 3806 and upstream of the check-valve is below a bypass water pressure threshold. Accordingly, when the solenoid system 306 is in an open state and while the check-valve 3808 is closed (i.e., the pressure within the generator bypass conduit 3806 is below the bypass water pressure threshold), the flow of fluid through the generator conduit 312 flows through the rotor stream conduit 3804 to interact with the rotor assembly to induce the generation of electric power by the generator 310.

The generator sub-system 3902, in some embodiments, is removably secured with the housing 202 enabling the generator sub-system 3902 to be manufactured separate from rest of the valve system and subsequently cooperated into the valve system 3900. Similarly, in some embodiments, the generator sub-system 3902 is removable to enable maintenance, repair and/or replacement of the generator sub-system. In some implementations, the generator sub-system 3902 has a sub-system housing, with the rotor stream conduit 3804 and the generator bypass conduit 3806 cooperated with or formed within (e.g., through injection molding, tooling, 3D printing, other such methods or combination of two or more of such methods) the sub-system housing. Further, the sub-system housing is configured to receive and maintain a position of the generator 310 relative to at least the rotor stream conduit 3804. In some implementations the generator 310 and/or rotor assembly is removable from the sub-system housing.

The generator sub-system 3902, in some implementations, comprises an inlet that is configured to fluidly couple with an upstream side of generator conduit 312, and an outlet that is configured to fluidly couple with a downstream side of the generator conduit 312 or to fluidly couple with the main conduit 303. An electrical coupling is typically included enabling the generator sub-system 3902 to electrically couple with at least the rechargeable power storage system and/or the valve control system 314.

Similar to the valve system 3800 of FIG. 38, in some embodiments, the check-valve 3808 is configured to open when the pressure on an upstream side of the check-valve 3808 is greater than the bypass water pressure threshold enabling some or all of the fluid flowing through the generator conduit 312 to flow through the generator bypass conduit 3806. Further, in some instances while the check-valve 3808 is in an open state, some of the fluid flowing through the generator conduit 312 continues to flow through the rotor stream conduit 3804 to interact with the rotor assembly causing the generator 310 to continue to generate electrical energy. Additionally, in some embodiments, the rotor stream conduit 3804 is sized and/or is configured with a cross-sectional area D11, diameter or other measure that is less than the cross-sectional area D3, diameter or other measure of the generator conduit 312, which in some instances causes an increase in the flow rate of the fluid through the rotor stream conduit 3804 and accordingly induce an increased rate of rotation of the rotor assembly. The cross-sectional area D12, diameter or other measure of the generator bypass conduit 3806 can be substantially any relevant size to achieve an intended flow rate through the generator conduit 312 and/or the rotor stream conduit 3804. In some embodiments, as a non-limiting example, the sum of the cross-sectional area D11 of the rotor stream conduit 3804 and the cross-sectional area D12 of the generator bypass conduit 3806 is at least equal to the cross-sectional area D3 of the generator conduit 312. In other embodiments, the sum of the cross-sectional area D11 of the rotor stream conduit 3804 and the cross-sectional area D12 of the generator bypass conduit 3806 is greater than the cross-sectional area D3 of the generator conduit 312, while the difference can be dependent on one or more factors such as an expected input pressure, an expected or threshold flow rate, other such factors, or a combination of two or more of such factors. Further, in some embodiments, the cross-sectional area D11 of the rotor stream conduit 3804 is less than the cross-sectional area D12 of the generator bypass conduit 3806 to achieve a desired flow rate through the rotor stream conduit 3804. Further, in some implementations cross-sectional area D12 and/or the check-valve 3808 are configured to induce a sufficient pressure so that a threshold amount of fluid flows through the rotor stream conduit 3804 when there is a threshold expected input pressure at the inlet conduit 204 at least while the diaphragm 304 is in the closed position. In some embodiments, a cross-sectional area D14 of an outlet of the generator conduit 312, positioned downstream of the generator 310 and rotor stream conduit 3804, is at least equal to a cross-sectional area D3 at an inlet of the generator conduit 312. The valve control system 314 provides control over the operation of the valve system 3900 as described above with reference to the valve system 102 of FIGS. 3A-3B.

In some embodiments, the valve system 3900 comprises an irrigation valve system that comprises at least one main conduit 303, at least one generator conduit 312, at least one solenoid system 306, at least one valve control system 314 and at least one generator sub-system 3902. In some embodiments, the valve system 3900 includes a housing 202 that comprises at least the main conduit 303 and diaphragm 304. The main conduit 303 includes the inlet conduit 204 and the outlet conduit 206 with the diaphragm 304 positioned within the main conduit. The diaphragm is configured to transition between a closed position and an open position. In the closed position the diaphragm 304 prevents water from flowing along a primary flow path from the inlet conduit, past the diaphragm and to the outlet conduit. The generator conduit 312 is fluidly coupled with the main conduit 303 upstream of the diaphragm 304 at a generator conduit inlet, and fluidly coupled with the main conduit 303 downstream of the diaphragm 304 at a generator conduit outlet.

The generator sub-system 3902, in some implementations, comprises at least one rotor stream conduit 3804, at least one generator bypass conduit 3806 that is fluidly coupled in parallel with at least one rotor stream conduit 3804, at least one generator 310 and at least one electrical coupling 3906 configured to enable electrical coupling with at least a rechargeable power storage system of the valve control system 314. The generator sub-system 3902 is configured to be removably cooperated with the housing 202. The generator sub-system 3902 is further configured to fluidly couple with the generator conduit 312 enabling fluid to flow from the inlet through at least the rotor stream conduit 3804, and typically further through the generator bypass conduit 3806 in response to a pressure within the generator conduit exceeding a threshold and activating the check valve 3808 to open. Further, in some embodiments, the generator sub-system 3902 includes a check-valve 3808 positioned within the generator bypass conduit 3806. The check-valve 3808 is configured to open when the pressure on an upstream side of the check-valve is greater than the bypass water pressure threshold enabling at least some of the fluid flowing through the generator conduit 312 to flow through the generator bypass conduit 3806.

In some embodiments, the solenoid system 306 is cooperated with the generator conduit 312. Further, the solenoid system, when activated, is configured to enable water to flow through the generator conduit 312 for at least a threshold duration prior to the diaphragm 304 transitioning from the closed position to the open position. The generator 310 includes a rotor assembly, inline propeller, turbine and/or other such structure configured to be contacted by the flow of fluid through the rotor stream conduit 3804. The generator 310 is positioned with the rotor assembly cooperated with the rotor stream conduit 3804 and configured to be physically activated by the flow of fluid through the rotor stream conduit 3804. The valve control system 314, in some embodiments, comprises: at least one rechargeable power storage system electrically coupled with the generator and configured to receive and store electrical power generated by the generator 310, and a control circuit configured to receive power from the rechargeable power storage system and to activate the solenoid drive output to output a solenoid drive signal to activate the solenoid system 306. In some embodiments, the valve control system 314 includes at least one wireless transceiver. The control circuit can be communicatively coupled with the wireless transceiver and configured to activate, in response to a valve activation signal received through the wireless transceiver, the solenoid drive output to output the solenoid drive signal to activate the solenoid system 306.

Figure 40A:
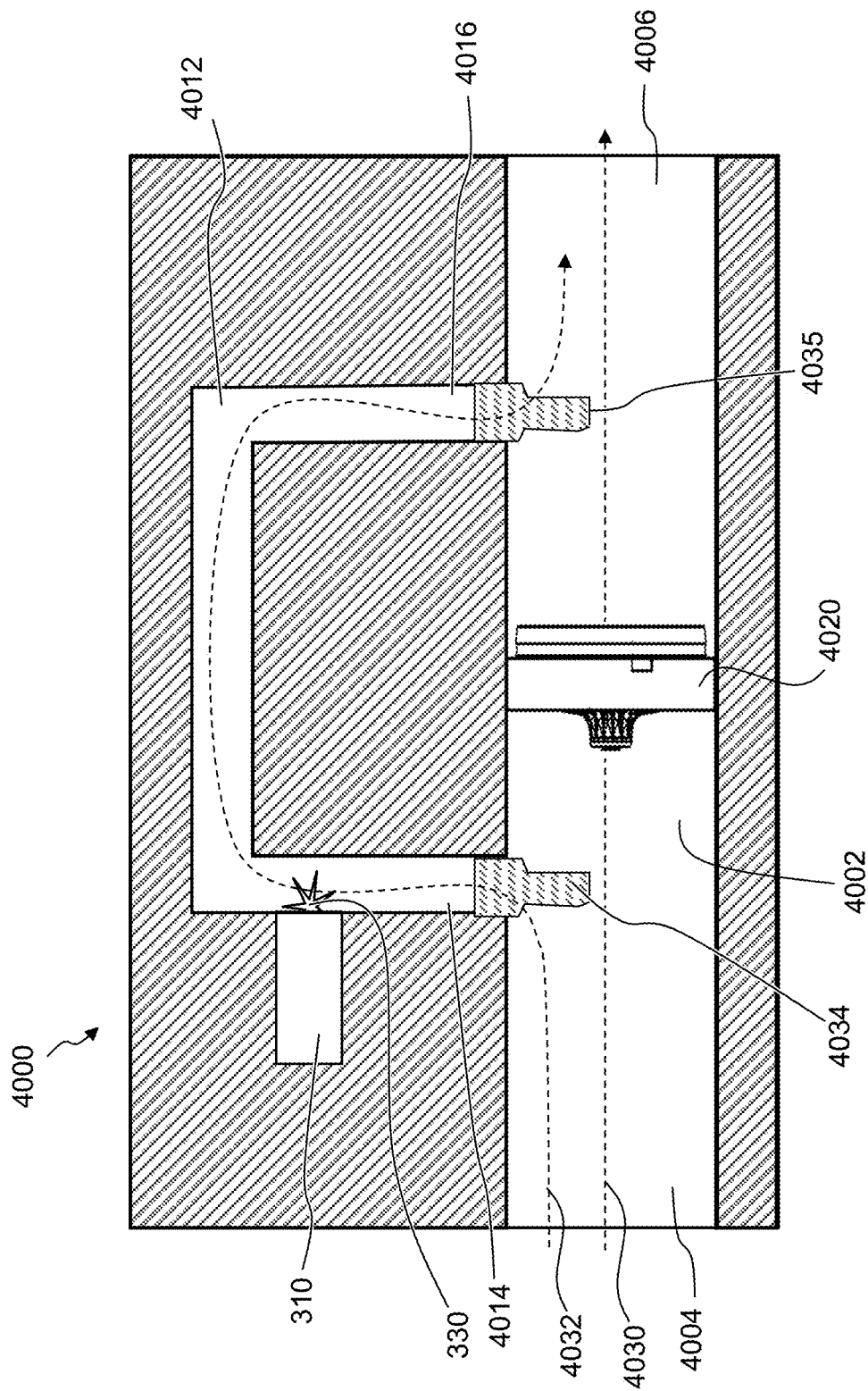
FIGS. 40A-40B illustrate simplified block diagram, cross-sectional views of an exemplary hydro-powered irrigation generator system, in accordance with some embodiments.

FIG. 40A illustrates a simplified block diagram, cross-sectional view of an exemplary hydro-powered irrigation generator system 4000, in accordance with some embodiments. The irrigation generator system 4000 includes a main conduit 4002, a generator conduit 4012, one or more generator systems 310 each cooperated with one or more rotor assemblies 330, and one or more pressure and/or flow control systems 4020 positioned within the main conduit 4002. The main conduit 4002 includes an inlet conduit 4004 configured to fluidly couple with one or more sources of fluid and receive fluid from the one or more fluid sources, and an outlet conduit 4006 positioned downstream of the inlet conduit 4004 and configured to fluidly couple with one or more fluid conduits and/or fluid receiving devices (e.g., valve, sprinkler, dripline, etc.).

The generator conduit 4012 includes a generator inlet conduit 4014 that is fluidly coupled with the main conduit 4002 upstream of the flow control system 4020, and a generator outlet conduit 4016 that fluidly coupled with the main conduit 4002 downstream of the flow control system 4020. The generator 310 is positioned such that the rotor assembly is cooperated with generator conduit 4012 to be physically activated by a flow of fluid through the generator conduit 4012 to cause rotation of the rotor assembly 330. The generator 310 generates electrical power in response to the rotation of the rotor assembly. Some embodiments include one or more optional flow filters 4034, 4035 cooperated with the generator inlet conduit 4014 to filter fluid from the main conduit 4002 and/or the generator outlet conduit 4016.

Figure 40B:
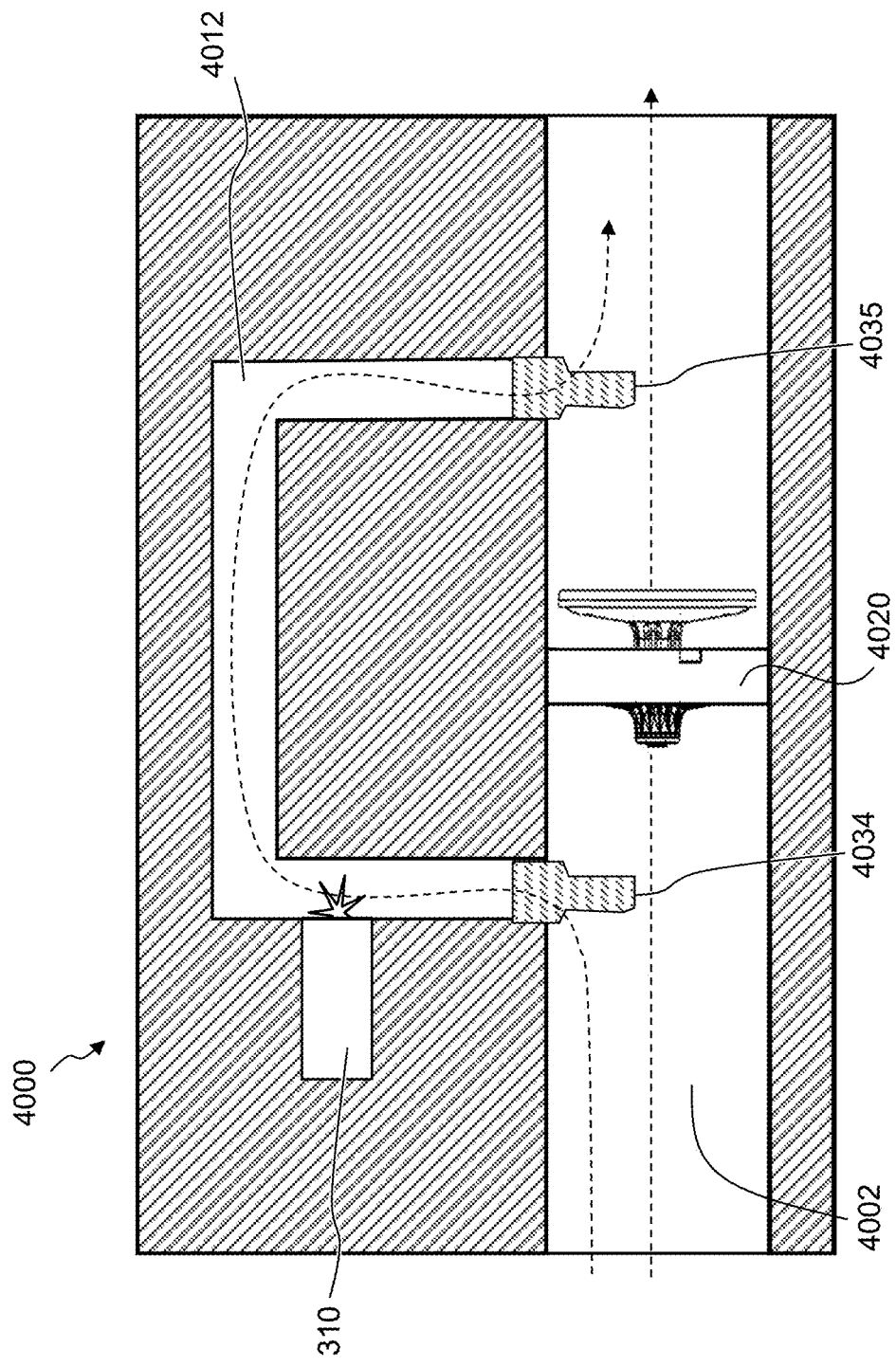

The flow control system 4020 is positioned within the main conduit 4002 and is configured to transition between a closed state to the open state in response to a water pressure within the inlet conduit 4004 and/or the main conduit upstream of the flow control system. FIG. 40B illustrates a simplified block diagram, cross-sectional view of the exemplary hydro-powered irrigation generator system 4000 of FIG. 40A with the flow control system 4020 in an exemplary open state of multiple different potential open positions, in accordance with some embodiments. Referring to FIGS. 40A-B, in some embodiments, the flow control system 4020 is configured to transition from a closed state (as illustrated in FIG. 40A) to an open state in response to the water pressure within the inlet conduit 4004 exceeding a flow control pressure threshold. The flow control system 4020, in some embodiments, when in the closed state prevents water from flowing along a primary flow path (illustrated as path 4030) from the inlet conduit 4004 and through the flow control system 4020 to exit the irrigation generator system 4000 through the outlet conduit 4006. Typically, however, the generator system 4000 enables fluid to flow, while the flow control system 4020 is in the closed state, from the inlet conduit 4004 and into the generator conduit 4012 to flow along a generator flow path (illustrated as path 4032) from the generator inlet conduit 4014 and exit the generator conduit through the generator outlet conduit 4016.

Further, the flow control system when in the open state enables water to flow along the main conduit 4002 and through the flow control system 4020. In some embodiments, while in the open state, the flow control system can operate to control a level of flow through the generator conduit 4012 and prevent a water flow through the generator conduit that is greater than a generator threshold flow rate. Still further, in some embodiments, the flow control system 4020 is configured to variably open between the closed state and a maximum open state as a function of a variable water pressure, within the main conduit 4002, between the first pressure threshold and a maximum pressure threshold. The ability to provide a variability in the amount or level of opening of the flow control system 4020 allows the flow rate to vary and enables a greater amount or a less amount of fluid to flow through the flow control system 4020 as the pressure within the main conduit 4002 and/or flow rate into the inlet conduit 4004 varies. Additionally, by providing the variable amount of opening of the flow control system, some embodiments further prevent a water flow greater than the threshold flow rate through the generator conduit 4012, at least while the water pressure is less than or equal to the maximum pressure threshold in part by controlling the amount of fluid that flows through the flow control system 4020 along the primary flow path 4030, and/or controlling the pressure within the generator conduit 4012. Accordingly, in some embodiments, the flow control system 4020 directs all of the flow into the generator conduit 4012 when the pressure within the main conduit 4002 is less than the flow control pressure threshold, and maintains a predefined flow rate and/or pressure within the generator conduit 4012 while the pressure within the main conduit 4002 is between the flow control pressure threshold and the maximum pressure threshold.

Figure 41A:
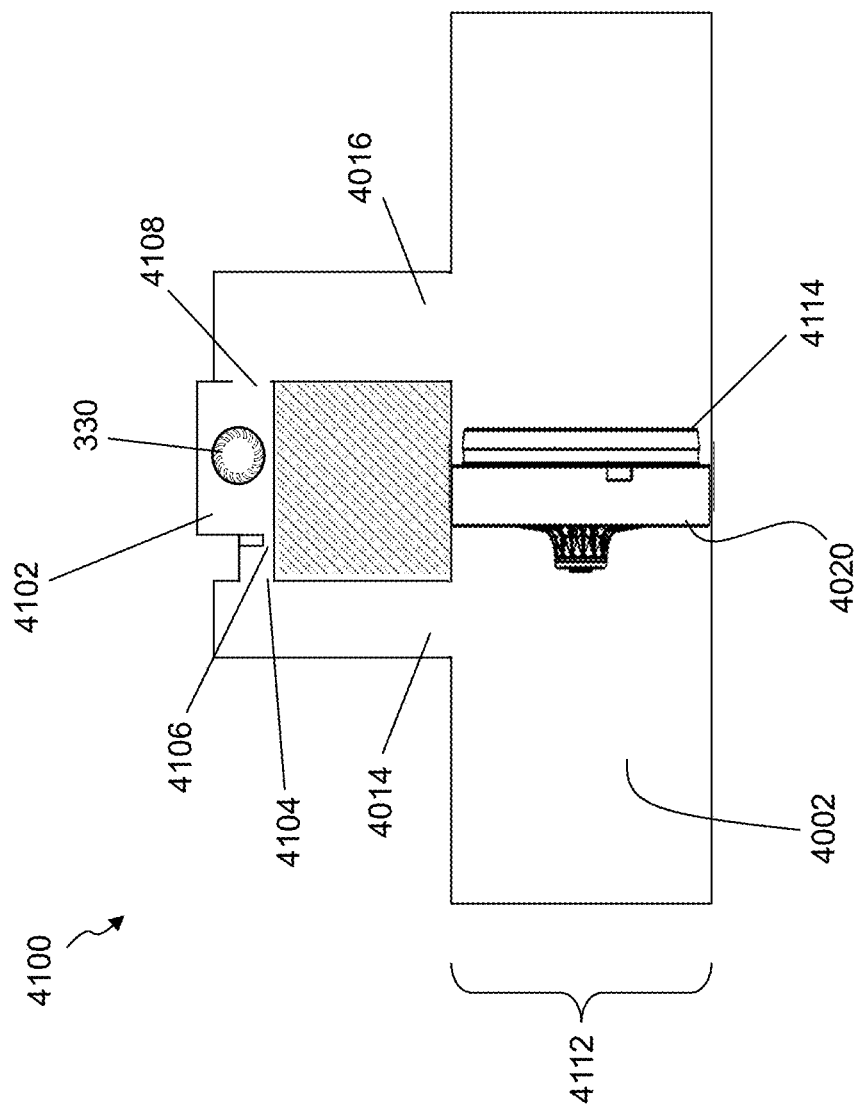
FIGS. 41A-41B illustrate simplified block diagram, cross-sectional views of an exemplary hydro-powered irrigation generator system with a flow control system, in accordance with some embodiments.
Figure 41B:
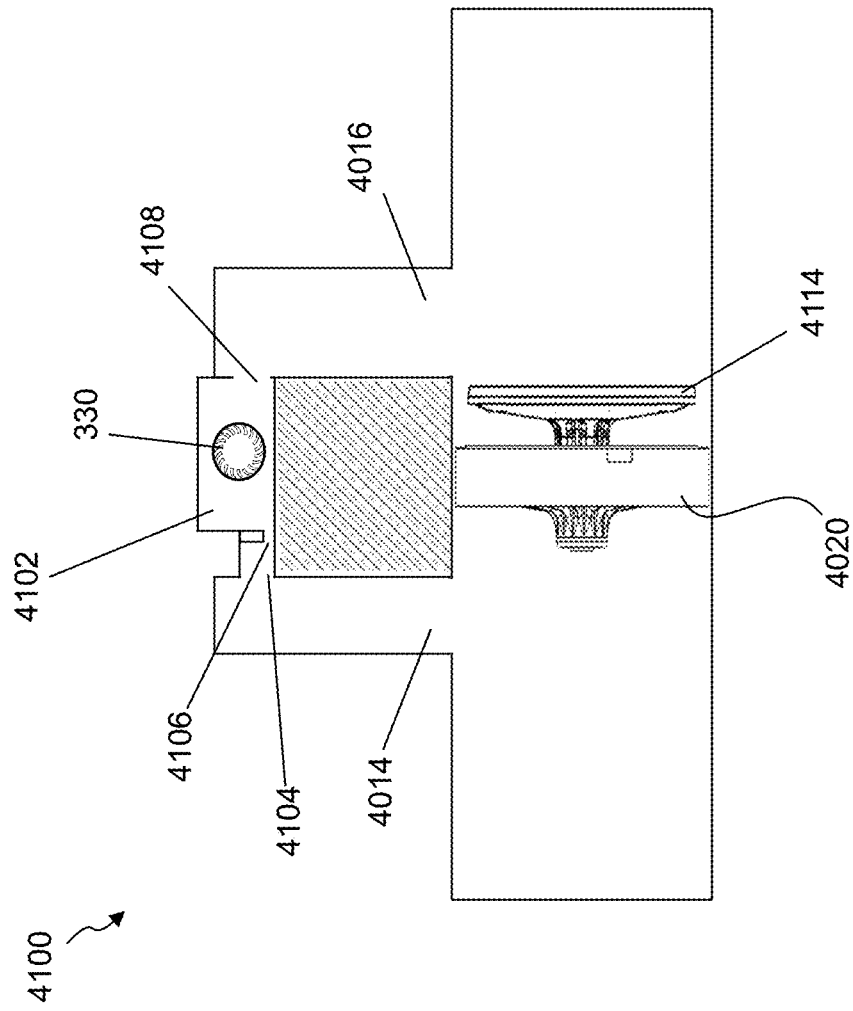

FIG. 41A illustrates a simplified block diagram, cross-sectional view of an exemplary hydro-powered irrigation generator system 4100 with a flow control system 4020 in a closed state, in accordance with some embodiments. FIG. 41B illustrates a simplified block diagram, cross-sectional view of the exemplary hydro-powered irrigation generator system 4100 with the flow control system 4020 in an exemplary open state, in accordance with some embodiments. Referring to FIGS. 41A-B, in some embodiments, the generator conduit 4012 includes a rotor cavity 4102 or chamber within which is positioned the rotor assembly 330. The rotor assembly and/or a part of the rotor assembly rotates within the rotor cavity 4102 in response to fluid flow from the generator conduit 4012 and through the rotor cavity 4102. Some embodiments include one or more optional flow filters 4034, 4035 (not shown) cooperated with the generator inlet conduit 4014 and/or the generator outlet conduit 4016.

In some embodiments, the generator conduit 4012 further includes a cavity inlet feed 4104 fluidly coupled between the generator inlet conduit 4014 and the rotor cavity 4102. The cavity inlet feed 4104 feeds and/or enables fluid to flow from the generator inlet conduit 4014 and into the rotor cavity 4102. Additionally, in some embodiments, a cross-sectional area of the cavity inlet feed 4104 is less than a cross-sectional area of the generator inlet conduit 4014. This at least in part induces an increased flow rate through the cavity inlet feed 4104.

In some embodiments the cavity inlet feed 4104 further includes one or more inlet apertures 4106 fluidly coupled between the cavity inlet feed 4104 and the rotor cavity 4102. Furthermore, the inlet aperture 4106, in some embodiments, has a cross-section area (or a sum of cross-sectional area of multiple inlet apertures) that is less than the cross-sectional area of the cavity inlet feed 4104. The cross-sectional area and/or dimensions of the cavity inlet feed 4104 and/or the inlet aperture 4106, in some embodiments, is proportional to an actual and/or predicted pressure difference and/or pressure drop across the flow control system 4020. The inlet aperture 4106 is configured to be aligned with the rotor assembly 330 and configured to direct the water flow at the rotor assembly. The one or more inlet apertures 4106, in some embodiments, are shaped to generate a stream, jet or other intended concentrated and/or directed flow of fluid that is directed at the rotor assembly. Further, the shape of the inlet aperture can be configured to generate the stream to induce a threshold force on the rotor assembly when there low flow in the main conduit (e.g., pressure within the main conduit is less than a low flow threshold).

The rotor cavity 4102 further includes one or more rotor cavity outlets 4108 fluidly coupling the rotor cavity 4102 with the generator outlet conduit 4016. In some embodiments, the cross-sectional area of the rotor cavity outlet 4108 (and/or sum of the cross-sectional areas when there are multiple rotor cavity outlets) is at least equal to or greater than the cross-sectional area of the inlet aperture 4106, and in some instances equal to or greater than the cross-sectional area of the cavity inlet feed 4104.

The main conduit includes a main flow aperture 4112 defining a flow area through which the water in the main conduit flows. In some embodiments, the flow aperture is defined by the interior walls of the main conduit 4002. Additionally or alternatively, some embodiments include one or more shoulders, extensions, recesses, protrusions, and/or other such structures forming at least part of the flow aperture. For example, some embodiments include an extended shoulder extending about the interior circumference of the main conduit that defines a minimum cross-sectional area of the main conduit 4002. Further, in some implementations, the flow control system 4020 is configured to be positioned against the shoulder establishing and maintaining a position of the flow control system within the main conduit. In other embodiments, the flow control system 4020 is additionally or alternatively secured within the main conduit through one or more other methods, such as through epoxy, heat welding, friction force, compression force, screws, rivets, tongue and groove, other such methods, or a combination of such methods. The flow control system 4020, in some embodiments, establishes and/or defines the flow aperture of the main conduit.

As described above, the flow control system 4020 is configured, in some embodiments, to repeatedly transition over time between the closed state and the maximum open state as a function of the pressure within the main conduit 4002. In some embodiments, the flow control system 4020 comprises a check-valve, pressure regulator or other such flow control system positioned across the flow aperture and/or a cross-sectional area of the main conduit, and extends across the flow area of the main conduit. The regulator comprises a biased diaphragm 4114 that is configured to variably move as a function of the biasing between a closed position and a maximum open position as a function of the water pressure within the inlet conduit 4004 when the water pressure is between an opening pressure threshold and a maximum pressure threshold. Further, in some embodiments, the variable opening of the diaphragm in part maintains a substantially constant generator water flow through the generator conduit 4012 while the water pressure within the main conduit 4002 is between the opening pressure threshold and the maximum pressure threshold. The biasing typically maintains the diaphragm in the closed state until the pressure within the main conduit reaches and/or exceeds the opening pressure threshold causing the diaphragm to shift away from a seal and creating an opening through which the fluid can flow. The biasing can be implemented through one or more springs, levers, flex-structures, other such methods or a combination of two or more of such biasing.

Figure 42:
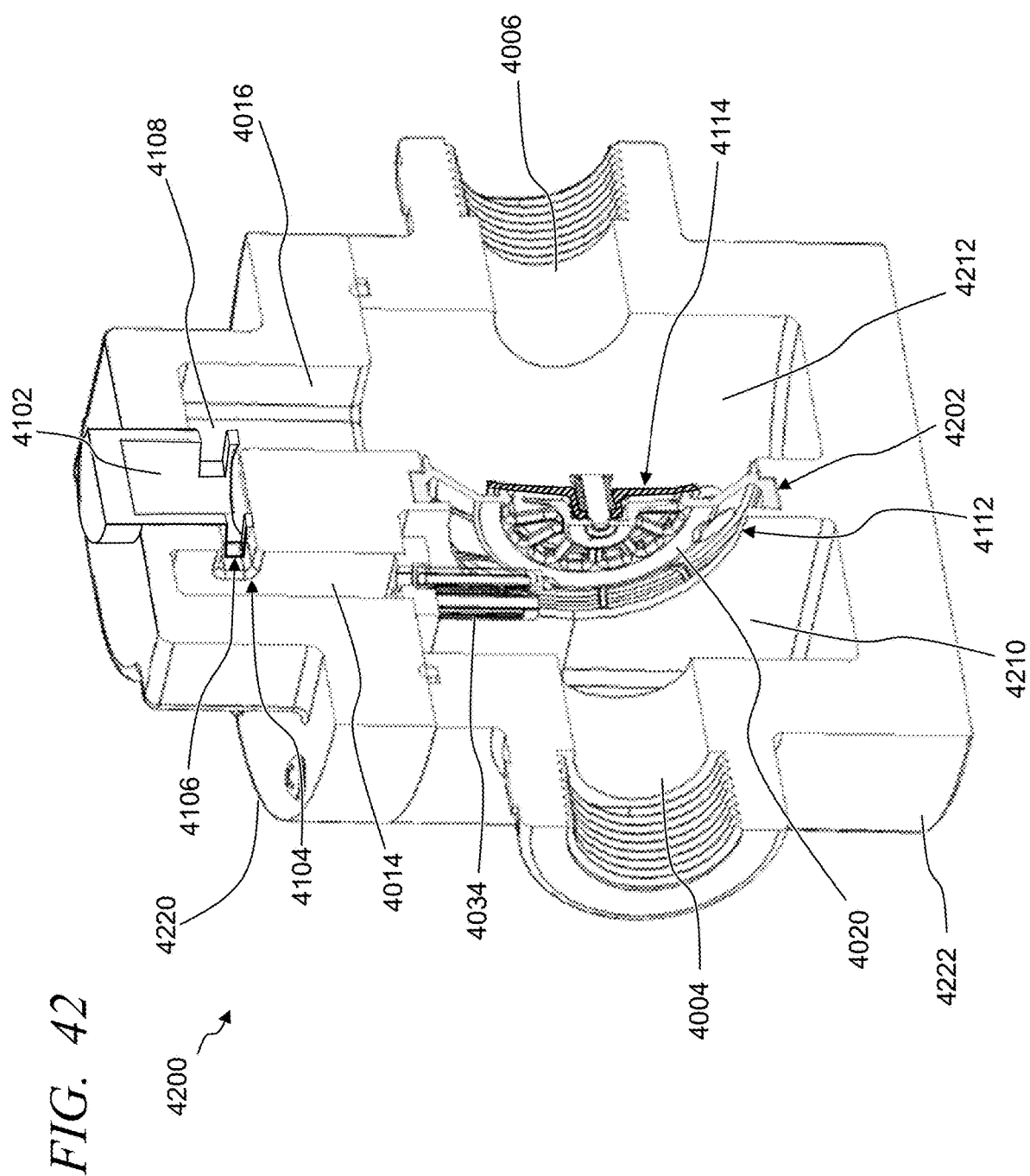
FIG. 42 illustrates a cross-sectional view of an exemplary irrigation generator system, in accordance with some embodiments.
Figure 43:
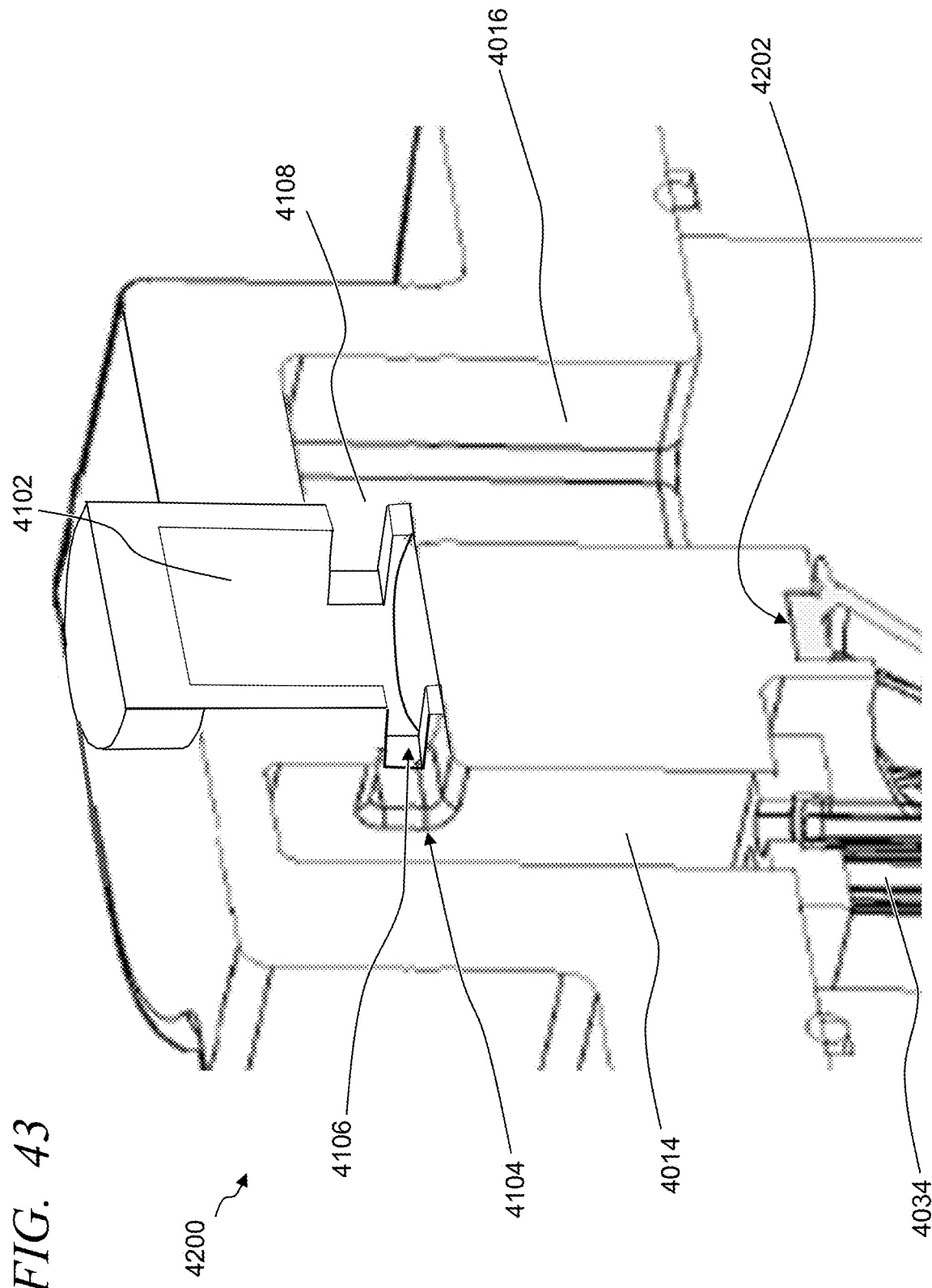
FIG. 43 illustrates an enlarged view of a portion of the irrigation generator, in accordance with some embodiments.

FIG. 42 illustrates a cross-sectional view of an exemplary irrigation generator system 4200, in accordance with some embodiments. FIG. 43 illustrates an enlarged view of a portion of the irrigation generator system 4200 of FIG. 43, including the rotor cavity 4102, in accordance with some embodiments. Referring to FIGS. 42-43, similar to the irrigation generator system 4100 of FIGS. 41A-41B, the irrigation generator system 4200 includes the inlet conduit 4004 and the outlet conduit 4006 with a fluid flow control system 4020 positioned within a flow aperture 4112. In some embodiments, the flow control system 4020 is positioned within a circumferential channel 4202 securing the flow control system. In some embodiments, the flow control system includes a biased diaphragm 4114 that is biased in the closed position. In response to upstream pressure the diaphragm transitions from the closed position to an open state when an amount of opening is dependent on the upstream pressure within the main conduit. The flow control system, in some embodiments further includes a frame, body or other such structure with a series of apertures, channels, other such passages or a combination of two or more of such passages that enable fluid to flow through the flow control system. Typically, when the diaphragm 4114 is in the closed state the diaphragm seals the passages preventing fluid from passing the flow control system.

The irrigation generator system 4200 further includes the generator inlet conduit 4014 feed by a set of one or more optional flow filters 4034. The generator inlet conduit 4014 fluidly cooperates with and/or extends into the cavity inlet feed 4104 that is fluidly cooperated with one or more rotor cavity inlet apertures 4106. One or more rotor cavity outlets 4108 provide a flow path from the rotor cavity 4102 to the generator outlet conduit 4016. The shape of the one or more rotor cavity outlets 4108 can be substantially any shape providing the desired flow rate, such as but not limited to oval, square, circular, triangular, and other such shapes.

In some embodiments, the irrigation generator system 4200 includes an upstream main conduit chamber 4210 positioned upstream of the flow control system that fluidly couples with inlet conduit 4004 and the generator inlet conduit 4014, and a downstream main conduit chamber 4212 positioned downstream of the flow control system and that fluidly couples with the generator outlet conduit 4016 and the outlet conduit 4006. In some embodiments, both of the upstream and downstream chambers are sized and/or shaped design to allow fluid to easily flow through the flow control systems 4020. While these geometries are less important at lower flow rates, these become beneficial at highest flow rates when the flow control systems 4020 is fully open. Flow restrictions in the upstream main conduit chamber 4210 and/or the downstream main conduit chamber 4212 can cause higher pressure losses for the generator. As described above, the flow control system 4020 provides flow and/or pressure regulation. In some implementations, the flow control system is configured to focus flow to the rotor cavity and rotor assembly at lower fluid flow rates. Further, in some embodiments, the one or more rotor assembly inlet apertures 4106 and/or the one or more rotor cavity outlets 4108 are configured to aid in optimize the flow path of the fluid through the rotor cavity. Still further, some embodiments incorporate the one or more turbine flow filters 4034 and/or flow filters 4035 to further aid in optimize the flow quantity, rate of flow and/or pressure of the fluid through the generator. For example, in some embodiments, the one or more inlet apertures 4106 are designed to maximum fluid velocity at low flow pressures and/or low flow rates (e.g., below a low flow control pressure threshold and/or a flow control pressure threshold activates the flow control system to transition to at least a partially open state). Further, some embodiments design the one or more inlet apertures 4106 and one or more rotor cavity outlets 4108 in combination with the turbine filtering through one or more flow filters 4034, 4035 to act as a fluid deterrent at higher flow rates and/or pressures.

The hydro-powered generator system of FIG. 42, in some embodiments, is electrically coupled with, cooperated with and/or incorporated into one or more of the above or below described embodiments, such as the valve systems, irrigation rotor systems, and/or other such systems. For example, in some embodiments, the generator system 4200 is incorporated in a self-powered valve system to generate power that can be used at least in part to control the operation of the one or more internal valves. Additionally or alternatively, some embodiments, further include one or more additional power generator systems (e.g., solar power generator systems, wind power generator systems, and/or other such systems). Generated power can be stored locally in one or more internal rechargeable power storage system 906. A control system, such as a valve control circuit 902 cooperated with one or more transceivers 904, can control the valve utilizing the power stored in the rechargeable power storage system. The self-powered valve system may be a stand-alone valve system or may be incorporated into another system, such as a rotor system 3500.

Figure 44:
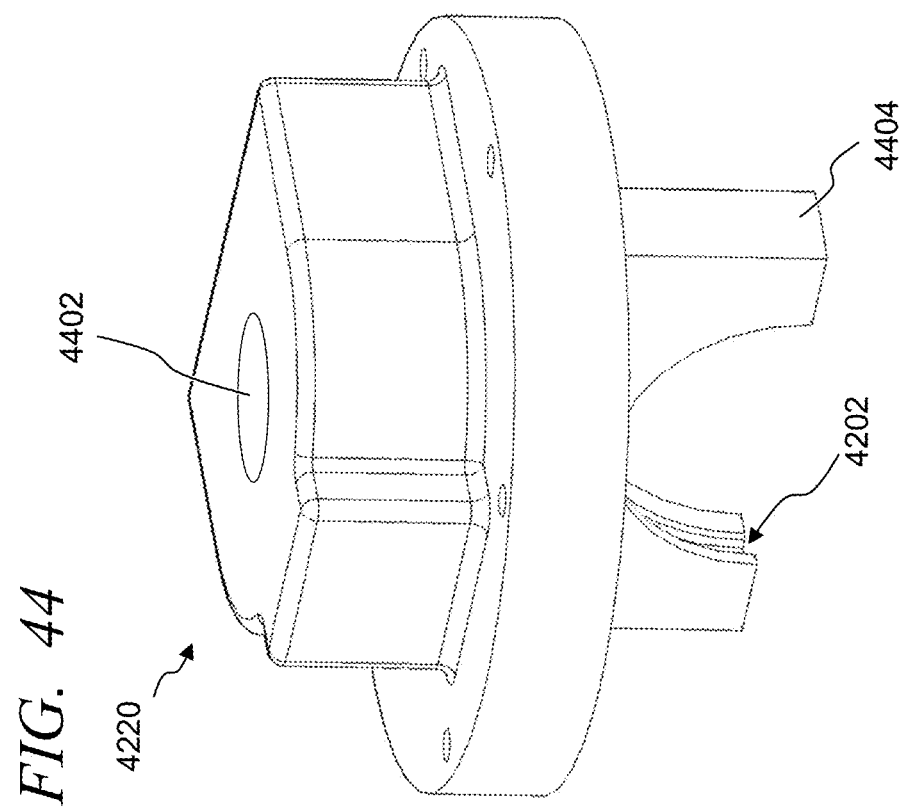
FIG. 44 illustrates a simplified, perspective view of an exemplary irrigation generator cap, in accordance with some embodiments.

The irrigation generator system 4200, in some embodiments, includes a generator cap 4220 that is removably secured with a main housing 4222 or body, such as through one or more screws, bolts, pins, threading, and/or other such methods or combination of two or more of such methods. One or more seals can be included (e.g., o-ring, gasket, etc.) between the cap 4220 and the main housing 4222 to prevent leaking and/or maintain pressure within the generator conduit and/or main conduit. The removal of the cap 4220 enables access into the main conduit and/or into generator conduit, such as for maintenance, replacement of components, removal of debris, and/or other such reasoning. FIG. 44 illustrates a simplified, perspective view of an exemplary irrigation generator cap 4220 in accordance with some embodiments. The cap, in some implementations, includes one or more protrusions 4404 that cooperate with similar structures within the main conduit to form some or all of the main flow aperture 4112. For example, in some embodiments, the protrusion 4404 comprises and/or forms a portion of the circumferential channel 4202 into which the flow control system is positioned and/or secured. The removal of the cap 4220 enables insertion of the flow control system, as well as removal, replacement and/or other such maintenance of the flow control system.

Figure 45:
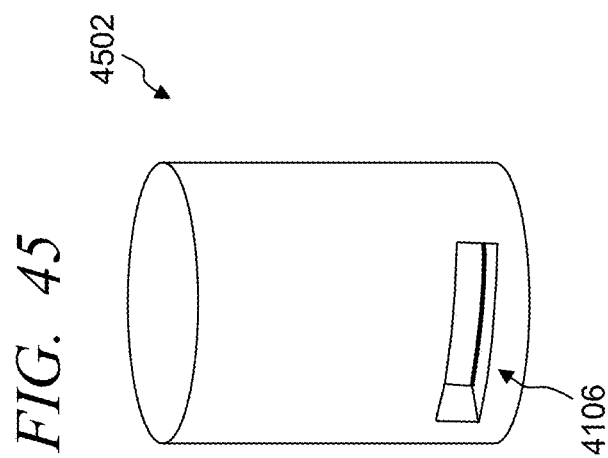
FIG. 45 illustrates a simplified representation of an exemplary removable rotor cavity body, in accordance with some embodiments.

Referring to FIGS. 42-44, in some implementations, some or all of the generator conduit is formed within the cap 4220. Similarly, some or all of the rotor cavity 4102 can be formed, in some embodiments, in the cap. In other embodiments, the rotor cavity 4102 is formed within a removable rotor cavity body that is removable from the cap 4220. FIG. 45 illustrates a simplified representation of an exemplary removable rotor cavity body 4502, in accordance with some embodiments. The removable rotor cavity body 4502 can be secured with the cap through one or more screws, bolts, rivets, pins, threading, and/or other such methods. One or more gaskets, o-rings and/or other such sealing mechanisms can be utilized between the removable rotor cavity body 4502 and the cap 4220. In some embodiments, the rotor cavity body 4502 includes and/or forms the inlet apertures 4106 and/or rotor cavity outlet 4108 (not shown in FIG. 45). The cap 4220 can include a rotor cavity receiving port 4402 that received the removable rotor cavity body. This can allow the rotor cavity to be replaced, and in some instances some or all of the rotor assembly. Additionally or alternatively, the removable rotor cavity body may provide access to the rotor cavity to enable maintenance and/or replacement of some or all of the rotor assembly.

Figure 46:
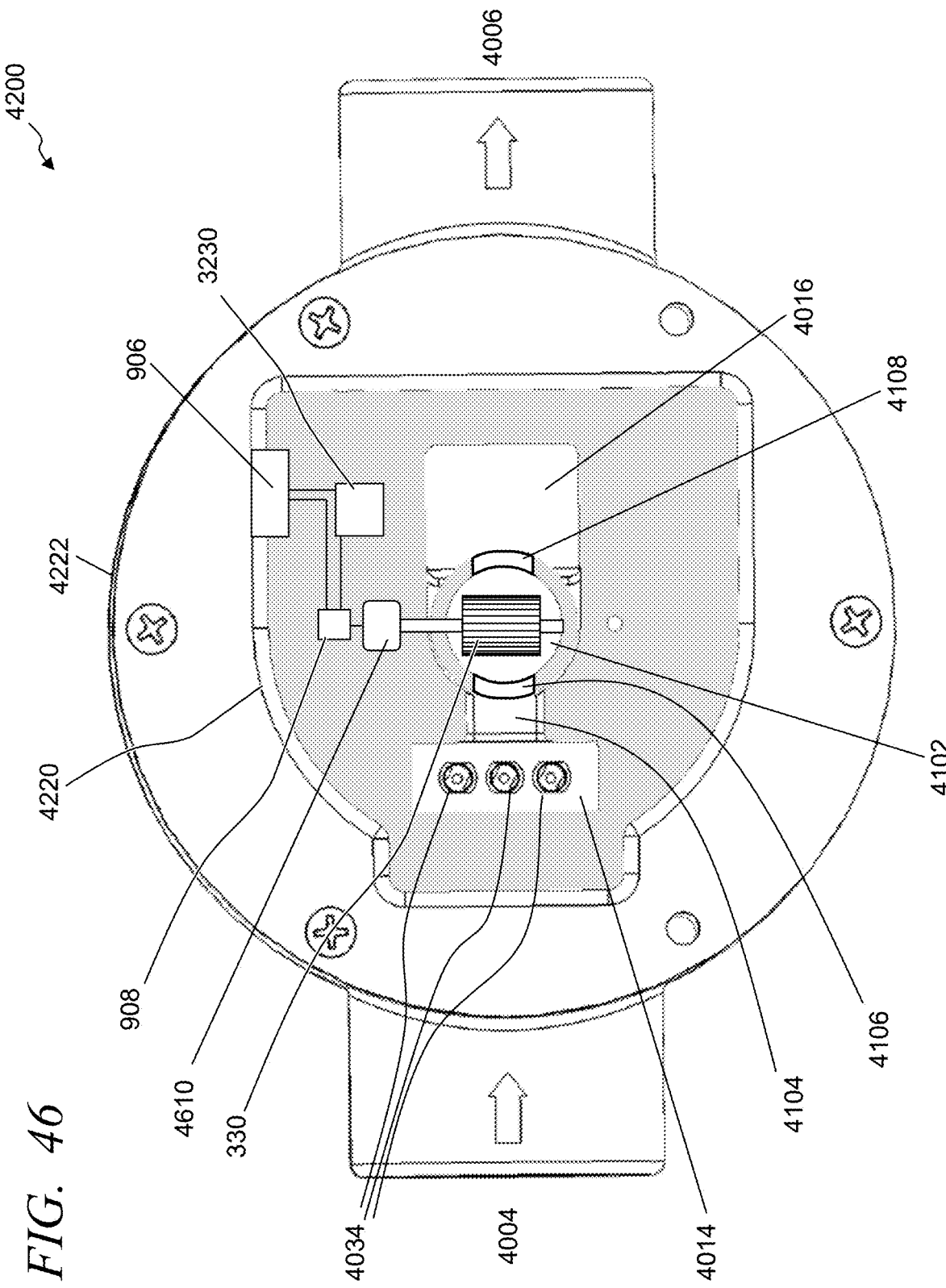
FIG. 46 illustrates a simplified, partially exposed, overhead view of the irrigation generator system, in accordance with some embodiments.

FIG. 46 illustrates a simplified, partially exposed, overhead view of the irrigation generator system 4200, in accordance with some embodiments. One or more rotor assemblies 330 are positioned within the rotor cavity 4102 and configured to rotate in response to fluid flowing through the rotor cavity. The rotor assembly 330 includes and/or coupled with an electrical generator 4610 that generates electrical power in response to the rotation of the rotor assembly 330. In some embodiments the generator is electrically coupled with one or more bridge rectifiers 908 coupled with an output of the generator. Electrical power from the generator 4610 can be stored in one or more rechargeable power storage systems 906 that can be used to supply power to one or more external components of an irrigation system. For example, the bridge rectifier circuit can be configured to supply power from the generator to the rechargeable power storage system that is configured to repeatedly receive and store the electrical power generated by the generator and supplied through the bridge rectifier. Some embodiments include one or more generator control circuits 3230 that controls one or more of the release of power from the rechargeable power storage systems, activation of the generator, and/or other such functions as described above. The irrigation generator system can include electrical circuitry similar to or the same as those described above. In some embodiments, the generator control circuit 3230 can be similar to the generator control circuit described above. Further, the generator control circuit 3230 in some embodiments, is a stand-alone system that operates independent of other systems. In other implementations, the generator control circuit 3230 is part of a generator control system, such as those described above.

Figure 47A:
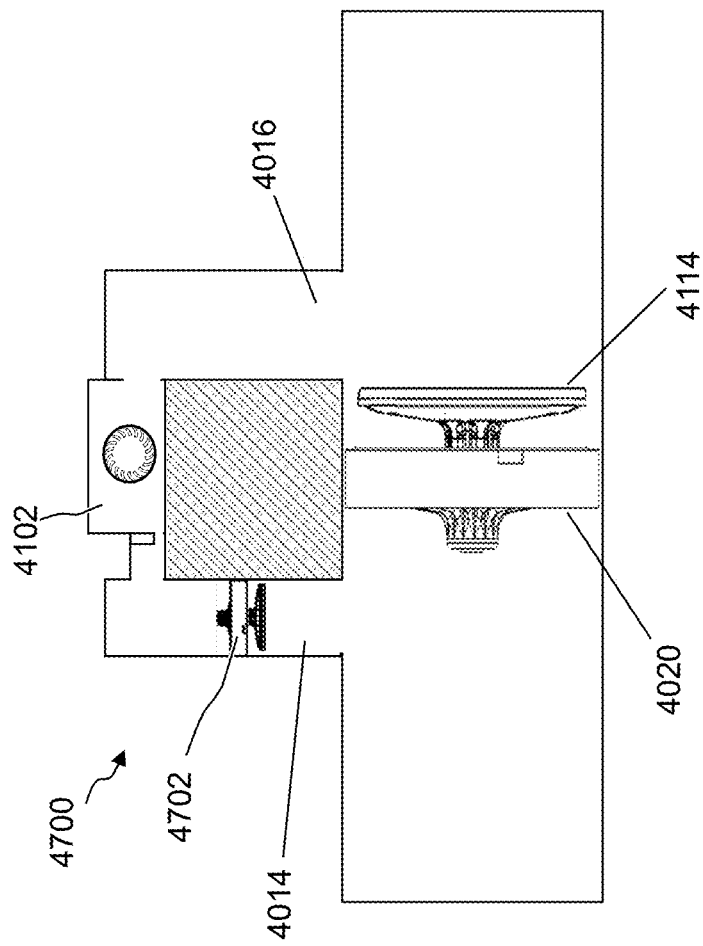
FIGS. 47A-47B illustrate simplified cross-sectional views of an exemplary irrigation generator system, in accordance with some embodiments.

FIG. 47A illustrates a simplified cross-sectional view of an exemplary irrigation generator system 4700, in accordance with some embodiments. The irrigation generator system 4700 includes one or more generator protection systems 4702 cooperated with the generator inlet conduit 4014. The generator protection system 4702 is configured to control a flow of water to the rotor cavity 4102. In some embodiments, the generator protection system 4702 is configured to control a flow of water to the rotor cavity 4102 as a function of pressure in the generator inlet conduit. This control can be an automated control that responds to the pressure and/or flow rate in the generator conduit. In some embodiments, for example, the flow generator protection system 4702 includes one or more pressure regulators, pressure regulation valves, check-valves, other such flow restricting devices, or a combination of two or more of such flow restricting devices configured to restrict or reduce flow into the rotor cavity 4102.

Figure 47B:
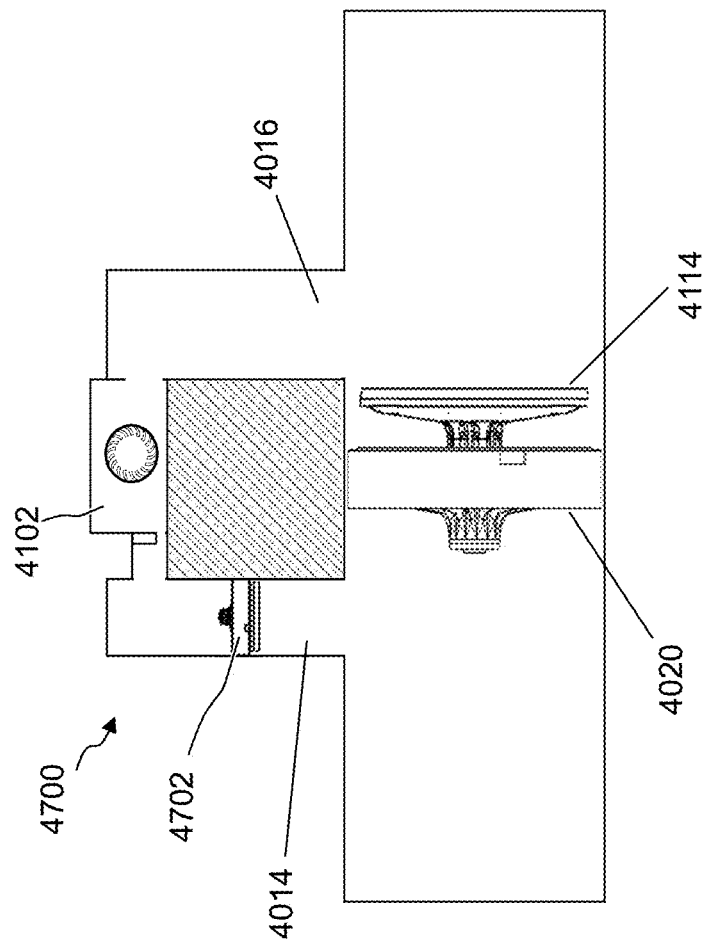

FIG. 47A shows the generator protection system 4702 in an exemplary open state enabling fluid to flow from the main conduit, through the generator conduit, into and through the rotor cavity 4102. FIG. 47B illustrates a simplified cross-sectional view of the exemplary irrigation generator system 4700 in an exemplary closed state, in accordance with some embodiments. Referring to FIGS. 47A-47B, in some embodiments, the generator protection system 4702 variably closes or reduces the opening through the generator conduit as the pressure within the generator conduit increases above an initial protection pressure threshold and continues to decrease the opening as pressure within the generator conduit increases. In some embodiments, the generator protection system continues to allow fluid to flow through the rotor cavity while limiting pressure and/or flow within the generator cavity to a maximum rotor pressure threshold and/or maximum rotor flow threshold. In other embodiments, generator protection system continues to decrease the opening as the generator conduit pressure within the generator conduit increases until the generator protection system 4702 is in a closed state when the generator conduit pressure and/or a flow rate within the generator conduit is greater than a maximum protection pressure threshold and/or a maximum protection flow rate. This fully closing of the generator protection system can be advantageous when excess fluid flows through the generator system, when the irrigation system is being prepared for winter (e.g., when a large amount of air is forced through an irrigation system to flush out water before freezing can occur), and/or other such situations. In some embodiments, the generator protection system 4702 comprises a frame, body or other structure that supports one or more diaphragms that are spring biased in the open position. Pressure and/or flow rate on the diaphragm causes the diaphragm to transition between fully open and fully closed as a function of the pressure and/or flow rate. Again, in some embodiments, the generator protection system 4702 autonomously transitions to a closed state when the pressure within the generator conduit is greater than a maximum protection pressure threshold. In other embodiments, one or more control systems activate and/or control the protection system.

Figure 48A:
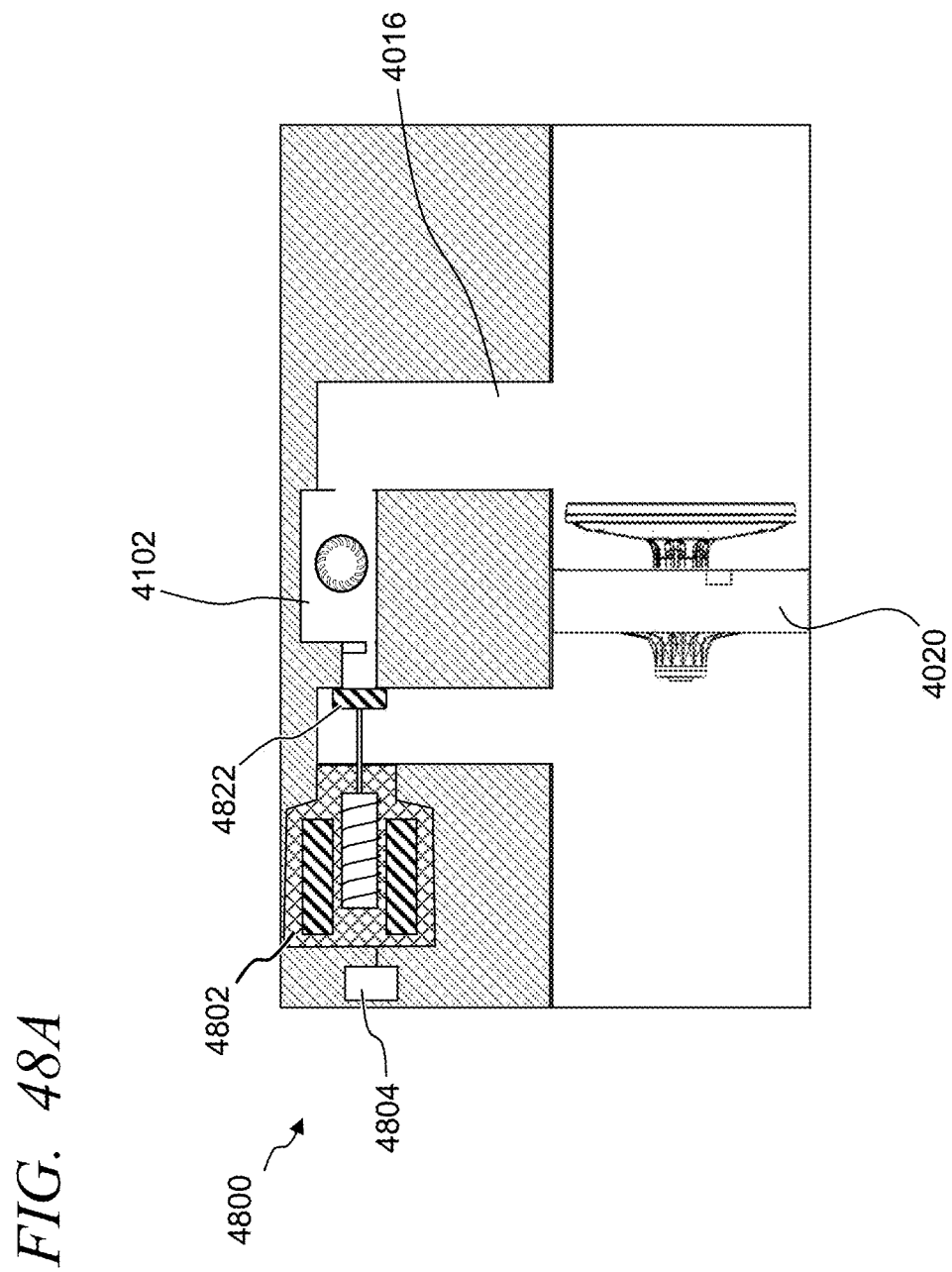
FIG. 48A illustrates a simplified, cross-sectional view of an exemplary irrigation generator system that includes an actuatable generator protection system, in accordance with some embodiments.

FIG. 48A illustrates a simplified, cross-sectional view of an exemplary irrigation generator system 4800 that includes an actuatable generator protection system 4802, in accordance with some embodiments. The actuatable generator protection system 4802 can include one or more solenoids, valves, gates and/or other such devices that can be activated to control a flow into and/or pressure within the rotor cavity 4102. For example, the actuatable generator protection system 4802 in some embodiments includes a solenoid system with a plunger 4822 (similar to the solenoid systems described above) that can be controlled to move in controlling an amount of flow and/or pressure, and/or prevent a flow into the rotor cavity 4102 and/or the generator conduit depending on placement and/or orientation. In some embodiments, the solenoid system, when activated, is configured to transition from an open state to a closed state closing the rotor cavity and/or the generator inlet conduit from the main conduit and preventing a flow from the main conduit through the rotor cavity and/or generator conduit. In other embodiments, the solenoid system may be controlled to control a level of opening in controlling the flow rate and/or pressure within the rotor cavity.

In some embodiments, the irrigation generator system 4800 includes one or more protection control circuits 4804 that communicatively couples with the generator protection system 4802 to control whether the generator protection system is in an open state or a closed state. Similarly, in some implementations, the protection control circuit is configured to control a level of how open the generator protection system 4802 is open. For example, a pressure sensor, a flow sensor, rate of rotation of the rotor assembly, a rate of power generation, other such factors, or a combination of two or more of such factors can be monitored to determine a pressure and/or flow rate through the rotor cavity 4102, and the protection control circuit can use that information in adjusting a level of how open and/or whether the protection control system is open. Similarly, in some embodiments, the protection control circuit 4804 can be controlled by an external user through one or more wired and/or wireless transceivers, user interface and/or other such methods to control whether the generator protection system 4802 is open or closed and/or a level of how open. Still further, in some embodiments, the protection control circuit 4804 is communicatively coupled with a generator control circuit 3230 or is part of a generator control circuit 3230.

Figure 48B:
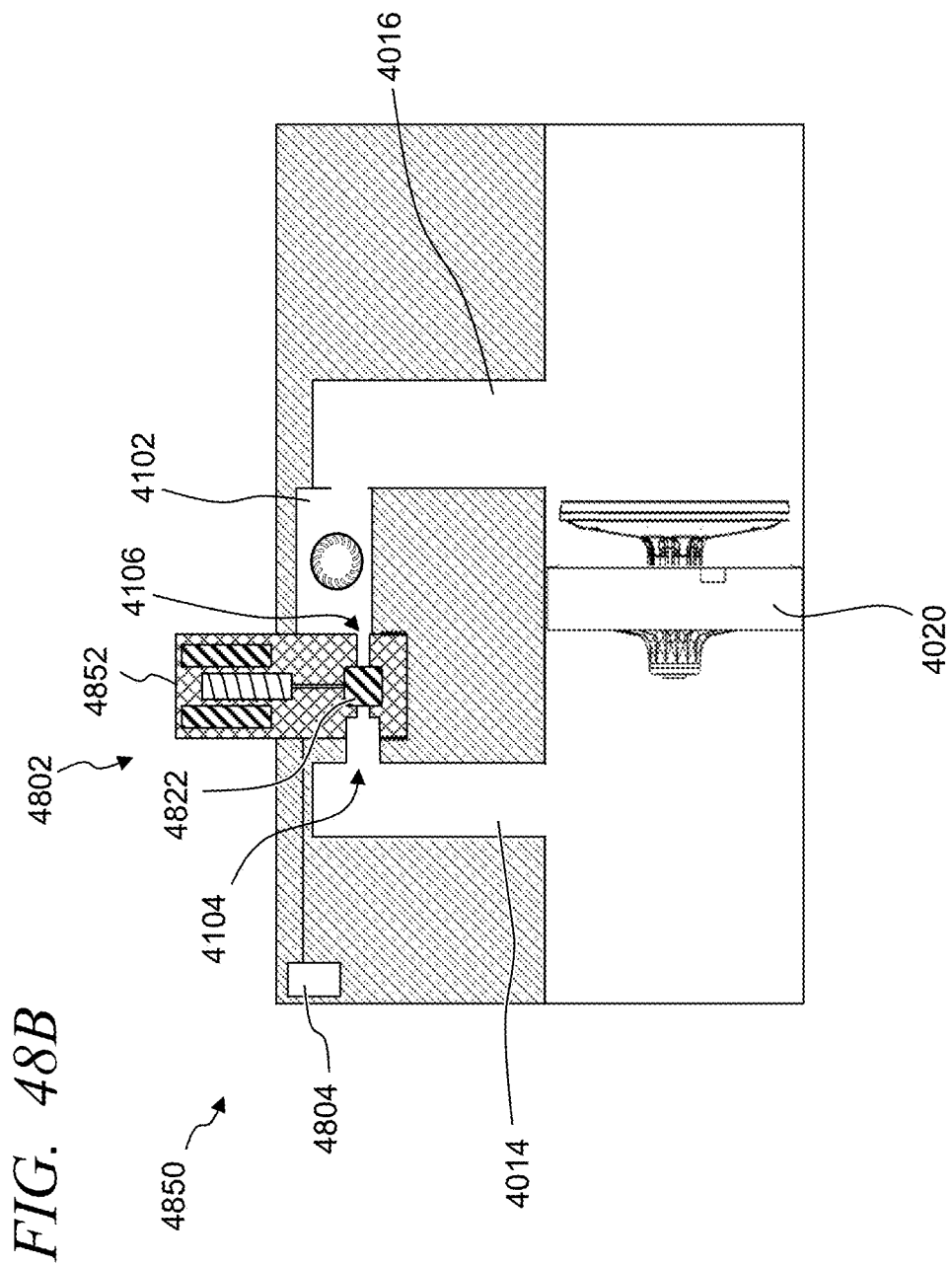
FIGS. 48B-48C illustrate simplified, cross-sectional views of an exemplary irrigation generator system that includes an actuatable generator protection system, in accordance with some embodiments.
Figure 48C:
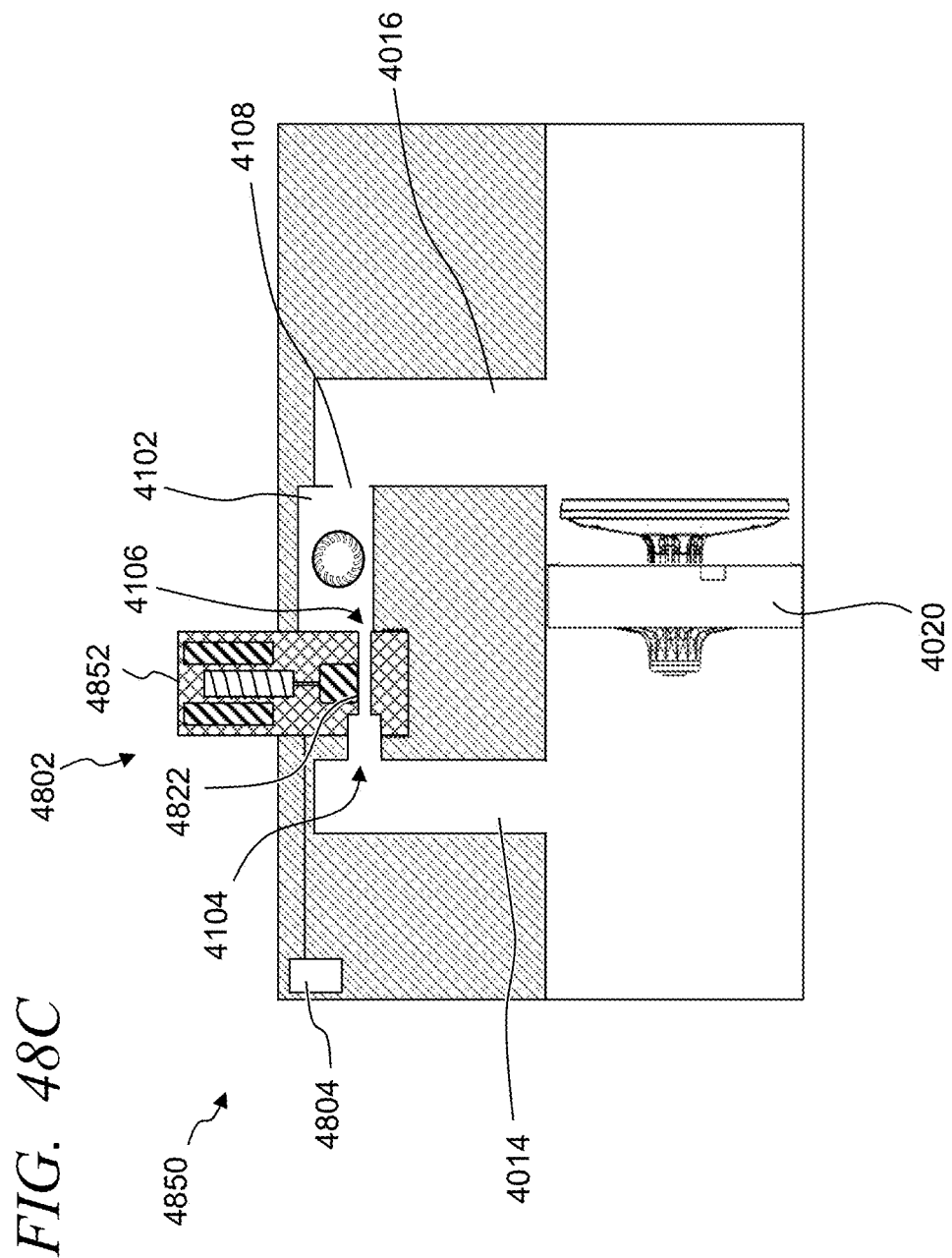

In some embodiments, the solenoid system 4852 fluidly couples with the cavity inlet feed 4104 and the inlet aperture 4106. Further, in some embodiments, some or all of the cavity inlet feed 4104 and/or some or all of the one or more inlet apertures 4106 are formed as part of the solenoid system of the generator protection system 4802. FIG. 48B illustrates a simplified, cross-sectional view of an exemplary irrigation generator system 4850 that includes an actuatable generator protection system 4802 comprising a solenoid system 4852 in a closed state, in accordance with some embodiments. FIG. 48C illustrates a simplified, cross-sectional view of the exemplary irrigation generator system 4850 with the solenoid system 4852 in an exemplary open state, in accordance with some embodiments. The actuatable solenoid system 4852 forms part of the cavity inlet feed 4104 and fluidly aligns with the portion of the cavity inlet feed of the housing of the generator system. Similarly, the solenoid system 4852 forms at least part of the inlet aperture 4106 and is fluidly cooperated with the rotor cavity 4102. The plunger 4822, in some embodiments, is configured to transition between a closed state (as illustrated in FIG. 48B) and an open state (e.g., as exemplary illustrated in FIG. 48C in a maximum open position) to control the flow of fluid from the cavity inlet feed 4104 to the inlet aperture 4106 to be delivered into the rotor cavity 4102. In some embodiments, the solenoid system 4852 may be controlled to control a level of opening in controlling the flow rate and/or pressure within the rotor cavity.

In some embodiments, the generator protection system 4802 includes and/or couples with one or more protection control circuits 4804 that communicatively couples with the solenoid system 4852 to control whether the generator protection system is in an open state or a closed state. Similarly, in some implementations, the protection control circuit is configured to control a position of the plunger 4822 in controlling a level of how open the solenoid system is in providing variable opening and thus variable control over the flow rate and/or pressure. For example, a pressure sensor, a flow sensor and/or a rate of power generation can be monitored to determine a pressure and/or flow rate through the rotor cavity 4102, and the protection control circuit 4804 can use that information in adjusting a level of how open and/or whether the protection control system is open. Similarly, in some embodiments, the protection control circuit 4804 can be controlled by an external system and/or user through one or more wired and/or wireless transceivers, user interface and/or other such methods to control whether the generator protection system 4802 is open or closed and/or a level of how open. Still further, in some embodiments, the protection control circuit 4804 is communicatively coupled with a generator control circuit 3230 or is part of a generator control circuit 3230. As described above, the generator protection system 4802 provides protection at least for the rotor assembly in the event of excess pressure and/or flow through the rotor cavity. This can include an excess water flow, and high pressure air flow (e.g., air-blow off for winterization of an irrigation system), and/or other such conditions that may cause damage to the rotor assembly and/or other components of the generator system 4850.

In some embodiments, the size, diameter and/or cross-sectional area of inlet aperture 4106 (or a sum of cross-sectional area of multiple inlet apertures) is less than the cross-sectional area of the cavity inlet feed 4104. The cross-sectional area and/or dimensions of the cavity inlet feed 4104 and/or the inlet aperture 4106, in some embodiments, is proportional to an actual and/or predicted pressure difference and/or pressure drop across the flow control system 4020. As one non-limiting example, a cross-sectional area of the inlet aperture 4106 can be defined to result in a pressure drop that is similar to or equal to a maximum predicted pressure drop caused in the main conduit by the flow control system 4020. In other embodiments, the protection control circuit 4804 is configured to adjust a level of opening by controlling the level of the plunger 4822 to control a level of flow and/or opening of the inlet aperture 4106 into the rotor cavity 4102 as a function of and/or proportional to the pressure drop across the flow control system 4020.

Figure 48D:
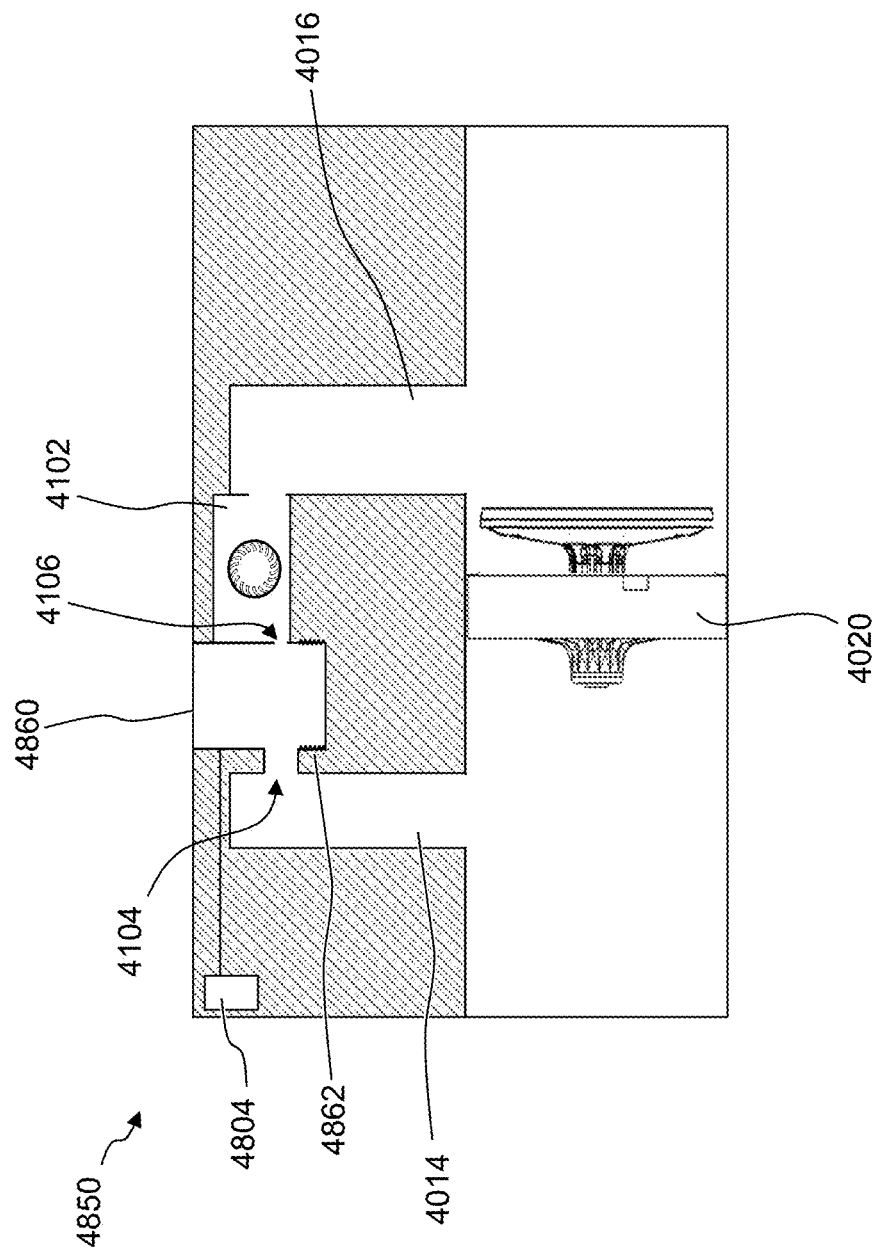
FIG. 48D illustrates a simplified, cross-sectional view of an exemplary irrigation generator system comprising a solenoid port, in accordance with some embodiments.

In some implementations, the solenoid system 4852 is removable from the generator system to enable maintenance of the solenoid system and/or the generator system, and/or to replace the solenoid system. FIG. 48D illustrates a simplified, cross-sectional view of the exemplary irrigation generator system 4850 with the solenoid system 4852 removed from a solenoid port 4860, in accordance with some embodiments. The solenoid port 4860 includes one or more securing mechanisms 4862 configured cooperate with corresponding securing mechanisms of the solenoid system in receiving and securing the solenoid system 4852 with the generator system 4850. The securing mechanisms can include threading, tongue and groove, compression fit, friction fit, spring biasing, bolts, other such securing mechanism, or a combination of two or more of such securing mechanisms. In some embodiments the securing mechanisms further aids in aligning the portion of the cavity inlet feed 4104 of the solenoid system with the portion of cavity inlet feed of the generator system 4850, and/or aligning the portion of the inlet apertures 4106 of the solenoid system with the portion of inlet apertures of the generator system 4850. Still further, some embodiments includes one or more sealing mechanisms to prevent leaks around the solenoid system. The sealing mechanisms can include substantially any relevant sealing mechanism, such as but not limited to one or more o-rings, one or more gaskets, one or more washers, other such mechanisms, or a combination of two or more of such mechanisms.

Figure 49:
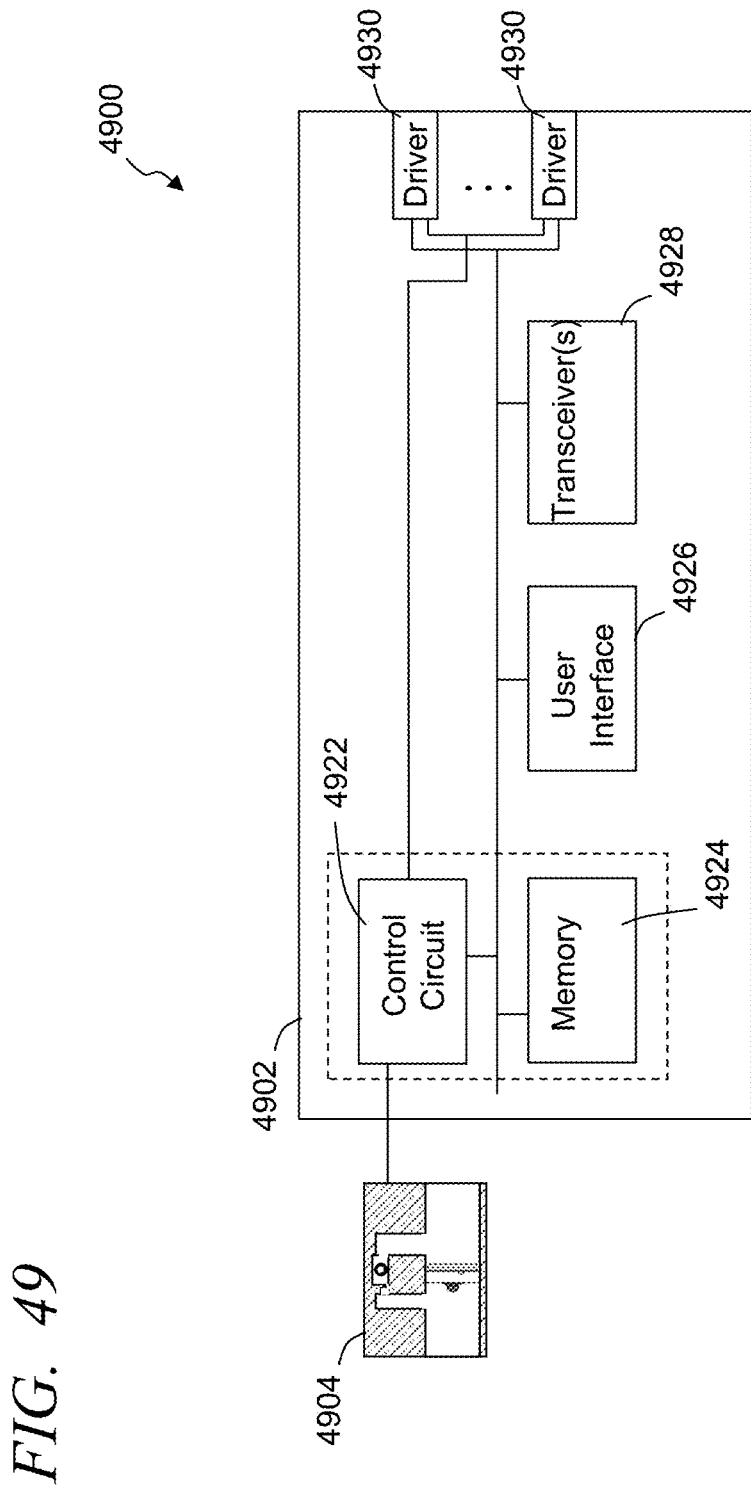
FIG. 49 illustrates a simplified block diagram of an irrigation system, in accordance with some embodiments.

In some embodiments, an irrigation generator system includes and/or is cooperated with one or more irrigation control devices that are powered by the electrical power generated by the generator. FIG. 49 illustrates a simplified block diagram of an irrigation system 4900 that includes an irrigation control device 4902 electrically coupled with and/or including one or more irrigation generator systems 4904, in accordance with some embodiments. The irrigation generator system 4904, in some embodiments, is one of or is similar to one or more of the generator systems described above and further below (e.g., irrigation generator systems 3200, 3300, 4000, 4100, 4200, 4700). Similar to the irrigation devices described above and further below, in some embodiments, the irrigation control device comprises a wireless transceiver 4928, and an irrigation control device control circuit 4922 communicatively coupled with the wireless transceiver and configured to receive and transmit communications via the wireless transceiver, and to implement an irrigation schedule stored local in one or more memory 4924 at the irrigation control device and output valve signals to cause activation of one or more valves and/or valve drivers 4930. In some embodiments, the irrigation control device optionally includes one or more user interfaces 4926 (e.g., one or more buttons, one or more switches, one or more lights or other indicators, one or more displays, one or more touch screens, etc.). In other implementations, the irrigation control device additionally or alternatively wirelessly communicates with a remote device that provides a graphical user interface to receive input and/or control from a user instead of through the user interface 4926.

Figure 50:
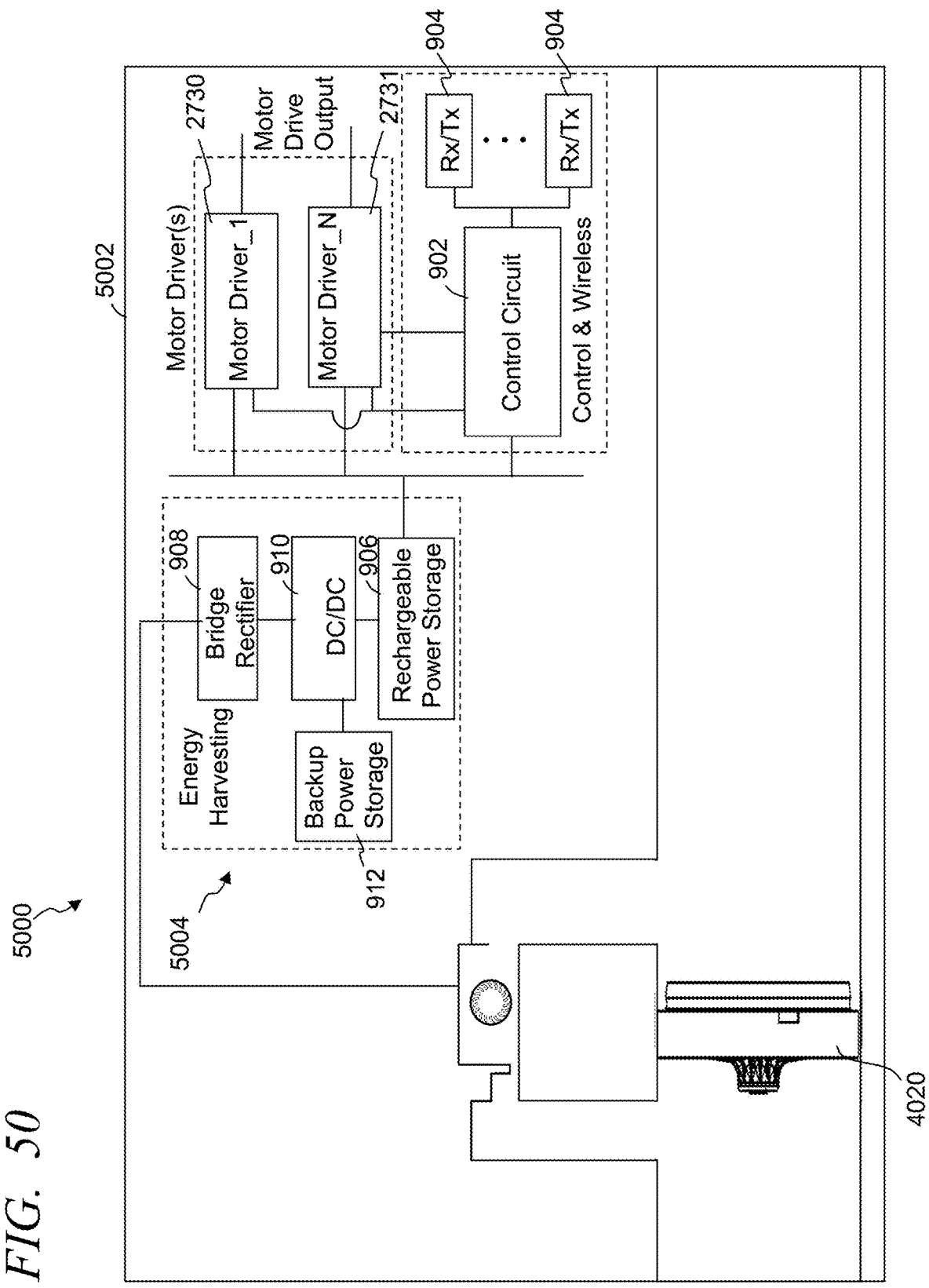
FIG. 50 illustrates a simplified block diagram of an exemplary valve control system, in accordance with some embodiments.

In some embodiments, the irrigation generator system is incorporated into and/or electrically coupled with one or more wireless valve systems. The one or more valve systems are typically separate from an irrigation control device (e.g., irrigation control device 4902). FIG. 50 illustrates a simplified block diagram of an exemplary valve control system 5000, in accordance with some embodiments. The valve control system 5000 includes a housing 5002 separate and remote from the irrigation control device. The main conduit 4002, the generator conduit 4012 and the generator 310 are positioned within the housing 5002. A valve control system 5004 is positioned and maintained within the housing 5002. In some embodiments, the valve control system 5004 includes a rechargeable power storage system 906 electrically coupled with the generator and configured to repeatedly receive and store electrical power generated by the generator. The valve control system further includes one or more wireless valve transceivers 904, one or more drive outputs 2730, 2731 electrically coupled with the rechargeable power storage system 906, and one or more valve control circuits 902 electrically coupled with and receiving operational power from the rechargeable power storage system 906. The valve control circuit 902 is communicatively coupled with the one or more wireless valve transceivers 904 and the drive outputs 2730, 2731. The valve control circuit 902 is configured to activate, in response to a valve signal wirelessly received from the irrigation control device, the drive output to output a drive signal powered from the rechargeable power storage system to power an irrigation valve to transition between a closed state and an open state.

In some embodiments, the generator system is part of a valve system. The valve system can include a rechargeable power storage system electrically coupled with the generator and configured to receive and store electrical power generated by the generator, a wireless transceiver, and an irrigation valve. One or more drive outputs can electrically couple with the rechargeable power storage system, and a control circuit can communicatively couple with the wireless transceiver and the drive output. The control circuit is configured to receive power from the rechargeable power storage system and to activate, in response to a valve activation signal, the drive output to output a first drive signal configured to activate the irrigation valve.

In some embodiments, the generator system is part of a rotor system comprising a riser configured to rise from a non-active position to an active position and emit water from at least one water emitter of the riser in the active position, a valve system cooperated with the main conduit and configured to control the flow of water from the main conduit to the at least one water emitter, a wireless transceiver, a drive output electrically coupled with the rechargeable power storage system and the valve system, and a control circuit. The control circuit can be communicatively coupled with the wireless transceiver and the drive output, wherein the control circuit is configured to receive power from the rechargeable power storage system and to activate, in response to a valve activation signal, the drive output to output a drive signal configured to activate the valve system.

Figure 51:
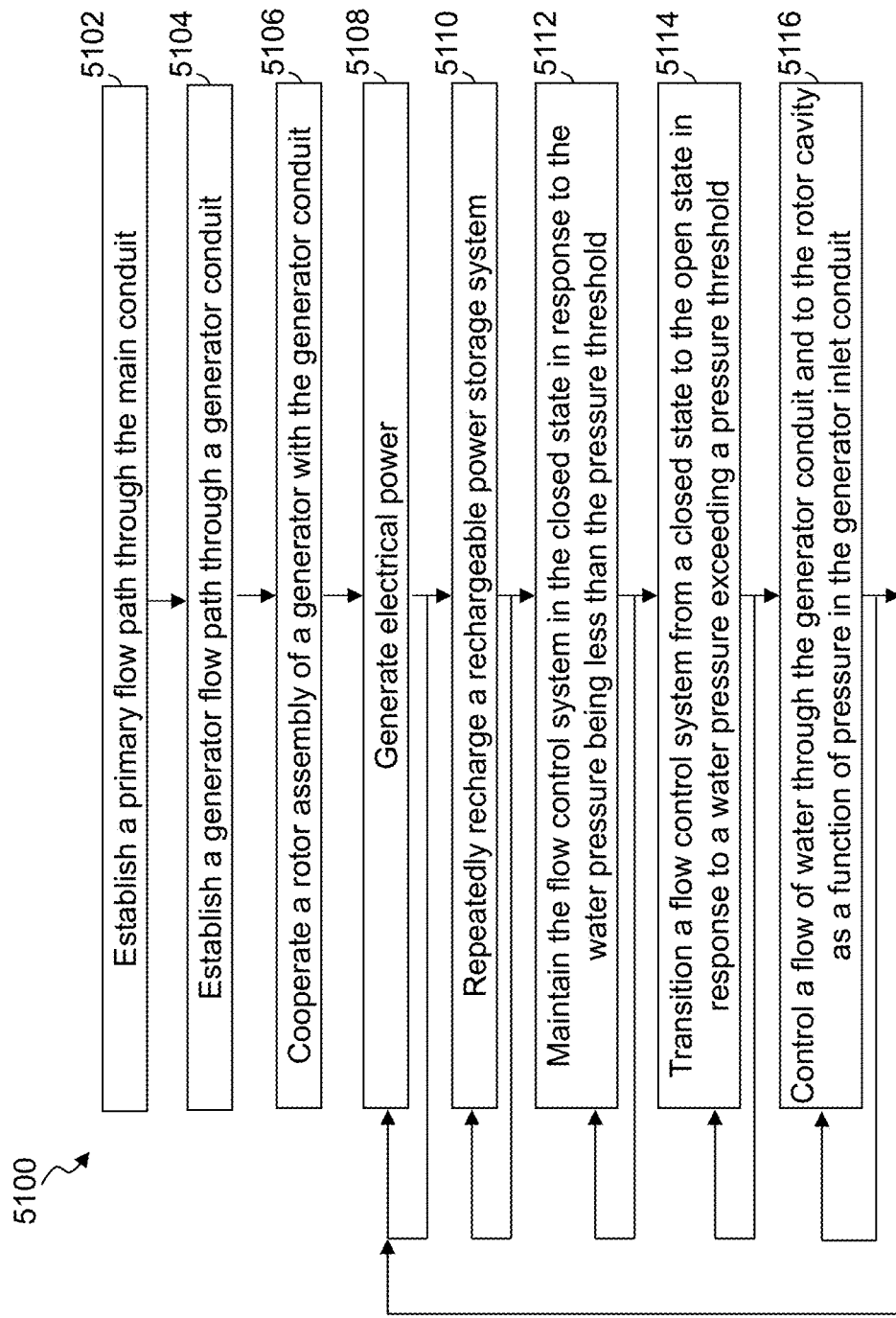
FIG. 51 illustrates a simplified flow diagram of an exemplary process of generating electrical power for irrigation control, in accordance with some embodiments.

FIG. 51 illustrates a simplified flow diagram of an exemplary process 5100 of generating electrical power for irrigation control, in accordance with some embodiments. In step 5102, a primary flow path is established through an inlet conduit 4004 of a main conduit 4002 of an irrigation generator system and out of an outlet conduit 4006 of the main conduit. In step 5104, a generator flow path is established through a generator conduit 4012 fluidly coupled at a generator inlet conduit 4014 with the main conduit 4002 and fluidly coupled downstream with the main conduit through a generator outlet conduit 4016. In step 5106, one or more rotor assemblies 330 of a generator are cooperated with the generator conduit 4012. In some embodiments, a rotor is positioned within the rotor cavity 4102 of the generator conduit.

In step 5108, electrical power is generated in response a physical activation of the rotor assembly 330 by a flow of fluid through the generator conduit 4012 causing rotation of the rotor assembly. In some embodiments, the water flows from the generator inlet conduit 4014 through a cavity inlet feed 4104 that is fluidly coupled between the generator inlet conduit and the rotor cavity enabling fluid to flow from the generator inlet cavity into the rotor cavity. In some implementations, a cross-sectional area of the cavity inlet feed is less than a cross-sectional area of the generator inlet conduit. The cavity inlet feed 4104, in some embodiments, is fluidly coupled with one or more inlet apertures 4106 having a cross-section area that is less than the cross-sectional area of the cavity inlet feed. The one or more inlet apertures is aligned with one or more rotor assemblies and configured to direct the water flow at the one or more rotor assemblies.

In step 5110, one or more rechargeable power storage systems 906 are repeatedly recharged with the electrical power generated by the generator. In some embodiments, the electrical power is supplied from the generator to the rechargeable power storage system through one or more bridge rectifiers. In some embodiments, power generated by the generator and stored in the rechargeable power storage system. The stored electrical power can be used to power substantially any relevant subsystem of an irrigation system and/or other systems that use electrical power. For example, the power from the rechargeable power storage system can be used to power one or more wireless transceivers 904 and a valve control circuit 902 of a valve control system 5000. This enables valve signals from a remote irrigation control device to be wirelessly received through the wireless transceiver. The valve control circuit can activate, in response to the valve signal, a drive output to output a drive signal powered from the rechargeable power storage system to power an irrigation valve to transition between a closed state and an open state.

In step 5112, the flow control system, in response to the water pressure within the inlet conduit being less than the pressure threshold, is maintained in the closed state and water is prevented from flowing along the primary flow path from the inlet conduit 4004 and through the flow control system 4020. In step 5114, the fluid flow through the generator conduit is controlled, at least in part, by transitioning the flow control system 4020 from a closed state to the open state in response to a water pressure within the inlet conduit exceeding a pressure threshold enabling water to flow through the main conduit 4002. In some embodiments, the flow control system prevents water flow greater than a threshold flow rate through the generator conduit 4012. Further, in some embodiments, the fluid flow through the generator conduit is controlled at least in part by variably opening the flow control system 4020 between the closed state and a maximum open state as a function of a variable water pressure between an activation pressure threshold and a maximum pressure threshold. In some implementations, the variable control prevents the water flow greater than the threshold flow rate through the generator conduit while the water pressure is less than or equal to the maximum pressure threshold. The flow control system 4020, in some implementations, includes one or more diaphragms. Some embodiments further bias one or more diaphragms toward the closed position where the biasing enables the transiting between the closed state and the maximum open state as a function of the variable water pressure between the activation pressure threshold and the maximum pressure threshold. Additionally or alternatively, one or more regulators and/or one or more biased diaphragms of one more regulators are positioned across one or more flow apertures of the main conduit 4002. A substantially constant generator water flow is maintained through the generator conduit while the water pressure within the main conduit is between the activation pressure threshold and the maximum pressure threshold in response to the biased diaphragm moving between a closed position and a maximum open position as a function of the water pressure within the inlet conduit while the water pressure is between the activation pressure threshold and the maximum pressure threshold. Some embodiments include optional step 5116 where a generator protection system is utilized to control the flow of water through the generator conduit and to the rotor cavity as a function of pressure and/or flow in the generator inlet conduit to in part provide protection for the generator. Some embodiments control a solenoid system 4802 cooperated with the generator conduit to transition from an open state to a closed state closing the generator inlet conduit from the main conduit 4002 and preventing a flow from the main conduit through generator conduit and/or the rotor cavity.

One or more of the steps of the process 5100 are repeated over time. For example, step 5108 and 5110 is continuously repeated while water is supplied to the inlet conduit and continues while the generator protection system is not activated to prevent flow to the rotor cavity. Similarly, step 5112 is repeated while the water pressure is less than the pressure threshold, and step 5114 is repeated when the pressure exceeds the pressure threshold.

Figure 52:
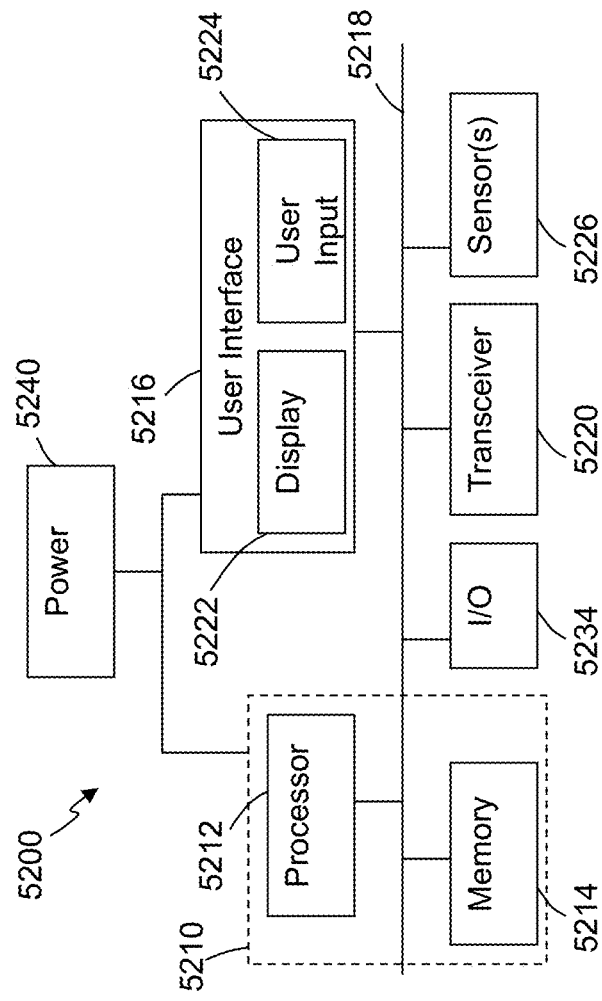
FIG. 52 illustrates an exemplary system for use in implementing methods, techniques, devices, apparatuses, systems, servers, sources and providing control over irrigation, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 52 illustrates an exemplary system 5200 that may be used for implementing any of the components, circuits, circuitry, systems, functionality, apparatuses, processes, or devices of irrigation system 100, valve system 102, irrigation control devices (e.g., irrigation controller 110, central irrigation controller 112, user device 114, etc.) and/or other above or below mentioned systems or devices, or parts of such circuits, circuitry, functionality, systems, apparatuses, processes, or devices. For example, the system 5200 may be used to implement some or all of the valve control system 314, valve control circuit 902, irrigation control circuit 2002, and/or other such components, circuitry, functionality and/or devices. However, the use of the system 5200 or any portion thereof is certainly not required.

By way of example, the system 5200 may comprise a control circuit or processor module 5212, memory 5214, and one or more communication links, paths, buses or the like 5218. Some embodiments may include one or more user interfaces 5216, and/or one or more internal and/or external power sources or supplies 5240. The control circuit 5212 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 5212 can be part of control circuitry and/or a control system 5210, which may be implemented through one or more processors with access to one or more memory 5214 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 5200 may be used to implement one or more of the above or below, or parts of, components, circuits, systems, processes and the like.

Some embodiments include a user interface 5216 can allow a user to interact with the system 5200 and receive information through the system. In some instances, the user interface 5216 includes a display 5222 and/or one or more user inputs 5224, such as buttons, touch screen, track ball, keyboard, mouse, etc., which can be part of or wired or wirelessly coupled with the system 5200. Typically, the system 5200 further includes one or more communication interfaces, ports, transceivers 5220 and the like allowing the system 5200 to communicate over a communication bus, a distributed computer and/or communication network (e.g., a local area network (LAN), the Internet, wide area network (WAN), etc.), communication link 5218, other networks or communication channels with other devices and/or other such communications or combination of two or more of such communication methods. Further the transceiver 5220 can be configured for wired, wireless, optical, fiber optical cable, satellite, or other such communication configurations or combinations of two or more of such communications.

Some embodiments include one or more input/output (I/O) ports 5234 that allow one or more devices to couple with the system 5200. The I/O ports can be substantially any relevant port or combinations of ports, such as but not limited to USB, Ethernet, or other such ports. The I/O interface 5234 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 5226 to provide information to the system and/or sensor information that is communicated to another component. The sensors can include substantially any relevant sensor, such as but not limited to flow sensor, rain sensor, temperature sensor, voltage sensor, current sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 5200 comprises an example of a control and/or processor-based system with the control circuit 5212. Again, the control circuit 5212 can be implemented through one or more processors, controllers, central processing units, logic, software and the like. Further, in some implementations the control circuit 5212 may provide multiprocessor functionality.

The memory 5214, which can be accessed by the control circuit 5212, typically includes one or more processor-readable and/or computer-readable media accessed by at least the control circuit 5212, and can include volatile and/or nonvolatile media, such as RAM, ROM, EEPROM, flash memory and/or other memory technology. Further, the memory 5214 is shown as internal to the control system 5210; however, the memory 5214 can be internal, external or a combination of internal and external memory. Similarly, some or all of the memory 5214 can be internal, external or a combination of internal and external memory of the control circuit 5212. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 5214 can store code, software, executables, scripts, data, content, lists, programming, programs, log or history data, user information, customer information, product information, and the like. While FIG. 52 illustrates the various components being coupled together via a bus, it is understood that the various components may actually be coupled to the control circuit and/or one or more other components directly.

Some embodiments provide an irrigation valve system, comprising: a first inlet conduit; a first outlet conduit; a first diaphragm configured to transition between a closed position and an open position, wherein in the closed position the first diaphragm prevents water from flowing from the first inlet conduit to the first outlet conduit; a first solenoid system cooperated with a first generator conduit, wherein the first solenoid system, when activated, is configured to enable water to flow through the first generator conduit for at least a first threshold duration prior to the first diaphragm transitioning from the closed position to the open position; a first turbine generator comprising a first rotor assembly, wherein the first turbine generator is positioned with the first rotor assembly extending into a portion of the first generator conduit; and a valve control system comprising: a rechargeable power storage system electrically coupled with the first turbine generator and configured to receive and store electrical power generated by the first turbine generator; a first wireless transceiver; a first solenoid drive output electrically coupled with the rechargeable power storage system and the first solenoid system; a control circuit communicatively coupled with the wireless transceiver and the first solenoid drive output, wherein the control circuit is configured to receive power from the rechargeable power storage system and to activate, in response to a first valve activation signal, the first solenoid drive output to output a first solenoid drive signal to activate the first solenoid system.

Further, some embodiments provide irrigation valve systems, comprising: a housing comprising a first inlet fluidly coupled with a first outlet; a first valve maintained within the housing fluidly coupled with and between the first inlet and the first outlet; a turbine generator maintained within the housing, wherein the turbine generator comprises a rotor assembly secured with the first valve and configured to be periodically activated in response to activation of the first valve; a valve control system maintained within the housing and comprising: a rechargeable power storage system electrically coupled with the turbine generator and configured to receive and store electrical power generated by the turbine generator; a first wireless transceiver; a first valve drive output electrically coupled with the rechargeable power storage system and the first valve; a control circuit electrically coupled with and receiving operational power from the rechargeable power storage system, and the control circuit is further communicatively coupled with the first wireless transceiver and the first valve drive output, wherein the control circuit is configured to activate, in response to a first valve activation signal, the first valve drive output to output a first solenoid drive signal powered from the rechargeable power storage system to power and activate the first valve to cause the first valve to transition between a closed state and an open state.

Additionally, some embodiments provide irrigation valve systems, comprising: an inlet conduit; a valve seat; an outlet conduit fluidly coupled with the valve seat; a bonnet cavity fluidly coupled with the inlet conduit; a diaphragm secured between the valve seat and the bonnet chamber, wherein the diaphragm is configured to move between a closed positioned and an open position; a generator conduit; a solenoid system comprising a plunger coupled with a solenoid, wherein the plunger is configured to move between a closed position and the open position, wherein the plunger when in the closed position seals the generator conduit preventing water from flowing through the generator conduit, and the plunger when in the open position enables water to flow through the generator conduit; and a turbine generator comprising a rotor assembly and a generator cooperated with the rotor assembly and configured to generate electrical power in response to rotation of the rotor assembly, wherein the turbine generator is positioned with the rotor assembly extending into a portion of the generator conduit; and a valve control system comprising: a rechargeable power storage system electrically coupled with the turbine generator and configured to receive and store electrical power generated by the turbine generator; a wireless transceiver; a solenoid drive output electrically coupled with the rechargeable power storage system and the solenoid system; a control circuit communicatively coupled with the wireless transceiver and the solenoid drive output, wherein the control circuit is configured to activate, in response to a valve activation signal, the solenoid drive output to output a solenoid drive signal to activate the solenoid causing the plunger to move from the closed position to the open position or the closed position to the open position.

Some embodiments provide irrigation systems comprising: an irrigation control device comprising: a wireless transceiver; and an irrigation control device control circuit communicatively coupled with the wireless transceiver and configured to receive and transmit communications via the wireless transceiver, and to implement an irrigation schedule stored local at the irrigation control device and output valve signals to cause activation of one or more valves; and a wireless valve system separate from the irrigation control device, wherein the wireless valve system comprises: a housing comprising a first inlet and a first outlet fluidly coupled with the first inlet; a first valve maintained within the housing fluidly coupled with and between the first inlet and the first outlet; a turbine generator comprising a rotor assembly secured with the valve and configured to be periodically activated in response to activation of the valve; and a valve control system maintained within the housing comprising: a rechargeable power storage system electrically coupled with the turbine generator and configured to receive and store electrical power generated by the turbine generator; a first wireless valve transceiver; a first drive output electrically coupled with the rechargeable power storage system and the first valve; and a valve control circuit electrically coupled with and receiving operational power from the rechargeable power storage system, and the valve control circuit is further communicatively coupled with the first wireless valve transceiver and the first drive output, wherein the valve control circuit is configured to activate, in response to a first valve signal of the valve signals wirelessly received from the irrigation control device, the first drive output to output a first drive signal powered from the rechargeable power storage system to power and activate the first valve to cause the first valve to transition between a closed state and an open state.

Some embodiments provide an irrigation flow sensor, comprising: a housing comprising a first inlet and a first outlet fluidly coupled with the first inlet; a first valve maintained within the housing fluidly coupled with and between the first inlet and the first outlet; a turbine generator maintained within the housing, wherein the turbine generator comprises a rotor assembly configured to be periodically activated based on fluid flow in response to activation of the valve; and a control circuit electrically coupled with the turbine generator and configured to detect an amount of power generated by the turbine generator, and determine a flow rate of fluid flowing through the outlet conduit as a function of the amount of power generated by the power turbine.

Some embodiments provide methods of controlling irrigation, comprising: wirelessly receiving, at a valve control circuit of a self-powered irrigation valve system, a valve activation signal; activating a solenoid activation signal; causing an activation of a boost converter and boosting a voltage from a rechargeable power storage system to charge the solenoid energy reserves configured to drive one or more solenoid drive circuits and activate a solenoid systems; generating electrical power, in response to the activation of the solenoid system and resulting water flowing through a generator conduit for at least a threshold duration prior to an opening of the diaphragm, by a generator within the irrigation valve system for at least the threshold duration; and applying the generated power and recharging the rechargeable power storage system. In some instances, an active runtime is tracked while water is flowing through the valve system; and the boost converter is reactivated to deactivate the solenoid system in response to a specified runtime duration being met. Some methods further comprise: wirelessly receiving a deactivation signal; and reactivating the boost converter to deactivate the solenoid system in response to receiving the deactivation signal. Additionally or alternatively, some embodiments evaluate a voltage level of the rechargeable power storage system and detecting when the voltage level of the rechargeable power storage system is greater than a voltage threshold; enable a power switch to enable power to be obtained from a backup power storage system and recharging the rechargeable power storage system with the power received from the backup power storage system; track the voltage level of the rechargeable power storage system while recharging the rechargeable power storage system; and disable the power switch and disconnecting the backup power storage system.

Some embodiments provide irrigation generator systems that include a main conduit comprising an inlet conduit and an outlet conduit; a flow control system positioned within the main conduit; a generator conduit comprising a generator inlet conduit and a generator outlet conduit, wherein the generator inlet conduit is fluidly coupled with the main conduit upstream of the flow control system, the generator outlet conduit is fluidly coupled with the main conduit downstream of the flow control system; and a generator comprising a rotor assembly, wherein the generator is positioned with the rotor assembly cooperated with generator conduit and configured to be physically activated by a flow of fluid through the generator conduit causing rotation of the rotor assembly and the generation of electrical power in response to the rotation of the rotor assembly. The flow control system is configured to transition between a closed state to the open state in response to a water pressure within the inlet conduit exceeding a first pressure threshold enabling water to flow through the main conduit and preventing water flow greater than a threshold flow rate through the generator conduit.

Further, some embodiments provide methods of generating electrical power for irrigation control comprising: establishing a primary flow path through an inlet conduit of a main conduit of an irrigation generator system and out of an outlet conduit of the main conduit; establishing a generator flow path through a generator conduit fluidly coupled at a generator inlet conduit with the main conduit and fluidly coupled downstream with the main conduit through a generator outlet conduit; cooperating a rotor assembly of a generator with the generator conduit; generating electrical power in response a physical activation of the rotor assembly by a flow of fluid through the generator conduit causing rotation of the rotor assembly; and controlling the fluid flow through the generator conduit comprising transitioning a flow control system from a closed state to the open state in response to a water pressure within the inlet conduit exceeding a first pressure threshold enabling water to flow through the main conduit and preventing water flow greater than a threshold flow rate through the generator conduit.

Some embodiments provide an irrigation valve system, comprising: a first inlet conduit; a first outlet conduit; a first diaphragm configured to transition between a closed position and an open position, wherein in the closed position the first diaphragm prevents water from flowing from the first inlet conduit to the first outlet conduit; a first solenoid system cooperated with a first generator conduit, wherein the first solenoid system, when activated, is configured to enable water to flow through the first generator conduit for at least a first threshold duration prior to the first diaphragm transitioning from the closed position to the open position; a first turbine generator comprising a first rotor assembly, wherein the first turbine generator is positioned with the first rotor assembly extending into a portion of the first generator conduit; and a valve control system comprising: a rechargeable power storage system electrically coupled with the first turbine generator and configured to receive and store electrical power generated by the first turbine generator; a first wireless transceiver; a first solenoid drive output electrically coupled with the rechargeable power storage system and the first solenoid system; a control circuit communicatively coupled with the wireless transceiver and the first solenoid drive output, wherein the control circuit is configured to receive power from the rechargeable power storage system and to activate, in response to a first valve activation signal, the first solenoid drive output to output a first solenoid drive signal to activate the first solenoid system.

The first inlet conduit, in some implementations, has an inlet cross-sectional area, and the first outlet conduit has an outlet cross-sectional area that is less the inlet cross-sectional area, with a first area ratio of the outlet cross-sectional area to the inlet cross-sectional area is configured to induce, in response to the activation of the first solenoid system, a back-pressure to cause water to flow through the generator conduit for at least the threshold duration prior to the first diaphragm transitioning from the closed position to the open position. In some embodiments, a sum of the outlet cross-sectional area of the first outlet conduit and a cross-sectional area of the generator conduit is proportional to the inlet cross-sectional area of the inlet conduit.

Some embodiments include a bonnet cavity positioned adjacent the first diaphragm, wherein the first diaphragm is positioned between the bonnet cavity and both the first inlet conduit and the first outlet conduit, and a bonnet cavity conduit extending from the generator conduit, wherein bonnet cavity conduit is configured to supply water to the bonnet cavity while the first diaphragm is in the closed position. Additionally or alternatively, some embodiments include a bonnet cavity positioned adjacent the first diaphragm, wherein the first diaphragm is positioned between the bonnet cavity and both the first inlet conduit and the first outlet conduit; and a flow filter positioned to fluidly couple the first inlet conduit and the bonnet cavity, wherein the flow filter is configured to supply filtered water to the bonnet cavity while the first diaphragm is in the closed position. The generator conduit in some implementations extends from the bonnet cavity and supplies water between the bonnet cavity and the first generator conduit. One or more optional generator conduit flow filters can be included and cooperated with the generator conduit between the first inlet conduit and the first solenoid system. In some embodiments, the first turbine generator is positioned upstream of the solenoid system with the first rotor assembly extending into the portion of the first generator conduit.

In some embodiments, the irrigation valve system and/or the valve control system further comprises one or more external electrical connectors that are electrically coupled with and/or receive power from the rechargeable power storage system. The external electrical connector can be exposed external to the irrigation valve system and configured to electrically couple with and supply power to one or more external systems that are separate from the irrigation valve system. The control circuit can be configured, in some implementations, to control electrical power supplied from the rechargeable power storage system to the external electrical connector. In some embodiments, a valve control system further comprises an external electrical connector electrically coupled with the rechargeable power storage system and communicatively coupled with the control circuit. The external electrical connector can be exposed external to the irrigation valve system and configured to electrically couple with and supply power to an external irrigation valve that is separate from the irrigation valve system. The control circuit is configured to control electrical power supplied from the rechargeable power storage system to the external irrigation valve according to an irrigation schedule, wirelessly received command and/or one or more other such activation triggers.

In some embodiments, the irrigation valve systems further include a first switch, and a removable, backup battery electrically coupled with the first switch. The first switch can be activated when a power level stored on the rechargeable power storage system drops below a threshold level. The rechargeable power storage system and the backup battery, in some embodiments, provide the only power of the irrigation valve system. The valve control system in some embodiments further comprises: a bridge rectifier coupled with an output of the turbine generator and further coupled with the rechargeable power storage system, wherein the bridge rectifier circuit is configured to supply power from the turbine generator to the rechargeable power storage system. The rechargeable power storage system can comprise a capacitance configured to be repeatedly charged by the power generated by the turbine generator and supplied through the bridge rectifier. Some embodiments include a boost converter circuit electrically coupled with the rechargeable power storage system, wherein the boost converter circuit is configured boost the solenoid output signal at least at a threshold voltage that is greater than a voltage from the rechargeable power storage system. In some embodiments, a valve control system further comprises at least a second wireless transceiver communicatively coupled with the control circuit, wherein the first wireless transceiver is configured to wirelessly communicate through a first wireless protocol, and the second wireless transceiver is configured to wirelessly communicate through a second wireless protocol that is different than the first wireless protocol.

Some irrigation valve systems further comprise: a housing within which is maintained the first diaphragm, the first solenoid system, the first turbine generator and the rechargeable power storage system, and wherein the first inlet conduit and the first outlet conduit are formed within the housing. The housing can further comprise: a second inlet conduit and a second outlet conduit formed within the housing, a second diaphragm, a second solenoid system, and the valve control system. The second diaphragm can be positioned between the second inlet conduit and the second outlet conduit and configured to prevent a flow of water between the second inlet conduit and the second output conduit when the second diaphragm is in a closed position. The valve control system cab comprise a second solenoid drive output electrically coupled with the rechargeable power storage system and the second solenoid system, and wherein the control circuit is communicatively coupled with the second solenoid drive output and is configured to receive power from the rechargeable power storage system and to activate, in response to a second valve activation signal, the second solenoid drive output to output a second solenoid drive signal to activate the second solenoid system.

Some embodiments provide irrigation valve systems, comprising: a housing comprising a first inlet fluidly coupled with a first outlet; a first valve maintained within the housing fluidly coupled with and between the first inlet and the first outlet; a turbine generator maintained within the housing, wherein the turbine generator comprises a rotor assembly secured with the first valve and configured to be periodically activated in response to activation of the first valve; a valve control system maintained within the housing and comprising: a rechargeable power storage system electrically coupled with the turbine generator and configured to receive and store electrical power generated by the turbine generator; a first wireless transceiver; a first valve drive output electrically coupled with the rechargeable power storage system and the first valve; a control circuit electrically coupled with and receiving operational power from the rechargeable power storage system, and the control circuit is further communicatively coupled with the first wireless transceiver and the first valve drive output, wherein the control circuit is configured to activate, in response to a first valve activation signal, the first valve drive output to output a first solenoid drive signal powered from the rechargeable power storage system to power and activate the first valve to cause the first valve to transition between a closed state and an open state.

In some implementations the irrigation valve system further comprises a plurality of separate valves, including the first valve, maintained within the housing, where the housing further comprises a plurality of inlet conduits and a plurality of outlet conduits, including the first inlet and the first outlet. Each of the plurality of inlet conduits is fluidly coupled with one of the plurality of outlet conduits, and each of the plurality of valves is fluidly coupled with and between a set of one of the plurality of inlet conduits and one of the plurality of outlet conduits. The valve control system can further comprise a plurality of solenoid drive outputs each electrically coupled with one of the plurality of valves, wherein the control circuit is further communicatively coupled with each of the plurality of solenoid drive outputs and configured to activate, in response to a respective one of a plurality of valve activation signals, the respective one of the plurality of solenoid drive outputs to output a corresponding solenoid drive signal powered from the rechargeable power storage system to power and activate the respective one of the plurality of valves to cause the respective one of the plurality of valves to transition between a closed state and an open state.

The irrigation valve system, in some embodiments further comprises: a first switch; and a removable, backup battery electrically coupled with the first switch; wherein the first switch is activated when a power level stored on the rechargeable power storage system drops below a threshold level; wherein the rechargeable power storage system and the backup battery provide the only power of the irrigation valve system. The valve control system, in some implementations, further comprises: a bridge rectifier coupled with an output of the turbine generator and further coupled with the rechargeable power storage system, wherein the bridge rectifier circuit is configured to supply power from the turbine generator to the rechargeable power storage system; and wherein the rechargeable power storage system comprises a capacitance configured to be repeatedly charged by the power generated by the turbine generator and supplied through the bridge rectifier. In some embodiments, the irrigation valve system further comprises: one or more boost converter circuits electrically coupled between the rechargeable power storage system and the first valve drive output, and the control circuit is electrically coupled with the boost converter and configured to activate the boost converter to release the first solenoid output signal; wherein the boost converter circuit is configured generate the first solenoid output signal at a threshold voltage that is greater than a voltage received from the rechargeable power storage system.

The irrigation valve system, in some embodiments, further comprises: an external electrical connector electrically coupled with the boost converter circuit; wherein the external electrical connector is exposed external to the irrigation valve system and configured to electrically couple with and supply power to an external irrigation valve that is separate from the irrigation valve system; and wherein the control circuit is configured to control electrical power supplied from the rechargeable power storage system through the boost converter circuit to the external irrigation valve according to an irrigation schedule. The valve control system can further comprise an external electrical connector electrically coupled with the rechargeable power storage system, wherein the external electrical connector is exposed external to the irrigation valve system and configured to electrically couple with and supply power to an external system that is separate from the irrigation valve system. In some embodiments, the valve control system further comprises a second wireless transceiver communicatively coupled with the control circuit, wherein the first wireless transceiver is configured to wirelessly communicate through a first wireless protocol, and the second wireless transceiver is configured to wirelessly communicate through a second wireless protocol that is different than the first wireless protocol.

Some embodiments, provide an irrigation valve system, comprising: an inlet conduit; a valve seat; an outlet conduit fluidly coupled with the valve seat; a bonnet cavity fluidly coupled with the inlet conduit; a diaphragm secured between the valve seat and the bonnet chamber, wherein the diaphragm is configured to move between a closed positioned and an open position; a generator conduit; a solenoid system comprising a plunger coupled with a solenoid, wherein the plunger is configured to move between a closed position and the open position, wherein the plunger when in the closed position seals the generator conduit preventing water from flowing through the generator conduit, and the plunger when in the open position enables water to flow through the generator conduit; and a turbine generator comprising a rotor assembly and a generator cooperated with the rotor assembly and configured to generate electrical power in response to rotation of the rotor assembly, wherein the turbine generator is positioned with the rotor assembly extending into a portion of the generator conduit; and a valve control system comprising: a rechargeable power storage system electrically coupled with the turbine generator and configured to receive and store electrical power generated by the turbine generator; a wireless transceiver; a solenoid drive output electrically coupled with the rechargeable power storage system and the solenoid system; a control circuit communicatively coupled with the wireless transceiver and the solenoid drive output, wherein the control circuit is configured to activate, in response to a valve activation signal, the solenoid drive output to output a solenoid drive signal to activate the solenoid causing the plunger to move from the closed position to the open position or the closed position to the open position. In some implementations, a first area ratio of an outlet cross-sectional area of the outlet conduit to an inlet cross-sectional area of the inlet conduit is configured to induce, in response to the activation of the solenoid system, back-pressure to cause water to flow through the generator conduit for at least a threshold duration prior to the first diaphragm transitioning from the closed position to the open position.

The control circuit, in some embodiments, is electrically coupled with the rechargeable power storage system and receives operating power from the rechargeable power storage system. The inlet conduit can comprise an inlet conduit coupler configured to cooperate with a separate input irrigation conduit that is coupled upstream with a water source and configured to direct water into the inlet conduit; wherein the outlet conduit comprising an outlet conduit coupler configured to cooperate with a separate outlet irrigation conduit that extends from the irrigation valve system to carry water downstream to an irrigation distribution device. The valve control system further comprises, in some implementations, an external electrical connector electrically coupled with the rechargeable power storage system, wherein the external electrical connector is exposed external to the irrigation valve system and configured to electrically couple with and supply power to an external system that is separate from the irrigation valve system; and wherein the control circuit is configured to control electrical power supplied from the rechargeable power storage system to the external electrical connector.

In some embodiments, the valve control system further comprises an external electrical connector electrically coupled with the rechargeable power storage system and communicatively coupled with the control circuit; wherein the external electrical connector is exposed external to the irrigation valve system and configured to electrically couple with and supply power to an external irrigation valve that is separate from the irrigation valve system; and wherein the control circuit is configured to control electrical power supplied from the rechargeable power storage system to the external irrigation valve according to an irrigation schedule. The irrigation valve system can further include: a first switch; a removable, backup battery electrically coupled with the first switch; wherein the first switch is activated when a power level stored on the rechargeable power storage system drops below a threshold level; wherein the rechargeable power storage system and the backup battery provide the only power of the irrigation valve system.

In some embodiments, an irrigation system is provided that comprises: an irrigation control device comprising: a wireless transceiver; and an irrigation control device control circuit communicatively coupled with the wireless transceiver and configured to receive and transmit communications via the wireless transceiver, and to implement an irrigation schedule stored local at the irrigation control device and output valve signals to cause activation of one or more valves; and a wireless valve system separate from the irrigation control device, wherein the wireless valve system comprises: a housing comprising a first inlet and a first outlet fluidly coupled with the first inlet; a first valve maintained within the housing fluidly coupled with and between the first inlet and the first outlet; a turbine generator comprising a rotor assembly and secured with the valve and configured to be periodically activated in response to activation of the valve; and a valve control system maintained within the housing comprising: a rechargeable power storage system electrically coupled with the turbine generator and configured to receive and store electrical power generated by the turbine generator; a first wireless valve transceiver; a first drive output electrically coupled with the rechargeable power storage system and the first valve; and a valve control circuit electrically coupled with and receiving operational power from the rechargeable power storage system, and the valve control circuit is further communicatively coupled with the first wireless valve transceiver and the first drive output, wherein the valve control circuit is configured to activate, in response to a first valve signal of the valve signals wirelessly received from the irrigation control device, the first drive output to output a first drive signal powered from the rechargeable power storage system to power and activate the first valve to cause the first valve to transition between a closed state and an open state.

Some embodiments further comprises: an irrigation sensor system; wherein the irrigation valve system further comprises external electrical connector electrically coupled with the rechargeable power storage system and communicatively coupled with the valve control circuit; wherein irrigation sensor system is electrically coupled with the external electrical connector; and wherein the valve control circuit is configured to control a supplying of electrical power from the rechargeable power storage system, through the external electrical connector, to the irrigation sensor system to supply operation power to the irrigation sensor system enabling the irrigation sensor to operate to acquire sensor information and communicate the sensor information. The valve control system, in some implementations, further comprises an external electrical connector electrically coupled with the rechargeable power storage system and communicatively coupled with the valve control circuit; wherein the external electrical connector is exposed external to the irrigation valve system and configured to electrically couple with and supply power to an external irrigation valve that is separate from the irrigation valve system; and wherein the valve control circuit is configured to wirelessly receive an additional valve activation signal in accordance with the irrigation schedule and control electrical power supplied from the rechargeable power storage system to the external irrigation valve in response to the additional valve activation signal according to the irrigation schedule. In some embodiments, the irrigation control device comprises an irrigation controller located at a location where the valve control system is located and irrigation is implemented, wherein the irrigation controller comprises a plurality of valve driver outputs each configured to be physically and electrically coupled with one or more remote valves via one or more wires, and wherein the irrigation controller in generating the output valve signals is configured to generate one or more of the output valve signals on one or more of the plurality of driver outputs to cause activation of a respective one of the one or more valves physically coupled via at least one of the one or more wires with a respective one of the plurality of driver outputs.

The irrigation control device, in some embodiments, comprises a central irrigation controller located remote from a location where the valve control system is located and irrigation is implemented, wherein the central irrigation controller is configured to communicate the valve signals over a distributed communication network. The irrigation control device can comprise a user mobile device configured to wirelessly communicate the valve signals over a wireless communication network. Some embodiments further include irrigation controller located at a location where the valve control system is located and irrigation is implemented, wherein the irrigation controller comprises a plurality of valve driver outputs each configured to be physically and electrically coupled over one or more wires with one or more additional valves, and wherein the irrigation controller is configured to generate additional output valve signals on one or more of the plurality of driver outputs to cause activation of a respective one of the one or more additional valves. The irrigation controller can be configured to wirelessly receive a modification instruction from the user mobile device and to modify an additional irrigation schedule locally stored on the irrigation controller consistent with the modification instruction.

Some embodiments provide an irrigation flow sensor that comprises: a housing comprising a first inlet and a first outlet fluidly coupled with the first inlet; a first valve maintained within the housing fluidly coupled with and between the first inlet and the first outlet; a turbine generator maintained within the housing, wherein the turbine generator comprises a rotor assembly configured to be periodically activated based on fluid flow in response to activation of the valve; and a control circuit electrically coupled with the turbine generator and configured to detect an amount of power generated by the turbine generator, and determine a flow rate of fluid flowing through the outlet conduit as a function of the amount of power generated by the power turbine.

In some embodiments, methods of controlling irrigation are provided that comprise: wirelessly receiving, at a valve control circuit of a self-powered irrigation valve system, a valve activation signal; activating a solenoid activation signal; causing an activation of a boost converter and boosting a voltage from a rechargeable power storage system to charge a solenoid energy reserve configured to drive one or more solenoid drive circuits and activate a solenoid systems; generating electrical power, in response to the activation of the solenoid system and resulting water flowing through a generator conduit for at least a threshold duration prior to an opening of the diaphragm, by a generator within the irrigation valve system for at least the threshold duration; and applying the generated power and recharging the rechargeable power storage system. Some embodiments further comprise: tracking an active runtime while water is flowing through the valve system; and reactivating the boost converter to deactivate the solenoid system in response to a specified runtime duration being met. The method, in some embodiments, further comprises: wirelessly receiving a deactivation signal; and reactivating the boost converter to deactivate the solenoid system in response to receiving the deactivation signal. Some embodiments further comprise: evaluating a voltage level of the rechargeable power storage system and detecting when the voltage level of the rechargeable power storage system is greater than a voltage threshold; enabling a power switch to enable power to be obtained from a backup power storage system and recharging the rechargeable power storage system with the power received from the backup power storage system; tracking the voltage level of the rechargeable power storage system while recharging the rechargeable power storage system; and disabling the power switch and disconnecting the backup power storage system.

A valve system is provided in some embodiments that comprises: a main conduit; a generator conduit fluidly coupled with the main conduit; actuation sub-valve system cooperated with the generator conduit, wherein the sub-valve system comprises an actuation diaphragm configured to transition between a closed position preventing a flow of fluid through the generator conduit and an open position allowing fluid to travel through the generator conduit; a solenoid system fluidly cooperated with the actuation diaphragm; a generator cooperated with the generator conduit and configured to generate electrical power in response to a fluid flow through the generator conduit; a primary sub-valve system cooperated with main conduit, wherein the primary sub-valve system comprises a primary diaphragm configured to transition from a closed position preventing a flow of fluid through the main conduit to an open position enabling a flow of fluid through the main conduit; and a valve control system communicatively coupled with the solenoid system; a rechargeable power storage system electrically coupled with the generator and configured to receive and store the electrical power generated by the generator; wherein the valve control system is configured to wirelessly receive an activation signal from an external source, and cause power to be supplied from the rechargeable power storage system to activate the solenoid system to cause the solenoid system to transition to an activate position triggering a transition of the actuation diaphragm to the open position enabling fluid flow through the generator conduit for at least a threshold duration wherein the generator is configured to generate the electrical power at least during the threshold duration; and wherein the transition of the actuation diaphragm to the open position induces, after the threshold duration, the primary diaphragm to transition to the open position enabling the flow of fluid through the main conduit.

Some embodiments provide a hydro-powered irrigation sensor system comprising: a main conduit; a generator conduit fluidly coupled with the main conduit; the main flow conduit comprising an inlet having an inlet cross-sectional area, an outlet having an outlet cross-sectional area, and a flow restriction section positioned downstream of a generator conduit inlet of the generator conduit, wherein the flow restriction section comprising a reduced cross-sectional area that is less than the inlet cross-sectional area; the generator conduit is fluidly coupled at the generator conduit inlet with the main flow conduit upstream of the flow restriction section and further fluidly coupled with the main flow conduit at a generator conduit outlet downstream of an initial restriction of the main flow conduit caused by the flow restriction section; a generator cooperated with the generator conduit and configured to generate electrical power in response to a fluid flow through the generator conduit induced by a back pressure caused by the flow restriction section; a rechargeable power storage system electrically coupled with the generator and configured to receive and store the electrical power generated by the generator; a sensor system electrically coupled with the rechargeable power storage system and configured to receive power from the rechargeable power system and output sensor information; and a transceiver configured to receive electrical power from the rechargeable power storage system and transmit the sensor information.

In some embodiments, a hydro-powered irrigation sensor system is provided comprising: a main conduit; a generator conduit fluidly coupled with the main conduit; the main flow conduit comprising an inlet, an outlet, and a flow restricting device cooperated with the main flow conduit downstream of a generator conduit inlet of the generator conduit; the generator conduit is fluidly coupled at the generator conduit inlet with the main flow conduit upstream of the flow restricting device and further fluidly coupled with the main flow conduit at a generator conduit outlet downstream of the flow restricting device; a generator cooperated with the generator conduit and configured to generate electrical power in response to a fluid flow through the generator conduit induced by a back pressure caused by the flow restricting device; a rechargeable power storage system electrically coupled with the generator and configured to receive and store the electrical power generated by the generator; a sensor system electrically coupled with the rechargeable power storage system and configured to receive power from the rechargeable power system and output sensor information; and a transceiver configured to receive electrical power from the rechargeable power storage system and transmit the sensor information.

Some embodiments provide a valve system, comprising: a main conduit; a generator conduit fluidly coupled with the main conduit; actuation sub-valve system cooperated with the generator conduit, wherein the actuation sub-valve system comprises a generator conduit ball valve system configured to transition between a closed state preventing a flow of fluid through the generator conduit and an open state allowing fluid to travel through the generator conduit; a generator cooperated with the generator conduit and configured to generate electrical power in response to a fluid flow through the generator conduit; a primary sub-valve system cooperated with main conduit, wherein the primary sub-valve system comprises a main ball valve system configured to transition between a closed state preventing a flow of fluid through the main conduit and an open state enabling a flow of fluid through the main conduit; and a valve control system communicatively coupled with the generator conduit ball valve system; and a rechargeable power storage system electrically coupled with the generator and configured to receive and store the electrical power generated by the generator; wherein the valve control system is configured to wirelessly receive an activation signal from an external source, and cause power to be supplied from the rechargeable power storage system to the generator conduit ball valve system and cause the generator conduit ball valve system to transition to the open state enabling a flow of fluid from the main conduit while the main ball valve system is at or below a partially open threshold state inducing a back pressure causing the fluid to flow through the generator conduit, wherein the generator is configured to generate the electrical power while the fluid flows through the generator conduit.

An irrigation valve system according to some embodiments comprises: a main fluid conduit; a main valve system cooperated with and configured to control a flow of fluid through the main fluid conduit; a generator conduit fluidly coupled at a generator conduit inlet with the main fluid conduit upstream of the main valve system, and fluidly coupled with the main fluid conduit at a generator conduit outlet downstream of the main valve system; a generator conduit valve system cooperated with and configured to control the flow of fluid through the generator conduit; a generator system; and a valve control system electrically coupled with the main valve system, the generator conduit valve system and the generator system; and a rechargeable power storage system electrically coupled with the generator system and configured to receive electrical power from the generator system; wherein the valve control system is configured to: monitor a charge level of the rechargeable power storage system; activate, in response to receiving a valve activation signal and while maintaining the main valve system in a closed state or below a threshold open position, the generator conduit valve system when the charge level is below a charge threshold enabling water to flow through the generator conduit, wherein the generator system is configured to generate electrical power in response to the flow of fluid through the generator conduit.

Some embodiments provide an irrigation rotor system comprising: a body; a riser cooperated with the body and configured to rise from a non-active position within the body to an active position extending from the body when actively emitting water from at least one water emitter of the riser; a valve system cooperated with a rotor fluid conduit and configured to control the flow of water through the rotor fluid conduit to the at least one water emitter, wherein the valve system comprises: a generator system configured to be activated in response to the valve control system enabling a flow of water to the at least one fluid emitter, and a rechargeable power storage system electrically coupled with the generator system and configured to receive and store electrical power from the generator system, wherein the valve system receives operational power from the rechargeable power storage system to control the valve system and the release of the fluid from the at least one emitter.

In some embodiments, an irrigation valve system in provided comprising: a main conduit; a primary sub-valve system cooperated with and configured to control a flow of fluid through the main conduit, wherein the primary sub-valve system comprises a primary bonnet cavity separated from the main conduit by a primary diaphragm; a generator conduit fluidly coupled at a generator conduit inlet with the main conduit upstream of the primary sub-valve system, and fluidly coupled with the main conduit at a generator conduit outlet downstream of the primary sub-valve system; an actuation sub-valve system cooperated with and configured to control the flow of fluid through the generator conduit, wherein the actuation sub-valve system comprises an actuation bonnet cavity separated from the generator conduit by an actuation diaphragm, and a solenoid system fluidly coupled with the actuation bonnet cavity; a bonnet coupling conduit fluidly coupling the actuation bonnet cavity with the primary bonnet cavity; a generator system cooperated with the generator conduit; a valve control system electrically coupled with the primary sub-valve system, the actuation sub-valve system and the generator system; and a rechargeable power storage system electrically coupled with the generator system and configured to receive electrical power from the generator system; wherein the valve control system is configured to: activate the solenoid system, in response to a valve activation signal, to cause both the primary diaphragm and the actuation diaphragm to transition between a closed position and an open position in controlling fluid flow through the main conduit and generator conduit enabling the generator system to generate electrical power supplied to the rechargeable power storage system.

Some embodiments include an irrigation valve system comprising: a main fluid conduit; a main valve system cooperated with and configured to control a flow of fluid through the main fluid conduit, wherein the main valve system comprises a primary bonnet cavity; a generator conduit fluidly coupled at a generator conduit inlet with the main fluid conduit upstream of the main valve system, and fluidly coupled with the main fluid conduit at a generator conduit outlet downstream of the main valve system; a generator conduit valve system cooperated with and configured to control the flow of fluid through the generator conduit, wherein the generator conduit valve system comprises an actuation bonnet cavity, and a solenoid system configured to control the opening and closing of the generator conduit valve system; a bonnet coupling conduit fluidly coupling the actuation bonnet cavity of the generator conduit valve system with the primary bonnet cavity of the main valve system; a generator system cooperated with the generator conduit; a valve control system electrically coupled with the main valve system, the solenoid system, and the generator system; and a rechargeable power storage system electrically coupled with the generator system and configured to receive electrical power from the generator system; wherein the valve control system is configured to: activate the solenoid system, in response to a valve activation signal, to cause both the main valve system and the generator conduit valve system to transition between a closed state and an open state in controlling fluid flow through the main fluid conduit and generator conduit enabling the generator system to generate electrical power supplied to the rechargeable power storage system.

In some embodiments, a n irrigation valve system comprises: a main conduit comprising an inlet conduit and an outlet conduit with diaphragm positioned within the main conduit, wherein the diaphragm is configured to transition between a closed position and an open position, wherein in the closed position the diaphragm prevents water from flowing along a primary flow path from the inlet conduit, past the diaphragm and to the outlet conduit; a generator conduit fluidly coupled with the main conduit upstream of the diaphragm at a generator conduit inlet, and fluidly coupled with the main conduit downstream of the diaphragm at a generator conduit outlet, wherein the generator conduit further comprises a rotor stream conduit and a generator bypass conduit fluidly coupled in parallel with the rotor stream conduit; a solenoid system cooperated with the generator conduit, wherein the solenoid system, when activated, is configured to enable water to flow through the generator conduit for at least a threshold duration prior to the diaphragm transitioning from the closed position to the open position; a generator comprising a rotor assembly, wherein the generator is positioned with the rotor assembly cooperated with the rotor stream conduit and configured to be physically activated by a flow of fluid through the rotor stream conduit; and a valve control system comprising: a rechargeable power storage system electrically coupled with the generator and configured to receive and store electrical power generated by the generator; a wireless transceiver; a solenoid drive output electrically coupled with the rechargeable power storage system and the solenoid system; a control circuit communicatively coupled with the wireless transceiver and the solenoid drive output, wherein the control circuit is configured to receive power from the rechargeable power storage system and to activate, in response to a valve activation signal, the solenoid drive output to output a solenoid drive signal to activate the solenoid system. The irrigation valve system, in some implementations, further comprises: a check-valve positioned within the generator bypass conduit, wherein the check-valve is configured to open when the pressure on an upstream side of the check-valve is greater than the bypass water pressure threshold enabling some of the fluid flowing through the generator conduit to flow through the generator bypass conduit. In some embodiments, the irrigation valve system further comprises: generator sub-systems comprising the rotor stream conduit, the generator bypass conduit, the generator and an electrical coupling configured to enable electrical coupling with at least the rechargeable power storage system; and a housing comprising the main conduit and diaphragm; wherein the generator sub-system is configured to be removably cooperated with the housing.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An irrigation generator system, comprising:
a main conduit comprising an inlet conduit and an outlet conduit;
a flow control system positioned within the main conduit;
a generator conduit comprising a generator inlet conduit and a generator outlet conduit, wherein the generator inlet conduit is fluidly coupled with the main conduit upstream of the flow control system, the generator outlet conduit is fluidly coupled with the main conduit downstream of the flow control system; and
a generator comprising a rotor assembly, wherein the generator is positioned with the rotor assembly cooperated with generator conduit and configured to be physically activated by a flow of fluid through the generator conduit causing rotation of the rotor assembly and a generation of electrical power in response to the rotation of the rotor assembly;
wherein the flow control system is configured to transition between a closed state to an open state in response to a water pressure within the inlet conduit exceeding a first pressure threshold enabling water to flow through the main conduit and preventing water flow greater than a threshold flow rate through the generator conduit.

2. The system of claim 1, wherein in the closed state the flow control system prevents water from flowing along a primary flow path from the inlet conduit and through the flow control system.

3. The system of claim 1, wherein the flow control system is configured to variably open between the closed state and a maximum open state as a function of a variable water pressure between the first pressure threshold and a maximum pressure threshold while preventing the water flow greater than the threshold flow rate through the generator conduit while the water pressure is less than or equal to the maximum pressure threshold.

4. The system of claim 3, wherein the flow control system comprises a biased diaphragm configured to transition between the closed state and the maximum open state as a function of the variable water pressure between the first pressure threshold and the maximum pressure threshold.

5. The system of claim 1, wherein the main conduit comprises a flow aperture defining a flow area through which the water in the main conduit flows; and
wherein the flow control system comprises:
a regulator positioned across the flow aperture and extending across the flow area of the main conduit, wherein the regulator comprises a biased diaphragm configured to variably move between a closed position and a maximum open position as a function of the water pressure within the inlet conduit between the first pressure threshold and a maximum pressure threshold maintaining a substantially constant generator water flow through the generator conduit while the water pressure within the main conduit is between the first pressure threshold and the maximum pressure threshold.

6. The system of claim 5, wherein the generator conduit comprises:
a rotor cavity within which is positioned the rotor assembly, wherein the rotor assembly rotates within the rotor cavity in response to fluid flow through the rotor cavity; and
a cavity inlet feed fluidly coupled between the generator inlet conduit and the rotor cavity enabling water to flow from the generator inlet conduit into the rotor cavity, wherein a cross-sectional area of the cavity inlet feed is less than a cross-sectional area of the generator inlet conduit.

7. The system of claim 6, wherein the cavity inlet feed is fluidly coupled with an inlet aperture having a cross-section area that is less than the cross-sectional area of the cavity inlet feed, wherein the inlet aperture is aligned with the rotor assembly and configured to direct the water flow at the rotor assembly.

8. The system of claim 6, further comprising:
a generator protection system positioned within the generator conduit and configured to control a flow of water to the rotor cavity as a function of pressure in the generator inlet conduit.

9. The system of claim 6, further comprising:
a generator protection system positioned within the generator conduit and configured to close in response to a generator conduit pressure exceeding a second pressure threshold and preventing the flow of water into the rotor cavity.

10. The system of claim 1 further comprising:
a rechargeable power storage system; and
a bridge rectifier coupled with an output of the generator and further coupled with the rechargeable power storage system, wherein the bridge rectifier is configured to supply power from the generator to the rechargeable power storage system;
wherein the rechargeable power storage system is configured to repeatedly receive and store the electrical power generated by the generator and supplied through the bridge rectifier.

11. The system of claim 1, further comprising:
an irrigation control device powered by the electrical power generated by the generator, wherein the irrigation control device comprises:
a wireless transceiver; and
an irrigation control device control circuit communicatively coupled with the wireless transceiver and configured to receive and transmit communications via the wireless transceiver, and to implement an irrigation schedule stored local at the irrigation control device and output valve signals to cause activation of one or more valves; and
a wireless valve system separate from the irrigation control device, wherein the wireless valve system comprises:
a housing separate and remote from the irrigation control device, wherein the main conduit, the generator conduit and the generator are positioned within the housing;
a valve control system maintained within the housing comprising:
a rechargeable power storage system electrically coupled with the generator and configured to repeatedly receive and store electrical power generated by the generator;
a first wireless valve transceiver;
a drive output electrically coupled with the rechargeable power storage system; and
a valve control circuit electrically coupled with and receiving operational power from the rechargeable power storage system, and the valve control circuit is further communicatively coupled with the wireless valve transceiver and the drive output, wherein the valve control circuit is configured to activate, in response to a valve signal wirelessly received from the irrigation control device, the drive output to output a drive signal powered from the rechargeable power storage system to power an irrigation valve to transition between a closed state and an open state.

12. The system of claim 1, further comprising:
a generator protection system comprising a solenoid system cooperated with the generator conduit, wherein the solenoid system, when activated, is configured to transition from an open state to a closed state closing the generator inlet conduit from the main conduit and preventing a flow from the main conduit through the generator conduit.

13. The system of claim 1, further comprising:
a rechargeable power storage system electrically coupled with the generator and configured to receive and store electrical power generated by the generator;
a solenoid system cooperated with the generator conduit, wherein the solenoid system, when activated, is configured to enable water to flow through the generator conduit for at least a threshold duration prior to the flow control system transitioning from the closed position to the open position;
a wireless transceiver;
an irrigation valve;
a drive output electrically coupled with the rechargeable power storage system;
a control circuit communicatively coupled with the wireless transceiver and the drive output, wherein the control circuit is configured to receive power from the rechargeable power storage system and to activate, in response to a valve activation signal, the drive output to output a first drive signal configured to activate the irrigation valve.

14. The system of claim 1, further comprising:
irrigation rotor system comprising:
    a riser configured to rise from a non-active position to an active position and emit water from at least one water emitter of the riser in the active position;
    a valve system cooperated with the main conduit and configured to control the flow of water from the main conduit to the at least one water emitter;
    a wireless transceiver;
    a drive output electrically coupled with the rechargeable power storage system and the valve system; and
    a control circuit communicatively coupled with the wireless transceiver and the drive output, wherein the control circuit is configured to receive power from the rechargeable power storage system and to activate, in response to a valve activation signal, the drive output to output a drive signal configured to activate the valve system.

15. A method of generating electrical power for irrigation control comprising:
establishing a primary flow path through an inlet conduit of a main conduit of an irrigation generator system and out of an outlet conduit of the main conduit;
establishing a generator flow path through a generator conduit fluidly coupled at a generator inlet conduit with the main conduit and fluidly coupled downstream with the main conduit through a generator outlet conduit;
cooperating a rotor assembly of a generator with the generator conduit;
generating electrical power in response a physical activation of the rotor assembly by a flow of fluid through the generator conduit causing rotation of the rotor assembly; and
controlling the fluid flow through the generator conduit comprising transitioning a flow control system from a closed state to an open state in response to a water pressure within the inlet conduit exceeding a first pressure threshold enabling water to flow through the main conduit and preventing water flow greater than a threshold flow rate through the generator conduit.

16. The method of claim 15, wherein the controlling the fluid flow through the generator conduit comprises maintaining the flow control system in the closed state and preventing water from flowing along the primary flow path from the inlet conduit and through the flow control system in response to the water pressure within the inlet conduit being less than the first pressure threshold.

17. The method of claim 15, wherein the controlling the fluid flow through the generator conduit comprises variably opening the flow control system between the closed state and a maximum open state as a function of a variable water pressure between the first pressure threshold and a maximum pressure threshold, and preventing the water flow greater than the threshold flow rate through the generator conduit while the water pressure is less than or equal to the maximum pressure threshold.

18. The method of claim 17, wherein the variably opening the flow control system comprises biasing a diaphragm toward a closed position wherein the biasing enables the transiting between the closed state and the maximum open state as a function of the variable water pressure between the first pressure threshold and the maximum pressure threshold.

19. The method of claim 15, wherein the controlling the fluid flow through the generator conduit comprises:
positioning a biased diaphragm of a regulator across a flow aperture of the main conduit; and
maintaining a substantially constant generator water flow through the generator conduit while the water pressure within the main conduit is between the first pressure threshold and a maximum pressure threshold in response to the biased diaphragm moving between a closed position and a maximum open position as a function of the water pressure within the inlet conduit while the water pressure is between the first pressure threshold and the maximum pressure threshold.

20. The method of claim 19, wherein the generating the electrical power in response a physical activation of the rotor assembly by a flow of fluid through the generator conduit causing rotation of the rotor assembly comprises:
positioning a rotor within a rotor cavity of the generator conduit; and
causing the fluid to flow from the generator inlet conduit through a cavity inlet feed fluidly coupled between the generator inlet conduit and the rotor cavity enabling water to flow from the generator inlet conduit into the rotor cavity, wherein a cross-sectional area of the cavity inlet feed is less than a cross-sectional area of the generator inlet conduit.

21. The method of claim 20, further comprising:
fluidly coupling the cavity inlet feed with an inlet aperture having a cross-section area that is less than the cross-sectional area of the cavity inlet feed, wherein the inlet aperture is aligned with the rotor assembly and configured to direct the water flow at the rotor assembly.

22. The method of claim 20, further comprising:
controlling, through activation of a generator protection system, a flow of water through the generator conduit and to the rotor cavity as a function of pressure in the generator inlet conduit, and protecting the generator.

23. The method of claim 20, further comprising:
preventing the flow of water through the generator conduit in response to a generator conduit pressure exceeding a second pressure threshold.

24. The method of claim 15, further comprising:
repeatedly recharging a rechargeable power storage system with the electrical power generated by the generator and supplied through a bridge rectifier.

25. The method of claim 15, further comprising:
repeatedly recharging and storing the electrical power generated by the generator in a rechargeable power storage system electrically coupled with the generator;
powering, from the rechargeable power storage system, a wireless transceiver and a valve control circuit of a valve control system;
wirelessly receiving a valve signal through the wireless transceiver and from a remote irrigation control device; and
activating, by the valve control circuit in response to the valve signal, a drive output to output a drive signal powered from the rechargeable power storage system to power an irrigation valve to transition between a closed state and an open state.

26. The method of claim 15, further comprising:
controlling a solenoid system cooperated with the generator conduit to transition from an open state to a closed state closing the inlet conduit from the main conduit and preventing a flow from the main conduit through the rotor cavity.

\* \* \* \* \*

UNITED STATES PATENT AND TRADEMARK OFFICE
CERTIFICATE OF CORRECTION

PATENT NO. : 11,990,823 B2
APPLICATION NO. : 17/744349
DATED : May 21, 2024
INVENTOR(S) : Michael J. Millius et al.

It is certified that error appears in the above-identified patent and that said Letters Patent is hereby corrected as shown below:

In the Claims

In Column 88, Claim 10, Line 21, delete "claim 1" and insert -- claim 1, --.

In Column 89, Claim 15, Line 64, delete "response a" and insert -- response to a --.

In Column 90, Claim 20, Line 45, delete "response a" and insert -- response to a --.

Signed and Sealed this
Third Day of September, 2024

Katherine Kelly Vidal
*Director of the United States Patent and Trademark Office*